United States Patent
Rosenbluth et al.

(10) Patent No.: US 12,453,853 B2
(45) Date of Patent: Oct. 28, 2025

(54) MULTI-MODAL STIMULATION FOR TREATING TREMOR

(71) Applicant: Cala Health, Inc., San Mateo, CA (US)

(72) Inventors: Kathryn H. Rosenbluth, San Francisco, CA (US); Scott Lee Delp, Stanford, CA (US); John Paderi, San Francisco, CA (US); Vijaykumar Rajasekhar, San Francisco, CA (US); Tahel Altman, San Francisco, CA (US); Samuel Richard Hamner, San Francisco, CA (US); Erika Kristine Ross, San Mateo, CA (US)

(73) Assignee: Cala Health, Inc., San Mateo, CA (US)

(*) Notice: Subject to any disclaimer, the term of this patent is extended or adjusted under 35 U.S.C. 154(b) by 0 days.

(21) Appl. No.: 16/020,876

(22) Filed: Jun. 27, 2018

(65) Prior Publication Data

US 2019/0001129 A1    Jan. 3, 2019

Related U.S. Application Data

(63) Continuation-in-part of application No. 15/277,946, filed on Sep. 27, 2016, now Pat. No. 10,850,090.
(Continued)

(51) Int. Cl.
*A61N 1/36* (2006.01)
*A61N 1/02* (2006.01)
(Continued)

(52) U.S. Cl.
CPC ......... *A61N 1/36014* (2013.01); *A61N 1/025* (2013.01); *A61N 1/0456* (2013.01);
(Continued)

(58) Field of Classification Search
None
See application file for complete search history.

(56) References Cited

U.S. PATENT DOCUMENTS

| 3,204,637 A | 9/1965 | Frank et al. |
| 3,870,051 A | 3/1975 | Brindley |

(Continued)

FOREIGN PATENT DOCUMENTS

| CN | 1135722 | 11/1996 |
| CN | 1547483 | 11/2004 |

(Continued)

OTHER PUBLICATIONS

U.S. Appl. No. 16/071,056, filed Jul. 18, 2018, Wong et al.
(Continued)

*Primary Examiner* — Erica S Lee
(74) *Attorney, Agent, or Firm* — Knobbe, Martens, Olson & Bear, LLP

(57) ABSTRACT

A peripheral nerve stimulator to stimulate a peripheral nerve to treat essential tremor and other movement disorders, as well as overactive bladder, cardiac dysfunction and neurotransmitter dysfunction is provided. The peripheral nerve stimulator can be a noninvasive surface stimulator to provide multi-modal optimized therapy. Stimulation can be vibrational, electromechanical, thermal, radiant, electrical, magnetic, electromagnetic, light, mechanical, chemical, thermal, ultrasonic, radiofrequency (RF), acoustic, infrared, ultraviolet, x-ray, and/or microwave. Stimulation can be delivered using an open loop system and/or a closed loop system with feedback. Stimulation can be to one site or multiple sites.

18 Claims, 26 Drawing Sheets

Related U.S. Application Data which is a continuation of application No. 14/805,385, filed on Jul. 21, 2015, now Pat. No. 9,452,287, which is a continuation of application No. PCT/US2014/012388, filed on Jan. 21, 2014.

(60) Provisional application No. 61/857,248, filed on Jul. 23, 2013, provisional application No. 61/822,215, filed on May 10, 2013, provisional application No. 61/815,919, filed on Apr. 25, 2013, provisional application No. 61/786,549, filed on Mar. 15, 2013, provisional application No. 61/754,945, filed on Jan. 21, 2013.

(51) Int. Cl.
  *A61N 1/04* (2006.01)
  *A61N 1/08* (2006.01)
  *A61N 1/18* (2006.01)

(52) U.S. Cl.
  CPC ......... *A61N 1/0476* (2013.01); *A61N 1/0492* (2013.01); *A61N 1/08* (2013.01); *A61N 1/18* (2013.01); *A61N 1/36067* (2013.01)

(56) References Cited

U.S. PATENT DOCUMENTS

| | | | |
|---|---|---|---|
| 4,103,808 A | 8/1978 | Hallman et al. | |
| 4,233,986 A | 11/1980 | Tannenbaum | |
| 4,300,575 A | 11/1981 | Wilson | |
| 4,458,696 A | 7/1984 | Larimore | |
| 4,461,075 A | 7/1984 | Bailey | |
| 4,539,996 A | 9/1985 | Engel | |
| 4,569,351 A | 2/1986 | Tang | |
| 4,582,049 A | 4/1986 | Ylvisaker | |
| 4,729,377 A | 3/1988 | Granek et al. | |
| 4,739,764 A | 4/1988 | Lue et al. | |
| 4,763,659 A | 8/1988 | Dunseath, Jr. | |
| 4,769,881 A | 9/1988 | Pedigo et al. | |
| 4,771,779 A | 9/1988 | Tanagho et al. | |
| 4,917,092 A | 4/1990 | Todd et al. | |
| 4,981,146 A | 1/1991 | Bertolucci | |
| 4,982,432 A | 1/1991 | Clark et al. | |
| 4,996,987 A | 3/1991 | Petrofsky | |
| 5,003,978 A | 4/1991 | Dunseath, Jr. | |
| 5,052,391 A | 10/1991 | Silverstone et al. | |
| 5,070,862 A | 12/1991 | Berlant | |
| 5,137,507 A | 8/1992 | Park | |
| 5,330,516 A | 7/1994 | Nathan | |
| 5,395,398 A | 3/1995 | Rogozinski | |
| 5,397,338 A | 3/1995 | Grey et al. | |
| 5,514,175 A | 5/1996 | Kim et al. | |
| 5,540,235 A | 7/1996 | Wilson | |
| 5,562,707 A | 10/1996 | Prochazka et al. | |
| 5,562,717 A | 10/1996 | Tippey et al. | |
| 5,573,011 A | 11/1996 | Felsing | |
| 5,575,294 A | 11/1996 | Perry et al. | |
| 5,606,968 A | 3/1997 | Mang | |
| 5,643,173 A | 7/1997 | Welles | |
| 5,775,331 A | 7/1998 | Raymond et al. | |
| 5,833,709 A | 11/1998 | Rise et al. | |
| 5,833,716 A | 11/1998 | Bar-Or et al. | |
| 5,899,922 A | 5/1999 | Loos | |
| 5,961,542 A | 10/1999 | Agarwala | |
| 6,016,449 A | 1/2000 | Fischell et al. | |
| 6,076,018 A | 6/2000 | Sturman et al. | |
| 6,081,744 A * | 6/2000 | Loos | A61N 1/36014 607/2 |
| 6,161,044 A | 12/2000 | Silverstone | |
| 6,178,352 B1 | 1/2001 | Gruzdowich et al. | |
| 6,351,674 B2 | 2/2002 | Silverstone | |
| 6,366,813 B1 | 4/2002 | DiLorenzo | |
| 6,366,814 B1 | 4/2002 | Boveja et al. | |
| 6,445,955 B1 | 9/2002 | Michelson et al. | |
| 6,449,512 B1 | 9/2002 | Boveja | |
| 6,453,204 B1 | 9/2002 | Rhoads | |
| 6,505,074 B2 | 1/2003 | Boveja et al. | |
| 6,546,290 B1 | 4/2003 | Shloznikov | |
| 6,564,103 B2 | 5/2003 | Fischer et al. | |
| 6,579,270 B2 | 6/2003 | Sussman et al. | |
| 6,652,449 B1 | 11/2003 | Gross et al. | |
| 6,678,548 B1 | 1/2004 | Echauz et al. | |
| 6,701,185 B2 | 3/2004 | Burnett et al. | |
| 6,704,603 B1 | 3/2004 | Gesotti | |
| 6,731,987 B1 | 5/2004 | McAdams et al. | |
| 6,735,474 B1 | 5/2004 | Loeb et al. | |
| 6,735,480 B2 | 5/2004 | Giuntoli et al. | |
| 6,788,976 B2 | 9/2004 | Gesotti | |
| 6,819,956 B2 | 11/2004 | DiLorenzo | |
| 6,829,510 B2 | 12/2004 | Nathan et al. | |
| 6,836,684 B1 | 12/2004 | Rijkhoff et al. | |
| 6,862,480 B2 | 3/2005 | Cohen et al. | |
| 6,892,098 B2 | 5/2005 | Ayal et al. | |
| 6,937,905 B2 | 8/2005 | Carroll et al. | |
| 6,959,215 B2 | 10/2005 | Gliner et al. | |
| 6,959,216 B2 | 10/2005 | Faghri | |
| 6,988,005 B2 | 1/2006 | McGraw et al. | |
| 7,010,352 B2 | 3/2006 | Hogan | |
| 7,089,061 B2 | 8/2006 | Grey | |
| 7,146,220 B2 | 12/2006 | Dar et al. | |
| 7,162,305 B2 | 1/2007 | Tong et al. | |
| 7,171,266 B2 | 1/2007 | Gruzdowich et al. | |
| 7,177,694 B2 | 2/2007 | Elbaum | |
| 7,177,703 B2 | 2/2007 | Boveja et al. | |
| 7,209,787 B2 | 4/2007 | DiLorenzo | |
| 7,228,178 B2 | 6/2007 | Carroll et al. | |
| 7,231,254 B2 | 6/2007 | DiLorenzo | |
| 7,236,830 B2 | 6/2007 | Gliner | |
| 7,254,444 B2 | 8/2007 | Moore et al. | |
| 7,277,758 B2 | 10/2007 | DiLorenzo | |
| 7,324,851 B1 | 1/2008 | DiLorenzo | |
| 7,326,235 B2 | 2/2008 | Edwards | |
| 7,328,068 B2 | 2/2008 | Spinelli et al. | |
| 7,349,739 B2 | 3/2008 | Harry et al. | |
| 7,353,064 B2 | 4/2008 | Gliner et al. | |
| 7,369,896 B2 | 5/2008 | Gesotti | |
| 7,499,747 B2 | 3/2009 | Kieval et al. | |
| 7,529,582 B1 | 5/2009 | DiLorenzo | |
| 7,558,610 B1 | 7/2009 | Odderson | |
| 7,636,602 B2 | 12/2009 | Baru Fassio et al. | |
| 7,640,052 B2 | 12/2009 | Weinstock | |
| 7,643,880 B2 | 1/2010 | Tanagho et al. | |
| 7,643,882 B2 | 1/2010 | Boston | |
| 7,647,112 B2 | 1/2010 | Tracey et al. | |
| 7,650,190 B2 | 1/2010 | Zhou et al. | |
| 7,657,317 B2 | 2/2010 | Thacker et al. | |
| 7,742,820 B2 | 6/2010 | Wyler et al. | |
| 7,761,166 B2 | 7/2010 | Giftakis et al. | |
| 7,769,464 B2 | 8/2010 | Gerber et al. | |
| 7,801,585 B1 | 9/2010 | Weinstock | |
| 7,857,771 B2 | 12/2010 | Alwan et al. | |
| 7,899,527 B2 | 3/2011 | Yun et al. | |
| 7,899,556 B2 | 3/2011 | Nathan et al. | |
| 7,917,201 B2 | 3/2011 | Gozani et al. | |
| 7,930,034 B2 | 4/2011 | Gerber | |
| 7,949,403 B2 | 5/2011 | Palermo et al. | |
| 7,957,814 B2 | 6/2011 | Goetz et al. | |
| 7,974,696 B1 | 7/2011 | DiLorenzo | |
| 7,974,698 B2 | 7/2011 | Tass et al. | |
| 7,991,476 B2 | 8/2011 | Nachum | |
| 7,996,088 B2 | 8/2011 | Marrosu et al. | |
| 7,998,092 B2 | 8/2011 | Avni | |
| 8,000,796 B2 | 8/2011 | Tass | |
| 8,025,632 B2 | 9/2011 | Einarsson | |
| 8,046,083 B2 | 10/2011 | Al. | |
| 8,064,988 B2 | 11/2011 | Weinstock | |
| 8,075,499 B2 | 12/2011 | Nathan et al. | |
| 8,086,318 B2 | 12/2011 | Strother et al. | |
| 8,108,047 B2 | 1/2012 | Schumann | |
| 8,121,694 B2 | 2/2012 | Molnar et al. | |
| 8,145,316 B2 | 3/2012 | Deem et al. | |
| 8,165,668 B2 | 4/2012 | Dacey, Jr. et al. | |
| 8,165,685 B1 | 4/2012 | Knutson et al. | |

(56) References Cited

U.S. PATENT DOCUMENTS

| | | |
|---|---|---|
| 8,170,658 B2 | 5/2012 | Dacey, Jr. et al. |
| 8,175,718 B2 | 5/2012 | Wahlgren et al. |
| 8,187,209 B1 | 5/2012 | Guiffrida et al. |
| 8,190,249 B1 | 5/2012 | Gharieb et al. |
| 8,195,287 B2 | 6/2012 | Dacey, Jr. et al. |
| 8,209,036 B2 | 6/2012 | Nathan et al. |
| 8,219,188 B2 | 7/2012 | Craig |
| 8,233,988 B2 | 7/2012 | Errico et al. |
| 8,260,439 B2 | 9/2012 | Diubaldi et al. |
| 8,265,763 B2 | 9/2012 | Fahey |
| 8,301,215 B2 | 10/2012 | Lee |
| 8,306,624 B2 | 11/2012 | Gerber et al. |
| 8,308,665 B2 | 11/2012 | Harry et al. |
| 8,313,443 B2 | 11/2012 | Tom |
| 8,326,398 B2 | 12/2012 | Weinstock |
| 8,326,432 B2 | 12/2012 | Kalisek |
| 8,343,026 B2 | 1/2013 | Gardiner et al. |
| 8,364,257 B2 | 1/2013 | Van Den Eerenbeemd et al. |
| 8,374,701 B2 | 2/2013 | Hyde et al. |
| 8,380,314 B2 | 2/2013 | Al. |
| 8,382,688 B2 | 2/2013 | Dar et al. |
| 8,391,970 B2 | 3/2013 | Tracey et al. |
| 8,396,556 B2 | 3/2013 | Libbus et al. |
| 8,406,841 B2 | 3/2013 | Lin et al. |
| 8,409,116 B2 | 4/2013 | Wang et al. |
| 8,412,338 B2 | 4/2013 | Faltys |
| 8,414,507 B2 | 4/2013 | Asada |
| 8,417,351 B2 | 4/2013 | Kilger |
| 8,428,719 B2 | 4/2013 | Napadow |
| 8,430,805 B2 | 4/2013 | Burnett et al. |
| 8,435,166 B2 | 5/2013 | Burnett et al. |
| 8,447,411 B2 | 5/2013 | Skelton et al. |
| 8,452,410 B2 | 5/2013 | Emborg et al. |
| 8,463,374 B2 | 6/2013 | Hudson et al. |
| 8,473,064 B2 | 6/2013 | Castel et al. |
| 8,538,512 B1 | 9/2013 | Bibian et al. |
| 8,548,594 B2 | 10/2013 | Thimineur et al. |
| 8,571,687 B2 | 10/2013 | Libbus et al. |
| 8,581,731 B2 | 11/2013 | Purks et al. |
| 8,583,238 B1 | 11/2013 | Heldman et al. |
| 8,588,884 B2 | 11/2013 | Hegde et al. |
| 8,588,917 B2 | 11/2013 | Whitehurst et al. |
| 8,608,671 B2 | 12/2013 | Kinoshita et al. |
| 8,626,305 B2 | 1/2014 | Nielsen et al. |
| 8,639,342 B2 | 1/2014 | Possover |
| 8,644,904 B2 | 2/2014 | Chang et al. |
| 8,644,938 B2 | 2/2014 | Craggs |
| 8,660,656 B2 | 2/2014 | Moser et al. |
| 8,666,496 B2 | 3/2014 | Simon et al. |
| 8,679,038 B1 | 3/2014 | Giuffrida |
| 8,682,441 B2 | 3/2014 | De Ridder |
| 8,688,220 B2 | 4/2014 | Degiorgio et al. |
| 8,694,104 B2 | 4/2014 | Libbus et al. |
| 8,694,110 B2 | 4/2014 | Nathan et al. |
| 8,702,584 B2 | 4/2014 | Rigaux et al. |
| 8,702,629 B2 | 4/2014 | Giuffrida et al. |
| 8,706,241 B2 | 4/2014 | Firlik et al. |
| 8,718,780 B2 | 5/2014 | Lee |
| 8,738,143 B2 | 5/2014 | Tucker et al. |
| 8,740,825 B2 | 6/2014 | Ehrenreich et al. |
| 8,744,587 B2 | 6/2014 | Miesel et al. |
| 8,755,892 B2 | 6/2014 | Amurthur et al. |
| D709,874 S | 7/2014 | Aumiller et al. |
| 8,768,452 B2 | 7/2014 | Gerber |
| 8,788,045 B2 | 7/2014 | Gross et al. |
| 8,788,049 B2 | 7/2014 | Lasko et al. |
| 8,792,977 B2 | 7/2014 | Kakei et al. |
| 8,798,698 B2 | 8/2014 | Kim et al. |
| 8,821,416 B2 | 9/2014 | Johansson et al. |
| 8,825,163 B2 | 9/2014 | Grill et al. |
| 8,825,165 B2 | 9/2014 | Possover |
| 8,843,201 B1 | 9/2014 | Heldman et al. |
| 8,845,494 B2 | 9/2014 | Whitall et al. |
| 8,845,557 B1 | 9/2014 | Giuffrida et al. |
| 8,849,371 B2 | 9/2014 | Weinstock |
| 8,855,775 B2 | 10/2014 | Leyde |
| 8,862,238 B2 | 10/2014 | Rahimi et al. |
| 8,862,247 B2 | 10/2014 | Schoendorf et al. |
| 8,868,177 B2 | 10/2014 | Simon et al. |
| 8,874,227 B2 | 10/2014 | Simon et al. |
| 8,880,175 B2 | 11/2014 | Simon |
| 8,886,321 B2 | 11/2014 | Rohrer et al. |
| 8,892,200 B2 | 11/2014 | Wagner et al. |
| 8,897,870 B2 | 11/2014 | De Ridder |
| 8,903,494 B2 | 12/2014 | Goldwasser et al. |
| 8,920,345 B2 | 12/2014 | Greenberg et al. |
| 8,923,970 B2 | 12/2014 | Bar-Yoseph et al. |
| 8,948,876 B2 | 2/2015 | Gozani et al. |
| 8,961,439 B2 | 2/2015 | Yang et al. |
| 8,972,017 B2 | 3/2015 | Dar et al. |
| 8,989,861 B2 | 3/2015 | Su et al. |
| 9,002,477 B2 | 4/2015 | Burnett |
| 9,005,102 B2 | 4/2015 | Burnett et al. |
| 9,008,781 B2 | 4/2015 | Ahmed |
| 9,011,310 B2 | 4/2015 | Ahmed |
| 9,017,273 B2 | 4/2015 | Burbank et al. |
| 9,026,216 B2 | 5/2015 | Rossi et al. |
| 9,042,988 B2 | 5/2015 | Dilorenzo |
| 9,060,747 B2 | 6/2015 | Salorio |
| 9,079,029 B2 | 7/2015 | Weinstock |
| 9,089,691 B2 | 7/2015 | Libbus et al. |
| 9,095,351 B2 | 8/2015 | Sachs et al. |
| 9,095,417 B2 | 8/2015 | Dar et al. |
| 9,107,614 B2 | 8/2015 | Halkias et al. |
| 9,119,964 B2 | 9/2015 | Marnfeldt |
| 9,155,885 B2 | 10/2015 | Wei et al. |
| 9,155,890 B2 | 10/2015 | Guntinas-Lichius et al. |
| 9,162,059 B1 | 10/2015 | Lindenthaler |
| 9,168,374 B2 | 10/2015 | Su |
| 9,174,045 B2 | 11/2015 | Simon et al. |
| 9,186,095 B2 | 11/2015 | Machado et al. |
| 9,192,763 B2 | 11/2015 | Gerber et al. |
| 9,220,431 B2 | 12/2015 | Holzhacker |
| 9,220,895 B2 | 12/2015 | Siff et al. |
| 9,227,056 B1 | 1/2016 | Heldman et al. |
| 9,238,137 B2 | 1/2016 | Einav et al. |
| 9,238,142 B2 | 1/2016 | Heldman et al. |
| 9,242,085 B2 | 1/2016 | Hershey et al. |
| 9,248,285 B2 | 2/2016 | Haessler |
| 9,248,286 B2 | 2/2016 | Simon et al. |
| 9,248,297 B2 | 2/2016 | Hoyer et al. |
| 9,254,382 B2 | 2/2016 | Ahmad et al. |
| 9,259,577 B2 | 2/2016 | Kaula et al. |
| 9,265,927 B2 | 2/2016 | Yonce et al. |
| 9,282,928 B1 | 3/2016 | Giffrida |
| 9,289,607 B2 | 3/2016 | Su et al. |
| 9,301,712 B2 | 4/2016 | McNames et al. |
| 9,302,046 B1 | 4/2016 | Giuffrida et al. |
| 9,302,117 B2 | 4/2016 | De Vincentiis |
| 9,311,686 B2 | 4/2016 | Roush et al. |
| 9,314,190 B1 | 4/2016 | Giuffrida et al. |
| 9,314,622 B2 | 4/2016 | Embrey et al. |
| 9,332,918 B1 | 5/2016 | Buckley et al. |
| 9,339,213 B2 | 5/2016 | Otsamo et al. |
| 9,339,641 B2 | 5/2016 | Rajguru et al. |
| 9,345,872 B2 | 5/2016 | Groteke |
| 9,364,657 B2 | 6/2016 | Kiani et al. |
| 9,364,672 B2 | 6/2016 | Marnfeldt |
| 9,375,570 B2 | 6/2016 | Kiani et al. |
| 9,387,338 B2 | 7/2016 | Burnett |
| 9,393,430 B2 | 7/2016 | Demers et al. |
| 9,408,683 B2 | 8/2016 | St. Anne et al. |
| 9,414,776 B2 | 8/2016 | Sillay et al. |
| 9,415,205 B2 | 8/2016 | Lasko et al. |
| D767,436 S | 9/2016 | Goodner et al. |
| 9,452,287 B2 | 9/2016 | Rosenbluth et al. |
| 9,468,753 B2 | 10/2016 | Fisher et al. |
| 9,474,898 B2 | 10/2016 | Gozani et al. |
| 9,549,872 B2 | 1/2017 | Chen et al. |
| 9,550,068 B2 | 1/2017 | Weinstock |
| 9,581,972 B1 | 2/2017 | Arrow et al. |
| 9,586,038 B1 | 3/2017 | Kosierkiewicz |
| 9,589,698 B2 | 3/2017 | Anhalt et al. |
| 9,597,509 B2 | 3/2017 | Hoffer et al. |

(56) References Cited

U.S. PATENT DOCUMENTS

| | | |
|---|---|---|
| 9,610,442 B2 | 4/2017 | Yoo et al. |
| 9,610,459 B2 | 4/2017 | Burnett et al. |
| 9,615,797 B2 | 4/2017 | John |
| 9,630,004 B2 | 4/2017 | Rajguru et al. |
| 9,649,486 B2 | 5/2017 | Holzhacker |
| 9,656,070 B2 | 5/2017 | Gozani et al. |
| 9,669,211 B2 | 6/2017 | Wijting et al. |
| 9,675,800 B2 | 6/2017 | Li et al. |
| 9,675,801 B2 | 6/2017 | Kong et al. |
| 9,707,393 B2 | 7/2017 | Hsueh et al. |
| 9,731,126 B2 | 8/2017 | Ferree et al. |
| 9,757,584 B2 | 9/2017 | Burnett |
| 9,782,584 B2 | 10/2017 | Cartledge et al. |
| 9,802,041 B2 | 10/2017 | Wong et al. |
| 9,826,921 B2 | 11/2017 | Griffiths et al. |
| 9,861,283 B1 | 1/2018 | Giuffrida |
| 9,877,679 B1 | 1/2018 | Giuffrida |
| 9,877,680 B1 | 1/2018 | Giuffrida et al. |
| 9,884,179 B2 | 2/2018 | Bouton et al. |
| 9,924,899 B2 | 3/2018 | Pracar et al. |
| 9,956,395 B2 | 5/2018 | Bikson et al. |
| 9,974,478 B1 | 5/2018 | Brokaw et al. |
| 9,980,659 B2 | 5/2018 | Sadeghian-Motahar et al. |
| 9,992,918 B2 | 6/2018 | Watanabe et al. |
| 10,004,900 B2 | 6/2018 | Kent et al. |
| 10,016,600 B2 | 7/2018 | Creasey et al. |
| 10,022,545 B1 | 7/2018 | Giuffrida |
| 10,028,695 B2 | 7/2018 | Machado et al. |
| 10,045,740 B2 | 8/2018 | John |
| 10,046,161 B2 | 8/2018 | Biasiucci et al. |
| D828,351 S | 9/2018 | Xi et al. |
| 10,076,656 B2 | 9/2018 | Dar et al. |
| 10,080,885 B2 | 9/2018 | Nathan et al. |
| 10,085,670 B2 | 10/2018 | Crosson et al. |
| 10,112,040 B2 | 10/2018 | Herb et al. |
| 10,118,035 B2 | 11/2018 | Perez et al. |
| 10,130,809 B2 | 11/2018 | Cartledge et al. |
| 10,130,810 B2 | 11/2018 | Ferree et al. |
| 10,137,025 B2 | 11/2018 | Fior et al. |
| 10,173,060 B2 | 1/2019 | Wong et al. |
| 10,179,238 B2 | 1/2019 | Wong et al. |
| 10,213,593 B2 | 2/2019 | Kaplan et al. |
| 10,213,602 B2 | 2/2019 | Ironi et al. |
| 10,232,174 B2 | 3/2019 | Simon et al. |
| 10,252,053 B2 | 4/2019 | Page et al. |
| 10,285,646 B1 | 5/2019 | Grant et al. |
| 10,286,210 B2 | 5/2019 | Yoo |
| 10,293,159 B2 | 5/2019 | Kong et al. |
| 10,335,594 B2 | 7/2019 | Lin et al. |
| 10,335,595 B2 | 7/2019 | Ferree et al. |
| 10,342,977 B2 | 7/2019 | Raghunathan |
| 10,398,896 B2 | 9/2019 | Lin et al. |
| 10,456,573 B1 | 10/2019 | Feinstein et al. |
| 10,463,854 B2 | 11/2019 | Perez |
| 10,499,848 B2 | 12/2019 | Weinstock |
| 10,500,396 B2 | 12/2019 | Tamaki et al. |
| 10,537,732 B2 | 1/2020 | Nachum et al. |
| 10,549,093 B2 | 2/2020 | Wong et al. |
| 10,556,107 B2 | 2/2020 | Yoo et al. |
| 10,561,839 B2 | 2/2020 | Wong et al. |
| 10,603,482 B2 | 3/2020 | Hamner et al. |
| 10,610,114 B2 | 4/2020 | Buckley et al. |
| 10,625,074 B2 | 4/2020 | Rosenbluth et al. |
| 10,632,312 B2 | 4/2020 | Ziv |
| 10,661,082 B2 | 5/2020 | Kerselaers |
| 10,716,941 B2 | 7/2020 | Yang et al. |
| 10,722,709 B2 | 7/2020 | Yoo et al. |
| 10,765,856 B2 | 9/2020 | Wong et al. |
| 10,773,079 B2 | 9/2020 | Keller et al. |
| 10,780,269 B2 | 9/2020 | Gozani et al. |
| 10,786,199 B1 | 9/2020 | Giuffrida et al. |
| 10,786,669 B2 | 9/2020 | Rajguru et al. |
| 10,814,130 B2 | 10/2020 | Wong et al. |
| 10,814,131 B2 | 10/2020 | Goldwasser et al. |
| D902,769 S | 11/2020 | Riot et al. |
| 10,835,736 B2 | 11/2020 | Horter et al. |
| 10,850,090 B2 | 12/2020 | Rosenbluth et al. |
| 10,870,002 B2 | 12/2020 | Wybo et al. |
| 10,905,879 B2 | 2/2021 | Wong et al. |
| 10,918,853 B2 | 2/2021 | Creasey et al. |
| 10,940,311 B2 | 3/2021 | Gozani et al. |
| 10,945,879 B2 | 3/2021 | Black et al. |
| 10,960,207 B2 | 3/2021 | Wong et al. |
| D915,399 S | 4/2021 | Chao et al. |
| 10,967,177 B2 | 4/2021 | Lee |
| 11,026,835 B2 | 6/2021 | Black et al. |
| 11,033,206 B2 | 6/2021 | Roh |
| 11,033,731 B2 | 6/2021 | Jeffery et al. |
| 11,033,736 B2 | 6/2021 | Edgerton et al. |
| 11,058,867 B2 | 7/2021 | Nathan et al. |
| 11,077,300 B2 | 8/2021 | McBride |
| 11,077,301 B2 | 8/2021 | Creasey et al. |
| 11,079,225 B2 | 8/2021 | Ong et al. |
| 11,103,699 B1 | 8/2021 | Oppenheim et al. |
| 11,141,586 B2 | 10/2021 | Campean et al. |
| 11,141,587 B2 | 10/2021 | Campean et al. |
| 11,160,971 B2 | 11/2021 | Sharma et al. |
| 11,166,632 B2 | 11/2021 | Grossman et al. |
| 11,197,999 B2 | 12/2021 | Crosson |
| 11,213,681 B2 | 1/2022 | Raghunathan |
| 11,224,742 B2 | 1/2022 | Burnett |
| 11,247,040 B2 | 2/2022 | Ferree et al. |
| 11,247,053 B2 | 2/2022 | Rajguru et al. |
| 11,266,836 B2 | 3/2022 | Charlesworth et al. |
| 11,278,724 B2 | 3/2022 | Law et al. |
| 11,318,307 B2 | 5/2022 | Kern et al. |
| 11,331,480 B2 | 5/2022 | Hamner et al. |
| 11,338,120 B2 | 5/2022 | Yun et al. |
| 11,338,128 B2 | 5/2022 | Lawson et al. |
| 11,344,722 B2 | 5/2022 | Wong et al. |
| 11,357,981 B2 | 6/2022 | Moaddeb et al. |
| 11,389,651 B2 | 7/2022 | Tamaki et al. |
| 11,419,515 B2 | 8/2022 | Crosson et al. |
| 11,420,052 B2 | 8/2022 | Doskocil et al. |
| 11,424,755 B2 | 8/2022 | Yang et al. |
| D962,929 S | 9/2022 | He et al. |
| 11,484,710 B2 | 11/2022 | Mantovani et al. |
| 11,504,530 B2 | 11/2022 | Herr et al. |
| 11,517,753 B2 | 12/2022 | Rhodes |
| 11,534,605 B2 | 12/2022 | Bouton et al. |
| 11,547,316 B2 | 1/2023 | Crosson et al. |
| 11,590,348 B2 | 2/2023 | Moaddeb et al. |
| 11,596,785 B2 | 3/2023 | Hamner et al. |
| 11,596,791 B2 | 3/2023 | Wong et al. |
| 11,596,792 B2 | 3/2023 | Campean et al. |
| 11,628,300 B2 | 4/2023 | Rajguru et al. |
| 11,642,513 B2 | 5/2023 | Sharma et al. |
| 11,666,758 B2 | 6/2023 | Crosson |
| 11,672,981 B2 | 6/2023 | Jaasma et al. |
| 11,766,191 B2 | 9/2023 | Sharma et al. |
| 11,833,352 B2 | 12/2023 | Law et al. |
| 11,839,583 B1 | 12/2023 | Carballo et al. |
| 11,839,762 B2 | 12/2023 | Doskocil et al. |
| 11,844,943 B2 | 12/2023 | Rajguru et al. |
| 11,857,778 B2 | 1/2024 | Hamner et al. |
| 11,872,399 B2 | 1/2024 | Raghunathan |
| 11,878,166 B2 | 1/2024 | Colburn et al. |
| 11,890,468 B1 | 2/2024 | Yu |
| 11,890,469 B2 | 2/2024 | Moaddeb et al. |
| 11,896,824 B2 | 2/2024 | Doskocil |
| 11,911,604 B2 | 2/2024 | Sharma et al. |
| 11,911,605 B2 | 2/2024 | Crosson et al. |
| 11,918,806 B2 | 3/2024 | Wong et al. |
| 11,975,190 B2 | 5/2024 | Cho et al. |
| 11,992,685 B2 | 5/2024 | Kassiri Bidhendi et al. |
| 12,029,287 B2 | 7/2024 | Ye et al. |
| 12,109,413 B2 | 10/2024 | Wong et al. |
| 12,161,858 B2 | 12/2024 | Rosenbluth et al. |
| 12,161,865 B2 | 12/2024 | Hamner et al. |
| 12,237,121 B2 | 2/2025 | Ye et al. |
| D1,065,549 S | 3/2025 | Ye et al. |
| 2001/0020177 A1 | 9/2001 | Gruzdowich et al. |
| 2002/0055761 A1 | 5/2002 | Mann et al. |
| 2002/0138116 A1 | 9/2002 | Bertolucci |

(56) References Cited

U.S. PATENT DOCUMENTS

| | | |
|---|---|---|
| 2002/0161415 A1 | 10/2002 | Cohen et al. |
| 2002/0165586 A1 | 11/2002 | Hill et al. |
| 2002/0177882 A1 | 11/2002 | DiLorenzo |
| 2003/0032992 A1 | 2/2003 | Thacker et al. |
| 2003/0045922 A1 | 3/2003 | Northrop |
| 2003/0088294 A1 | 5/2003 | Gesotti |
| 2003/0093098 A1 | 5/2003 | Heitzmann et al. |
| 2003/0100932 A1 | 5/2003 | Ciaff |
| 2003/0149457 A1 | 8/2003 | Tcheng et al. |
| 2003/0181959 A1 | 9/2003 | Dobak, III |
| 2003/0187483 A1 | 10/2003 | Grey et al. |
| 2003/0195583 A1 | 10/2003 | Gruzdowich et al. |
| 2004/0015094 A1 | 1/2004 | Manabe et al. |
| 2004/0088025 A1* | 5/2004 | Gesotti .............. A61N 1/36003 607/49 |
| 2004/0093093 A1 | 5/2004 | Andrews |
| 2004/0102819 A1 | 5/2004 | Zou et al. |
| 2004/0111129 A1 | 6/2004 | Gliner et al. |
| 2004/0127939 A1 | 7/2004 | Grey et al. |
| 2004/0133249 A1 | 7/2004 | Gesotti |
| 2004/0167588 A1 | 8/2004 | Bertolucci |
| 2004/0249416 A1 | 12/2004 | Yun et al. |
| 2004/0267331 A1 | 12/2004 | Koeneman et al. |
| 2005/0015042 A1 | 1/2005 | Sun et al. |
| 2005/0021103 A1 | 1/2005 | DiLorenzo |
| 2005/0055063 A1 | 3/2005 | Loeb et al. |
| 2005/0060009 A1 | 3/2005 | Geotz |
| 2005/0065553 A1 | 3/2005 | Ben Ezra et al. |
| 2005/0075502 A1 | 4/2005 | Shafer |
| 2005/0171576 A1 | 8/2005 | Williams et al. |
| 2005/0171577 A1 | 8/2005 | Cohen et al. |
| 2005/0182454 A1 | 8/2005 | Gharib et al. |
| 2005/0222626 A1 | 10/2005 | DiLorenzo |
| 2005/0234309 A1 | 10/2005 | Klapper |
| 2005/0240241 A1 | 10/2005 | Yun et al. |
| 2006/0015153 A1* | 1/2006 | Gliner ................ A61N 1/36146 607/45 |
| 2006/0047326 A1 | 3/2006 | Wheeler |
| 2006/0052726 A1 | 3/2006 | Weisz et al. |
| 2006/0074450 A1 | 4/2006 | Boveja et al. |
| 2006/0095088 A1 | 5/2006 | De Ridder |
| 2006/0161218 A1 | 7/2006 | Danilov |
| 2006/0173509 A1 | 8/2006 | Lee et al. |
| 2006/0184059 A1 | 8/2006 | Jadidi |
| 2006/0217781 A1 | 9/2006 | John |
| 2006/0224191 A1 | 10/2006 | DiLorenzo |
| 2006/0229678 A1 | 10/2006 | Lee |
| 2006/0253167 A1 | 11/2006 | Kurtz et al. |
| 2006/0276853 A1 | 12/2006 | Tass |
| 2006/0293723 A1 | 12/2006 | Whitehurst et al. |
| 2007/0027486 A1 | 2/2007 | Armstrong |
| 2007/0073361 A1 | 3/2007 | Goren et al. |
| 2007/0123951 A1 | 5/2007 | Boston |
| 2007/0123952 A1 | 5/2007 | Strother et al. |
| 2007/0142862 A1 | 6/2007 | DiLorenzo |
| 2007/0142874 A1 | 6/2007 | John |
| 2007/0156179 A1 | 7/2007 | Karashurov |
| 2007/0156182 A1 | 7/2007 | Castel et al. |
| 2007/0156183 A1 | 7/2007 | Rhodes |
| 2007/0156200 A1 | 7/2007 | Kornet et al. |
| 2007/0173899 A1 | 7/2007 | Levin et al. |
| 2007/0173903 A1 | 7/2007 | Goren et al. |
| 2007/0203533 A1 | 8/2007 | Goren et al. |
| 2007/0203534 A1 | 8/2007 | Tapper |
| 2007/0207193 A1 | 9/2007 | Zasler et al. |
| 2007/0249952 A1 | 10/2007 | Rubin et al. |
| 2007/0255319 A1 | 11/2007 | Greenberg et al. |
| 2007/0276217 A1* | 11/2007 | Brown ................ A61B 34/73 600/407 |
| 2007/0282228 A1 | 12/2007 | Einav et al. |
| 2007/0293917 A1 | 12/2007 | Thompson et al. |
| 2008/0004672 A1 | 1/2008 | Dalal et al. |
| 2008/0009772 A1 | 1/2008 | Tyler et al. |
| 2008/0021505 A1 | 1/2008 | Hastings et al. |
| 2008/0027507 A1 | 1/2008 | Bijelic et al. |
| 2008/0030170 A1 | 2/2008 | Dacuay et al. |
| 2008/0033259 A1 | 2/2008 | Manto et al. |
| 2008/0033504 A1 | 2/2008 | Bertolucci |
| 2008/0033510 A1 | 2/2008 | Herregraven et al. |
| 2008/0051839 A1 | 2/2008 | Libbus et al. |
| 2008/0051845 A1 | 2/2008 | Mentelos |
| 2008/0058773 A1 | 3/2008 | John |
| 2008/0058871 A1 | 3/2008 | Libbus et al. |
| 2008/0058893 A1 | 3/2008 | Noujokat |
| 2008/0091256 A1 | 4/2008 | Libbus et al. |
| 2008/0097564 A1 | 4/2008 | Lathrop |
| 2008/0147146 A1 | 6/2008 | Wahlgren et al. |
| 2008/0177398 A1 | 7/2008 | Gross et al. |
| 2008/0195007 A1 | 8/2008 | Podrazhansky et al. |
| 2008/0208282 A1 | 8/2008 | Gelfand et al. |
| 2008/0208288 A1* | 8/2008 | Gesotti .............. A61N 1/36003 607/48 |
| 2008/0216593 A1 | 9/2008 | Jacobsen et al. |
| 2008/0243204 A1 | 10/2008 | Uthman et al. |
| 2008/0269593 A1 | 10/2008 | Weinstock |
| 2008/0288016 A1 | 11/2008 | Amurthur et al. |
| 2008/0300449 A1 | 12/2008 | Gerber et al. |
| 2008/0306325 A1 | 12/2008 | Burnett et al. |
| 2008/0312520 A1 | 12/2008 | Rowlandson et al. |
| 2009/0018609 A1 | 1/2009 | DiLorenzo |
| 2009/0076565 A1 | 3/2009 | Surwit |
| 2009/0082831 A1 | 3/2009 | Paul et al. |
| 2009/0099623 A1 | 4/2009 | Bentwich |
| 2009/0105785 A1 | 4/2009 | Wei et al. |
| 2009/0112133 A1 | 4/2009 | Deisseroth et al. |
| 2009/0157138 A1 | 6/2009 | Errico et al. |
| 2009/0187121 A1 | 7/2009 | Evans |
| 2009/0216294 A1 | 8/2009 | Ewing et al. |
| 2009/0222053 A1 | 9/2009 | Gaunt et al. |
| 2009/0247910 A1 | 10/2009 | Klapper |
| 2009/0249617 A1 | 10/2009 | Karicherla et al. |
| 2009/0270952 A1 | 10/2009 | Weinstock |
| 2009/0299435 A1 | 12/2009 | Gliner et al. |
| 2009/0312690 A1 | 12/2009 | Kim et al. |
| 2009/0318986 A1 | 12/2009 | Alo et al. |
| 2009/0326595 A1 | 12/2009 | Brockway et al. |
| 2009/0326607 A1 | 12/2009 | Castel et al. |
| 2010/0004715 A1 | 1/2010 | Fahey |
| 2010/0010381 A1 | 1/2010 | Skelton et al. |
| 2010/0010383 A1 | 1/2010 | Skelton et al. |
| 2010/0010572 A1 | 1/2010 | Skelton et al. |
| 2010/0036464 A1 | 2/2010 | Picciano |
| 2010/0057154 A1 | 3/2010 | Dietrich et al. |
| 2010/0059722 A1 | 3/2010 | Copp-Howland et al. |
| 2010/0076533 A1 | 3/2010 | Dar et al. |
| 2010/0099963 A1 | 4/2010 | Kilger |
| 2010/0107657 A1 | 5/2010 | Vistakula |
| 2010/0125220 A1 | 5/2010 | Seong |
| 2010/0152817 A1 | 6/2010 | Gillbe |
| 2010/0168501 A1 | 7/2010 | Burnett et al. |
| 2010/0168604 A1 | 7/2010 | Echauz |
| 2010/0174342 A1 | 7/2010 | Boston et al. |
| 2010/0222630 A1 | 9/2010 | Mangrum et al. |
| 2010/0227330 A1 | 9/2010 | Fink et al. |
| 2010/0228180 A1 | 9/2010 | Jayes et al. |
| 2010/0249637 A1 | 9/2010 | Walter et al. |
| 2010/0292527 A1 | 11/2010 | Schneider et al. |
| 2010/0298905 A1 | 11/2010 | Simon |
| 2010/0324611 A1 | 12/2010 | Deming et al. |
| 2011/0004268 A1 | 1/2011 | Tcheng et al. |
| 2011/0009920 A1 | 1/2011 | Whitehurst et al. |
| 2011/0021899 A1 | 1/2011 | Arps et al. |
| 2011/0040204 A1 | 2/2011 | Ivorra et al. |
| 2011/0040288 A1 | 2/2011 | Eckstein et al. |
| 2011/0054358 A1 | 3/2011 | Kim et al. |
| 2011/0071590 A1 | 3/2011 | Mounaim et al. |
| 2011/0082524 A1 | 4/2011 | Thomas et al. |
| 2011/0098780 A1 | 4/2011 | Graupe et al. |
| 2011/0112605 A1 | 5/2011 | Fahey |
| 2011/0118805 A1 | 5/2011 | Wei et al. |
| 2011/0125212 A1 | 5/2011 | Tyler |
| 2011/0137375 A1 | 6/2011 | McBride |
| 2011/0184489 A1 | 7/2011 | Nicolelis et al. |
| 2011/0196446 A1 | 8/2011 | Wu |

(56) References Cited

U.S. PATENT DOCUMENTS

| | | |
|---|---|---|
| 2011/0202107 A1 | 8/2011 | Sunagawa et al. |
| 2011/0208444 A1 | 8/2011 | Solinky |
| 2011/0213278 A1 | 9/2011 | Horak et al. |
| 2011/0224571 A1 | 9/2011 | Pascual-Leone et al. |
| 2011/0230701 A1 | 9/2011 | Simon et al. |
| 2011/0245734 A1 | 10/2011 | Wagner et al. |
| 2011/0250297 A1 | 10/2011 | Oronsky et al. |
| 2011/0282412 A1 | 11/2011 | Glukhovsky et al. |
| 2011/0288615 A1 | 11/2011 | Armstrong et al. |
| 2011/0301663 A1 | 12/2011 | Wang et al. |
| 2012/0010492 A1 | 1/2012 | Thramann et al. |
| 2012/0035674 A1 | 2/2012 | Weinstock |
| 2012/0046535 A1 | 2/2012 | Lin et al. |
| 2012/0050298 A1 | 3/2012 | Hoffman |
| 2012/0053491 A1 | 3/2012 | Nathan et al. |
| 2012/0059298 A1 | 3/2012 | Hoffman et al. |
| 2012/0078319 A1 | 3/2012 | De Ridder |
| 2012/0088986 A1 | 4/2012 | David et al. |
| 2012/0092178 A1 | 4/2012 | Callsen et al. |
| 2012/0098493 A1 | 4/2012 | Budike |
| 2012/0101326 A1 | 4/2012 | Simon et al. |
| 2012/0109013 A1 | 5/2012 | Everett et al. |
| 2012/0136410 A1 | 5/2012 | Rezai et al. |
| 2012/0158094 A1 | 6/2012 | Kramer et al. |
| 2012/0184801 A1 | 7/2012 | Simon et al. |
| 2012/0185020 A1 | 7/2012 | Simon et al. |
| 2012/0203079 A1 | 8/2012 | McLaughlin |
| 2012/0211013 A1* | 8/2012 | Otis ............... A61M 21/02 128/898 |
| 2012/0220812 A1 | 8/2012 | Mishelevich |
| 2012/0239112 A1 | 9/2012 | Muraoka |
| 2012/0245483 A1 | 9/2012 | Lundqvist |
| 2012/0259255 A1 | 10/2012 | Tomlinson et al. |
| 2012/0277621 A1 | 11/2012 | Gerber et al. |
| 2012/0289869 A1* | 11/2012 | Tyler ............... A61B 5/245 601/2 |
| 2012/0290036 A1 | 11/2012 | Karamanoglu et al. |
| 2012/0302821 A1 | 11/2012 | Burnett |
| 2012/0303080 A1 | 11/2012 | Ben-David et al. |
| 2012/0310298 A1 | 12/2012 | Besio et al. |
| 2012/0310299 A1 | 12/2012 | Norbert et al. |
| 2012/0310303 A1 | 12/2012 | Popovic et al. |
| 2012/0330182 A1 | 12/2012 | Alberts et al. |
| 2013/0006322 A1 | 1/2013 | Tai |
| 2013/0035745 A1* | 2/2013 | Ahmed ............ A61N 1/36103 607/66 |
| 2013/0053817 A1 | 2/2013 | Yun et al. |
| 2013/0060124 A1 | 3/2013 | Zietsma |
| 2013/0066388 A1 | 3/2013 | Bernhard et al. |
| 2013/0066395 A1 | 3/2013 | Simon et al. |
| 2013/0085317 A1 | 4/2013 | Feinstein |
| 2013/0090519 A1* | 4/2013 | Tass ............... A61H 23/00 600/28 |
| 2013/0106684 A1 | 5/2013 | Weast et al. |
| 2013/0116606 A1 | 5/2013 | Cordo |
| 2013/0123568 A1 | 5/2013 | Hamilton et al. |
| 2013/0123666 A1 | 5/2013 | Giuffrida et al. |
| 2013/0131484 A1 | 5/2013 | Pernu |
| 2013/0131770 A1 | 5/2013 | Rezai |
| 2013/0158624 A1 | 6/2013 | Bain et al. |
| 2013/0158627 A1 | 6/2013 | Gozani et al. |
| 2013/0178765 A1* | 7/2013 | Mishelevich ............ A61N 7/00 601/2 |
| 2013/0211471 A1 | 8/2013 | Libbus et al. |
| 2013/0231713 A1 | 9/2013 | De Ridder et al. |
| 2013/0236867 A1 | 9/2013 | Avni et al. |
| 2013/0238049 A1 | 9/2013 | Simon et al. |
| 2013/0245486 A1 | 9/2013 | Simon et al. |
| 2013/0245713 A1 | 9/2013 | Tass |
| 2013/0253299 A1 | 9/2013 | Weber et al. |
| 2013/0267759 A1 | 10/2013 | Jin |
| 2013/0281890 A1 | 10/2013 | Mishelevich |
| 2013/0289647 A1 | 10/2013 | Bhadra et al. |
| 2013/0296967 A1 | 11/2013 | Skarbias et al. |
| 2013/0297022 A1 | 11/2013 | Pathak |
| 2013/0317565 A1 | 11/2013 | Weinstock |
| 2013/0331907 A1 | 12/2013 | Sumners et al. |
| 2013/0333094 A1 | 12/2013 | Rogers et al. |
| 2013/0338726 A1 | 12/2013 | Machado |
| 2014/0025059 A1 | 1/2014 | Kerr |
| 2014/0031605 A1* | 1/2014 | Schneider ............ A61N 2/008 600/14 |
| 2014/0039573 A1 | 2/2014 | Jindra |
| 2014/0039575 A1 | 2/2014 | Bradley |
| 2014/0046407 A1 | 2/2014 | Ben-Ezra et al. |
| 2014/0046423 A1 | 2/2014 | Rajguru et al. |
| 2014/0058189 A1 | 2/2014 | Stubbeman |
| 2014/0067003 A1 | 3/2014 | Vase et al. |
| 2014/0078694 A1 | 3/2014 | Wissmar |
| 2014/0081345 A1 | 3/2014 | Hershey |
| 2014/0081353 A1 | 3/2014 | Cook et al. |
| 2014/0094675 A1 | 4/2014 | Luna et al. |
| 2014/0094873 A1 | 4/2014 | Emborg et al. |
| 2014/0114117 A1 | 4/2014 | Naghavi et al. |
| 2014/0128939 A1* | 5/2014 | Embrey ............ A61N 1/36003 607/49 |
| 2014/0132410 A1 | 5/2014 | Chang |
| 2014/0142654 A1 | 5/2014 | Simon et al. |
| 2014/0148872 A1 | 5/2014 | Goldwasser et al. |
| 2014/0148873 A1 | 5/2014 | Kirn |
| 2014/0163444 A1 | 6/2014 | Ingvarsson |
| 2014/0171834 A1 | 6/2014 | DeGoede et al. |
| 2014/0200573 A1 | 7/2014 | Deem et al. |
| 2014/0214119 A1 | 7/2014 | Greiner et al. |
| 2014/0228927 A1 | 8/2014 | Ahmad et al. |
| 2014/0236258 A1 | 8/2014 | Carroll et al. |
| 2014/0246628 A1 | 9/2014 | Anhalt et al. |
| 2014/0249452 A1 | 9/2014 | Marsh et al. |
| 2014/0257047 A1 | 9/2014 | Sillay et al. |
| 2014/0257129 A1 | 9/2014 | Choi et al. |
| 2014/0276194 A1 | 9/2014 | Osorio |
| 2014/0277220 A1 | 9/2014 | Brennan et al. |
| 2014/0296752 A1 | 10/2014 | Edgerton et al. |
| 2014/0296934 A1 | 10/2014 | Gozani et al. |
| 2014/0296935 A1 | 10/2014 | Ferree et al. |
| 2014/0300490 A1 | 10/2014 | Kotz et al. |
| 2014/0309709 A1 | 10/2014 | Gozani et al. |
| 2014/0316484 A1 | 10/2014 | Edgerton et al. |
| 2014/0324118 A1 | 10/2014 | Simon et al. |
| 2014/0330068 A1 | 11/2014 | Partsch et al. |
| 2014/0330335 A1 | 11/2014 | Errico et al. |
| 2014/0336003 A1 | 11/2014 | Franz et al. |
| 2014/0336722 A1 | 11/2014 | Rocon De Lima et al. |
| 2014/0336731 A1 | 11/2014 | Weinstock |
| 2014/0343462 A1 | 11/2014 | Burnet |
| 2014/0350436 A1 | 11/2014 | Nathan et al. |
| 2014/0358040 A1 | 12/2014 | Kim et al. |
| 2014/0364678 A1 | 12/2014 | Harry et al. |
| 2015/0004656 A1 | 1/2015 | Tang et al. |
| 2015/0005852 A1 | 1/2015 | Hershey et al. |
| 2015/0012067 A1 | 1/2015 | Bradley et al. |
| 2015/0018926 A1 | 1/2015 | Frenkel et al. |
| 2015/0038886 A1 | 2/2015 | Snow |
| 2015/0042315 A1 | 2/2015 | Cen et al. |
| 2015/0044656 A1 | 2/2015 | Eichhorn et al. |
| 2015/0057506 A1 | 2/2015 | Luna et al. |
| 2015/0073310 A1 | 3/2015 | Pracar et al. |
| 2015/0080979 A1 | 3/2015 | Lasko et al. |
| 2015/0100004 A1 | 4/2015 | Goldman et al. |
| 2015/0100104 A1 | 4/2015 | Kiani et al. |
| 2015/0100105 A1 | 4/2015 | Kiani et al. |
| 2015/0148866 A1 | 5/2015 | Bulsen et al. |
| 2015/0148878 A1 | 5/2015 | Yoo et al. |
| 2015/0157274 A1 | 6/2015 | Ghassemzadeh et al. |
| 2015/0164377 A1 | 6/2015 | Nathan et al. |
| 2015/0164401 A1 | 6/2015 | Toth et al. |
| 2015/0190085 A1 | 7/2015 | Nathan et al. |
| 2015/0190634 A1 | 7/2015 | Rezai et al. |
| 2015/0196767 A1 | 7/2015 | Zaghloul |
| 2015/0202444 A1 | 7/2015 | Franke et al. |
| 2015/0208955 A1 | 7/2015 | Smith |
| 2015/0216475 A1 | 8/2015 | Luna et al. |
| 2015/0230733 A1 | 8/2015 | Heo et al. |

(56) References Cited

U.S. PATENT DOCUMENTS

| | | |
|---|---|---|
| 2015/0230756 A1 | 8/2015 | Luna et al. |
| 2015/0273234 A1 | 10/2015 | Weinstock |
| 2015/0277559 A1 | 10/2015 | Vescovi et al. |
| 2015/0297901 A1 | 10/2015 | Kockx |
| 2015/0321000 A1 | 11/2015 | Rosenbluth et al. |
| 2015/0335882 A1 | 11/2015 | Gross |
| 2015/0360030 A1 | 12/2015 | Cartledge et al. |
| 2016/0001096 A1 | 1/2016 | Mishelevich |
| 2016/0008620 A1 | 1/2016 | Stubbeman |
| 2016/0016014 A1 | 1/2016 | Wagner et al. |
| 2016/0022987 A1 | 1/2016 | Zschaeck et al. |
| 2016/0022989 A1 | 1/2016 | Pfeifer |
| 2016/0038059 A1 | 2/2016 | Asada et al. |
| 2016/0039239 A1 | 2/2016 | Ward et al. |
| 2016/0045140 A1 | 2/2016 | Kitamura et al. |
| 2016/0089045 A1 | 3/2016 | Sadeghian-Motahar et al. |
| 2016/0106344 A1 | 4/2016 | Nazari |
| 2016/0120432 A1 | 5/2016 | Sridhar et al. |
| 2016/0121110 A1 | 5/2016 | Kent et al. |
| 2016/0128621 A1 | 5/2016 | Machado et al. |
| 2016/0129248 A1 | 5/2016 | Creasey et al. |
| 2016/0158542 A1 | 6/2016 | Ahmed |
| 2016/0158565 A1 | 6/2016 | Lee |
| 2016/0198998 A1 | 7/2016 | Rahimi et al. |
| 2016/0213924 A1 | 7/2016 | Coleman et al. |
| 2016/0220836 A1 | 8/2016 | Parks |
| 2016/0262685 A1 | 9/2016 | Wagner et al. |
| 2016/0263376 A1 | 9/2016 | Yoo et al. |
| 2016/0279435 A1 | 9/2016 | Hyde et al. |
| 2016/0287879 A1 | 10/2016 | Denison et al. |
| 2016/0336722 A1 | 11/2016 | Taxter |
| 2016/0339239 A1 | 11/2016 | Yoo et al. |
| 2016/0361540 A9 | 12/2016 | Simon et al. |
| 2016/0375249 A1 | 12/2016 | Bonnet et al. |
| 2017/0014625 A1 | 1/2017 | Rosenbluth et al. |
| 2017/0027812 A1 | 2/2017 | Hyde et al. |
| 2017/0036025 A1 | 2/2017 | Sachs et al. |
| 2017/0042467 A1 | 2/2017 | Herr et al. |
| 2017/0056238 A1 | 3/2017 | Yi et al. |
| 2017/0056643 A1 | 3/2017 | Herb et al. |
| 2017/0079597 A1 | 3/2017 | Horne |
| 2017/0080207 A1 | 3/2017 | Perez et al. |
| 2017/0087364 A1 | 3/2017 | Cartledge et al. |
| 2017/0095667 A1 | 4/2017 | Yakovlev et al. |
| 2017/0113045 A1 | 4/2017 | Baldassano et al. |
| 2017/0132067 A1 | 5/2017 | Singaravelu Vanaja et al. |
| 2017/0157398 A1 | 6/2017 | Wong et al. |
| 2017/0165485 A1 | 6/2017 | Sullivan et al. |
| 2017/0224991 A1 | 8/2017 | Wingeier et al. |
| 2017/0239415 A1 | 8/2017 | Hwang et al. |
| 2017/0246481 A1 | 8/2017 | Mishelevich |
| 2017/0266443 A1 | 9/2017 | Rajguru et al. |
| 2017/0274208 A1 | 9/2017 | Nagel et al. |
| 2017/0287146 A1 | 10/2017 | Pathak et al. |
| 2017/0312505 A1 | 11/2017 | Ahmed |
| 2017/0312512 A1 | 11/2017 | Creasey et al. |
| 2017/0312513 A1 | 11/2017 | Hershey et al. |
| 2017/0361093 A1 | 12/2017 | Yoo et al. |
| 2017/0368329 A1 | 12/2017 | Tyler et al. |
| 2018/0001086 A1 | 1/2018 | Bartholomew et al. |
| 2018/0001088 A1 | 1/2018 | Tass |
| 2018/0021576 A1 | 1/2018 | Wong et al. |
| 2018/0028841 A1 | 2/2018 | Konofagou et al. |
| 2018/0036535 A1 | 2/2018 | Wong et al. |
| 2018/0042654 A1 | 2/2018 | Ingvarsson et al. |
| 2018/0049676 A1 | 2/2018 | Griffiths et al. |
| 2018/0064344 A1 | 3/2018 | Nguyen |
| 2018/0064362 A1 | 3/2018 | Hennings et al. |
| 2018/0064944 A1 | 3/2018 | Grill et al. |
| 2018/0116546 A1 | 5/2018 | Pastoor et al. |
| 2018/0132757 A1 | 5/2018 | Kong et al. |
| 2018/0140842 A1 | 5/2018 | Olaighin et al. |
| 2018/0168905 A1 | 6/2018 | Goodall et al. |
| 2018/0169400 A1 | 6/2018 | Wong et al. |
| 2018/0199841 A1 | 7/2018 | Yang et al. |
| 2018/0214694 A1 | 8/2018 | Parramon |
| 2018/0221620 A1 | 8/2018 | Metzger |
| 2018/0235500 A1 | 8/2018 | Lee et al. |
| 2018/0264263 A1 | 9/2018 | Rosenbluth et al. |
| 2018/0345020 A1 | 12/2018 | Ironi et al. |
| 2019/0001117 A1 | 1/2019 | Ben-David et al. |
| 2019/0001129 A1 | 1/2019 | Rosenbluth et al. |
| 2019/0001139 A1 | 1/2019 | Mishra et al. |
| 2019/0126047 A1 | 5/2019 | Kassiri Bidhendi et al. |
| 2019/0134393 A1 | 5/2019 | Wong et al. |
| 2019/0143098 A1 | 5/2019 | Kaplan et al. |
| 2019/0143111 A1 | 5/2019 | Hamner et al. |
| 2019/0143113 A1 | 5/2019 | Wong et al. |
| 2019/0167976 A1 | 6/2019 | Byers et al. |
| 2019/0269914 A1 | 9/2019 | Moaddeb et al. |
| 2019/0298998 A1 | 10/2019 | Coleman et al. |
| 2019/0321636 A1 | 10/2019 | Law |
| 2019/0343462 A1 | 11/2019 | Grant et al. |
| 2019/0374771 A1 | 12/2019 | Simon et al. |
| 2020/0023183 A1 | 1/2020 | Ollerenshaw et al. |
| 2020/0038654 A1 | 2/2020 | Doskocil et al. |
| 2020/0046968 A1 | 2/2020 | Herr et al. |
| 2020/0061378 A1 | 2/2020 | Ganguly et al. |
| 2020/0069947 A1 | 3/2020 | Kent |
| 2020/0077943 A1 | 3/2020 | Weinstock |
| 2020/0093400 A1 | 3/2020 | Hamner et al. |
| 2020/0139118 A1 | 5/2020 | John et al. |
| 2020/0147373 A1 | 5/2020 | Tamaki et al. |
| 2020/0155847 A1 | 5/2020 | Perez |
| 2020/0171269 A1 | 6/2020 | Hooper et al. |
| 2020/0171304 A1 | 6/2020 | Simon et al. |
| 2020/0179687 A1 | 6/2020 | Wong et al. |
| 2020/0197707 A1 | 6/2020 | Covalin |
| 2020/0215324 A1 | 7/2020 | Mantovani et al. |
| 2020/0221975 A1 | 7/2020 | Basta et al. |
| 2020/0254247 A1 | 8/2020 | Brezel et al. |
| 2020/0254251 A1 | 8/2020 | Wong et al. |
| 2020/0269046 A1 | 8/2020 | Page et al. |
| 2020/0276442 A1 | 9/2020 | Owen |
| 2020/0282201 A1 | 9/2020 | Doskocil |
| 2020/0289813 A1 | 9/2020 | Ito et al. |
| 2020/0289814 A1 | 9/2020 | Hamner et al. |
| 2020/0297999 A1 | 9/2020 | Pal |
| 2020/0316379 A1 | 10/2020 | Yoo et al. |
| 2020/0324104 A1 | 10/2020 | Labuschagne et al. |
| 2020/0338348 A1 | 10/2020 | Honeycutt et al. |
| 2020/0367775 A1 | 11/2020 | Buckley et al. |
| 2020/0405188 A1 | 12/2020 | Sharma et al. |
| 2020/0406022 A1 | 12/2020 | Sharma et al. |
| 2021/0008369 A1 | 1/2021 | Crosson |
| 2021/0016079 A1 | 1/2021 | Ekelem et al. |
| 2021/0016089 A1 | 1/2021 | Crosson |
| 2021/0031026 A1 | 2/2021 | Simon et al. |
| 2021/0031036 A1 | 2/2021 | Sharma et al. |
| 2021/0052883 A1 | 2/2021 | Wong et al. |
| 2021/0052897 A1 | 2/2021 | Bhadra et al. |
| 2021/0052900 A1 | 2/2021 | Pepin et al. |
| 2021/0060337 A1 | 3/2021 | Wybo et al. |
| 2021/0069507 A1 | 3/2021 | Gozani et al. |
| 2021/0085974 A1 | 3/2021 | Bouton et al. |
| 2021/0100999 A1 | 4/2021 | Rosenbluth et al. |
| 2021/0101007 A1* | 4/2021 | Hamner ............... A61N 1/0456 |
| 2021/0113834 A1 | 4/2021 | Wong et al. |
| 2021/0162212 A1 | 6/2021 | Kern et al. |
| 2021/0169684 A1 | 6/2021 | Black et al. |
| 2021/0187279 A1 | 6/2021 | Bouton et al. |
| 2021/0205619 A1 | 7/2021 | Wong et al. |
| 2021/0213283 A1 | 7/2021 | Yoo et al. |
| 2021/0220650 A1 | 7/2021 | Kassiri Bidhendi et al. |
| 2021/0244940 A1 | 8/2021 | Liberatore et al. |
| 2021/0244950 A1 | 8/2021 | Ironi et al. |
| 2021/0252278 A1 | 8/2021 | Hamner et al. |
| 2021/0252279 A1 | 8/2021 | Kong et al. |
| 2021/0260379 A1 | 8/2021 | Charlesworth et al. |
| 2021/0266011 A1 | 8/2021 | Chen et al. |
| 2021/0283400 A1* | 9/2021 | Hamner ............... A61N 1/36014 |
| 2021/0289814 A1 | 9/2021 | Roubos-van den Hil et al. |
| 2021/0299445 A1 | 9/2021 | Rajguru et al. |
| 2021/0308460 A1 | 10/2021 | Wong et al. |

(56) References Cited

U.S. PATENT DOCUMENTS

| | | | |
|---|---|---|---|
| 2021/0330547 | A1* | 10/2021 | Moaddeb ............ A61N 1/0456 |
| 2021/0330974 | A1 | 10/2021 | Wong et al. |
| 2021/0353181 | A1 | 11/2021 | Roh |
| 2021/0379374 | A1 | 12/2021 | Hamner et al. |
| 2021/0379379 | A1 | 12/2021 | Campean et al. |
| 2021/0402172 | A1 | 12/2021 | Ross et al. |
| 2022/0001164 | A1 | 1/2022 | Sharma et al. |
| 2022/0016413 | A1 | 1/2022 | John et al. |
| 2022/0031245 | A1 | 2/2022 | Bresler |
| 2022/0054820 | A1 | 2/2022 | Turner |
| 2022/0054831 | A1 | 2/2022 | McBride |
| 2022/0080196 | A1 | 3/2022 | Crosson |
| 2022/0088373 | A1 | 3/2022 | Burnett |
| 2022/0126095 | A1 | 4/2022 | Rajguru et al. |
| 2022/0143391 | A1 | 5/2022 | Vaishya et al. |
| 2022/0143392 | A1 | 5/2022 | Labuschagne et al. |
| 2022/0143393 | A1 | 5/2022 | Charlesworth et al. |
| 2022/0143402 | A1 | 5/2022 | Oppenheim et al. |
| 2022/0203091 | A1 | 6/2022 | Vysokov |
| 2022/0212007 | A1 | 7/2022 | Rajguru et al. |
| 2022/0218991 | A1 | 7/2022 | Moaddeb et al. |
| 2022/0220276 | A1 | 7/2022 | Ziebell et al. |
| 2022/0233860 | A1 | 7/2022 | Hamner et al. |
| 2022/0266011 | A1 | 8/2022 | Hamner et al. |
| 2022/0266012 | A1 | 8/2022 | Hamner et al. |
| 2022/0347461 | A1 | 11/2022 | Campean et al. |
| 2022/0401721 | A1 | 12/2022 | Jackson et al. |
| 2022/0409404 | A1 | 12/2022 | Yang et al. |
| 2023/0009158 | A1 | 1/2023 | Liberatore |
| 2023/0010696 | A1 | 1/2023 | Pradeep |
| 2023/0062326 | A1 | 3/2023 | Colachis et al. |
| 2023/0080790 | A1 | 3/2023 | Crosson et al. |
| 2023/0086004 | A1 | 3/2023 | Yang et al. |
| 2023/0110185 | A1 | 4/2023 | Mantovani et al. |
| 2023/0191115 | A1 | 6/2023 | Blum et al. |
| 2023/0191126 | A1 | 6/2023 | Kent et al. |
| 2023/0200732 | A1 | 6/2023 | Ye et al. |
| 2023/0201584 | A1 | 6/2023 | Rajguru et al. |
| 2023/0207232 | A1 | 6/2023 | Ye et al. |
| 2023/0218897 | A1 | 7/2023 | Wang et al. |
| 2023/0233855 | A1 | 7/2023 | Sunkeri et al. |
| 2023/0248962 | A1 | 8/2023 | Zhang et al. |
| 2023/0256245 | A1 | 8/2023 | Crosson |
| 2023/0277109 | A1 | 9/2023 | Blum et al. |
| 2023/0277841 | A1 | 9/2023 | Wang et al. |
| 2023/0285743 | A1 | 9/2023 | Muccio |
| 2023/0293882 | A1 | 9/2023 | Howe |
| 2023/0321430 | A1 | 10/2023 | Ye et al. |
| 2023/0371846 | A1 | 11/2023 | Sharma et al. |
| 2024/0032819 | A1 | 2/2024 | Zhao et al. |
| 2024/0058606 | A1 | 2/2024 | Law et al. |
| 2024/0066286 | A1 | 2/2024 | Yin et al. |
| 2024/0066287 | A1 | 2/2024 | Siff |
| 2024/0090600 | A1 | 3/2024 | Colachis et al. |
| 2024/0108239 | A1 | 4/2024 | Crosson et al. |
| 2024/0122797 | A1 | 4/2024 | Moaddeb et al. |
| 2024/0123230 | A1 | 4/2024 | Raghunathan |
| 2024/0157142 | A1 | 5/2024 | Yeniel et al. |
| 2024/0189594 | A1 | 6/2024 | Hamner et al. |
| 2024/0197237 | A1 | 6/2024 | Hamner et al. |
| 2024/0299734 | A1 | 9/2024 | Wang et al. |
| 2024/0299735 | A1 | 9/2024 | Wang et al. |
| 2024/0316339 | A1 | 9/2024 | Keefer et al. |
| 2024/0325727 | A1 | 10/2024 | Hamner et al. |
| 2024/0325728 | A1 | 10/2024 | Schulte et al. |
| 2024/0335654 | A1 | 10/2024 | Schulte et al. |
| 2024/0406000 | A1 | 12/2024 | Nguyen et al. |
| 2025/0018185 | A1 | 1/2025 | Ye et al. |

FOREIGN PATENT DOCUMENTS

| | | |
|---|---|---|
| CN | 1826154 | 8/2006 |
| CN | 101022849 | 8/2007 |
| CN | 101115524 | 1/2008 |
| CN | 101365373 | 2/2009 |
| CN | 101612043 | 12/2009 |
| CN | 101687093 | 3/2010 |
| CN | 101801453 | 8/2010 |
| CN | 102089031 | 6/2011 |
| CN | 102481394 | 5/2012 |
| CN | 202724457 | 2/2013 |
| CN | 103517732 | 1/2014 |
| CN | 103889503 | 6/2014 |
| CN | 104144729 | 11/2014 |
| CN | 104168951 | 11/2014 |
| CN | 104436431 | 3/2015 |
| CN | 104519960 | 4/2015 |
| CN | 105457158 | 4/2016 |
| CN | 105848710 | 8/2016 |
| CN | 106413805 | 2/2017 |
| CN | 106687161 | 5/2017 |
| CN | 106794347 | 5/2017 |
| CN | 107949421 | 4/2018 |
| CN | 108697890 | 10/2018 |
| CN | 111358461 | 7/2020 |
| DE | 102008042373 | 4/2010 |
| DE | 102009004011 | 7/2010 |
| EP | 0000759 | 2/1979 |
| EP | 0801957 | 10/1997 |
| EP | 0725665 | 1/1998 |
| EP | 1062988 | 12/2000 |
| EP | 1558333 | 5/2007 |
| EP | 1727591 | 4/2009 |
| EP | 2383014 | 11/2011 |
| EP | 2291115 | 9/2013 |
| EP | 2801389 | 11/2014 |
| EP | 3020448 | 5/2016 |
| EP | 2029222 | 3/2017 |
| EP | 2780073 | 9/2017 |
| EP | 1951365 | 10/2017 |
| EP | 3154627 | 4/2018 |
| EP | 2827771 | 5/2018 |
| EP | 3184143 | 7/2018 |
| EP | 3075412 | 12/2018 |
| EP | 3349712 | 7/2019 |
| EP | 3503960 | 3/2020 |
| EP | 3650077 | 5/2020 |
| EP | 3352846 | 7/2020 |
| EP | 3493874 | 8/2020 |
| EP | 3409200 | 9/2020 |
| EP | 3427793 | 11/2020 |
| EP | 3758595 | 1/2021 |
| EP | 3641876 | 4/2021 |
| EP | 3679979 | 6/2021 |
| EP | 3841967 | 6/2021 |
| EP | 3402404 | 7/2021 |
| EP | 3562541 | 7/2021 |
| EP | 3675795 | 8/2021 |
| EP | 3100765 | 1/2022 |
| EP | 3487578 | 12/2022 |
| EP | 4108292 | 12/2022 |
| EP | 3784337 | 6/2023 |
| EP | 4233990 | 8/2023 |
| EP | 3541279 | 9/2023 |
| EP | 3463550 | 3/2024 |
| EP | 3565631 | 4/2024 |
| EP | 4356952 | 4/2024 |
| EP | 3842094 | 5/2024 |
| ES | 2222819 | 3/2006 |
| ES | 2272137 | 6/2008 |
| GB | 2496449 | 5/2013 |
| JP | 2010-527256 | 1/1900 |
| JP | 2002/200178 | 7/2002 |
| JP | 2003-501207 | 1/2003 |
| JP | 2003-533299 | 11/2003 |
| JP | 2004-512104 | 4/2004 |
| JP | 2006-503658 | 2/2006 |
| JP | 2008/018235 | 1/2008 |
| JP | 2009/034328 | 2/2009 |
| JP | 2009-512516 | 3/2009 |
| JP | 2009-529352 | 8/2009 |
| JP | 2010-506618 | 3/2010 |
| JP | 2010-512926 | 4/2010 |
| JP | 2010/246745 | 11/2010 |

(56) References Cited

FOREIGN PATENT DOCUMENTS

| | | |
|---|---|---|
| JP | 2012-005596 | 1/2012 |
| JP | 2012/055650 | 3/2012 |
| JP | 2012-217565 | 11/2012 |
| JP | 2013-017609 | 1/2013 |
| JP | 2013/094305 | 5/2013 |
| JP | 54-39921 | 3/2014 |
| JP | 2015-514460 | 5/2015 |
| JP | 2016-511651 | 4/2016 |
| JP | 2018-038597 | 3/2018 |
| KR | 20130104446 | 9/2013 |
| WO | WO 87/01024 | 2/1987 |
| WO | WO 1987/01024 | 2/1987 |
| WO | WO1994/000187 | 1/1994 |
| WO | WO1994/017855 | 8/1994 |
| WO | WO1996/032909 | 10/1996 |
| WO | WO 98/23326 | 6/1998 |
| WO | WO 98/40121 | 9/1998 |
| WO | WO1998/043700 | 10/1998 |
| WO | WO1999/019019 | 4/1999 |
| WO | WO2000/015293 | 3/2000 |
| WO | WO2000/076436 | 12/2000 |
| WO | WO 01/03768 | 1/2001 |
| WO | WO2001/087411 | 11/2001 |
| WO | WO2002/017987 | 3/2002 |
| WO | WO 02/34327 | 5/2002 |
| WO | WO 2002/034327 | 5/2002 |
| WO | WO 03/015866 | 2/2003 |
| WO | WO 2004/037344 | 5/2004 |
| WO | WO 2004/067087 | 8/2004 |
| WO | WO 2004/108209 | 12/2004 |
| WO | WO 2005/007029 | 5/2005 |
| WO | WO 2005/105201 | 11/2005 |
| WO | WO2005/122894 | 12/2005 |
| WO | WO 2006/021820 | 3/2006 |
| WO | WO 2006/044793 | 4/2006 |
| WO | WO 2006/092007 | 9/2006 |
| WO | WO 2006/102724 | 10/2006 |
| WO | WO 2007/056493 | 5/2007 |
| WO | WO 07/092290 | 8/2007 |
| WO | WO 2007/092290 | 8/2007 |
| WO | WO2007/112092 | 10/2007 |
| WO | WO 2008/005478 | 1/2008 |
| WO | WO2008/045598 | 4/2008 |
| WO | WO2008/062395 | 5/2008 |
| WO | WO 2008/106174 | 9/2008 |
| WO | WO 2008/150591 | 12/2008 |
| WO | WO 2009/005797 | 1/2009 |
| WO | WO2009/153730 | 12/2009 |
| WO | WO 2010/014260 | 2/2010 |
| WO | WO 2010/031055 | 3/2010 |
| WO | WO2010/111321 | 9/2010 |
| WO | WO2010/141155 | 12/2010 |
| WO | WO 2011/106225 | 9/2011 |
| WO | WO2011/119224 | 9/2011 |
| WO | WO2011/144883 | 11/2011 |
| WO | WO 2011/149656 | 12/2011 |
| WO | WO2012/040243 | 3/2012 |
| WO | WO 2012/074794 | 6/2012 |
| WO | WO2013/071307 | 5/2013 |
| WO | WO2013/074809 | 5/2013 |
| WO | WO 13/173727 | 11/2013 |
| WO | WO 2013/173727 | 11/2013 |
| WO | WO2014/043757 | 3/2014 |
| WO | WO2014/053041 | 4/2014 |
| WO | WO 2014/070999 | 5/2014 |
| WO | WO 14/089549 | 6/2014 |
| WO | WO 14/093964 | 6/2014 |
| WO | WO 2014/089549 | 6/2014 |
| WO | WO 2014/093964 | 6/2014 |
| WO | WO2014/113813 | 7/2014 |
| WO | WO2014/146082 | 9/2014 |
| WO | WO2014/151431 | 9/2014 |
| WO | WO2014/153201 | 9/2014 |
| WO | WO2014/207512 | 12/2014 |
| WO | WO2015/033152 | 3/2015 |
| WO | WO2015/039206 | 3/2015 |
| WO | WO2015/039244 | 3/2015 |
| WO | WO2015/042365 | 3/2015 |
| WO | WO2015/079319 | 6/2015 |
| WO | WO 2015/085880 | 6/2015 |
| WO | WO2015/095880 | 6/2015 |
| WO | WO 15/138981 | 9/2015 |
| WO | WO2015/128090 | 9/2015 |
| WO | WO 2015/138981 | 9/2015 |
| WO | WO2015/164706 | 10/2015 |
| WO | WO2015/187712 | 12/2015 |
| WO | WO 2016-007093 | 1/2016 |
| WO | WO2016/019250 | 2/2016 |
| WO | WO 2016/032929 | 3/2016 |
| WO | WO 2016-094728 | 6/2016 |
| WO | WO2016/102958 | 6/2016 |
| WO | WO2016/110804 | 7/2016 |
| WO | WO2016/128985 | 8/2016 |
| WO | WO2016/149751 | 9/2016 |
| WO | WO2016/166281 | 10/2016 |
| WO | WO 2016/176668 | 11/2016 |
| WO | WO2016/179407 | 11/2016 |
| WO | WO2016/189422 | 12/2016 |
| WO | WO2016/195587 | 12/2016 |
| WO | WO2016/201366 | 12/2016 |
| WO | WO 2017-004021 | 1/2017 |
| WO | WO2017/010930 | 1/2017 |
| WO | WO2017/023864 | 2/2017 |
| WO | WO 17/044904 | 3/2017 |
| WO | WO2017/053847 | 3/2017 |
| WO | WO2017/062994 | 4/2017 |
| WO | WO2017/086798 | 5/2017 |
| WO | WO2017/088573 | 6/2017 |
| WO | WO2017/132067 | 8/2017 |
| WO | WO2017/199026 | 11/2017 |
| WO | WO2017/208167 | 12/2017 |
| WO | WO2017/209673 | 12/2017 |
| WO | WO2017/210729 | 12/2017 |
| WO | WO2017221037 | 12/2017 |
| WO | WO2018/009680 | 1/2018 |
| WO | WO 2018-028170 | 2/2018 |
| WO | WO2018/028220 | 2/2018 |
| WO | WO2018/028221 | 2/2018 |
| WO | WO2018/039458 | 3/2018 |
| WO | WO 2018-093765 | 5/2018 |
| WO | WO 18/106839 | 6/2018 |
| WO | WO 2018/106839 | 6/2018 |
| WO | WO2018/112164 | 6/2018 |
| WO | WO 2018119220 | 6/2018 |
| WO | WO2018/187241 | 10/2018 |
| WO | WO 2019-005774 | 1/2019 |
| WO | WO 2019-014250 | 1/2019 |
| WO | WO 2019-028000 | 2/2019 |
| WO | WO 2019/046180 | 3/2019 |
| WO | WO 19/082180 | 6/2019 |
| WO | WO 2019/082180 | 6/2019 |
| WO | WO2019/143790 | 7/2019 |
| WO | WO 19/169240 | 9/2019 |
| WO | WO 2019/169240 | 9/2019 |
| WO | WO 19/202489 | 10/2019 |
| WO | WO 2019/202489 | 10/2019 |
| WO | WO 2020/006048 | 1/2020 |
| WO | WO 20/068830 | 4/2020 |
| WO | WO 2020/068830 | 4/2020 |
| WO | WO 2020/069219 | 4/2020 |
| WO | WO 2020/086726 | 4/2020 |
| WO | WO 20/131857 | 6/2020 |
| WO | WO 2020/131857 | 6/2020 |
| WO | WO 20/185601 | 9/2020 |
| WO | WO 2020/185601 | 9/2020 |
| WO | WO 2020/252406 | 12/2020 |
| WO | WO 21/005584 | 1/2021 |
| WO | WO 2021/005584 | 1/2021 |
| WO | WO 21/055716 | 3/2021 |
| WO | WO 2021/055716 | 3/2021 |
| WO | WO 21/062345 | 4/2021 |
| WO | WO 2021/062345 | 4/2021 |
| WO | WO 2021/092533 | 5/2021 |
| WO | WO 21/127422 | 6/2021 |

(56) References Cited

FOREIGN PATENT DOCUMENTS

| WO | WO 2021/127422 | 6/2021 |
|---|---|---|
| WO | WO 21/228128 | 11/2021 |
| WO | WO 2021/228128 | 11/2021 |
| WO | WO 2021/236815 | 11/2021 |
| WO | WO 21/252292 | 12/2021 |
| WO | WO 2021/252292 | 12/2021 |
| WO | WO 2022/090834 | 5/2022 |
| WO | WO 2022/187486 | 9/2022 |
| WO | WO 2022/221858 | 10/2022 |
| WO | WO 2022/235607 | 11/2022 |
| WO | WO 2023/283568 | 1/2023 |
| WO | WO 2023/014499 | 2/2023 |
| WO | WO 2023/015158 | 2/2023 |
| WO | WO 2023/015159 | 3/2023 |
| WO | WO 2023/156391 | 8/2023 |
| WO | WO 2023/163300 | 8/2023 |
| WO | WO 2023/168016 | 9/2023 |
| WO | WO 2023/191236 | 10/2023 |
| WO | WO 2023/196578 | 10/2023 |
| WO | WO 2023/222911 | 11/2023 |
| WO | WO 2024/083685 | 4/2024 |

OTHER PUBLICATIONS

U.S. Appl. No. 16/327,780, filed Feb. 22, 2019, Hamner et al.
U.S. Appl. No. 16/833,388, filed Mar. 27, 2020, Hamner et al.
U.S. Appl. No. 16/780,758, filed Feb. 3, 2020, Wong et al.
Apartis; Clinical neurophysiology in movement disorders. Handb Clin Neurol; 111; Pediatric Neurology Pt. 1; pp. 87-92;Apr. 2013.
Barbaud et al.; Improvement in essential tremor after pure sensory stroke due to thalamic infarction; European neurology; 46; pp. 57-59; Jul. 2001.
Barrios et al.: BCI algorithms for tremor identification, characterization and tracking;|Seventh Framework Programme, EU; Contract No. FP7-ICT-2007-224051 (v3.0); 57 pgs.; Jul. 10, 2011.
Bartley et al.; Neuromodulation for overactive bladder; Nature Reviews Urology; 10; pp. 513-521; Sep. 2013.
Benabid et al.; A putative generalized model of the effects and mechanism of action of high frequency electrical stimulation of the central nervous system; Acta Neural Belg; 105(3); pp. 149-157; Sep. 2005.
Bergquist et al.: Motor unit recruitment when neuromuscular electrical stimulation is applied over a nerve trunk compared with a muscle belly: quadriceps femoris, Journal of Applied Physiology; vol. 113, No. 1, pp. 78-89; Jul. 2012.
Bergquist et al.; Motor unit recruitment when neuromuscular electrical stimulation is applied over a nerve trunk compared with a muscle belly: triceps surae, Journal of Applied Physiology; vol. 110, No. 3, pp. 627-637; Mar. 2011.
Bijelic et al.: E Actitrode®: The New Selective Stimulation Interface for Functional Movements in Hemiplegic Patients; Serbian Journal of Electrical Engineering; 1(3); pp. 21-28; Nov. 2004.
Birdno et al.; Pulse-to-pulse changes in the frequency of deep brain stimulation affect tremor and modeled neuronal activity .; Journal of Neurophysiology; 98; pp. 1675-1684; Jul. 2007.
Birdno et al.; Response of human thalamic neurons to high-frequency stimulation .; PloS One; 9(5); 10 pgs.; May 2014.
Birgersson et al.; Non-invasive bioimpedance of intact skin: mathematical modeling and experiments; Physiological Measurement; 32(1); pp. 1-18; Jan. 2011.
Bohling et al.; Comparison of the stratum corneum thickness measured in vivo with confocal Raman spectroscopy and confocal reflectance microscopy; Skin research and Technology; 20(1); pp. 50-47; Feb. 2014.
Bonaz et al.; "Vagus nerve stimulation: a new promising therapeutic tool in inflammatory bowel disease." Journal of internal medicine 282.1 (2017): 46-63.
Bowman et al.; Effects of waveform parameters on comfort during transcutaneous neuromuscular electrical stimulation; Annals of Biomedical Engineering; 13(1); pp. 59-74; Jan. 1985.

Brittain et al.; Tremor suppression by rhythmic transcranial current stimulation; Current Biology; 23; pp. 436-440; Mar. 2013.
Britton et al.; Modulation of postural tremors at the wrist by supramaximal electrical median nerve shocks in ET, PD, and normal subjects mimicking tremor; J Neurology, Neurosurgery, and Psychiatry; 56(10); pp. 1085-1089; Oct. 1993.
Cagnan et al.; Phase dependent modulation of tremor amplitude in essential tremor through thalamic stimulation; Brain; 136(10); pp. 3062-3075; Oct. 2013.
Campero et al.; Peripheral projections of sensory fascicles in the human superficial radial nerve; Brain; 128(Pt 4); pp. 892-895; Apr. 2005.
Chen et al.; A web-based system for home monitoring of patients with Parkinson's disease using wearable sensors; IEEE Trans on Bio-Medical Engineering; 58(3); pp. 831-836; Mar. 2011.
Clair et al.; Postactivation depression and recovery of reflex transmission during repetitive electrical stimulation of the human tibial nerve, Journal of Neurophysiology; vol. 106, No. 1; pp. 184-192; Jul. 2011.
Clar et al.; Skin impedance and moisturization; J. Soc. Cosmet. Chem.; 26; pp. 337-353; 1975; presented at IFSCC VIIIth Int'l Congress on Cosmetics Quality and Safety in London on Aug. 26-30, 1974.
Constandinou et al.; A Partial-Current-Steering Biphasic Stimulation Driver for Vestibular Prostheses; IEEE Trans on Biomedical Circuits and Systems; 2(2); pp. 106-113; Jun. 2008.
Daneault et al.; Using a smart phone as a standalone platform for detection and monitoring of pathological tremors; Frontiers in Human Neuroscience; vol. 6, article 357; 12 pgs.; Jan. 2012.
Deuschl et at; Consensus statement of the Movement Disorder Society on Tremor. Ad HocScientific Committee., Movement Disorders, vol. 13 Suppl 3, pp. 2-23; (year of pub. sufficiently earlier than effective US filing date and any foreign priority date) 1998.
Dideriksen et al.; EMG-based characterization of pathological tremor using the iterated Hilbert transform; IEEE transactions on Biomedical Engineering; 58(10); pp. 2911-2921; Oct. 2011.
Dosen et al.: Tremor suppression using electromyography and surface sensory electrical stimulation; Converging Clinical and Engineering Research on Neurorehabilitation; vol. 1 (Siosystems & Biorobotics Series); pp. 539-543; Feb. 2013.
Doucet et al.; Neuromuscular electrical stimulation for skeletal muscle function; The Yale Journal of Biology and Medicine; 85(2); pp. 201-215; Jun. 2012.
Fuentes et al.; Restoration of locomotive function in Parkinson's disease by spinal cord stimulation: mechanistic approach, Eur J Neurosci, vol. 32, pp. 1100-1108; Oct. 2010 (author manuscript; 19 pgs.).
Fuentes et al.; Spinal cord stimulation restores locomotion in animal models of Parkinson's disease; Science; 323; pp. 1578-1582; Mar. 2009.
Gallego et al.; A neuroprosthesis for tremor management through the control of muscle co-contraction; Journal of Neuroengineering and Rehabilitation; vol. 10; 36; (13 pgs); Apr. 2013.
Gallego et al.; A soft wearable robot for tremor assessment and suppression; 2011 IEEE International Conference on Robotics and Automation; Shanghai International Conference Center; pp. 2249-2254; May 9-13, 2011.
Gallego et al.; Real-time estimation of pathological tremor parameters from gyroscope data.; Sensors; 10(3); pp. 2129-2149; Mar. 2010.
Gao; Analysis of amplitude and frequency variations of essential and Parkinsonian tremors; Medical & Biological Engineering & Computing; 42(3); pp. 345-349; May 2004.
Garcia-Rill et al.; "Arousal, motor control, and Parkinson's disease." Translational neuroscience 6.1 pp. 198-207 (2015).
Giuffrida et al.; Clinically deployable Kinesia technology for automated tremor assessment.; Movement Disorders; 24(5); pp. 723-730; Apr. 2009.
Gracanin et al.; Optimal stimulus parameters for minimum pain in the chronic stimulation ofinnervated muscle; Archives of Physical Medicine and Rehabilitation; 56(6); pp. 243-249; Jun. 1975.
Haeri et al.; Modeling the Parkinson's tremor and its treatments; Journal of Theoretical Biology; 236(3); pp. 311-322; Oct. 2005.

(56) References Cited

OTHER PUBLICATIONS

Halonen et al.; Contribution of cutaneous and muscle afferent fibres to cortical SEPs following median and radial nerve stimulation in man; Electroenceph. Clin. Neurophysiol.; 71(5); pp. 331-335; Sep.-Oct. 1988.

Hao et al.; Effects of electrical stimulation of cutaneous afferents on corticospinal transmission of tremor signals in patients with Parkinson's disease; 6th International Conference on Neural Engineering; San Diego, CA; pp. 355-358; Nov. 2013.

Hauptmann et al.; External trial deep brain stimulation device for the application of desynchronizing stimulation techniques; Journal of Neural Engineering; 6; 12 pgs.; Oct. 2009.

Heller et al.; Automated setup of functional electrical stimulation for drop foot using a novel 64 channel prototype stimulator and electrode array: Results from a gait-lab based study; Medical Engineering & Physic; 35(1); pp. 74-81; Jan. 2013.

Henry Dreyfuss Associates; The Measure of Man and Woman: Human Factors in Design (Revised Edition); John Wiley & Sons, New York; pp. 10-11 and 22-25; Dec. 2001.

Hernan, Miguel, et al. "Alcohol Consumption and the Incidence of Parkinson's Disease." May 15, 2003. Annals of Neurology. vol. 54. pp. 170-175.

Hua et al.; Posture-related oscillations in human cerebellar thalamus in essential tremor are enabled by voluntary motor circuits; J Neurophysiol; 93(1); pp. 117-127; Jan. 2005.

Inoue et al.; "Stretchable human interface using a conductive silicone elastomer containing silver fillers." Consumer Electronics, 2009. ISCE'09. IEEE 13th International Symposium on. IEEE, 2009.

Jacks et al.; Instability in human forearm movements studied with feed-back-controlled electrical stimulation of muscles; Journal of Physiology; 402; pp. 443-461; Aug. 1988.

Jobges et al.; Vibratory proprioceptive stimulation affects Parkinsonian tremor; Parkinsonism & Related Disorders; 8(3); pp. 171-176; Jan. 2002.

Joundi et al.; Rapid tremor frequency assessment with the iPhone accelerometer.; Parkinsonism & Related Disorders; 17(4); pp. 288-290; May 2011.

Kim et al.: Adaptive control of movement for neuromuscular stimulation-assisted therapy in a rodent model; IEEE Trans on Biomedical Engineering,; 56(2); pp. 452-461; Feb. 2009.

Krauss et al.; Chronic spinal cord stimulation in medically intractable orthostatic tremor; J Neurol Neurosurg Psychiatry; 77(9); pp. 1013-1016; Sep. 2006.

Kuhn et al.; Array electrode design for transcutaneous electrical stimulation a simulation study; Medical Engineering & Physics; 31 (8); pp. 945-951; Oct. 2009.

Kuhn et al.; The Influence of Electrode Size on Selectivity and Comfort in Transcutaneous Electrical Stimulation of the Forearm; Neural Systems and Rehabilitation Engineering, IEEE Transactions on; 18(3); pp. 255-262; Jun. 2010.

Kunz, Patrik, et al. "5 kHz transcranial alternating current stimulation: lack of cortical excitability changes when grouped in a theta burst pattern." Frontiers in Human Neuroscience 10 (2016): 683.

Lagerquist et al.: Influence of stimulus pulse width on M-waves, H-reflexes, and torque during tetanic low-intensity neuromuscular stimulation, Muscle & Nerve, 42(6), pp. 886-893; Dec. 2010.

Laroy et al.; The sensory innervation pattern of the fingers; J. Neurol.; 245 (5); pp. 294-298; May 1998.

Lee et al.; Resetting of tremor by mechanical perturbations: A comparison of essential tremor and parkinsonian tremor; Annals of Neurology; 10(6); pp. 523-531; Dec. 1981.

Legon et al.; Pulsed ultrasound differentially stimulates somatosensory circuits in humans as indicated by EEG and fMRI; PLoS ONE; 7(12); e51177; 14 pgs.; Dec. 2012.

Lourenco et al.; Effects produced in human arm and forearm motoneurones after electrical stimulation of ulnar and median nerves at wrist level; Experimental Brain Research; 178(2); pp. 267-284; Apr. 2007.

Malek et al.; The utility of electromyography and mechanomyography for assessing neuromuscular function: a noninvasive approach; Phys Med Rehabil in N Am; 23(1); pp. 23-32; Feb. 2012.

Mamorita et al.; Development of a system for measurement and analysis of tremor using a three-axis accelerometer; Methods Inf Med; 48(6); pp. 589-594; epub Nov. 2009.

Maneski et al.; Electrical Stimulation for suppression of pathological tremor; Med Biol Eng Comput; 49(10); pp. 1187-1193; Oct. 2011.

Marsden et al.; Coherence between cerebellar thalamus, cortex and muscle in man; Brain; 123; pp. 1459-1470; Jul. 2000.

Marshall, Ryan, et al. "Bioelectrical stimulation for the reduction of inflammation inlinflammatory bowel disease." Clinical Medicine Insights: Gastroenterology 8 (2015): CGast-S31779.

McAuley et al.; Physiological and pathological tremors and rhythmic central motor control; Brain; 123(Pt 8); pp. 1545-1567; Aug. 2000.

McIntyre et al.; Finite element analysis of current-density and electric field generated by metal microelectrodes; Annals of Biomedical Engineering; 29(3); pp. 227-235; Mar. 2001.

Meekins et al.; American Association of Neuromuscular & Electrodiagnostic Medicine evidenced-based review: use of surface electromyography in the diagnosis and study of neuromuscular disorders; Muscle Nerve 38(4); pp. 1219-1224; Oct. 2008.

Miller et al.; Multiplexed microneedle-based biosensor array for characterization of metabolic acidosis; Talanta; 88; pp. 739-742; Jan. 2012 (author manuscript; 13 pgs.).

Milne et al.; Habituation to repeated in painful and non-painful cutaneous stimuli: A quantitative psychophysical study; Experimental Brain Research; 87(2); pp. 438-444; Nov. 1991.

Mommaerts et al.; Excitation and nerve conduction; in Comprehensive Human Physiology; Springer Berlin Heidelberg; Chap. 13; pp. 283-294; Mar. 1996.

Mones et al.; The response of the tremor of patients with Parkinsonism to peripheral nerve stimulation; J Neurology, Neurosurgery, and Psychiatry; 32(6); pp. 512-518; Dec. 1969.

Morgante et al.: How many parkinsonian patients are suitable candidates for deep brain stimulation of subthalamic nucleus ?; Results of a Questionnaire, Parkinsonism and Related Disorders; 13; pp. 528-531; Dec. 2007.

Munhoz et al.; Acute effect of transcutaneous electrical nerve stimulation on tremor; Movement Disorders; 18(2); pp. 191-194; Feb. 2003.

Nardone et al.; Influences of transcutaneous electrical stimulation of cutaneous and mixed nerves on subcortical somatosensory evoked potentials; Electroenceph. Clin. Neurophysiol.; 74(1); pp. 24-35; Jan.-Feb. 1989.

PCT Search Report and Written Opinion in PCT Application No. PCT/US2019/39193 mailed Nov. 8, 2019 in 20 pages.

Perez et al.; Patterned Sensory Stimulation Induces Plasticity in Reciprocal la Inhibition in Humans; The Journal of Neuroscience; 23(6); pp. 2014-2018; Mar. 2003.

Perlmutter et al.; Deep brain stimulation; Ann Rev Neurosci; 29; pp. 229-257; Jul. 2006.

Popović☐Bijelić, Ana, et al. "Multi☐field surface electrode for selective electrical stimulation." Artificial organs 29.6 (2005): 448-452.

Prochazka et al.; Attenuation of pathological tremors by functional electrical stimulation I: Method; Annals of Biomedical Engineering; 20(2); pp. 205-224; Mar. 1992.

Pulliam et al.; Continuous in-home monitoring of essential tremor; Parkinsonism and Related Disorders; 20(1); pp. 37-40; Jan. 2014.

Quattrini et al.; Understanding the impact of painful diabetic neuropathy; Diabetes/Metabolism Research and Reviews; 19, Suppl. 1; pp. S2-8; Jan.-Feb. 2003.

Rocon et al.; Design and validation of a rehabilitation robotic exoskeleton for tremor assessment and suppression; IEEE Trans Neural Sys and Rehab Eng.; 15(3); pp. 367-378; Sep. 2007.

Silverstone et al.; Non-Invasive Neurostimulation In The Control of Familial Essential Tremor Using The Synaptic Neuromodulator; Conference Proceedings, International Functional Electrical Stimulation Society (IFES); Ed. Paul Meadows; 3 pgs.; May 1999.

(56) References Cited

OTHER PUBLICATIONS

Singer et al.; The effect of EMG triggered electrical stimulation plus task practice on arm function in chronic stroke patients with moderate-severe arm deficits; Restor Neurol Neurosci; 31(6); pp. 681-691; Oct. 2013.
Takanashi et al.; A functional MRI study of somatotopic representation of somatosensory stimulation in the cerebellum; Neuroradiology; 45(3); pp. 149-152; Mar. 2003.
Tass et al.; Coordinated reset has sustained aftereffects in Parkinsonian monkeys; Ann Neurol; 72(5); pp. 816-820; Nov. 2012.
Tass et al.; Counteracting tinnitus by acoustic coordinated reset neuromodulation; Restorative neurology and Neuroscience; 30(2); pp. 137-159; Apr. 2012.
Tass; A Model of desynchronizing deep brain stimulation with a demand-controlled coordinated reset of neural subpopulations; Biol Cybern; 89(2); pp. 81-88; Aug. 2003.
Toloso et al.; Essential tremor: treatment with propranolol; Neurology; 25(11); pp. 1041; Nov. 1975.
Treager; Interpretation of skin impedance measurements; Nature; 205; pp. 600-601; Feb. 1965.
Valente; Novel methods and circuits for field shaping in deep brain stimulation; Doctoral thesis, UCL (University College London); 222 pgs.; 2011.
Von Lewinski et al.; Efficacy of EMG-triggered electrical arm stimulation in chronic hemiparetic stroke patients; Restor Neurol Neurosci; 27(3); pp. 189-197; Jun. 2009.
Wardman et al.; Subcortical, and cerebellar activation evoked by selective stimulation of muscle and cataneous afferents: an fMRI study; Physiol. Rep.; 2(4); pp. 1-16; Apr. 2014.
Wiestler et al.; Integration of sensory and motor representations of single fingers in the human; J. Neurophysiol.; 105(6); pp. 3042-3053; Jun. 2011.
Woldag et al.; Evidence-based physiotherapeutic concepts for improving arm and hand function in stroke patients R A review; J Neurol; 249(5); pp. 518-528; May 2002.
Woolf et al.; Peripheral nerve injury triggers central sprouting of myelinated afferents; Nature; 355(6355); pp. 75-78; Jan. 1992.
Yeh et al.; "Intensity sensitive modulation effect of theta burst form of median nerve stimulation on the monosynaptic spinal reflex." Neural plasticity 2015 (2015) in 8 pages.
Yilmaz et al.; "Efficacy of EMG-biofeedback in knee osteoarthritis." Rheumatology international 30.7 (2010): 887-892.
PCT, PCT/US2014/012388 (published as WO 2014/113813), Jan. 21, 2014.
U.S. Appl. No. 14/805,385, now U.S. Pat. No. 9,452,287, filed Jul. 21, 2015.
U.S. Appl. No. 15/277,946 (published as U.S. Pub. No. 2017/0014625), filed Sep. 27, 2016.
U.S. Appl. No. 15/983,024, now U.S. Pat. No. 10,625,074, filed May 17, 2018.
PCT, PCT/US2019/039193 (published as PCT. Pub. No. WO 2020/006048), Jun, 26, 2019.
U.S. Appl. No. 14/271,669, (published as U.S. Pub. No. 2014/0336722), filed Nov. 13, 2014.
PCT, PCT/US2015/033809 (published as WO 2015/187712), Jun. 2, 2015.
U.S. Appl. No. 15/354,943, now U.S. Pat. No. 9,802,041, filed Nov. 17, 2016.
U.S. Appl. No. 15/721,475, now U.S. Pat. No. 10,179,238, filed Sep. 29, 2017.
U.S. Appl. No. 15/721,480, now U.S. Pat. No. 10,173,060, filed Sep. 29, 2017.
U.S. Appl. No. 16/242,983, now U.S. Pat. No. 10,549,093, filed Jan. 8, 2019.
U.S. Appl. No. 16/247,310, now U.S. Pat. No. 10,561,839, filed Jan. 14, 2019.
U.S. Appl. No. 16/780,758, filed Feb. 3, 2020.
U.S. Appl. No. 16/792,100, filed Feb. 14, 2020.
PCT, PCT/US2016/037080 (published as WO 2016/201366), Jun. 10, 2016.
U.S. Appl. No. 15/580,631, (published as U.S. Pub. No. 2018/0169400), filed Dec. 7, 2017.
PCT, PCT/US2017/014431 (published as WO 2017/132067), Jan. 20, 2017.
PCT, PCT/US2018/025752 (published as WO 2018/187241), Apr. 2, 2018.
U.S. Appl. No. 16/071,056, filed Jul. 18, 2018.
PCT, PCT/US2016/045038 (published as WO 2017/023864), Aug. 1, 2016.
U.S. Appl. No. 15/748,616, filed Jan. 29, 2018.
PCT, PCT/US2016/053513 (published as WO 2017/053847), Sep. 23, 2016.
U.S. Appl. No. 15/762,043, now U.S. Pat. No. 10,603,482, filed Mar. 21, 2018.
U.S. Appl. No. 16/833,388, filed Mar. 27, 2020.
PCT, PCT/US2017/040920 (published as WO 2018/009680), Jul. 6, 2017.
U.S. Appl. No. 16/241,846 (published as U.S. Pub. No. 2019/0134393), filed Jan. 7, 2019.
PCT, PCT/US2017/048424 (published as WO 2018/039458), Aug. 24, 2017.
U.S. Appl. No. 16/327,780, filed Feb. 22, 2019.
PCT, PCT/US2019/013966 (published as WO 2019/143790), Jan. 17, 2019.
PCT, PCT/US2019/030458 (published as WO 2019/213433), May 2, 2019.
PCT, PCT/US2019/053297 (published as WO 2020/069219), Sep. 26, 2019.
PCT, PCT/US2019/057674 (published as WO 2020086726), Oct. 23, 2019.
Australian Office Action dated Jan. 10, 2017 in Australian Patent Application No. 2014207265 in 2 pages.
Australian Office Action dated Sep. 22, 2018 in Australian Patent Application No. 2017204831 in 5 pages.
Bratton et al.; Neural regulation of inflammation: No. neural connection from the vagus to splenic sympathetic neurons; Exp Physiol 97.11 (2012); pp. 1180-1185.
Buschbacher et al.; Manual of nerve conduction series; 2nd edition; Demos Medical Publishing, LLC; 2006 (part 1, Title to p. #142).
Buschbacher et al.; Manual of nerve conduction series; 2nd edition; Demos Medical Publishing, LLC; 2006 (part 2, p. #143 to #299).
Canadian Office Action dated Feb. 26, 2020 in Canadian Patent Application No. 2,896,800 in 4 pages.
China Office Action and Search Report dated Oct. 10, 2016 in Chinese Patent Application No. 201480005343.5 in 26 pages.
China Office Action dated May 24, 2017 in Chinese Patent Application No. 201480005343.5 in 24 pages.
Choi, Jong Bo, et al. "Analysis of heart rate variability in female patients with overactive bladder." Urology 65.6 (2005): 1109-1112.
Di Giovangiulio et al.; The Neuromodulation of the intestinal immune system and its relevance in inflammatory bowel disease; Fronteir's in Immunology; vol. 6; Article 590; Nov. 2015.
European Office Action dated Jul. 31, 2017 in European Patent Application No. 14740684.7 in 5 pages.
Extended European Search Report dated Jul. 25, 2016 in European Application No. 14740684.7 in 7 pages.
Extended European Search Report dated Mar. 25, 2019 in European Application No. 19150254.1 in 5 pages.
Garcia et al.; Modulation of brainstem activity and connectivity by respiratory-gated auricular vagal afferent nerve stimulation in migraine patients; PAIN; International Association for the Study of Pain; 2017.
Huang, et al.; Theta burst stimulation report of the human motor cortex; Neuron, vol. 45, 201-206, Jan. 20, 2005.
Hubeaux, Katelyne, et al. "Autonomic nervous system activity during bladder filling assessed by heart rate variability analysis in women with idiopathic overactive bladder syndrome or stress urinary incontinence." The Journal of urology 178.6 (2007): 2483-2487.
Hubeaux, Katelyne, et al. "Evidence for autonomic nervous system dysfunction in females with idiopathic overactive bladder syndrome." Neurourology and urodynamics 30.8 (2011): 1467-1472.

(56) References Cited

OTHER PUBLICATIONS

Liao, Wen-Chien, et al. "A noninvasive evaluation of autonomic nervous system dysfunction in women with an overactive bladder." International Journal of Gynecology & Obstetrics 110.1 (2010): 12-17.
Mehnert, Ulrich, et al. "Heart rate variability: an objective measure of autonomic activity and bladder sensations during urodynamics." Neurourology and urodynamics 28.4 (2009): 313-319.
Miguel et al.; Alcohol consumption and the incidence of Parkinson's disease; Ann. Neurol.; 54(2); pp. 170-175; May 15, 2003.
Miller et al.; Neurostimulation in the treatment of primary headaches; Pract Neurol; Apr. 11, 2016;16:pp. 362-375.
Nonis et al.; Evidence of activation of vagal afferents by non-invasive vagus nerve stimulation: An electrophysiological study in healthy volunteers; Cephalalgia; pp. 1285-1293; vol. 37(13); Mar. 28, 2017.
Japan Office Action dated Nov. 14, 2017 in Japanese Application No. 2015-553901.
Japan Office Action dated Oct. 2, 2018 in Japanese Application No. 2015-553901 in 4 pages.
Straube et al.; Treatment of chronic migraine with transcutaneous stimulation of the auricular branch of the vagal nerve (auricular t-VNS): a randomized, monocentric clinical trial; The Journal of Headache and Pain (2015) 16:63.
Yarnitsky et al.; Nonpainful remote electrical stimulation alleviates episodic migraine pain; Neurology 88; pp. 1250-1255; Mar. 28, 2017.
Zhang et al.; Neural oscillator based control for pathological tremor suppression via functional electrical stimulation; Control Engineering Practice; 19(1); pp. 74-88; Jan. 2011.
Knutson et al., Nov. 2015, Neuromuscular electrical stimulation for motor restoration in hemiplegia, Phys. Med. Rehabil. Clin. N. Am., 26(4):729-745.
Zwarts et al.; Multichannel surface EMG: basic aspects and clinical utility; Muscle Nerve; 28(1); pp. 1-17; Jul. 2003.
U.S. Appl. No. 15/277,946, filed Sep. 27, 2016, Rosenbluth et al.
U.S. Appl. No. 15/354,943, filed Nov. 17, 2016, Wong et al.
U.S. Appl. No. 15/580,631, filed Dec. 7, 2017, Wong et al.
U.S. Appl. No. 15/721,475, filed Sep. 29, 2017, Wong et al.
U.S. Appl. No. 15/721,480, filed Sep. 29, 2017, Wong et al.
U.S. Appl. No. 15/762,043, filed Mar. 21, 2018, Hamner et al.
U.S. Appl. No. 16/241,846, filed Jan. 7, 2019, wong et al.
U.S. Appl. No. 16/242,983, filed Jan. 8, 2019, wong et al.
U.S. Appl. No. 16/247,310, filed Feb. 22, 2019, Wong et al.
U.S. Appl. No. 16/962,810, filed Jul. 16, 2002, Hamner et al.
U.S. Appl. No. 16/993,085, filed Aug. 13, 2020, Balbaky et al.
U.S. Appl. No. 17/013,396, 09-04-1001, Wong et al.
U.S. Appl. No. 17/052,483, filed Nov. 2, 2020, Liberatore et al.
U.S. Appl. No. 17/061,231, filed Oct. 1, 2020, Yu.
U.S. Appl. No. 17/080,544, filed Oct. 26, 2020, Wong et al.
U.S. Appl. No. 17/633,004, filed May 11, 2020, Wong et al.
U.S. Appl. No. 17/633,010, filed May 11, 2022, Wong et al.
Decision Granting Institution of Inter Partes Review of U.S. Pat. No. 9,387,338 (IPR2023-00511—Paper 7) dated Aug. 3, 2023.
Decision Granting Institution of Inter Partes Review of U.S. Pat. No. 9,757,584 (IPR2023-00508—Paper 7) dated Aug. 3, 2023.
Declaration of John Laughlin in Support of Petition for Inter Partes Review of U.S. Pat. No. 9,387,338 (IPR2023-00511—Ex. 1002) filed Jan. 23, 2023.
Declaration of John Laughlin in Support of Petition for Inter Partes Review of U.S. Pat. No. 9,757,584 (IPR2023-00508—Ex. 1002) filed Jan. 23, 2023.
lPetition for Inter Partes Review of U.S. Pat. No. 9,387,338 (IPR2023-00511) dated Jan. 23, 2023.
lPetition for Inter Partes Review of U.S. Pat. No. 9,757,584 (IPR2023-00508) dated Jan. 23, 2023.
Amarenco et al. "Urondynamic Effect of Acute Transcutaneous Posterior Tibial Nerve Stimulation in Overactive Bladder" Journal of Urology vol. 169, 2210-2215 (Jun. 2003).
Barath et al., 2020, Brain metabolic changes with longitudinal transcutaneous afferent patterned stimulation in essential tremor subjects, Tremor and Other Hyperkinetic Movements, 10(1):52, pp. 1-10.
Brillman et al., 2022, Real-world evidence of transcutaneous afferent patterned stimulation for essential tremor, Tremor and Other Hyperkinetic Movements, 12(1):27, pp. 1-11.
Ferreira et al., 2019, MDS evidence-based review of treatments for essential tremor, Movement Disorders, 34(7):950-958.
Fiorentino et al., 2011, Self calibrating wearable active running asymmetry measurement and correction, Journal of Control Engineering and Applied Informatics, 13(2):3-8.
Fred E. Govier, et al., "Percutaneous Afferent Neuromodulation for the Refractory Overactive Bladder: Results of a Multicenter Study," 165 J. Urology 1193-1198 (Apr. 2001).
Gupta et al., 2021, Exploring essential tremor: results from a large online survey, Clinical Parkinsonism & Related Disorders, 5:100101, 4 pp.
H.C. Klingler, et al., "Use of Peripheral Neuromodulation of the S3 Region for Treatment of Detrusor Overactivity: A Urodynamicbased Study," Urology 56:766-771, 2000.
Haubenberger et al., 2018, Essential Tremor, The New England Journal of Medicine, 378:1802-1810 and Supplementary Appendix.
Hellwig et al., Feb. 17, 2001, Tremor-correlated cortical activity in essential tremor, The Lancet, 357:519-523.
Hernandez-Martin et al., 2021, High-fidelity transmission of high-frequency burst stimuli from peripheral nerve to thalamic nuclei in children with dystonia, Scientific Reports, 11:8498, 9 pp.
Isaacson et al., 2020, Prospective home-use study on non-invasive neuromodulation therapy for essential tremor, Tremor and Other Hyperkinetic Movements, 10(1):29, pp. 1-16.
Krishnamoorthy et al., 2008, Gait Training After Stroke: A Pilot Study Combining a Gravity-Balanced Orthosis, Functional Electrical Stimulation, and Visual Feedback, Journal of Neurologic Physical Therapy, 32(4):192-202.
Lin et al., 2018, Noninvasive neuromodulation inessential tremor demonstrates relief in a sham-controlled pilot trial, Movement Disorders, 33(7):1182-1183.
Llinas et al., Dec. 21, 1999, Thalamocortical dysrhythmia: a neurological and neuropsychiatric syndrome characterized by magnetoencephalography, PNAS, 96(26):15222-15227.
Lyons et al., 2021, Essential tremor in adult patients, International Essential Tremor Foundation, 16 pp.
Michael R. Van Balken, et al., "Posterior Tibial Nerve Stimulation as Neuromodulative Treatment of Lower Urinary Track Dysfunction," 166 J. Urology 914-918 (Sep. 2001).
Pahwa et al., 2018, An acute randomized controlled trial of noninvasive peripheral nerve stimulation in essential tremor, Neuromodulation, 22:537-545.
Peng et al., 2015, Flexible dry electrode based on carbon nanotube/polymer hybrid micropillars for biopotential recording, Sensor and Actuatora A: Physical, 235:48-65.
Perez-Reyes, Jan. 2003, Molecular physiology of low-voltage-activated T-type calcium channels, Physiol. Rev. 83:117-161.
Popovi Maneski et al.; Electrical stimulation for the suppression of pathological tremor; Medical & Biological Engineering & Computing; 49(10); pp. 1187-1193; Oct. 2011.
Sigrist et al., 2012. Augmented visual, auditory, haptic, and multimodal feedback in motor learning: A review. Psychonomic Bulletin & Review, 20(1):21-53.
Solomonow et al., 1998, Studies toward spasticity suppression with high frequency electrical stimulation, Orthopedics, 7(8):1284-1288.
Thomas et al.; A review of posterior tibial nerve stimulation for faecal incontinence; Colorectal Disease; 2012 The Association of Coloproctology of Great Britain and Ireland. 15, pp. 519-526; Jun. 25, 2012.
Tracey; The inflammatory reflex; Nature; vol. 420; pp. 853-859; Dec. 19/26, 2002.
Vitton et al.; Transcutaneous posterior tibial nerve stimulation for fecal Incontinence in inflammatory bowel disease patients: a therapeutic option?; Inflamm Bowel Dis; vol. 15, No. 3, Mar. 2009; pp. 402-405.

(56) References Cited

OTHER PUBLICATIONS

Wallerberger, Apr. 4, 2019, Efficient Estimation of Autocorrelation Spectra, ArXiv.org, https://arxiv.org/abs/1810.05079.
Yilmaz, Ozlem O., et al. "Efficacy of EMG-biofeedback in knee osteoarthritis." Rheumatology international 30.7 (2010): 887-892.
Zorba et al.; Overactive bladder and the pons; Rize University, Medical Faculty, Department of Urology; 123-124; Undated.
Cala Trio Health Care Professional Guide (Jul. 2020).
Cala Trio Health Care Professional Guide (Nov. 2019).
Chang, M.D., Qwang-Yuen et al., Effect of Electroacupuncture and Transcutaneous Electrical Nerve Stimulation at Hegu (LI.4) Acupuncture Point on the Cutaneous Reflect, 27 Acupuncture & Electro-Therapeutics Res., Int. J. 191-202 (2002).
Javidan, et al., Attenuation of Pathological Tremors by Functional Electrical Stimulation II: Clinical Evaluation, 20 Annals of Biomedical Engineering 225 (1992).
Knutson et al., Neuromuscular Electrical Stimulation for Motor Restoration in Hemiplegia. Phys Med Rehabil Clin N A,. Nov. 2015; 26(4): 729-745. Published online Aug. 14, 2015. Doi: 10.1016/j.pmr.2015.06.002.
PTAB-IPR2024-00732—Exhibit 1002—Declaration of John Laughlin, M. Eng., P.E., in 109 pages.
PTAB-IPR2024-00732—Petition for Inter Partes Review of U.S. Pat. No. 10,786,669, filed Mar. 29, 2024, in 101 pages.
PTAB-IPR2024-00743—Exhibit 1002—Declaration of John Laughlin, M. Eng., P.E., in 102 pages.
PTAB-IPR2024-00743—Petition for Inter Partes Review of U.S. Pat. No. 11,628,300, filed Mar. 29, 2024, in 113 pages.
AEMED, Inc., 510(k) Summary, StimPad™ TENS System, Dec. 6, 2007.
Antal et al., Anodal Transcranial Direct Current Stimulation of the Motor Cortex Ameliorates Chronic Pain and Reduces Short Intracortical Inhibition, Journal of Pain and Symptom Management, vol. 39, No. 5, pp. 890-903, May 2010.
De Santana, et al., Effectiveness of Transcutaneous Electrical Nerve Stimulation for Treatment of Hyperalgesia and Pain, Curr Rheumatol Rep.; 10(6): 492-499, Dec. 2008.
Dewey, et al., A Pilot Study of Ai-Controled Transcutaneous Peripheral Nerve Stimulation for Essential Tremor, Tremor and Other Hyperkinetic Movements, 2025; 15(1):10, pp. 1-9.
Encore Medical, L.P., Intelect Transport 2 Channel Electrotherapy User Manual, 2005.
Falco et al., Cross Talk: A New Method for Peripheral Nerve Stimulation. An Observational Report with Cadaveric Verification, Pain Physician, 12:965-983, 2009.
Fowler et al., The conduction velocities of peripheral nerve fibres conveying sensations of warming and cooling, Journal of Neurology, Neurosurgery and Psychiatry Sep. 1988;51(9):1164-70.
Griffin et al., Efficacy of High Voltage Pulsed Current for Healing of Pressure Ulcers in Patents with Spinal Cord Injury, Physical Therapy, vol. 71, No. 6, Jun. 1991, pp. 433-442.
Johnson, Factors Influencing The Analgesic Effects and Clinical Efficacy of Transcutaneous Electrical Nerve Stimulation (TENS), Newcastle University, Jul. 1991.
Jones et al., Trancutaneous electronical nerve stimulation, Continuing Education in Anaethesia, Critical Care & Pain, vol. 9, No. 4, pp. 130-135, 2009.
Korkmaz et al., Pulsed radiofrequency versus conventional transcutaneous electrical nerve stimulation in painful shoulder: a prospective, randomized study, Clin Rehabil. Nov. 2010;24(11):1000-8, Aug. 4, 2010.
Lowry et al., Spinal Cord Stimulation for the Treatment of Chronic Knee Pain Following Total Knee Replacement, Pain Physician, 13:251-256, 2010.
Miller et al., Superimposed single impulse and pulse train electrical stimulation: A quantitative assessment during submaximal isometric knee extension in young, healthy men, Superimposed Electrical Stimulation Techniques, Muscle & Nerve, Aug. 1999, pp. 1038-1046.

* cited by examiner

Before treatment      After treatment

FIG. 3A
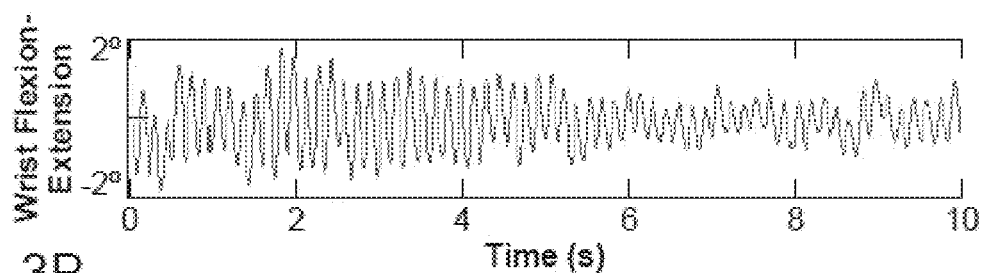
FIG. 3B
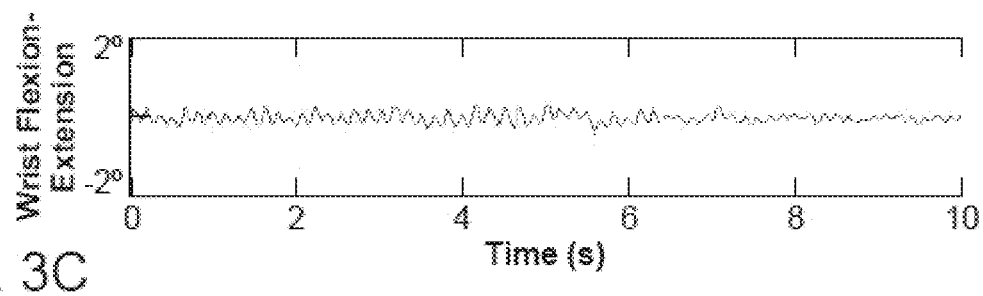
FIG. 3C
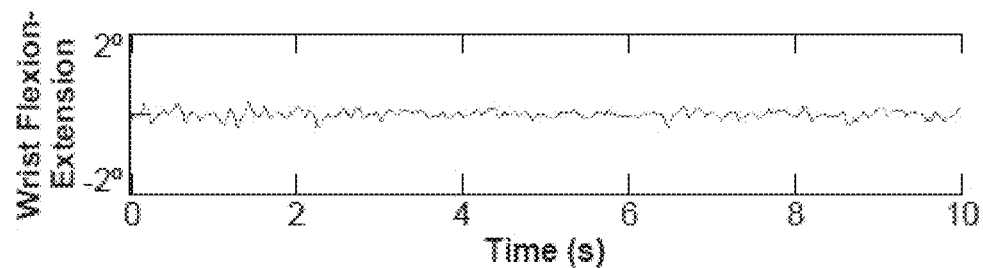
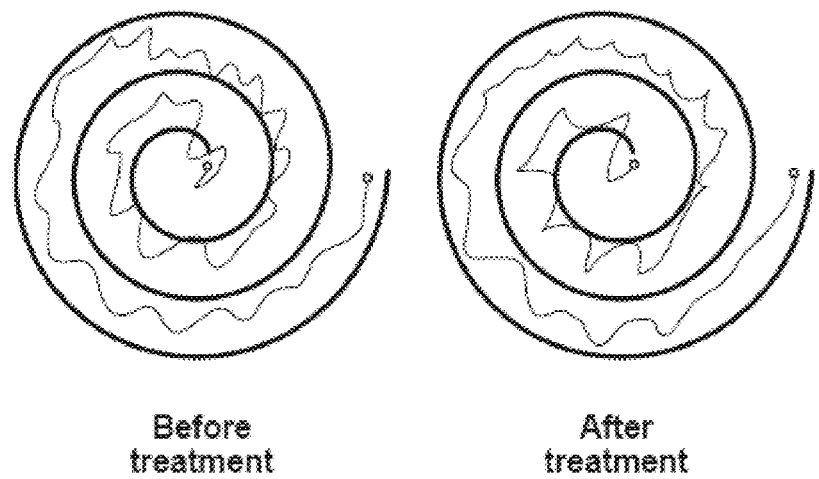
FIG. 4

FIG. 6A
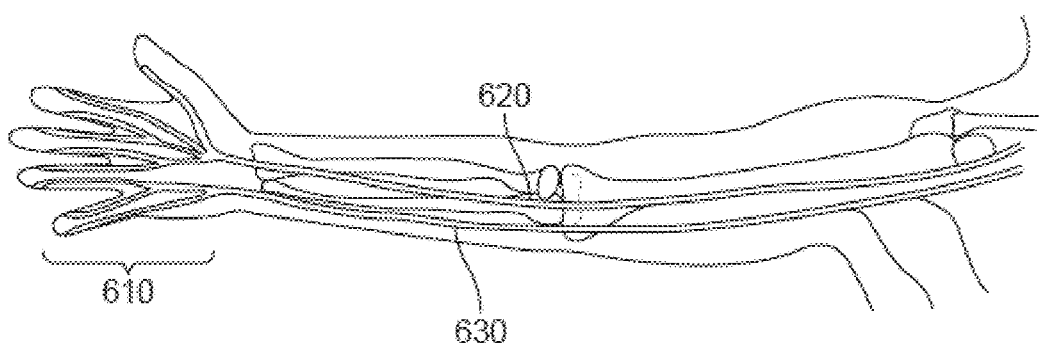
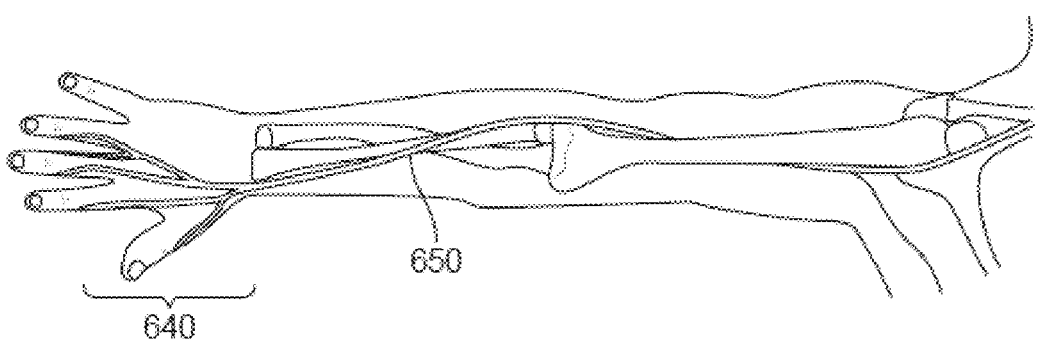
FIG. 6B

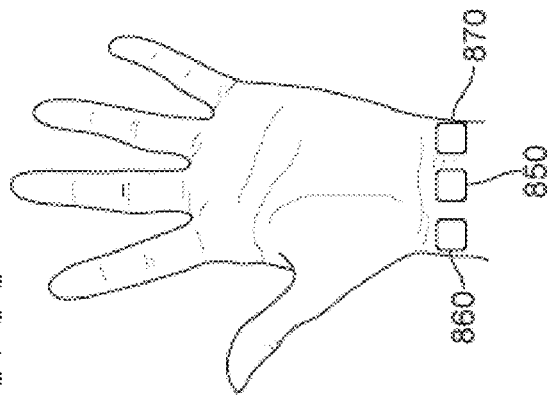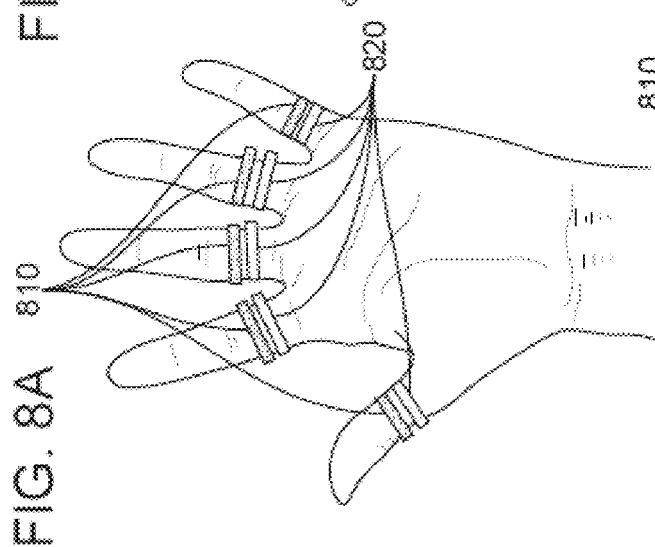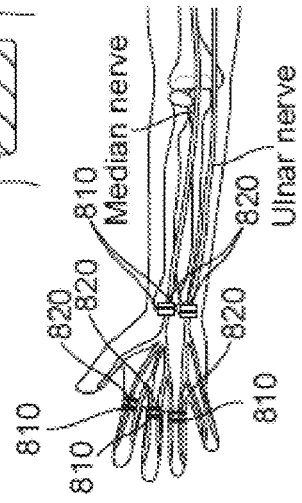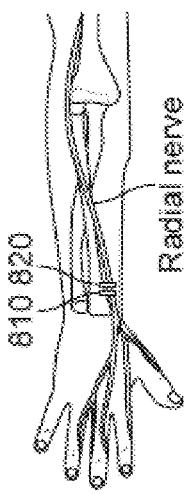

FIG. 9A
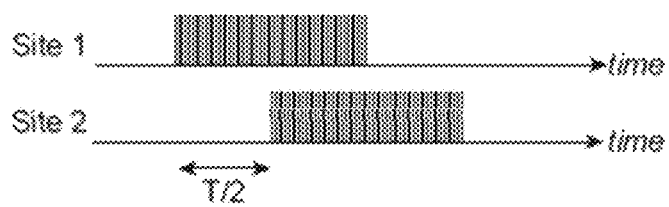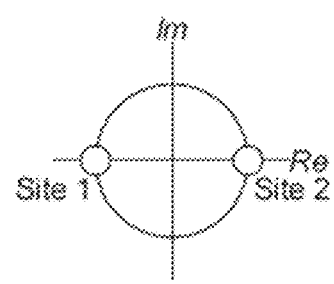
FIG. 9B
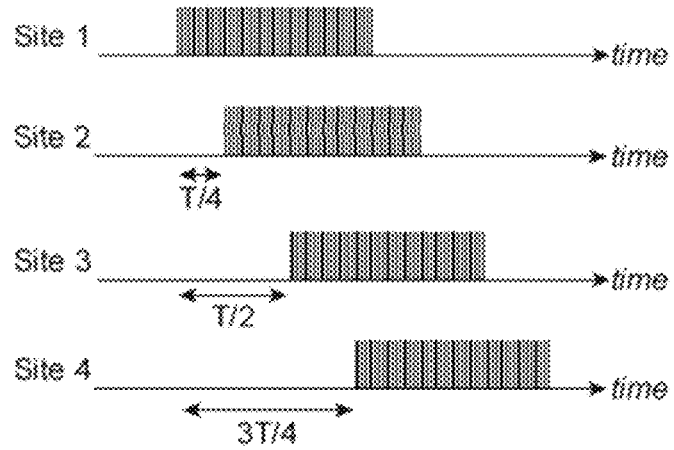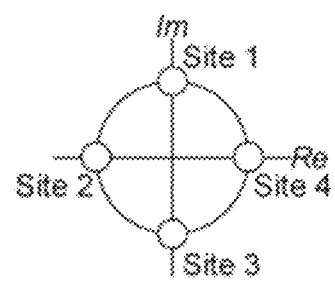

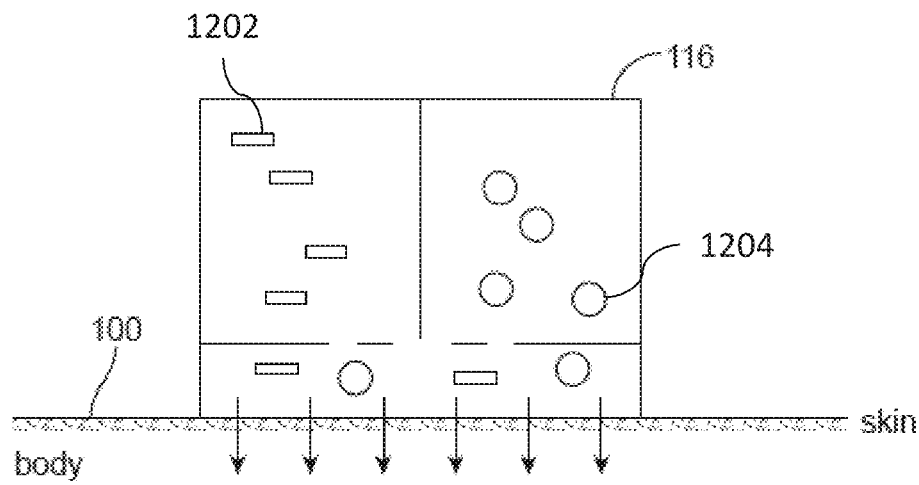
FIG. 12
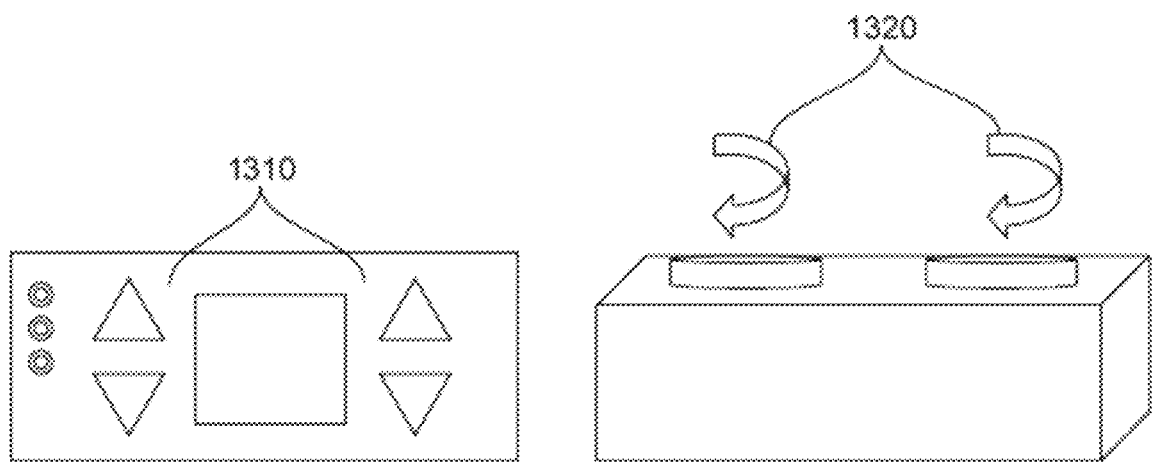
FIG. 13A
FIG. 13B

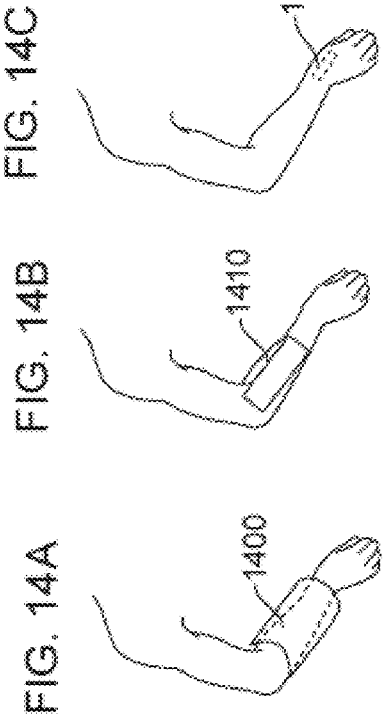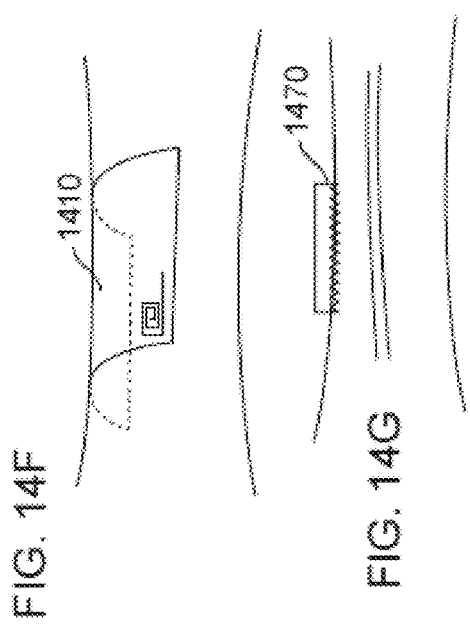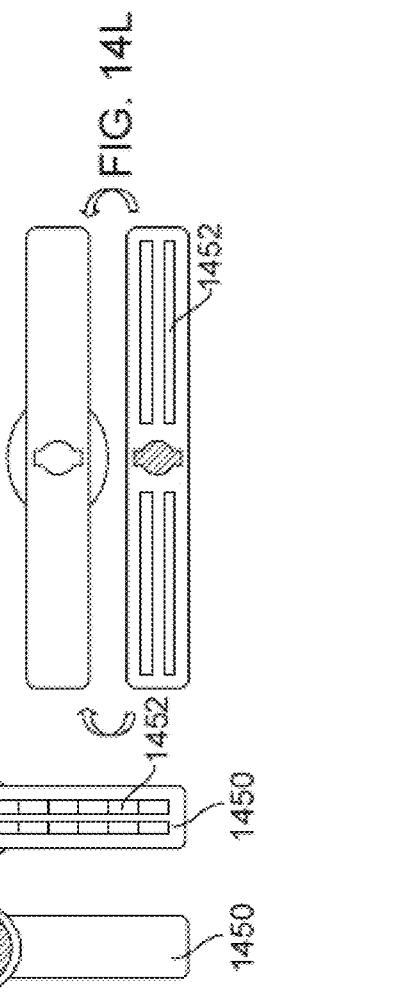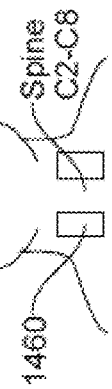

2 bands, each with a
linear array of electrodes

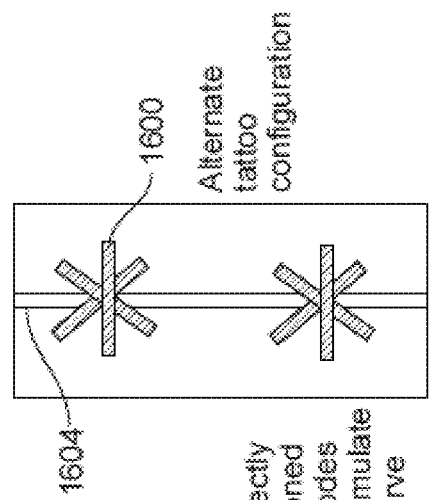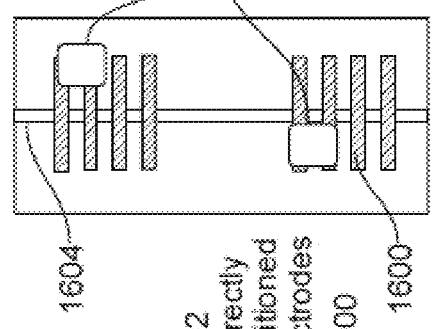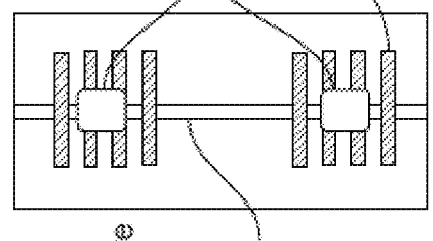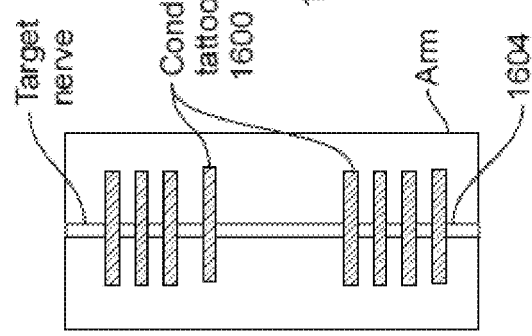

FIG. 18A
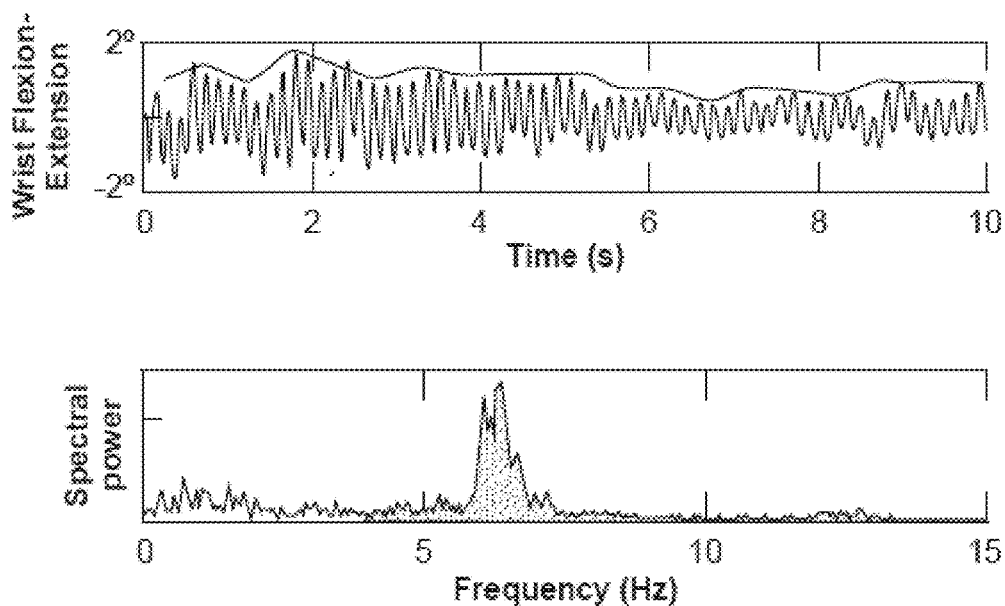
FIG. 18B
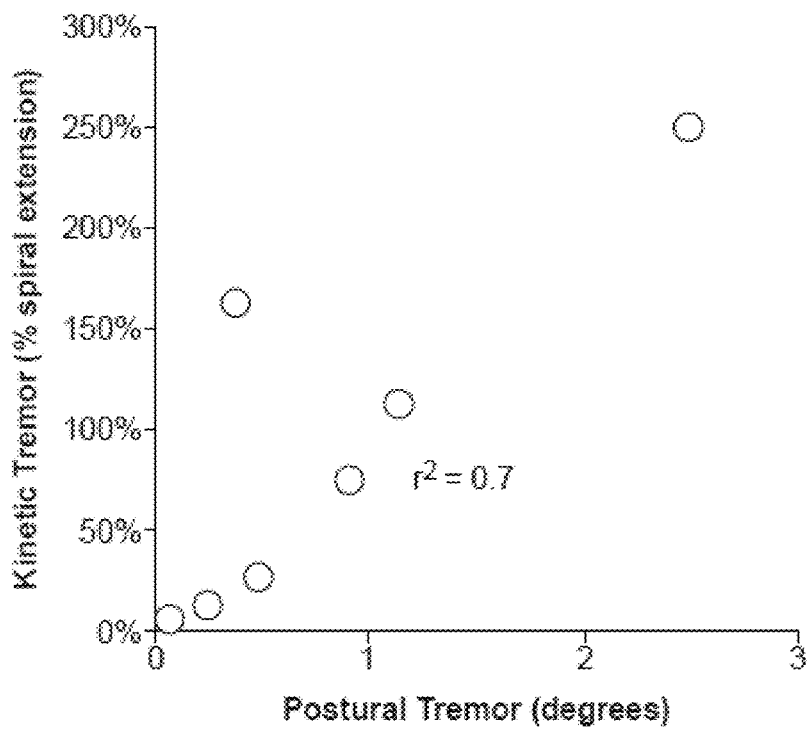
FIG. 19

NEEDLE INSERTION

IMPLANTED MICROELECTRODE
IN COMMUNICATION
WITH EXTERNAL DEVICE

INFO TRANSFER
FROM IMPLANT
TO EXTERNAL
LISTENER DEVICE

POWER TRANSFER BY
RF FROM EXTERNAL
DRVICE TO IMPLANT

MULTI-ELECTRODE
COILS WRAPPED
AROUND NERVE

RELAXED
CONFIGURATION
(NITINOL)
BEFORE INSERTION

AFTER
EXPOSURE
TO BODY
TEMPERATURE

BUTTERFLY
COILS PARTIALLY
ENCIRCLING
NERVE

OPEN
CONFIGURATION

LINEAR
ARRAY

MULTI-MODAL STIMULATION FOR TREATING TREMOR

INCORPORATION BY REFERENCE

This application is a continuation-in-part of U.S. patent application Ser. No. 15/277,946, filed Sep. 27, 2016, now U.S. Pat. No. 10,850,090, which is a continuation of U.S. patent application Ser. No. 14/805,385, filed Jul. 21, 2015, now U.S. Pat. No. 9,452,287, which is a continuation of International Patent Application No. PCT/US2014/012388, filed Jan. 21, 2014, which claims priority benefit of each of U.S. Provisional Patent Application No. 61/754,945, filed Jan. 21, 2013, U.S. Provisional Patent Application No. 61/786,549, filed Mar. 15, 2013, U.S. Provisional Patent Application No. 61/815,919, filed Apr. 25, 2013, U.S. Provisional Patent Application No. 61/822,215, filed May 10, 2013, and U.S. Provisional Patent Application No. 61/857,248, filed Jul. 23, 2013; each of which is herein incorporated by reference in its entirety for all purposes, including under 37 C.F.R. § 1.57. All publications and patent applications mentioned in this specification are herein incorporated by reference to the same extent as if each individual publication or patent application was specifically and individually indicated to be incorporated by reference in its entirety for all purposes.

BACKGROUND

Essential tremor (ET) is the most common movement disorder, affecting an estimated 10 million patients in the U.S., with growing numbers due to the aging population. The prevalence of ET rises with age, increasing from 6.3% of the population over 65 years old, to above 20% in the population over 95 years old. ET is characterized by an involuntary oscillatory movement, typically between 4-12 Hz. It (ET) can produce oscillations in the voice and unwanted movements of the head and limbs. Tremor in the hands and forearm is especially prevalent and problematic because it makes it difficult to write, type, eat, and drink. Unlike Parkinson's tremor, which exists at rest, essential tremor is postural and kinetic, meaning tremor is induced by holding a limb against gravity or during movement, respectively.

Disability with ET is variable, and ranges from embarrassment to the inability to live independently when tasks such as writing and self-feeding are not possible due to the uncontrolled movements of the hand and arm. Despite the high prevalence and high disability in many patients with ET, there are insufficient treatment options to address tremor.

The drugs used to treat tremor (e.g., propanolol and primidone) have been found to be effective in reducing tremor amplitude by only 50% in only 60% of patients. These drugs have side effects that can be severe and are not tolerated by many patients with ET. An alternative treatment is surgical implantation of a stimulator within the brain using deep brain stimulation (DBS), which can be effective in reducing tremor amplitude by 90%, but is a highly invasive surgical procedure that carries significant risks and cannot be tolerated by many ET patients. Thus, there is a great need for alternative treatments for ET patients that reduce tremors without the side effects of drugs and without the risks of brain surgery.

Tremor is also a significant problem for patients with orthostatic tremor, multiple sclerosis and Parkinson's Disease. A variety of neurological disorders include tremor such as stroke, alcoholism, alcohol withdrawal, peripheral neuropathy, Wilson's disease, Creutzfeldt-Jacob disease, Guillain-Barré syndrome and fragile X syndrome, as well as brain tumors, low blood sugar, hyperthyroidism, hypoparathyroidism, insulinoma, normal aging, and traumatic brain injury. Stuttering or stammering may also be a form of tremor. The underlying etiology of tremor in these conditions may differ from ET; however, treatment options for some of these conditions are also limited and alternative treatments are needed.

SUMMARY

ET is thought to be caused by abnormalities in the circuit dynamics associated with movement production and control. Previous work has shown that these circuit dynamics may be temporarily altered by cooling, topical analgesics and vibration. Previous work reported that electrical stimulation using transcutaneous electrical nerve stimulation (TENS) did not improve tremor (Munhoz 2003). It was therefore surprising to discover in our clinical study that circuit dynamics associated with ET can be altered by peripheral nerve simulation resulting in a substantial reduction in the tremor of individuals with ET.

Several embodiments include a novel peripheral stimulation device to send signals along the sensory nerves to the central nervous system in order to modify the abnormal network dynamics. Over time, this stimulation normalizes the neural firing in the abnormal network and reduces tremor. While DBS stimulates the brain directly, our peripheral stimulation influences the abnormal brain circuit dynamics by sending signals along the sensory nerves that connect the periphery to the brain. This approach is non-invasive and expected to avoid DBS's surgical risks and associated problems with cognitive, declarative and spatial memory dysarthria, ataxia or gait disturbances. The peripheral nerve stimulation may effectively treat tremors by dephasing, overriding or obscuring the abnormal brain circuit dynamics. Overriding, obscuring or training the brain to ignore the abnormal brain circuit dynamics follows on hypotheses for the mechanisms of traditional DBS.

Perhaps the technology most closely related to our approach is transcutaneous electrical nerve stimulation (TENS). High-frequency TENS (50 to 250 Hz) is commonly used to treat pain, with the hypothesis that excitation of large, myelinated peripheral proprioceptive fibers (A-beta) blocks incoming pain signals. While the inconsistent clinical results achieved using TENS for pain control have led many to question its use for treatment of pain, it is well documented that surface electrical stimulation excites A-beta neurons. A-beta neurons communicate proprioceptive sensory information into the same brain circuits that are abnormal in diseases including ET and Parkinson's disease. Without being limited by any proposed mechanism of action, this has led us to propose that neurostimulation could be used to excite A-beta nerves and thereby improve tremor. This proposal is particularly surprising because a previous study by Munhoz et al. failed to find any significant improvement in any of the tremor parameters tested after application of TENS. See Munhoz et al., Acute Effect of Transcutaneous Electrical Nerve Stimulation on Tremor, Movement Disorders, 18(2), 191-194 (2003).

Several embodiments disclosed herein relate to systems, devices, and methods for treating tremor, and more specifically relate to system, devices, and methods for treating tremor by stimulation of a peripheral nerve.

In some embodiments, a method of reducing tremor in a patient is provided. The method includes placing a first peripheral nerve effector at a first location relative to a first peripheral nerve; delivering a first stimulus to the first peripheral nerve through the first peripheral nerve effector; and reducing the tremor amplitude by modifying the patient's neural network dynamics.

In some embodiments, the placing step comprises placing the first peripheral nerve effector on the patient's skin and the first stimulus is an electrical stimulus applied to a skin surface. In some embodiments, the first stimulus has an amplitude from about 0.1 mA to 10 mA or higher (e.g., 15 mA) and a frequency from about 10 to 5000 Hz or higher. In some embodiments, the first stimulus has an amplitude that is less than about 15, 14, 13, 12, 11, 10, 9, 8, 7, 6, 5, 4, 3, 2 or 1 mA (e.g., between about 0.1 mA and about 1 mA, between about 0.1 mA and about 2 mA, between about 0.1 mA and about 3 mA, between about 0.1 mA and about 4 mA, between about 0.1 mA and about 5 mA, between about 0.1 mA and about 6 mA, between about 0.1 mA and about 7 mA, between about 0.1 mA and about 8 mA, between about 0.1 mA and about 9 mA, between about 0.1 mA and about 10 mA, between about 0.1 mA and about 11 mA, between about 0.1 mA and about 12 mA, between about 0.1 mA and about 13 mA, between about 0.1 mA and about 14 mA, between about 0.1 mA and about 15 mA, or other ranges between such values). In some embodiments, the first stimulus has a frequency between about 10 Hz and about 20 kHz (e.g., about 10 Hz, about 20 Hz, about 30 Hz, about 40 Hz, about 50 Hz, about 60 Hz, about 100 Hz, about 250 Hz, about 500 Hz, about 1000 Hz, about 2500 Hz, about 5000 Hz, about 10 kHz, about 15 kHz, about 20 kHz, and ranges between such values).

In some embodiments, the placing step comprises implanting the first peripheral nerve effector in the patient and the first stimulus is an electrical stimulus. In some embodiments, the implanting step comprises injecting the first peripheral nerve effector in the patient. In some embodiments, the first stimulus has an amplitude less than about 3 mA and a frequency from about 10 to 5000 Hz. In some embodiments, the first stimulus has an amplitude that is less than about 5, 4, 3, 2 or 1 mA (e.g., between about 0.1 mA and about 1 mA, between about 0.1 mA and about 2 mA, between about 0.1 mA and about 3 mA, between about 0.1 mA and about 4 mA, between about 0.1 mA and about 5 mA, or other ranges between such values). In some embodiments, the first stimulus has a frequency between about 10 Hz and about 20 kHz (e.g., about 10 Hz, about 20 Hz, about 30 Hz, about 40 Hz, about 50 Hz, about 60 Hz, about 100 Hz, about 250 Hz, about 500 Hz, about 1000 Hz, about 2500 Hz, about 5000 Hz, about 10 kHz, about 15 kHz, about 20 kHz, and ranges between such values).

In some embodiments, the peripheral nerve effector includes a power source. In some embodiments, the method further includes powering the first peripheral nerve effector wirelessly through an externally located power source.

In some embodiments, the first stimulus comprises vibrotactile. In some embodiments, the first stimulus comprises chemical. In some embodiments, a first stimulus comprises mechanical, vibrational, electromechanical, thermal, radiant, electrical, magnetic, electromagnetic, light, acoustic, ultrasonic (e.g., focused ultrasound), chemical, infrared, radiofrequency (RF), ultraviolet, x-ray, or microwave. In some embodiments, a second or third stimulus is the same as the first stimulus, but at a different location on the body. In other embodiments, a second or third stimulus is different from the first stimulus, and at the same or different location on the body. For example, a first stimulus is applied to the wrist and a second, different stimulus is applied at a different location. Alternatively, a first stimulus is applied to a first location (e.g., the wrist) and a second, different stimulus is applied to same first location. The same or different nerves can be stimulated on the first location. For example, different nerves (or multiple location points) in one region are stimulated in some embodiments. In several embodiments, stimulation or other neuromodulation can be applied within the body (e.g., partial or full implantation of a device, oral delivery, etc.) instead of or in addition to on the skin surface.

Using a multi-modal approach (whether such approach includes multiple locations, multiple types of the same stimulation, or multiple stimuli, etc., or combinations thereof) is beneficial in some embodiments by reducing habituation, improving efficacy, improving specificity of preferentially stimulated nerve fibers, providing synergistic effects with other non-energy based therapies (e.g., pharmacotherapies), improving efficiency of stimulation to affect a neural circuit, and/or reducing the amount or duration of at least one of the stimulus, etc. For example, treatment on the wrist and a second location (e.g., ankle, ear, finger, etc.) may result in a more rapid reduction in tremor, a longer period of tremor reduction, delivery of an overall reduced amount of stimulation, increased patient compliance, etc. In another example, using different points in the same region may offer similar beneficial outcomes (e.g., different points on the wrist). In one embodiment, the different points in the same region are within about 5 mm, 25 mm, 50 mm, 100 mm and 200 mm of each other (e.g., on a wrist or ankle). In other embodiments, the different points in the same region are within about 0.25 feet-4 feet of each other (e.g. on a leg).

Essential tremor is treated using a multi-modal approach in many embodiments. In some embodiments, dystonia, Parkinson's, and other movement disorders are treated using a multi-modal approach. In several embodiments, hand, leg, head, neck, and/or voice tremor are treated in the same individual. In other embodiments, patients with either hand tremor or leg tremor are treated.

In some embodiments, a multi-modal approach offers a 10-75% reduction in the time it takes to reach efficacy (e.g., a reduction in tremor) or a 10-75% increase in the length of therapeutic effect as compared to a single mode approach or no treatment. For example, in some embodiments, a multiple modal approach may reduce tremor during the stimulation and for a period of 30 minutes, 1-2 hours and 6 hours, or longer, post stimulation. Stimulation is provided one, two, three, four, five, or more times per day in some embodiments. A multi-modal optimized approach in which feedback is used is provided in several embodiments.

In some embodiments, the method further includes sensing motion of the patient's extremity using a measurement unit to generate motion data; and determining tremor information from the motion data. In some embodiments, delivery comprises delivering the first stimulus based on the tremor (or other) information. In some embodiments, the information (e.g., tremor information) comprises a maximum deviation from a resting position for the patient's extremity. In some embodiments, the information (e.g., tremor information) comprises a resting position for the patient's extremity. In some embodiments, the tremor information comprises tremor frequency, phase, and amplitude.

In some embodiments, delivering the first stimulus comprises delivering a plurality of bursts of stimulation having a variable temporal delay between the bursts of stimulation.

In some embodiments, the method further includes placing a second peripheral nerve effector at a second location relative to a second peripheral nerve; and delivering a second stimulus to the second peripheral nerve through the second peripheral nerve effector. According to several embodiments, the effector is placed on two or more points on the same general region (e.g., the wrist) or on two or more locations (e.g., the wrist and the ankle).

In some embodiments, the method further includes determining a period of the patient's tremor or other dysfunction, wherein delivering the second stimulus comprises offsetting delivery of the second stimulus from the delivery of the first stimulus by a predetermined fraction or multiple of a period of the tremor or other dysfunction. In some embodiments, the method further includes dephasing the synchronicity of a neural network in the patient's brain. The second stimulus, in some embodiments is provided in the identical location as the first stimulus or in a different location. The second stimulus may be the same as the first stimulus (both being electrical or mechanical for example) or different. The second stimulus may be the same as the first stimulus, but with different parameters (e.g., different amplitudes, duration, frequency, etc.).

In some embodiments, the first location and second location are located on adjacent fingers. In some embodiments, the first peripheral nerve and the second peripheral nerve are adjacent nerves. In some embodiments, the first peripheral nerve is the median nerve and the second peripheral nerve is the ulnar or radial nerve. In some embodiments, the first peripheral nerve and the second peripheral nerve are somatotopically adjacent.

In some embodiments, the first stimulus has an amplitude that is below a sensory threshold. In some embodiments, the first stimulus is greater than 15 Hz. In some embodiments, the first peripheral nerve carries proprioceptive information from the patient's extremity. In some embodiments, the method further includes determining a duration of efficacy of the first stimulus on reducing the tremor amplitude; and delivering a second stimulus before the expiration of the duration of efficacy.

In some embodiments, determining the duration of effect comprises analyzing multiple stimuli applications applied over a predetermined period of time. The stimuli may be applied in sequence (e.g., serially or one after another) and/or in at least partially overlapping (e.g., parallel).

In some embodiments, determining the duration of efficacy further comprises determining an activity profile for the patient. In some embodiments, determining the duration of efficacy further comprises determining a profile of the tremor or other dysfunction. In some embodiments, the activity profile includes data regarding caffeine and alcohol consumption. In some embodiments, the method further includes placing a conduction pathway enhancer over the first peripheral nerve. In some embodiments, the conduction pathway enhancer is a conductive tattoo. In some embodiments, the conduction pathway enhancer comprises one or more conductive strips.

In some embodiments, the first location is selected from the group consisting of a wrist, a forearm, a carpel tunnel, a finger, and an upper arm.

In some embodiments, a system for treating tremor or other dysfunction in a patient is provided. The device can include a decision unit; and an interface unit adapted to deliver electrical stimuli to a peripheral nerve, the interface unit comprising a first peripheral nerve effector in communication with the decision unit, the first peripheral nerve effector comprising at least one electrode; wherein the decision unit comprises a processor and a memory storing instructions that, when executed by the processor, cause the decision unit to: deliver a first electrical stimulus to a first peripheral nerve through the first peripheral nerve effector, the electrical stimulus configured by the controller to reduce tremor or other dysfunction in the patient's extremity by modifying the patient's neural network dynamics.

In some embodiments, the first electrical stimulus has an amplitude less than about 10 mA or higher (e.g., 15 mA) and a frequency from about 10 to 5000 Hz. In some embodiments, the amplitude is less than about 15, 14, 13, 12, 11, 10, 9, 8, 7, 6, 5, 4, 3, 2, or 1 mA (e.g., between about 0.1 mA and about 1 mA, between about 0.1 mA and about 2 mA, between about 0.1 mA and about 3 mA, between about 0.1 mA and about 4 mA, between about 0.1 mA and about 5 mA, between about 0.1 mA and about 6 mA, between about 0.1 mA and about 7 mA, between about 0.1 mA and about 8 mA, between about 0.1 mA and about 9 mA, between about 0.1 mA and about 10 mA, between about 0.1 mA and about 11 mA, between about 0.1 mA and about 12 mA, between about 0.1 mA and about 13 mA, between about 0.1 mA and about 14 mA, between about 0.1 mA and about 15 mA, or other ranges between such values). In some embodiments, the first electrical stimulus has a frequency between about 10 Hz and about 20 kHz (e.g., about 10 Hz, about 20 Hz, about 30 Hz, about 40 Hz, about 50 Hz, about 60 Hz, about 100 Hz, about 250 Hz, about 500 Hz, about 1000 Hz, about 2500 Hz, about 5000 Hz, about 10 kHz, about 15 kHz, about 20 kHz, and ranges between such values).

In some embodiments, the interface unit further comprises a second peripheral nerve effector in communication with the decision unit, the second peripheral nerve effector comprising at least one electrode, wherein the memory storing instructions that, when executed by the processor, further cause the decision unit to deliver a second electrical stimulus to a second peripheral nerve in the patient's extremity through the second peripheral nerve effector.

In some embodiments, the instructions, when executed by the processor, cause the decision unit to deliver the second electrical stimulus offset in time from the first electrical stimulus by a predetermined fraction or multiple a period of the tremor or other dysfunction.

In some embodiments, the first peripheral nerve effector is adapted to be placed on a first finger and the second peripheral nerve effector is adapted to be placed on a second finger.

In some embodiments, the first peripheral nerve effector comprises a plurality of electrodes arranged in linear array. In some embodiments, the plurality of electrodes are spaced about 1 to 100 mm apart. In some embodiments, the first peripheral nerve effector comprises a plurality of electrodes arranged in a two dimensional array. In some embodiments, the memory storing instructions that, when executed by the processor, further cause the decision unit to select a subset of the plurality of electrodes based on a position of first peripheral nerve effector on the patient's extremity, wherein the selection of the subset of the plurality of electrodes occurs each time the first peripheral nerve effector is positioned or repositioned on the extremity. In some embodiments, the plurality of electrodes are spaced about 1 to 100 mm apart along a first axis and about 1 to 100 mm apart along a second axis perpendicular to the first axis. In some embodiments, some of the electrodes are adjacent to each other to form a strip. In some embodiments, the spacing can be less than about 100, 90, 80, 70, 60, 50, 40, 30, 20, 10, 5, 4, 3, 2, or 1 mm (e.g., between about 0.1 mm and about 1 mm, between about 1 mm and about 2 mm, between about 1 mm and about 3 mm, between about 1 mm and about 4 mm, between about 1 mm and about 5 mm, between about 1 mm and about 10 mm, between about 1 mm and about 20 mm, between about 1 mm and about 30 mm, between about 1 mm and about 40 mm, between about 1 mm and about 50 mm, between about 1 mm and about 60 mm, between about 1 mm and about 70 mm, between about 1 mm and about 80 mm, between about 1 mm and 90 mm, between about 1 mm and about 100 mm, or other ranges between such values).

In some embodiments, the system further includes a measurement unit, wherein the memory storing instructions that, when executed by the processor, further cause the decision unit to: measure the movement of the patient's extremity using the measurement unit to generate motion data; and determine a tremor frequency and magnitude (or other parameters) based on an analysis of the motion data.

In some embodiments, the analysis of the motion data comprises a frequency analysis of the spectral power of the movement data. In some embodiments, the frequency analysis is restricted to between about 4 to 12 Hz. In some embodiments, the frequency analysis is restricted to approximately the expected frequency range of the tremor or tremors of concern. In some embodiments, the analysis of the motion data is done on a predetermined length of time of the motion data. In some embodiments, the decision unit is further adapted to determine tremor phase information based on the motion data and to deliver the first electrical stimulus based on the tremor phase information. In some embodiments, the tremor phase information comprises peak tremor deviation, the decision unit being further adapted to deliver the first electrical stimulus at a time corresponding to the peak tremor deviation.

In some embodiments, for tremor and other indications, the memory storing instructions that, when executed by the processor, further cause the decision unit to deliver the first electrical stimulus as a plurality of bursts of electrical stimulation having a variable temporal delay between the bursts of electrical stimulation. In some embodiments, the memory storing instructions that, when executed by the processor, further cause the decision unit to set parameters of the first electrical stimulus based on the determined tremor frequency. In some embodiments, the memory storing instructions that, when executed by the processor, further cause the decision unit to set parameters of the first electrical stimulus based on the determined tremor magnitude. In some embodiments, the memory storing instructions that, when executed by the processor, further cause the decision unit to compare the determined tremor magnitude (or other data) with a predetermined threshold; and wherein the first electrical stimulus is delivered when the determined tremor magnitude (or other data) exceeds a predetermined threshold. In some embodiments, the electrode is adapted to deliver the first electrical stimulus through the patient's skin. In some embodiments, the electrode is adapted to be implanted and deliver the electrical. In some embodiments, the decision unit comprises a user interface adapted to accept input from a user to adjust a parameter of the first electrical stimulus. In some embodiments, the memory further stores a library of one or more predetermined stimulation protocols. In some embodiments, the interface unit is integrated with the decision unit. In some embodiments, the interface unit and the decision unit are separate from each other and have separate housings. In some embodiments, the decision unit is configured to wirelessly provide power to, or communicate with, the interface unit. In some embodiments, the system further includes a measurement unit located in the decision unit. In some embodiments, the system further includes a measurement unit located in the interface unit. In some embodiments, the decision unit is a computing device selected from the group consisting of a smartphone, tablet and laptop. In some embodiments, the system further includes a server in communication with the computing device, the server configured to receive from the computing device motion data along with a history of the electrical stimuli delivered to the patient. In some embodiments, the server is programmed to: add the received motion data and the history of the electrical stimuli delivered to the patient to a database storing data from a plurality of patients. In some embodiments, the server is programmed to: compare the received motion data and the history of the electrical stimuli delivered to the patient to the data stored in the database; determine a modified electrical stimulus protocol based on the comparison of the received motion data and the history of the electrical stimuli delivered to the patient to the data stored in the database; and transmit the modified electrical stimulus protocol to the computing device. In some embodiments, the electronics are flexible and are disposed on a flexible substrate, which can be a sleeve, pad, band, or other housing.

In some embodiments, a system for monitoring tremor or other dysfunction in a patient's extremity is provided. The system can include an interface unit having an inertial motion unit for capturing motion data, a power source and a wireless transmitter and receiver, the interface unit adapted to be worn on the patient's extremity; and a processing unit in communication with the interface unit, the processing unit configured to receive the motion data from the interface unit. In one embodiment, the processing unit is programmed to determine a tremor signature and profile over a predetermined period of time based on an analysis of the motion data. In another embodiment, the processing unit is programmed to determine a neurological or movement signature and profile over a predetermined period of time based on an analysis of data. In another embodiment, the processing unit is disposed in the device or on a remote processor communicating with the device wirelessly and is programmed to analyze predetermined features of the neurological or movement data.

In several embodiments, a multi-modal approach is based on monitoring, wherein a second mode is provided (e.g., same or different stimulus at a second body location, different stimulus at the same or different body location, etc.) based on feedback received after the first mode is activated. In some embodiments, the second mode can be a different type of energy (e.g., thermal, mechanical, chemical, etc.) or the same type of energy with different stimulation parameters (e.g., frequency, amplitude, pulse width, pulse spacing, phase, waveform shape, waveform symmetry, duration, duty cycle, on/off time, bursting, etc.). In some embodiments, a device is provided that adjusts stimulation modalities to enhance efficacy based on prior responses by the subject and/or predetermined characteristics or features of the neurological or movement data measured from the sensors. In some embodiments, one or more sensors are provided to adjust the parameters of the second (or third or more) mode. This is beneficial in some embodiments to reduce the time it takes to achieve a therapeutic effect (e.g., by at least 10%, 25%, 50% or more, or overlapping ranges therein) or lengthens the therapeutic effect (by e.g., by at least 10%, 20%, 40% or more, or overlapping ranges therein), or improve the overall benefit (e.g., larger reduction in hand tremor levels).

In some embodiments, the processing unit is a mobile phone. In some embodiments, the system further includes a server in communication with the mobile phone, the server configured to receive motion data from the mobile phone. In some embodiments, the processing unit is further programmed to compare the tremor magnitude or other data with a predetermined threshold. In some embodiments, the processing unit is further programmed to generate an alert when the tremor magnitude or other factor exceeds the predetermined threshold. In some embodiments, the predetermined threshold is adjustable by the patient. In some embodiments, the processing unit is programmed to prompt the patient to enter activity data, the activity data including a description of the activity and a time the activity occurred. In some embodiments, the processing unit is programmed to correlate the activity data with the determined tremor frequency and magnitude. In some embodiments, the activity data comprises consumption of caffeine or alcohol. In some embodiments, the activity data comprises consumption of a drug.

Different modes of stimulation or multi-modal stimulation could include different locations of stimulation. Different modes of stimulation or multi-modal stimulation could include different types of energy, as well as energy modalities in combination with non-energy based therapies (e.g., pharmacotherapies). Different modes of stimulation or multi-modal stimulation could include different stimulation parameters for the same type of energy (e.g., frequency, amplitude, pulse width, pulse spacing, phase, waveform shape, waveform symmetry, duration, duty cycle, on/off time, and/or bursting). Different modes of stimulation or multi-modal stimulation could include different types of stimulation to selectively or preferentially stimulate distinct fiber types and/or nerve types, including afferent and efferent stimulation). Different modes of stimulation or multi-modal stimulation could include multiple stimulation targets or parameters to preferentially affect one of the limbs of the autonomic nervous system. Different modes of stimulation or multi-modal stimulation could include multiple durations. Different modes of stimulation or multi-modal stimulation could include application of different patterns to an array of devices (e.g., a linear array of pairs of electrodes). Different modes of stimulation or multi-modal stimulation could include combinations of two or more of the above different modes. In some embodiments, a multi-modal system can include a plurality of stimulators that communicate with each other wirelessly and provided a synchronized, patterned stimulation. In some embodiments, multiple stimulators may be in connection with multiple effectors to stimulate multiple nerves simultaneously. In one embodiment, a system can include a stimulator on the wrist to target median nerve and a stimulator in the ear to target the auricular branch of the vagus nerve.

In some embodiments, a system for treating a condition (including but not limited to tremor) is provided comprising a first stimulation actuator configured to apply a first stimulation mode to a first peripheral nerve (e.g., proprioceptor, afferent, A-fiber, B-fiber, C-fiber, etc.), a second stimulation actuator configured to apply a second stimulation mode to a second peripheral nerve (e.g., proprioceptor, afferent, A-fiber, B-fiber, C-fiber, etc.), and a controls module in communication with the first stimulation actuator and the second stimulation actuator. The second stimulation mode is different than the first stimulation mode in one embodiment. In another embodiment, the two modes are the same (e.g., the same location, both electrical stimulation, both excitatory, both inhibitory, etc.). Three, four or more modes may be used in some embodiments. In addition to tremor, overactive bladder and cardiac dysfunction are treated. Psychiatric disorders (e.g., with neurotransmission dysfunction) are treated in one embodiment.

In some embodiments, at least one of the first stimulation actuator or the second stimulation actuator may comprise an electrical actuator (such as means for delivering an electrical stimulation, including for example an element, device, mechanism, component, portion (e.g., electrode), affector, or the like). The electrical portion may be transcutaneous. The electrical portion may be subcutaneous. The first stimulation actuator may comprise a first electrical portion. The second stimulation actuator may comprise a second electrical portion.

The first stimulation mode may comprise a first value of a parameter. The second stimulation mode may comprise a second value of the parameter different than the first value of the parameter.

The parameter may comprise at least one of stimulation frequency, amplitude, pulse width, pulse spacing, phase, waveform shape, waveform symmetry, duration, duty cycle, on/off time, or bursting. The parameter may comprise stimulation continuousness. The first stimulation mode may comprise burst. The second stimulation mode may comprise continuous. The parameter may comprise stimulation frequency. The first stimulation mode may comprise between 10 Hz and 30 Hz (e.g., 20 Hz). The second stimulation mode may comprise between 30 Hz and 50 Hz (e.g., 40 Hz). The first stimulation mode may comprise between 100 Hz and 200 Hz (e.g., 150 Hz). The second stimulation mode may comprise between 50 Hz and 150 Hz (e.g., 100 Hz). In some embodiments, the first and second stimulation may burst on/off in an alternating pattern at a frequency between 4-12 Hz, for example in a burst mode; e.g., 10 Hz). The parameter may comprise a stimulation waveform. The first stimulation mode may comprise a first stimulation waveform. The second stimulation mode may comprise a second stimulation waveform different than the first stimulation waveform.

At least one of the first stimulation actuator or the second stimulation actuator may comprise a thermal device, component, actuator, or portion that increases and/or decreases internal temperature of surrounding tissue (such as means for heating and/or cooling (e.g., resistive heaters, piezoelectric cooler, fluid based temperature control) including for example an element, device, mechanism, component, portion, affector, or the like). The thermal device may be configured to apply a cooling effect. The thermal device may be configured to apply a heating effect. Temperature sensors may also be included and provide communication to the processor or controls module, with or without feedback that affects the cooling or heating.

At least one of the first stimulation actuator or the second stimulation actuator may comprise a vibrational or mechanical actuating actuator (such as means for vibrating, generating and transferring vibration to for example the skin, (e.g., vibrator, sonic systems, solenoids, offset motor) including for example an element, device, mechanism, component or portion affector, or the like). In some embodiments, a mechanical actuator configured to apply mechanical energy that is not vibrational may be activated to apply pressure at a specific location, such as an acupressure point. In some embodiments, a peg with a rounded end or other shaped element may be driven by a motor or solenoid to protrude into skin from a band worn around a body part to apply pressure to a nerve (e.g., the median nerve for a wrist band). In some embodiments, a band worn around a body part may be driven by a motor or solenoid to increase tension or tighten the band to apply pressure to a nerve (e.g., the median nerve for a wrist band). At least one of the first stimulation actuator or the second stimulation actuator may comprise a magnetic actuator (such as means for generating a magnetic field, (e.g., a magnet, an electromagnet) including for example an element, device, mechanism, component, portion, affector, or the like). At least one of the first stimulation actuator or the second stimulation actuator may comprise a chemical (e.g., pharmacological therapy or lidocaine). At least one of the first stimulation actuator or the second stimulation actuator may comprise an ultrasonic (e.g., focused ultrasound) actuator (such as means for generating ultrasonic energy (e.g., a transducer, piezoelectric element, coupling fluid) including for example an element, device, mechanism, component, portion, affector, or the like). At least one of the first stimulation actuator or the second stimulation actuator may comprise a microwave actuator (such as means for generating microwave energy (e.g., a microwave generator) including for example an element, device, mechanism, component or portion affector, or the like). In some embodiments, at least one of the first stimulation actuator or the second stimulation actuator comprises an electromagnetic actuator for generating electromagnetic energy, waves, fields, etc. In addition to a second stimulation actuator, a third, fourth or additional stimulation actuator is used in some embodiments.

The first stimulation actuator may be configured to be positioned on a wrist of the subject. The second stimulation actuator may be configured to be positioned on a finger of the subject. The second stimulation actuator may be configured to be positioned on an ankle of the subject. The first location may comprise an arm of the body and the second location may comprise a leg of the body. The first location may be a left arm or leg of the body and second location may be a right arm or leg of the body to provide bilateral stimulation.

The system may further comprise a sensor. The controls module may be configured to initiate at least one of the first stimulation mode or the second stimulation mode upon detection of an event.

In some embodiments, a system for treating tremor in a subject may comprise a first stimulation actuator and a controls module in communication with the first stimulation actuator. The first stimulation actuator is configured to apply a first stimulation mode comprising a first value of a parameter to a first peripheral nerve (e.g., proprioceptor, afferent, A-fiber, B-fiber, C-fiber, etc.), and a second stimulation mode comprising a second value of the parameter different than the first value of the parameter.

The first stimulation actuator may comprise an electrode (e.g., 1-6, or more electrodes). The electrode may be transcutaneous or subcutaneous.

The parameter may comprise at least one of stimulation frequency, amplitude, pulse width, pulse spacing, phase, waveform shape, waveform symmetry, duration, duty cycle, on/off time, or bursting. The parameter may comprise stimulation continuousness. The first stimulation mode may comprise burst. The second stimulation mode may comprise continuous. The parameter may comprise stimulation frequency. The first stimulation mode may comprise between 10 Hz and 30 Hz (e.g., 20 Hz). The second stimulation mode may comprise 30 Hz to 50 Hz (e.g., 40 Hz). The first stimulation mode may comprise between 100 Hz and 200 Hz (e.g., 150 Hz). The second stimulation mode may comprise between 50 Hz and 150 Hz (e.g., 100 Hz). In some embodiments, the first and second stimulation may burst on/off in an alternating pattern at a frequency between 4-12 Hz, for example in a burst mode; e.g., 10 Hz). The parameter may comprise stimulation waveform. The first stimulation mode may comprise a first stimulation waveform. The second stimulation mode may comprise a second stimulation waveform different than the first stimulation waveform.

The system may further comprise a second simulation actuator. The second stimulation actuator may comprise an electrode. The second stimulation actuator may comprise a thermal actuator. The stimulation actuator may comprise a mechanical, vibrational, electromechanical, thermal, radiant, electrical, magnetic, electromagnetic, light, acoustic, chemical, ultrasonic (e.g., focused ultrasound), infrared, radiofrequency (RF), ultraviolet, x-ray, or microwave actuator. Sensors are optionally included, and may alter neuromodulation of the various actuators.

The first stimulation actuator may be configured to be positioned on a wrist of the subject. The second stimulation actuator may be configured to be positioned on a finger or ankle of the subject. Circumferential stimulation is provided in one embodiment (e.g., at various points around the wrist, finger, ankle, etc.) using for example a band, cuff, etc. The foot, ankle, knee, thigh, back, sacral region, lumbar region, ear, head, and/or neck, and/or locations to target nerves, including, tibial, saphenous, sacral, peroneal, sural, and/or vagus may be beneficial to treat overactive bladder in some embodiments.

In some embodiments, a system and method of treating tremor or other indication in a subject comprises applying a first stimulation to a first peripheral body part and applying a second stimulation to a second peripheral body part different than the first peripheral body part. The first stimulation comprises at least one of electrical stimulation, vibrational stimulation, thermal stimulation, or chemical stimulation. The second stimulation comprises at least one of electrical stimulation, vibrational stimulation, thermal stimulation, or chemical stimulation. The second stimulation is different than the first stimulation.

In some embodiments, a system and method of treating tremor or other indication in a subject comprises applying a first stimulation to a first peripheral nerve (e.g., proprioceptor, afferent, A-fiber, B-fiber, C-fiber, etc.) and applying a second stimulation to a second peripheral nerve (e.g., proprioceptor, afferent, A-fiber, B-fiber, C-fiber, etc.). The first stimulation comprises at least one of electrical stimulation, vibrational stimulation, thermal stimulation, or chemical stimulation. The second stimulation comprises at least one of electrical stimulation, vibrational stimulation, thermal stimulation, or chemical stimulation. The second stimulation is different than the first stimulation in one embodiment, but can be the same in other embodiments. In some embodiments, the first stimulation comprises at least one of electrical stimulation, magnetic stimulation, chemical stimulation, thermal stimulation, vibrational stimulation, ultrasound stimulation (e.g., focused ultrasound), radiofrequency stimulation, or microwave stimulation and the second, or additional, stimulation comprises at least one of electrical stimulation, magnetic stimulation, chemical stimulation, thermal stimulation, vibrational stimulation, ultrasonic stimulation (e.g., focused ultrasound), radiofrequency stimulation, or microwave stimulation.

In some embodiments, the first and second (and optionally third, fourth or more) stimuli comprise electrical stimulation. The first stimulation may comprise a first value of a parameter. The second (and any additional) stimulation may comprise a second value of the parameter different than the first value of the parameter. The parameter may comprise at least one of stimulation frequency, amplitude, pulse width, pulse spacing, phase, waveform shape, waveform symmetry, duration, duty cycle, on/off time, or bursting. The parameter may comprise stimulation continuousness. The first stimulation mode may comprise burst. The second stimulation mode may comprise continuous. The parameter may comprise stimulation frequency. The first stimulation mode may comprise between 10 Hz and 30 Hz (e.g., 20 Hz). The second stimulation mode may comprise between 30 Hz and 50 Hz (e.g. 40 Hz). In one embodiment, the first stimulation is less than 40 Hz and the second stimulation is 40 Hz or higher. In another embodiment, the first stimulation is less than 20 Hz and the second stimulation is 20 Hz or higher. The first stimulation mode may comprise between 100 Hz and 200 Hz (e.g., 150 Hz). The second stimulation mode may comprise between 50 Hz and 150 Hz (e.g., 100 Hz). In some embodiments, the first and second stimulation may burst on/off in an alternating pattern at a frequency between 4-12 Hz, for example in a burst mode; e.g., 10 Hz). The parameter may comprise stimulation waveform. The first stimulation mode may comprise a first stimulation waveform. The second stimulation mode may comprise a second stimulation waveform different than the first stimulation waveform.

In some embodiments, the first and second (and optionally third, fourth or more) stimuli comprise chemical stimulation. The first stimulation may comprise a first neuromodulating chemical. The second (and any additional) stimulation may comprise a second neuromodulating chemical different than the first neuromodulating chemical.

In some embodiments, the first and second (and optionally third, fourth or more) stimuli comprise mechanical stimulation. In one embodiment, the stimuli have different vibration durations and/or frequencies. In another embodiment, a mechanical actuator is activated to apply controlled pressure to a specific location, such as a target nerve or acupressure point. The mechanical actuator can comprise a linear actuator or a rotational actuator that displaces tissue in the proximity of a nerve to apply pressure to activate proprioceptors in a target region or in a target nerve.

In some embodiments, the first and second (and optionally third, fourth or more) stimuli comprise different stimuli at different points in the same region. For example, electrical stimulation at a certain frequency, duration and/or amplitude is applied at a first point and electrical stimulation at a different frequency, duration and/or amplitude is applied at a second point. The two points may be on the wrist at different places, and may stimulate the same or different nerves. The stimuli may be simultaneous and/or sequential, or overlapping. The stimuli may be patterned across a plurality of electrodes arranged linearly or circumferentially in a band or over skin interface. A tri-modal approach is also used in one embodiment, in which, for example, three points on a wrist are stimulated. Instead of or in addition to the wrist, the treatment points (whether two, three, or more points) may be on an ankle, knee, thigh, upper arm, finger, toe, ear, chest, back, shoulder, head, neck, etc.

In one embodiment, both electrical and mechanical (e.g., vibration) are provided sequentially and/or simultaneously in a multi-modal dual approach. In one embodiment, the dual stimulation is provided at the same location (e.g., same point on the wrist). In another embodiment, the dual stimulation is provided in the same region but at different points (e.g., different points on the wrist). In yet another embodiment, the dual stimulation is provided at different regions (e.g., the wrist and the ankle). Third, fourth or additional stimuli are provided in some embodiments.

In some embodiments, a first stimulation is applied to a first location, a second stimulation is applied to a second location, and optionally a third stimulation is applied to a third location, and a fourth stimulation is applied to a fourth location. In one embodiment, one or more locations are different than the others.

In one embodiment, a first, second, third or additional location is selected from a wrist, a finger, toe, ear, ankle, knee, thigh, upper arm, back, chest, hand, foot, head, neck, etc. Cuffs or bands may be used, and may be flexible to accommodate a subject. Patches may also be used. 1-12 (or more) electrodes may be used in some embodiments (such as 2, 4, 6, 8, 10 and ranges therein). The electrodes can be in an array (e.g., a linear array).

In some embodiments, a method of treating tremor in a subject comprises applying a first stimulation from a first actuator to a first location on a body of the subject and applying a second stimulation from a second actuator. The first stimulation comprises electrical stimulation. The first actuator comprises an electrode. The second stimulation comprises vibratory stimulation. The first actuator and the second actuator are coupled to one of the arm, wrist, leg, knee, or ankle using a flexible cuff. At least one of applying the first stimulation or applying the second stimulation is responsive to a controller in a smart device and based on a sensed and predetermined characteristic of the disease. After applying the first stimulation and applying the second stimulation, the symptom of the disease is reduced.

Applying the second stimulation from the second actuator may be to a second location on the body. The second location may be spaced from the first location by a distance.

In some embodiments, systems and methods can involve afferent (sensory) stimulation in combination with motor (efferent) stimulation of nerves, muscles, or both, including but not limited to functional electrical stimulation. Functional electrical stimulation (FES) can activate tremorogenic muscles out-of-phase to attenuate tremor in some cases. In other embodiments, tremor can be mechanically dampened with a tool such as a gyroscope (e.g., rotating eccentric mass) in combination with nerve stimulation with an energy or other modality as described elsewhere herein. In some embodiments, a controller can receive real-time or near real-time feedback from one or more sensors configured to measure a parameter of the patient (e.g., tremor amplitude), and apply FES and/or mechanical dampening when the tremor amplitude is measured to be above a predetermined threshold level.

We have invented a peripheral nerve stimulation device and method that effectively reduces tremors without the side effects of drugs and without the risks of brain surgery. Our approach is safe, and in some embodiments non-invasive, and effective in reducing tremor. In some embodiments, the device may work by altering the neural circuit dynamics associated with essential tremor, Parkinson's tremor, and other tremors. The device is simple to use, comfortable, and adjustable to achieve the best therapy for each patient. The multi-modality devices and methods disclosed herein can also be utilized in some embodiments for a variety of other non-limiting indications. Such indications can include, but are not limited to cardiac dysfunction, (e.g., dysrhythmias such as atrial fibrillation, atrial flutter, ventricular tachycardia, and others), and abnormal blood pressure (hypertension and hypotension). Other non-limiting indications include urinary and/or gastrointestinal dysfunction (including overactive bladder, nocturia, and/or stress and urge incontinence) as well as fecal incontinence. Psychiatric conditions with a neurological component (such as neurotransmitter dysfunction) may be treated in some embodiments. Migraine may also be treated.

In one embodiment, overactive bladder is treated in a multi-modal manner using a first electrical stimulus and a second vibratory stimulus at one of the following locations, including foot, ankle, knee, thigh, back, sacral region, lumbar region, ear, head, and/or neck, and/or locations to target nerves, including, tibial, saphenous, sacral, peroneal, sural, and/or vagus. In some embodiments, electrical stimulus is provided at two or more different locations.

In one embodiment, cardiac dysfunction is treated in a multi-modal manner using a first electrical stimulus and a second vibratory stimulus at one of the following locations, including wrist, arm, fingers, shoulder, neck, head, transcranial, ear, in-ear, tragus, cymba concha, back, or chest, and/or locations to target nerves, including median, radial, ulnar, vagus, auricular vagus, or trigeminal, median, radial, ulnar, peroneal, saphenous, tibial, and/or other nerves or meridians accessible on the limbs. In some embodiments, electrical stimulus is provided at two or more different locations.

In one embodiment, neurotransmitter dysfunction (e.g., in depression, anxiety and other psychiatric conditions) is treated in a multi-modal manner using a first electrical stimulus and a second vibratory stimulus at one of the following locations, including wrist, arm, fingers, shoulder, neck, head, transcranial, ear, in-ear, tragus, cymba concha, back, or chest, and/or locations to target nerves, including median, radial, ulnar, vagus, auricular vagus, or trigeminal, median, radial, ulnar, peroneal, saphenous, tibial, and/or other nerves or meridians accessible on the limbs. In some embodiments, electrical stimulus is provided at two or more different locations.

For indications such as overactive bladder, cardiac dysfunction, psychiatric conditions and other indications, electrical and vibration modulation are nonlimiting examples of a multi-modal approach. Other modulation modalities include but are not limited to magnetic, chemical (pharmacological), thermal, ultrasonic (e.g., focused ultrasound), sonic, radiofrequency, and microwave. A multi-modal approach also includes using the same modality at different locations on the body or at different points in the same region according to several embodiments. A multi-modal approach also includes using the same modality with different parameters at the same or different locations on the body or same or different points in the same region, and/or different stimulation patterns.

In several embodiments, when two or more devices are used in different locations, the devices may be in communication with one another, either in communication via a wired connection or in wireless communication via standard wireless communication protocols, such as RF, WiFi, Bluetooth, cellular, or Zigbee. In another embodiment, multiple devices are in communication to synchronize stimulation across a plurality of devices in the same or different locations. Feedback from one sensor may be used to adjust stimulation of a device at a different location.

In some embodiments, a wearable device for treating tremor comprises a processing unit, a first peripheral nerve effector comprising at least one source of stimulation configured to be positioned to modulate a first peripheral nerve pathway, a second peripheral nerve effector comprising at least one source of stimulation configured to be positioned to modulate a second peripheral nerve pathway, and at least one sensor configured to measure a characteristic of a disease state. The processing unit comprises a controller and memory for storing instructions that when executed cause the device to apply a first stimulation from a first actuator to a first location on a body and apply a second stimulation from a second actuator. The first stimulation comprises electrical stimulation or vibratory stimulation. The second stimulation may comprise a different type of stimulation than the first stimulation. The second stimulation may comprise a same type of stimulation as the first stimulation and a different stimulation parameter comprising at least one of frequency, amplitude, pulse width, pulse spacing, phase, waveform shape, waveform symmetry, duty cycle, on/off time, burst pattern, or duration of stimulation. At least one of applying the first stimulation or applying the second stimulation is responsive to the controller and based on a sensed characteristics of the disease state. After applying the first stimulation and applying the second stimulation, the characteristic of the disease state is reduced.

The second actuator may be configured to be applied to a second location on the body spaced from the first location by a distance. The first stimulation can be configured for afferent nerve stimulation, and the second stimulation can be configured for functional electrical stimulation.

BRIEF DESCRIPTION OF THE DRAWINGS

The novel features of several embodiments are set forth with particularity in the claims and the detailed description, which sets forth illustrative (non-limiting) embodiments, in which the principles described herein are utilized, and the accompanying drawings of which:

FIGS. 3A-3C illustrate wrist flexion-extension calculated from gyroscopic data in subject B from FIGS. 2A-2C. FIG. 3A shows the tremor before treatment; FIG. 3B shows the reduction in tremor immediately after treatment; FIG. 3C shows that the tremor reduction is maintained twenty minutes after the treatment.

FIG. 4 illustrates an example of ineffective treatment in a moderate ET patient.

FIGS. 6A and 6B illustrate the major nerves innervating the hand and their distal branches.

FIG. 8A illustrates an embodiment of an electrode pair used to excite nerves in different fingers, in which both electrodes are positioned on the finger.

FIG. 8B illustrates a means of exciting nerves in different fingers, in which the second electrode is positioned at the wrist.

FIG. 8C illustrates an embodiment of the placement of electrodes on the wrist to target different underlying nerves.

FIGS. 8D and 8E illustrate various stimulation sites.

FIG. 9A is a diagram showing an embodiment of an excitation scheme to dephase the brain regions receiving sensory input from two fingers.

FIG. 9B is a diagram showing an embodiment of an excitation scheme to dephase the brain regions receiving sensory input from four fingers.

FIG. 12 is a drawing showing an embodiment where the stimulator is chemical and two neuromodulating chemicals can be mixed to provide tailored chemical stimulation.

FIGS. 13A and 13B illustrate various forms of user controls.

FIGS. 14A-14M illustrate various non-invasive or invasive embodiments of the tremor altering system. FIG. 14E is a drawing showing an embodiment in which the stimulator is mechanical. FIG. 14H illustrates an embodiment of a device having a form factor of a wrist watch. FIG. 14I illustrates the back of the device shown in FIG. 14H, showing the electrodes which are the interface with the user. FIGS. 14J and 14K illustrate an embodiment of a disposable electrode interface that snaps into place of the wrist watch form factor of the device housing. FIG. 14L illustrates an embodiment of a self-aligning snap feature that allows the disposable electrode interface to snap into the housing of the device in a wrist watch form factor. FIG. 14M is a drawing showing the potential placement of electrodes along the spine in an embodiment of the device where the effector is electrical.

FIGS. 16A-16D illustrate various embodiments of conductive ink tattoos.

FIGS. 18A and 18B illustrate an example of spectral analysis of gyroscopic motion data for a patient with a tremor centered at 6.5 Hz.

FIG. 19 illustrates the correlation of postural tremor with kinetic tremor.

The figures identified above can be combined with other figures and descriptions provided herein.

DETAILED DESCRIPTION

As used herein, the terms "stimulating" and "stimulator" generally refer to delivery of a signal, stimulus, or impulse to neural tissue of the targeted region. The effect of such stimulation on neuronal activity is termed "modulation"; however, for simplicity, the terms "stimulating" and "modulating", and variants thereof, are sometimes used interchangeably herein. The effect of delivery of the signal to the neural tissue may be excitatory or inhibitory and may potentiate acute and/or long-term changes in neuronal activity. For example, the effect of "stimulating" or "modulating" a neural tissue may comprise one or more of the following effects: (a) depolarizing the neurons such that the neurons fire action potentials, (b) hyperpolarizing the neurons to inhibit action potentials, (c) depleting neurons ion stores to inhibit firing action potentials (d) altering with proprioceptive input, (e) influencing muscle contractions, (f) affecting changes in neurotransmitter release or uptake, or (g) inhibiting firing. "Proprioception" refers to one's sensation of the relative position of one's own body parts or the effort being employed to move one's body part. Proprioception may otherwise be referred to as somatosensory, kinesthetic or haptic sensation. A "proprioceptor" is a receptor providing proprioceptive information to the nervous system and includes stretch receptors in muscles, joints, ligaments, and tendons as well as receptors for pressure, temperature, light and sound. An "effector" is the mechanism by which the device modulates the target nerve. For example, the "effector" may be electrical stimulation of the nerve or mechanical stimulation of proprioceptors.

"Electrical stimulation" refers to the application of electrical signals to the soft-tissue and nerves of the targeted area. "Vibrotactile stimulation" refers to excitation of the proprioceptors, as by application of a biomechanical load to the soft-tissue and nerves of the targeted area. Applying "thermal stimulation" refers to induced cooling or heating of the targeted area. Applying "chemical stimulation" refers to delivery of either chemical, drug or pharmaceutical agents capable of stimulating neuronal activity in a nerve or in neural tissue exposed to such agent. This includes local anesthetic agents that affect neurotransmitter release or uptake in neurons, electrically excitable cells that process and transmit information through electrical and chemical signals. The "cloud" refers to a network of computers communication using real-time protocols such as the internet to analyze, display and interact with data across distributed devices.

Device Location

Figure 5A:
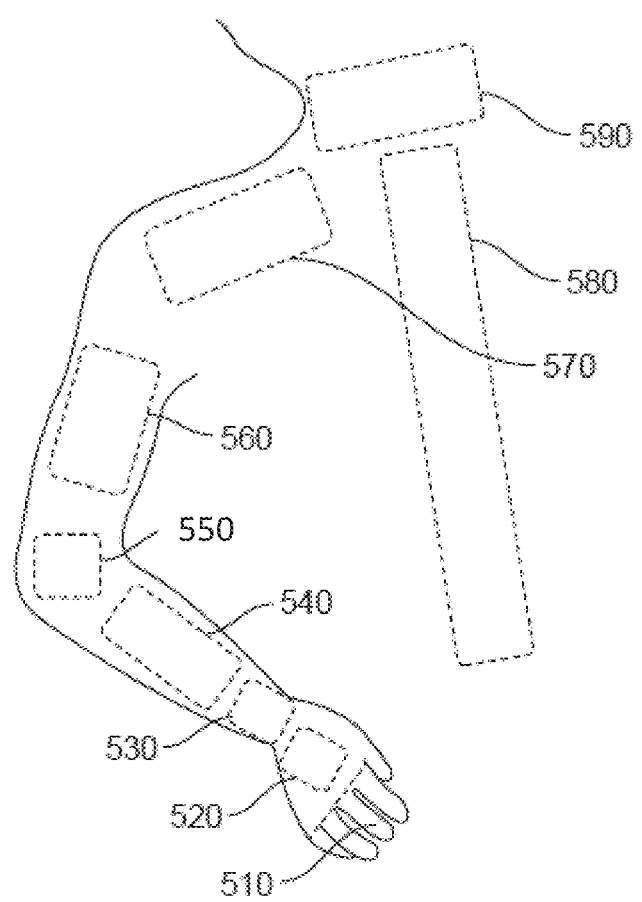
FIG. 5A illustrates various positions on a patient where the tremor altering system can be located.

The device stimulates the sensory nerves in order to modify the abnormal network dynamics. Over time, this stimulation normalizes the neural firing in the abnormal network and reduces tremor. Preferentially, the stimulated nerve is a nerve that carries sensory proprioceptive information from the limb affected by the tremor. The nerve may be modulated directly, such as by electrical stimulation anywhere along or adjacent to a nerve carrying proprioceptive information. In some embodiments, target nerve may be modulated indirectly, such as by excitation of the proprioceptors that stimulate the target nerve. FIG. 5A shows access points to nerves carrying proprioceptive information from a limb or vocal cords or larynx. These access points can include, but are not limited to, the fingers 510 including one or more fingers and/or the thumb, the hand 520, the wrist 530, the lower arm or forearm 540, the elbow 550, the upper arm 560, the shoulder 570, the spine 580 or the neck 590, foot (including one or more toes for example), ankle, lower leg or calf, knee, and/or upper leg or thigh. These access points may be used for direct stimulation in some embodiments. In other embodiments, these access points are used for indirect stimulation. Both indirect and direct stimulation are provided in several embodiments. Two, three or more access points are provided in some embodiments.

Nerves affecting proprioception can include, for example, the median, ulnar, radial, or other nerves in the hand, arm, and spinal area, or along muscle or within joints. These regions target to the nerves may include the brachial plexus, medial nerves, radial nerves, and ulnar, dermal, or joint space nerves. These regions may also target the musculature including muscles of the shoulder, muscles of the arm, and muscles of the forearm, hand, or fingers. Muscles of the shoulder may include, by non-limiting example, the deltoid, teres major and supraspinatus. Muscles of the arm may include the coracobrachialis and triceps brachii. Muscles of the forearm may include the extensor carpi radialis longus, abductor pollicis longus, extensor carpi ulnaris, and flexor carpi ulnaris. In some embodiments, one, two, three or more of these regions are stimulated (directly and/or indirectly).

Some examples of device locations or treatment sites that may be used in combination include two or more of wrist, hand, finger, forearm, upper arm, elbow, shoulder, arm, ankle, foot, toe, calf, lower leg, thigh, upper leg, knee, leg, upper body appendage, upper body, lower body appendage, lower body, spine, neck, head, or a portion of any of these. A plurality of sites may be combined with a plurality of modalities and/or a plurality of modes, each modality having a plurality of modes or one or more modalities having different modes. For example, a first stimulation modality and/or mode can be applied to the wrist 530 and a second stimulation modality and/or mode can be applied to the finger 510. For another example, a first stimulation modality and/or mode can be applied to the wrist 530 and a second stimulation modality and/or mode can be applied to the ankle. For yet another example, a first stimulation modality and/or mode can be applied to the arm and a second stimulation modality and/or mode can be applied to the leg. For still another example, a first stimulation modality and/or mode can be applied to the upper body and a second stimulation modality and/or mode can be applied to the lower body. The stimulators at the various sites can be implanted (e.g., subcutaneous) and/or transcutaneous.

In some embodiments, a vibrational or haptic motor is disposed in the device and located adjacent to a target region or nerve such that the vibrational energy is directed toward a target nerve. For example, in a wrist worn device, the vibrational motor can be disposed in the band such that it is located on the palmar side of the wrist directly adjacent to the median nerve. The motion of the vibrational motor can be oriented such that it is orthogonal and/or oblique to the target nerve or the surface of the skin. The motion of the motor could be, for example, linear or rotational with an eccentric mass.

In some embodiments, a hydrogel or water-based component (e.g., a hydrogel patch that has lidocaine or another chemical suspended in the gel, an electrode that stimulates via electrical energy) can be embedded with a chemical or pharmacological agent, such as lidocaine. The electrode can be placed on the surface of the skin, and the chemical is released at a predetermined rate proportional to the concentration of the chemical in the electrode. The electrode may or may not provide electrical stimulation in combination with the chemical suspended in the hydrogel. In some embodiments, an agent can be placed on the skin and electrical energy can synergistically both stimulate one, two, or more target regions or nerves as well as assist in driving the one, two or more agents through the skin (e.g., via iontophoresis). In some embodiments, iontophoresis devices can be modified to facilitate both enhanced skin penetration of the agent as well as electrical stimulation via the electrodes (e.g., in some cases alternating between a first stimulation mode to facilitate iontophoresis, and a second stimulation mode to facilitate nerve stimulation). The modes could involve different frequencies, amplitudes, waveforms, and/or other parameters as disclosed elsewhere herein.

In some embodiments, thermal energy is increased or decreased in the surrounding tissue in contact with the device. Thermal energy can be increased in tissue contacting the device by a thermoelectric heating element (for example, a battery disposed in the device with a resistive element). The heat can be transferred to specific target locations in the band, for example, that have conductive elements that transfer the thermal energy to tissue in contact with the conductive elements. Thermal energy can be decreased in tissue contacting the device by a thermoelectric cooling element (for example, a Peltier device or solid state refrigerator) or by circulating a coolant or cooling liquid through a part of the device in contact with the target tissue area (for example, in a wrist worn device the band may be disposed with tubing to circulate a cooling liquid through the band). In some embodiments, the device may have a pump to circulated the coolant. The device may have heat transfer elements, such as a heat sink or electrically powered fan, to transfer the thermal energy from the surrounding tissue to the surrounding air or environment (e.g., an area on the device not in contact with tissue).

In a preferred location in several embodiments, the device interfaces with the dermal surface of the tremulous upper extremities of the user and applies neuromodulatory signals to the nerve bundles selected from the group consisting of the brachial plexus, medial nerves, radial nerves, and ulnar nerves or the excitable structures in the musculature of the upper extremities on the skin or within a joint. Neuromodulatory signals are provided to one, two, or three or more nerve bundles in some embodiments.

Where stimulation or other neuromodulatory signals are provided to two, three or more locations, the signals are provided simultaneously, sequentially, or overlapping according to several embodiments.

Proprioceptors can be found for example in muscles, tendons, joints, skin, and the inner ear. Criteria defining candidate nerves for direct modulation include the location of the tremor to be reduced and the proximity of the nerve to the skin's surface, high density of proprioceptive fibers, and distance from excitable pain receptors or muscles. The median nerve targeted at the wrist and the ulnar nerve targeted at the elbow rank high by these criteria. Criteria defining candidate location for indirect proprioceptive modulation include the density and type of proprioceptors. Pacinian corpuscles provide information about touch; Muscle spindles provide information about changes in muscle length by triggering action potentials in the muscle spindle afferent nerve when mechanically-gated ion channels open due to muscle stretching; Golgi tendon organs provide information about muscle tension. These structures may also be stimulated to alter circuit dynamics and reduce tremor.

The device targets the specific nerves that synapse on the abnormal brain circuit. This synapse may be either direct, or through multiple relay synapses. FIGS. 6A and 6B show a set of representative nerves that transmit proprioceptive information into the olivo-cerebello network, a network that is abnormal in ET. These nerves include the 610 distal branches and main branches of the 620 median nerve and 630 ulnar nerve, as well as the 640 distal branches and main branches of the 650 radial nerve. In preferred embodiments, this device targets the nerves inputting proprioceptive information from the hand, wrist and forearm.

In another embodiment, the combination of any parts described here within, may be used to affect the nerves associated with voice tremor, including but not limited to branches of the vagus nerve such as the superior laryngeal nerve or the recurrent laryngeal nerve.

Device Components: Various Embodiments

FIGS. 7A-7D are conceptual diagrams illustrating some embodiments of a tremor altering system 700. System 700 includes a housing 720, one or more effectors 730, one or more controls 740 in electrical communication with the effector 730, and one or more power sources 750. The housing 720 can, in some embodiments, include an interface 760. The interface facilitates the coupling of the effector to the patient. For example, the interface can provide a physical, electrical, chemical, thermal or magnetic connection between the device and the patient's nerve. The housing 720 can also, in some embodiments, include a sensor 780 to detect the tremor, memory 770, display 790, and processor 797. The device in this embodiment may include a processor 797 coupled to the effector which could perform computations and control of other components. The device may also include a digital library stored on the processor 797 or memory 770 which could contain preloaded modulation protocols. The device could include a controls module 740 that communicates with the processor 797 and could be used by the user to control stimulation parameters. The controls allow the user to adjust the operation of the device. For example, the controls can be configured to turn the device on, turn the device off, adjust a parameter of the effector, such as the intensity. The device may include a sensor 780 connected to the processor 797 which may detect information of predefined parameters and transmits said parameter information to the processor 797. The device may include a data storage unit 770 connected to the sensor 780 and processor 797; and a power supply 750 may be connected to the processor.

The device may further contain a display or indicators 790 to communicate with the user and report on the status of the device. Indicators are preferably a light-emitting diode (LED) or some visual indicator in some embodiments but can be an audio indicator. The information may include the battery power or the stimulation status.

The device might lack or not have an effector 730. It may be a diagnostic non-therapeutic device. In a preferred embodiment, the interface unit 704 would be worn on the tremoring limb to track the tremor over time. Providing feedback to the user of the device can make them aware of their tremor and allow monitoring over time. Even without therapeutic stimulation this biofeedback can help some individuals reduce their tremor. The device might lack or not have a sensor 780. It may be a therapeutic non-diagnostic device.

Figure 7B:
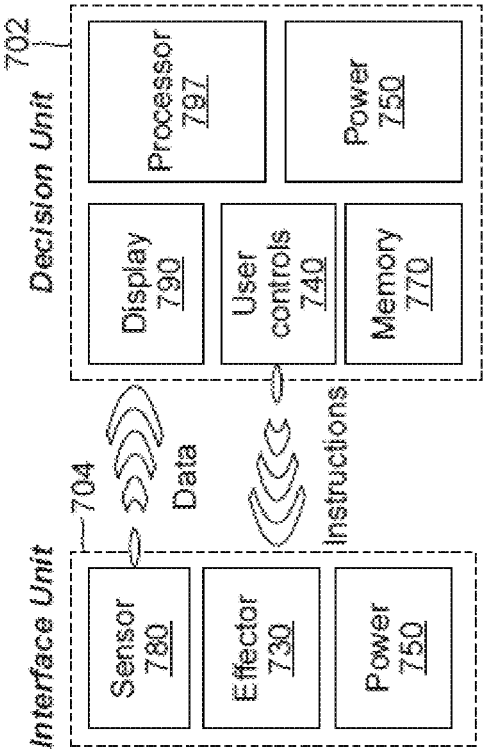
FIGS. 7A-7D are block diagrams illustrating various embodiments of a tremor altering system.
Figure 7C:
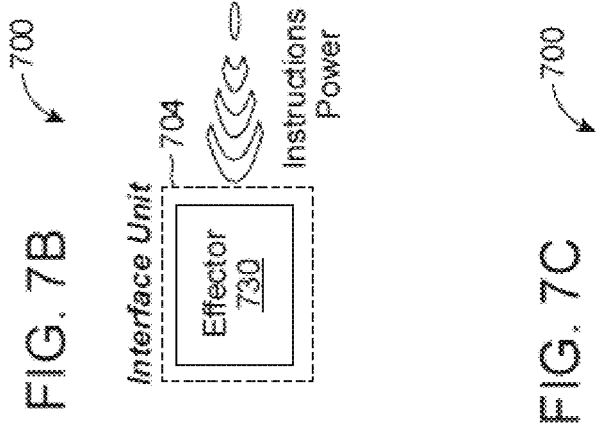
Figure 7A:
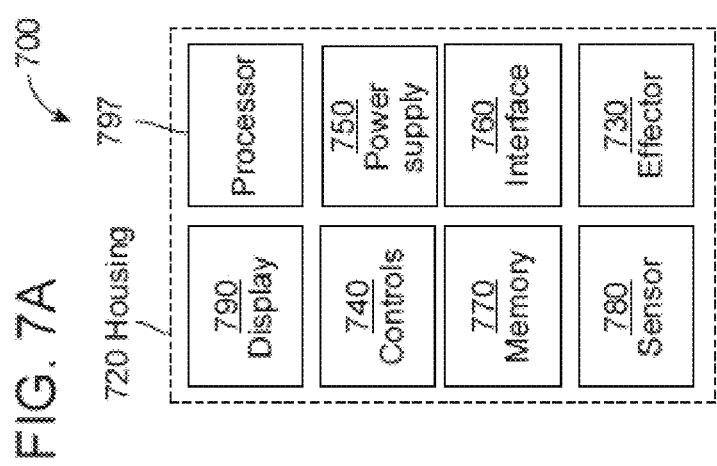
Figure 7D:
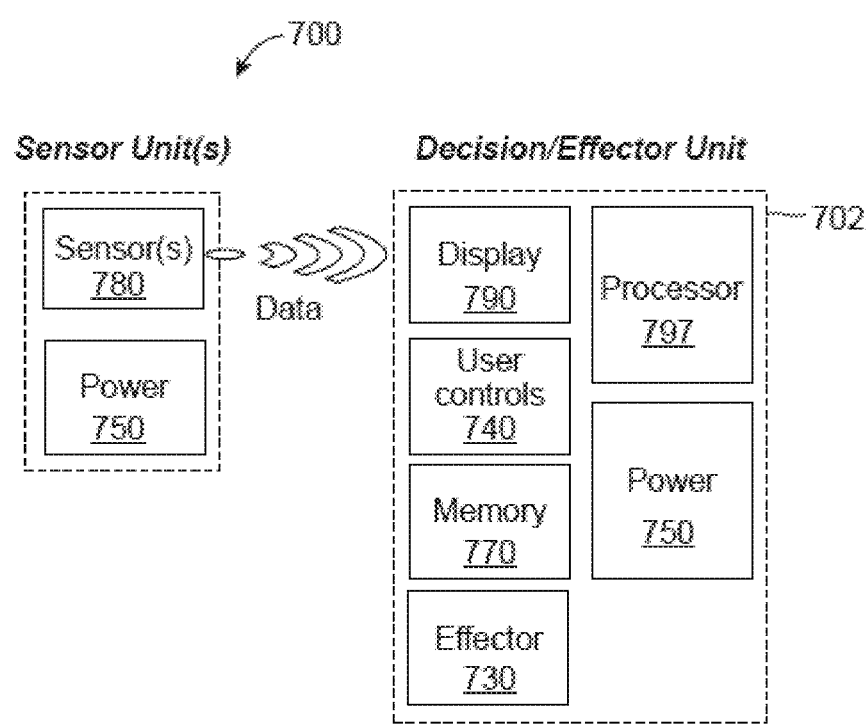

In order to make the device small and simple, many of these components could be housed in a separate unit. Processing, controlling and possibly sensing may be done remotely in a decision unit 702, making the interface unit 704 that provides the therapeutic contact with the patient compact, simple, and flexible for a variety of applications (FIGS. 7B-7D). This decision unit 702 may be a new device designed for this application, or it may be integrated into an existing technology such as a smartphone. This would allow the system to be robust handheld form-factor with a reduced cost and size.

In an embodiment shown in FIG. 7B, the interface unit 704 is an implant; the effector 730 provides electrical stimulation of the nerves; the instruction set and power are transmitted wirelessly from an external device. The implanted interface unit 704 may be powered with an on-board battery. The implanted interface unit 704 may contain a sensor 780 for direct detection of the tremor or neuromuscular activity detected by electroneurography (ENG) or electromyography (EMG).

In an embodiment shown in FIG. 7C, the interface unit 704 is worn on the surface of the body; the effector 730 provides electrical stimulation of the underlying nerves or vibrotactile stimulation of nearby proprioceptors. The sensor 780 could include motion sensors including accelerometers, gyroscopes and magnetometers.

In an embodiment shown in FIG. 7D, one or more sensor units 780, sensing motion, temperature, etc. may be worn at different locations in the body. The effector 730 and decision unit 702 are a separate entity worn at a different location on the body than the sensors 780. This is useful if stimulation of a nerve occurs in a location where tremor is not as easily or accurately measured. For instance, a stimulation device 700 placed on the underside of the wrist for reducing hand tremor is highly effective. However, measuring tremor of the hand from the wrist using accelerometer or gyroscopes could prove more difficult; a sensor unit placed separately on the palm or backside of the hand in a glove or worn as a ring on one of the digits would show greater sensitivity towards hand tremor since it is located beyond wrist joint.

Effectors: General

The effector may function to modulate the neural tissue in the upper extremity region at which stimulation is directed. For example, the effector can modify neuronal signals in the nerves and/or modify the flow or content of proprioceptive information. The effectors may be delivered transcutaneously or subcutaneously. One or more effectors can be used to influence the nerves. In some embodiments, the effector can be excitatory to the nerve. In other embodiments, the effector can be inhibitory to the nerve. In some embodiments, the system can be used to excite the nerve during some portions of the treatment and inhibit the nerve during other portions of the treatment.

Effector: Electrical Stimulation

In some embodiments, the effector may be an electrical stimulator. Electrical effectors can include an electrode, an electrode pair, an array of electrodes or any device capable of delivering an electrical stimulation to a desired location. Electrical stimulation may be transcutaneous or subcutaneous. For example, transcutaneous electrical stimulation may be achieved with electrodes placed on the surface of the skin while subcutaneous electrical stimulation may be achieved with an implanted electrode positioned close to a nerve.

The stimulation parameters may be adjusted automatically, or controlled by the user. The stimulation parameters may include on/off, time duration, intensity, pulse rate, pulse width, waveform shape, and the ramp of pulse on and off. In one preferred embodiment the pulse rate may be approximately 50 to 5000 Hz, and a preferred frequency of about 50 Hz to 300 Hz, or 150 Hz. For example, the frequency may be between about 10 Hz and about 20 kHz (e.g., about 10 Hz, about 20 Hz, about 30 Hz, about 40 Hz, about 50 Hz, about 60 Hz, about 100 Hz, about 250 Hz, about 500 Hz, about 1000 Hz, about 2500 Hz, about 5000 Hz, about 10 kHz, about 15 kHz, about 20 kHz, and ranges between such values). A preferred pulse width may range from 50 to 500 µs (micro-seconds), and a preferred pulse width may be approximately 300 µs (e.g., about 50 µs, about 100 µs, about 150 µs, about 200 µs, about 250 µs, about 300 µs, about 350 µs, about 400 µs, about 450 µs, about 500 µs, and ranges between such values). The intensity or amplitude of the electrical stimulation may vary from 0 mA to 500 mA, and a preferred current may be approximately 1 mA to 6 mA (e.g., about 0 mA, about 0.1 mA, about 1 mA, about 6 mA, about 10 mA, about 20 mA, about 30 mA, about 40 mA, about 50 mA, about 100 mA, about 200 mA, about 300 mA, about 400 mA, about 500 mA, and ranges between such values). Certain preferred settings are derived from the clinical study described above that provided a valuable reduction in tremor sustained for a time period. Electrical stimulation can be adjusted in different patients and with different methods of electrical stimulation. These preferred settings are non-limiting examples. The increment of intensity adjustment may be 0.1 mA to 1.0 mA (e.g. 0.1-3 mA, 3-6 mA, 6-10 mA, and overlapping ranges therein). In one preferred embodiment, the stimulation may last for approximately 10 minutes to 1 hour (e.g. 10-20 minutes, 20-40 minutes, 40-60 minutes, and overlapping ranges therein).

In one preferred embodiment, the electrodes may be in contact with the user at the surface of the skin above one or more nerve(s) that may include the medial, radial, and ulnar nerves. The electrode may be in the configuration where there is an electrode pair, in which one electrode is proximal (closer to the elbow) and another is distal (closer to the hand). The electrodes may be in communication with the opposing electrode. The electrode pair may have a polarity of positive or negative charge in which electrical current passes.

The effector may include two electrodes, each with positive or negative polarity, or an electrode array may include multiple electrode pairs, where each pair is independently programmed or programmed dependently in relation to the other pairs of electrodes. As an example, the program can allow cyclic stimulation of different nerves at different times, such as ulnar, then median, then radial, or any combination thereof.

Electrical stimulation may be designed to suppress tremors by interfering with proprioceptive input, inducing compensatory muscle contractions, or by a combination of both methods. The electrodes may be substituted by any equivalent material capable of conducting electrical signals through the stimulator interface with the dermal surface of the upper extremity. The electrodes may be attached to a control unit 740 which could apply electrical stimulation via the electrodes to the soft tissue and nerves in the region where the electrode are placed and the region immediately surrounding. In another variation of the embodiment, several electrodes can be placed to a combination of targeted regions.

A function generator connected to and controlled by the processor may function to modulate electrical stimulation parameters. The function generator is preferably an arbitrary waveform generator that uses direct digital synthesis techniques to generate any waveform that can be described by a table of amplitudes. The parameters are selected from a group including but not limited to frequency, intensity, pulse width or pulse duration, and overall duration. The outputs preferably have a power limit set by the maximum output voltage. In a preferred embodiment, the digitally stored protocols cycle through various stimulation parameters to prevent patient acclimation. Variation of electrical stimulation is achieved by the function generator.

In some embodiments, the electrical stimulus comprises a combination of one or more single frequencies and one or more sweep frequencies (e.g., continuously changing from a lower frequency to a higher frequency). For example, a first single frequency can be applied for a first duration and a first sweep frequency can be applied for a second duration. The second duration may be after (e.g., immediately after, after a pause duration) the first duration. The second duration may at least partially overlap the first duration. Continuing the example, a second single frequency different than the second frequency can be applied for a third duration. The third duration may be after (e.g., immediately after, after a pause duration) the second duration. The third duration may at least partially overlap the second duration. Continuing the example, a second sweep frequency different than the first sweep frequency (e.g., having a different low frequency, high frequency, and/or rate of frequency change) can be applied for a fourth duration. The fourth duration may be after (e.g., immediately after, after a pause duration) the third duration. The fourth duration may at least partially overlap the third duration. The example may continue for additional durations of single frequencies and/or sweep frequencies. The different frequencies can be applied to the same vibratory stimulator or different electrical stimulators (e.g., on the same body part, on different body parts). Electrical stimulus applied to different body parts may meet at a point between the body parts and may form a standing wave. In some embodiments, the meeting point may be the target body part (e.g., elbow and finger meeting at the wrist). Amplitudes of the sweeps could be enveloped by other waveforms, such as sinusoid or Gaussian curve, or the parameters could be changed randomly or pseudo-randomly. Discussions of different frequencies above can also apply to other parameters such as frequency, amplitude, pulse width, pulse spacing, phase, waveform shape, waveform symmetry, duration, duty cycle, on/off time, or bursting, combinations thereof, and the like.

Optimizing Stimulation: Dephasing

In a preferred embodiment, the stimulation is designed to dephase synchronicity in the brain. The concept of dephasing the abnormal circuit follows on recent work showing neural retraining reduces the network's propensity to fall into an abnormal rhythm. Interestingly, movement disorders are often associated with abnormal periodic synchronous firing in brain circuits. In Parkinson's disease, this circuit is in the basal ganglia. In ET, it is the olivo-cerebellar circuit. These anomalous oscillations are thought to drive the tremor, as supported by numerous studies showing that the tremor observed in the hand and forearm muscles is synched with pathological rhythmic discharges in the brain. Recent DBS studies have shown that low-voltage phase-shifted bursts on adjacent pairs of electrodes (called Coordinated Reset) can reduce synchronization in abnormal brain networks and that this reduces Parkinsonian tremors. The application of Coordinated Reset theory to treat tinnitus supports the concept of using synaptic excitation to retrain neural networks.

The device disclosed herein offers several advantages over high-frequency TENS stimulation, including using lower power (leading to extended battery life, less discomfort from motor recruitment and contraction, less discomfort from sensory excitation), less suppression of firing in activity in adjacent nerves (by depletion or other mechanisms), and maintaining longer-lasting effects such that the device only need be used intermittently to train or maintain training of the neural circuit dynamics. The device stimulates sets of nerves in such a way that it targets neural subpopulations to reduce synchronization of the population. For example, this may be achieved by stimulating different fingers on the hand.

FIG. 8A is a diagram showing a preferred embodiment of the device, in which anode 810 and cathode 820 electrode pairs on the fingers are used to excite the branches of the proprioceptive nerves (the median, radial and ulnar nerves) in each finger. This arrangement of anode 810 being distal and cathode 820 being proximal is designed to induce a nerve pulse traveling towards the brain. A unique stimulation pattern on each finger can send a unique signal to a specific subpopulation of neurons in the brain because of the somatotopic organization of the brain, in which signals from different adjacent or nearby body parts synapse at nearby locations in the brain. Stimulation using multiple unique patterns is an example of a multi-modal stimulation in which multiple modes (having at least one different parameter) of the same kind of stimulation are used. In some embodiments, the anode 810 and cathode 820 positions may be reversed to inhibit the passage of sensory impulses towards the brain (antidromic collision). The stimulation of multiple fingers is an example of a multi-modal stimulation in which multiple sites of the same kind of stimulation are used. In combination with unique stimulation patterns, such stimulation is an example of a multi-modal stimulation in which multiple sites and multiple modes of the same kind of stimulation are used. Different kinds of stimulation are also provided in several embodiments (e.g., electrical stimulation on one or more fingers and vibrotactile stimulation on one or more other fingers).

FIG. 8B shows an arrangement in which electrodes 830 are positioned on the fingers and a second electrode 840 is positioned on the wrist. In one embodiment, there is only a 830 single electrode on the finger and the 840 second electrode is positioned on the wrist. The fingers represent only one possible set of targets and different locations may similarly be used target adjacent subpopulations of neurons. In some embodiments, electrodes on one or more fingers may comprise an anode and a cathode, for example as described with respect to FIG. 8B and an anode and a cathode may be positioned on the wrist. The stimulation of one or more fingers and the wrist is another example of a multi-modal stimulation in which multiple sites are used. In some embodiments, electrodes on one or more fingers may be transcutaneous and electrodes on the wrist may be subcutaneous. The positioning of electrodes at different levels of the skin is an example of a multi-modal stimulation. Multimodal treatment in some embodiments is provided on one of the fingers (including the thumb) on one hand and additionally one of the fingers (including the thumb) on the other hand.

In the embodiment shown in FIG. 8C, the electrodes are positioned on different locations 850, 860, 870 on the wrist to target the median nerves (proximate the location 850), the ulnar nerves (proximate the location 860), and the radian nerves (proximate the location 870). It will be appreciated by one skilled in the art that the input may be positioned on other locations or branches of the nerves that input into the abnormal brain circuit. The location may be on the same or opposite side of the limb with tremors. The location may be on the surface of the skin, crossing the skin, and/or implanted.

FIG. 8D illustrates various stimulation sites which can be subjected to stimulation that is delayed or offset by a predetermined fraction or multiple of the tremor period, T, as shown for example in FIGS. 9A and 9B. The sites are proximate the medal nerve and the ulnar nerve. FIG. 8E illustrates a stimulation site proximate the radial nerve. The stimulation of a first side of the wrist (e.g., FIG. 8D) and a second side of the wrist (e.g., FIG. 8E) is another example of a multi-modal stimulation in which multiple sites are used.

The device uses stimulation schemes designed to dephase, override or obscure the abnormal network. FIG. 9A is a conceptual diagram showing a sample excitation scheme to dephase brain regions receiving sensory input from two sites. For example, the two sites could be two of the fingers shown in FIGS. 8A-8E. The stimulation at the second site is delayed after stimulation of the first site by time T/2, where T is the period of the native tremor. For example, if the tremor is at 8 Hz and the period T is 125 ms, the stimulation of the second site would be delayed by 62.5 ms. The stimulation is designed to reset the phase of the neuron, which may be implemented using high frequency stimulation (above 100 Hz) or a DC pulse.

FIG. 9B is a conceptual diagram showing a sample excitation scheme to dephase brain regions receiving sensory input from four sites, with subsequent sites delayed by T/4. In another embodiment, the stimulation at different locations is variable in parameters other than timing such as frequency or pulse width, or a combination of these. These variations are similarly designed to retrain the brain by dephasing, overriding or obscuring the abnormal network dynamics. In yet another embodiment, the stimulation may occur at a single location but vary in parameters over time. For example, it may vary in frequency every few seconds or turn on and off. In yet another embodiment, the stimulation is constant and at a single location. In preferred embodiments of these, the location is at the median nerve close to the wrist.

Optimizing Stimulation: Sub-Sensory

Stimulating at intensities below the sensory threshold will avoid the discomfort (tingling, numbness, pain) that can be associated with peripheral nerve stimulation. Because the exact electrode position, size and surface contact have a large effect on the stimulation level and the anatomical structures that receive the stimulation, the sensory threshold may needed to be calibrated for each patient and even for each session. This calibration may be done by the user manually setting the stimulation parameters or otherwise indicating their sensory threshold. Another possible mechanism is for the device to automatically sweep through a range of stimulation parameters and the patient chooses the most comfortable set of parameter values. Another possible mechanism is for the patient to choose from among a set of previously chosen parameter values that provided effective and comfortable stimulation. In some embodiments, the electrode pad can include a topical analgesic, such as Lidocaine, to reduce the discomfort from stimulation, thereby increasing the sensory threshold tolerated by the patient. In some embodiments, the topical analgesic can be delivered using a controlled release formation to provide pain relief for the duration the electrode pad is to be worn, which can be days, weeks or months. Such a method may provide more comfort or greater therapeutic effect, due to greater stimulation intensity and/or synergistic effects with the topical analgesic, which can reduce tremor in some patients.

Optimizing Stimulation: High Frequency

Alternatively or additionally, the stimulation waveform may be very high frequency, typically in the kHz and above, such that the stimulation is not felt by the user, or it is felt very little. Very high frequency stimulation is thought to make a conduction blockade. However, prior to the blockade there is an onset response including a strong depolarization of the nerve. To effectively implement very high frequency stimulation without causing discomfort for the patient, it would be preferable to eliminate this onset response. This can be done by cooling the nerve during the initial stimulation. Motor nerves are generally excited by stimulation at about 15 Hz and below, while sensory nerves are generally excited by stimulation at about 50 Hz and above. In some embodiments, it may be desirable to specifically stimulate above the 15 Hz threshold of motor neuron stimulation to avoid causing muscle contraction.

Optimizing Stimulation: Triggered

Alternatively or additionally, triggering the stimulation to the phase of the tremor can improve effectiveness. The goal of such stimulation is to break the rhythmic entrainment of motor units. More effective treatment may permit stimulating at lower levels to achieve similar therapeutic benefits with less discomfort. Essential tremor is essentially a problem of feedback in a resonant circuit. Stimulation timed off-phase from the tremor may reduce the tremor by altering the circuit dynamics, for example by shifting the gains on the feedback loop.

Figure 10A:
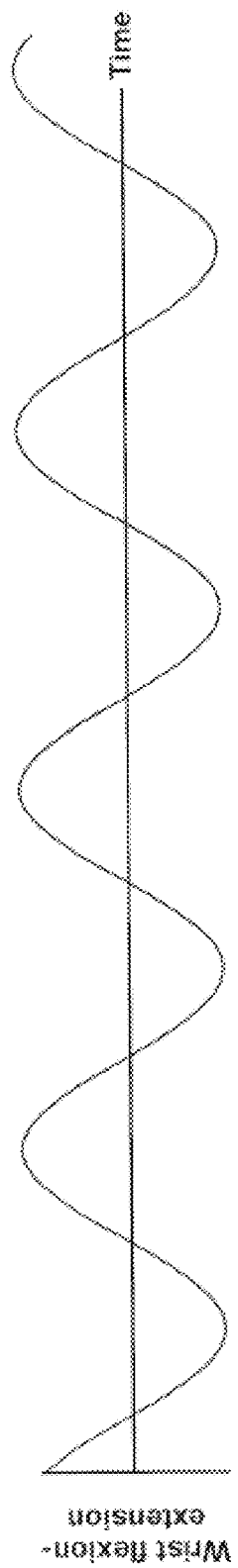
FIGS. 10A-10C illustrate an embodiment where the position of the hand may determine the optimal stimulation duty cycle and timing.
Figure 10B:
Figure 10C:
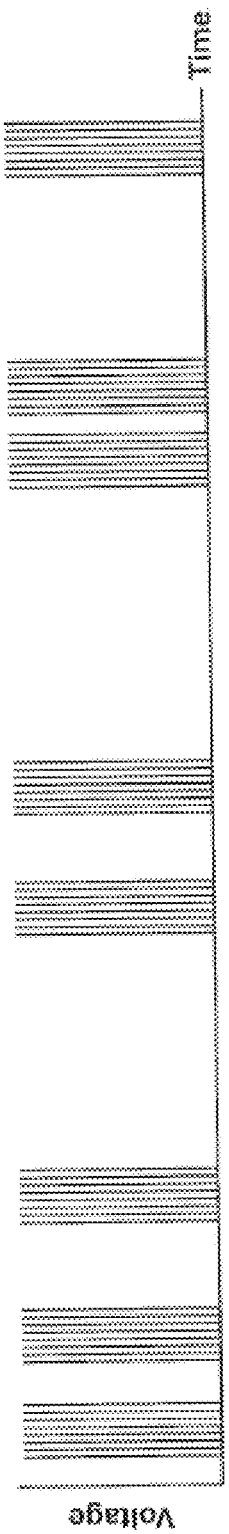

As shown in FIG. 10B, bursts of high-frequency stimulation may be timed to occur when the wrist is at its maximum flexion or extension (FIG. 10A). In example (FIG. 10C), the bursts have been shifted to a random phase. The position of the hand (FIG. 10A) may determine the optimal stimulation duty cycle and timing, such as (FIG. 10B) stimulating off-resonance with the maximum tremor deviation or (FIG. 10C) using bursts of variable temporal delays to avoid resonance with the tremor.

In some embodiments, a first stimulation may comprise burst stimulation (e.g., stimulation with a specified on period and off period) and a second stimulation may comprise continuous stimulation. The first stimulation may be before, during, and/or after the second stimulation. The first stimulation may be applied by a same electrode or set of electrodes as the second stimulation or by a different electrode or set of electrodes than the second stimulation. In some embodiments, burst stimulation may be applied to a first location on the body and continuous stimulation may be applied to a second location (either simultaneously or sequentially).

Figure 11:
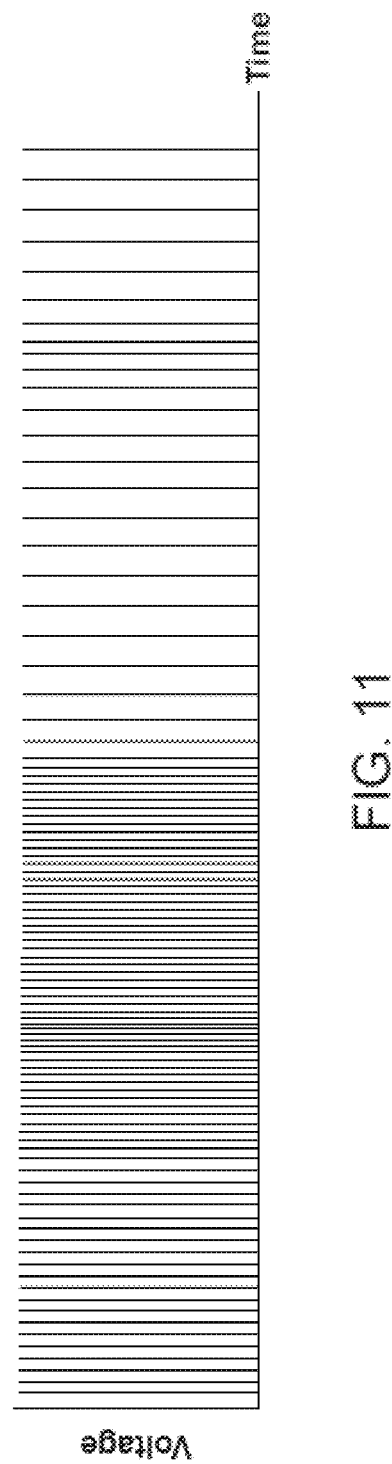
FIG. 11 illustrates an embodiment of variable stimulation that changes frequency over time.

Alternatively or additionally, the stimulation may be chaotic or variable. The goal of chaotic, random, or variable stimulation is to inhibit or prevent habituation and reduce resonance in the circuit. For example, this may be implemented by varying the stimulation frequency over time and/or by superimposing higher and lower frequency components, as illustrated in FIG. 11.

Alternatively or additionally, the stimulation may be high frequency alternating current. This has been shown to block action potentials as they transmit along axons and could adjust circuit dynamics.

In some embodiments, the stimulation parameters as described above can be cycled according to a predetermined order to determine the optimal stimulation parameter. In some embodiments, the effectiveness of the stimulation parameters can be monitored over time to determine whether a particular set of stimulation parameters is losing effectiveness. In some embodiments, when the effectiveness of a particular set of stimulation parameters has been reduced by a predetermined amount, the stimulation parameters can be altered or cycled according to a predetermined order. For example, if stimulation is being triggered to the phase of the tremor, the stimulation can be delivered with random or variable temporal delays, or if the stimulation was using a set amplitude and/or frequency, the stimulation can be changed to a chaotic, random or variable modality to prevent or disrupt habituation. In some embodiments, the random or variable type stimulation parameters can be utilized according to a predetermined routine, such as daily for a predetermined number of hours, or weekly for a predetermined number of days, or at some other predetermined interval including time of day.

Effector: Vibrotactile Stimulation

The effector may be mechanical excitation of the proprioceptors by means including vibrotactile or haptic sensation. The mechanical stimulation might include force, vibration and/or motion. The effector induces action potentials in the target nerves by exciting the Golgi tendon organs (GTOs) or Pacinian corpuscles. Mechanical effectors can include, for example, small motors; piezoelectrics; one or more vibrotactile units comprised of a mass and an effector to move the mass such that a vibratory stimulus is applied to the body; an eccentric mass mounted on a shaft such that a vibratory stimulus is produced when the shaft is rotated; an ultrasonic motor; a magnetorheological fluid (MRF) effector or electroactive polymer (EAP) effector; and/or a speaker (e.g., a haptic speaker, a piezoelectric speaker, an electroactive polymeric transducer, a magnetic coil speaker).

The vibratory stimulus can in some embodiments be 250 Hz, corresponding to the optimal sensitivity of the Pacinian corpuscles (also known as lamellar corpuscles). The Pacinian corpuscles are the nerve endings in the skin that sense touch and vibration. Deformation of the corpuscle opens pressure-sensitive sodium ion channels to cause action potentials. In one embodiment, the vibration may be below 50 Hz to excite the Meissner's corpuscles (also called tactile corpuscles) in the fingers that are sensitive to light touch. In some embodiments, the vibratory stimulus can be, for example, at least about, about, or no more than about 10 Hz, 20 Hz, 30 Hz, 40 Hz, 50 Hz, 60 Hz, 70 Hz, 80 Hz, 90 Hz, 100 Hz, 110 Hz, 120 Hz, 130 Hz, 140 Hz, 150 Hz, 160 Hz, 170 Hz, 180 Hz, 190 Hz, 200 Hz, 210 Hz, 220 Hz, 230 Hz, 240 Hz, 250 Hz, 260 Hz, 270 Hz, 280 Hz, 290 Hz, 300 Hz, 350 Hz, 400 Hz, 450 Hz, 500 Hz, or more or less, or ranges including any two of the foregoing parameters.

In some embodiments, the vibratory stimulus comprises a combination of one or more single frequencies. For example, a first single frequency can be applied for a first duration and a second single frequency can be applied for a second duration. The second duration may be after (e.g., immediately after, after a pause duration) the first duration. The second duration may at least partially overlap the first duration. Continuing the example, a third single frequency different than the second frequency can be applied for a third duration. The third duration may be after (e.g., immediately after, after a pause duration) the second duration. The third duration may at least partially overlap the second duration. The third duration may at least partially overlap the first duration. The third duration may at least partially overlap the first duration and the second duration. The example may continue for additional durations of single frequencies. The different frequencies can be applied to the same vibratory stimulator or different vibratory stimulators (e.g., on the same body part, on different body parts). Vibratory stimulus applied to different body parts may meet at a point between the body parts and may form a standing wave. In some embodiments, the meeting point may be the target body part (e.g., elbow and finger meeting at the wrist).

In some embodiments, the vibratory stimulus comprises a combination of one or more single frequencies and one or more sweep frequencies (e.g., continuously changing from a lower frequency to a higher frequency). For example, a first single frequency can be applied for a first duration and a first sweep frequency can be applied for a second duration. The second duration may be after (e.g., immediately after, after a pause duration) the first duration. The second duration may at least partially overlap the first duration. Continuing the example, a second single frequency different than the second frequency can be applied for a third duration. The third duration may be after (e.g., immediately after, after a pause duration) the second duration. The third duration may at least partially overlap the second duration. Continuing the example, a second sweep frequency different than the first sweep frequency (e.g., having a different low frequency, high frequency, and/or rate of frequency change) can be applied for a fourth duration. The fourth duration may be after (e.g., immediately after, after a pause duration) the third duration. The fourth duration may at least partially overlap the third duration. The example may continue for additional durations of single frequencies and/or sweep frequencies. The different frequencies can be applied to the same vibratory stimulator or different vibratory stimulators (e.g., on the same body part, on different body parts). Vibratory stimulus applied to different body parts may meet at a point between the body parts and may form a standing wave. In some embodiments, the meeting point may be the target body part (e.g., elbow and finger meeting at the wrist). Amplitudes of the sweeps could be enveloped by other waveforms, such as sinusoid or Gaussian curves, or the parameters could be changed randomly or pseudo-randomly.

Discussions of different frequencies above can also apply to other parameters such as frequency, amplitude, pulse width, pulse spacing, phase, waveform shape, waveform symmetry, duration, duty cycle, on/off time, or bursting, combinations thereof, and the like. Discussions of vibratory stimuli above also apply, in several applicable embodiments, to other modalities and combinations thereof.

In some embodiments, a first location on the body is electrically stimulated while a second location is provided with vibratory stimulus (e.g., a wrist and an ankle, a wrist and an ear, an ankle and an ear, an arm and a leg, etc.). In instead of a second location, or in addition to a second location, both electrical and vibratory stimuli are provided at the first location (simultaneously or sequentially). As an example, a band (or other device) is used for the wrist that provides both electrical and vibratory stimuli and a band (or other device) is used for the ear, ankle, leg, arm, etc. that provides either electrical and vibratory stimuli. In one embodiment, both locations provide electrical and vibratory stimuli. A third, fourth, or additional location may also be stimulated. Although stimulation is disclosed in several embodiments, neuromodulation that includes stimulation or inhibition is contemplated in multiple embodiments.

This mechanical-type (e.g., vibratory) stimulator may function to reduce tremor through several methods. One method may be to transmit proprioceptive signals to the brain that obscure or modify the driving proprioceptive signal transmitted from the tremulous muscles. Another method may be impedance control. Joint impedance may altering co-contracting muscles through transcutaneous neurostimulation, affecting the stiffness of muscles and consequently muscle contractions. Another method may be the generation of compensatory muscle contractions, through neurostimulation, that oppose the tremulous contractions. The stimulator is preferably affixed firmly against the dermal surface, for example through an elastic or Velcro band (or other adjustable, adaptable straps), in some embodiments.
Effectors: Chemical, Thermal & Other The examples herein have primarily described the stimulation as electrical or vibrotactile. However, stimulation may alternately be achieved using other effectors that may offer significant benefit in terms of patient comfort, portability, safety or cost.

In another variation of the embodiment, the effector may be a neuromodulating chemical that either raises or lowers neurons firing thresholds. The chemical used in some embodiments may be a topical anesthetic including, but not limited to the "caine" family. The "caine" family of anesthetics may include but are not limited to benzocaine, bupivacaine, butacaine, carbisocaine, chloroprocaine, ciprocaine, dibucaine, etidocaine, heptacaine, levobupivacaine, lidocaine, lidocaine hydrochloride, mepivacaine, mesocaine, prilocaine, procaine, propanocaine, ropivacaine, and tetracaine. Other chemical families may include those of menthol family, or alpha-hydroxy sanshool from Szechuan peppercorn, or capsaicin, all of which are known to influence peripheral sensory nerves.

FIG. 12 shows a chemical stimulator that may deliver chemical stimulus transdermally through a patch and/or by microinjection. The preloaded protocols may preferably be predetermined compositions of the one or more chemicals. The topical anesthetics in several embodiments may be known for other indications. The recommended doses for simulation may have been tested and approved for treatment of other indications. For example, the topical anesthetic lidocaine may be administered at 2-10% by weight. Lidocaine may be administered in conjunction with other anesthetics. As seen in FIG. 12, two neuromodulating chemicals 1202, 1204 are mixed to provide a tailored composition. The chemical stimulator may be administered as a composition comprising lidocaine 2.5 wt % as a first chemical 1202 and prilocaine 2.5 wt % as a second chemical 1204. The chemical stimulator could be administered as a composition comprising lidocaine 0.1-5 wt % as a first chemical 1202 and prilocaine 0.1-5 wt % as a second chemical 1204.

The chemical stimulator may comprise alpha hydroxy sanshool from Szechuan peppercorn. The alpha hydroxy sanshool may be contained in an excipient or carrier. The excipient may include gels, creams, oils, or other liquid. If the method of delivery is a transdermal patch, the formulation of the chemical agent may preferably be a cream or gel. The composition can be selected by the user through a control module (e.g., the control module 740 of FIG. 7). If the method of delivery is microinjection, the formulation may preferably be a solution.

In some embodiments, the effector can be a temperature or thermal effector (e.g., the temperature effector 732 of FIG. 7) that induces cooling and/or heating. The effector may modulate neuronal firing by directly cooling the nerve or indirectly by cooling adjacent muscle, skin or other component of the arm. A temperature effector can include, for example, piezoelectrics (e.g., Peltier cooling tiles), circulating fluid, compressed expandable gas, cooled or warmed solid material or evaporative material. One example of a cooling effector can be as disclosed in U.S. Publication No. 2010/0107657, which is incorporated herein by reference. Heating and/or cooling may be applied as a patch that adheres to the dermal surface, by attachment to affix the stimulator to the dermal surface, such as an armband, or by an implant.

In an embodiment with a thermal stimulator, the preloaded protocols may preferably be predetermined temperatures of stimulation and associated durations of stimulation. Preferably, a preloaded protocol may call for thermal cooling for the duration of 15 minutes and cooling temperatures in the range of 15-25° C. (e.g., about 15° C., about 17.5° C., about 20° C., about 22.5° C., about 25° C., ranges between such values, and the like). The duration of stimulation may be preprogrammed to (but is not limited to) about 5 minutes to about 30 minutes (e.g., about 5 min, about 10 min, about 15 min, about 20 min, about 25 min, about 30 min, ranges between such values, and the like). The maximum length of stimulation should be well tolerated by the user and not cause any muscular or neurological damage. Temperature sensors may function to detect the effective cooling temperature in an embodiment where the stimulator is a thermal stimulator. Effective cooling or heating temperature may be the temperature felt by the user, and this is not necessarily the same as the applied temperature. If the temperature sensors determine that the effective temperature reaches a threshold, which may range from 5 degrees C. greater or less than the applied temperature for a particular protocol, the processor 797 (from FIG. 7) may modify said protocol to cool or heat more than originally programmed to compensate for the discrepancy between effective and intended cooling.

In some embodiments, the effector can be a phased array ultrasonic (e.g., focused ultrasound) effector. For example, a phased array ultrasonic effector may comprise a plurality of ultrasonic transducer elements. The elements may each have a width and a thickness. The thickness may be related to the width (e.g., thickness being a fraction (e.g., ½, ⅓, ¼, ⅕, ⅒, ranges between such values, etc.) or multiple (e.g., 2×, 3×, 4×, 5×, 10×, ranges between such values, etc.) of the width). The elements may each have a width and a space between the elements may be related to the width (e.g., the same as the width, half the width, twice the width). Spacing between the elements may be adjustable. In some embodiments, the elements have a width between about 0.5 mm and about 2 mm and a spacing between about 0.1 mm and about 2 mm. The elements may be arranged in a one-dimensional array or a two-dimensional array. The elements may be cuboid, rectangular, cylindrical, prismatic, pyramidal, or any appropriate shape. Ultrasonic signals may be, for example, between about 20 kHz and about 2 GHz or more (e.g., about 20 kHz, about 50 kHz, about 100 kHz, about 500 kHz, about 1 MHz, about 1.5 MHz, about 2 MHz, ranges between such values, and the like). At least one of the elements may transmit a different frequency. Each of the elements may transmit a different frequency. Each of the elements may transmit a same frequency. In some embodiments, a dosage level applied by an ultrasonic effector is between about 0 W/cm$^2$ and about 2 W/cm$^2$ (e.g., about 0 W/cm$^2$, about 0.1 W/cm$^2$, about 0.25 W/cm$^2$, about 0.5 W/cm$^2$, about 1 W/cm$^2$, about 1.5 W/cm$^2$, about 2 W/cm$^2$, ranges between such values, etc.). One, some, or all of the ultrasonic transducer elements may be diverging, focused, scattered, flat, etc. In some embodiments, transducer elements may be arranged in a way to focus energy (e.g., energy from different elements results in constructive interference) at a location below the surface of the skin that is in proximity to a target nerve or region of tissue.

The ultrasonic transducer elements may be arranged on a printed circuit board. The ultrasonic transducer elements may be arranged on a flex circuit. A flex circuit may comprise, for example ultrasonic transducer elements and one or more other types of effectors. Certain circuit boards, flex circuits, etc. may include other combinations of effectors.

In some embodiments, the effector can be a magnet or a plurality of magnets. For example, a first magnet having a first polarity may be applied to a first site and a first magnet having a second polarity may be applied to a second site. The first polarity may be the same as the second polarity (e.g., positive-positive, negative-negative). The first polarity may be different than the second polarity (e.g., positive-negative, negative-positive). The first site may be proximate the second site (e.g., within about 10 cm, within about 8 cm, within about 6 cm, within about 5 cm, within about 4 cm, within about 3 cm, within about 2 cm, within about 1 cm, or closer). The first magnet may comprise the same material as the second magnet. The first magnet may comprise a different material than the second magnet. The first magnet may have the same dimensions (e.g., thickness, length, width diameter) as the second magnet. The first magnet may have at least one dimension (e.g., thickness, length, width diameter) different than the second magnet. The first magnet may have the same mass as the second magnet. The first magnet may have a different mass than the second magnet.

A magnet may comprise an electromagnet comprising a material that only becomes magnetic upon the application of a current to a wire wrapped around the magnet to create a magnetic field that can multiply the magnetic field strength of the material. In embodiments comprising an electromagnet, the magnetic effector can be turned on and off without moving the effector.

In some embodiments, magnetic energy can be applied using mini-TMS coils that are orthogonally oriented to the target nerve to deliver a burst of electromagnetic energy in proximity of the target nerve. A transcranial magnetic stimulation (TMS) coil comprises a toroidal shape containing multiple windings of a wire. Upon application of a current to the wire, a magnetic field is formed orthogonal to the plane of the toroid. The current can be altered over time, for example when connected to a stimulator. The magnetic field causes electric current to flow in the region of the body adjacent to the TMS. A mini-TMS could be a smaller version of a TMS configured to penetrate tissue, for example as opposed to the skull.

Several embodiments may alternatively apply other effectors including acoustic (using ultrasonic excitation for exciting sensory nerves at the fingertips), vibratory, tactile, luminescent (e.g., light exposure in optogenetically modified nerves), magnetically (e.g., by rapidly switching RF fields) or a combination of mechanisms. Some examples of modalities that may be used in combination include two, three or more of the following: electrical stimulation, magnetic stimulation, chemical stimulation, thermal stimulation (heat and/or cold), mechanical (e.g., vibrotactile) stimulation, focused ultrasonic (focused, high and/or low intensity, phased array), radiofrequency stimulation, or microwave stimulation. Such modalities may be used in the same region or on different regions. In some embodiments, different modalities are used to treat tremor or effect other neuromodulation for a single region, even though two or more body regions are modulated. For example, the wrist and the forearm may be modulated to synergistically reduce hand tremor. In other embodiments, different modalities are used to treat tremor or effect other neuromodulation for multiple regions. For example, the wrist and the ankle may be modulated to reduce both hand and leg tremor. In addition to tremor, other indications are treated using the devices described herein, including but not limited to: cardiac dysfunction, (e.g., dysrhythmias such as atrial fibrillation, atrial flutter, ventricular tachycardia, and others), abnormal blood pressure (hypertension and hypotension), urinary and/or gastrointestinal dysfunction (including overactive bladder, nocturia, and/or stress and urge incontinence) as well as fecal incontinence, and psychiatric conditions with a neurological component (such as neurotransmitter dysfunction).

In some embodiments, vibrational stimulation is used in combination with electrical stimulation. In some embodiments, vibration and electrical stimulation are in the same location or in different locations. In some embodiments, vibrational stimulation is used to preferentially stimulate proprioceptors (e.g., A-fibers) and electrical stimulation is used to preferentially stimulate a different type of sensory fiber, such as pain or touch sensory fibers (e.g., C-fibers), or vice-versa.

In some embodiments, chemical stimulation is used in combination with electrical stimulation. In some embodiments, chemical and electrical stimulation are in the same location or in different locations. In some embodiments, electrical stimulation is used to preferentially stimulate proprioceptors (e.g., A-fibers) and chemical stimulation is used to preferentially stimulate a different type of sensory fiber, such as pain or touch sensory fibers (e.g., C-fibers), or vice-versa.

Events to change modes could include biomarkers of the disease state (e.g., patient report symptoms, activity levels, tremor motion characteristics, nerve integrity). Modes could be controlled by a prescribing physician. Modes could be controlled by the end-user or patient. Modes could be preprogrammed for specific times of day. Modes could be controlled by measures of autonomic activity, including HRV, GSR, MSNA, etc.

Some examples of modes that may be used in combination include two or more different stimulation parameters (e.g., frequency, amplitude, pulse width, pulse spacing, phase, waveform shape, waveform symmetry, duration, duty cycle, on/off time, bursting, etc.). A plurality of modes may be combined with a plurality of modalities, each modality having a plurality of modes or one or more modalities having different modes. A first stimulation can comprise burst stimulation and a second stimulation can comprise continuous stimulation. A first stimulation can comprise a first frequency (e.g., about 20 Hz) and a second stimulation can comprise a second frequency (e.g., about 40 Hz). The first stimulation mode may comprise between 100 Hz and 200 Hz (e.g., 150 Hz). The second stimulation mode may comprise between 50 Hz and 150 Hz (e.g., 100 Hz). In some embodiments, the first and second stimulation may burst on/off in an alternating pattern at a frequency between 4-12 Hz, for example in a burst mode; e.g., 10 Hz). A first stimulation can comprise a first waveform and a second stimulation can comprise a second waveform different than the first waveform. In some embodiments, different stimulation parameters are used in the same region at the same nerve bundle, in the same region but at different nerve bundles (e.g., different points), and/or at different locations.

Form Factors: General Wearable Stimulator

Referring to FIG. 14A-14E, the system 700 from FIG. 7 can be non-invasive, fully implantable, or partially implantable. For example, a non-invasive embodiment can include a non-invasive housing such as a sleeve 1400, or a patch 1410, or a glove. In such non-invasive embodiments, the interface of the housing is in communication with an external part of the patient. In some embodiments, one or more of the system components can be implanted 1420. For example, an effector and/or at least a portion of the housing interface can be implanted in the patient at a point of contact while the power source is external to the patient.

A non-invasive system housing can facilitate in maintaining the interface and/or effector in close proximity to the patient. The sleeve can cover a long stretch of arm or be a narrow band. The sleeve can cover at least a portion of the circumference of any part of a limb or the sleeve may cover the full circumference of any part of the limb. The function of the sleeve may be to maintain the position of the external device relative to the implant. The purpose of maintaining the position may include achieving good power transfer, reliable communication or other purposes.

The housing may be made of any material suitable to achieve the desired properties. For example, the housing material may be flexible and/or stretchable material, polymer or fabric. The housing can include fasteners such as Velcro, laces, toggles and/or ties to secure the device to the patient. The housing can include multiple layers and/or pockets configured to hold various components of the system as disclosed herein.

The system may be positioned by the patient with or without the assistance of a caregiver. In some embodiments, the system may have assistive mechanisms to position it on the arm, such as pressure-responsive snaps and/or self-aligning magnets. In some embodiments, such as sleeve 1400, the system may be slipped on (similar to a sports sleeve) over the end of a limb or wrapped around the arm or self-wrapped around the arm (similar to a snap-band).

In some embodiments, the housing may be in the form of a patch 1410. For example, a housing patch 1410 can be secured to the patient's skin using a removable or degradable adhesive. The patch may be worn for a variety of times, including but not limited to patches worn only during the period of stimulation and patches left in place for several days, weeks, or months. The patch may also be attached mechanically, chemically, or electrically. Such embodiments include but are not limited to staples, strings, or magnets that secure the patch in a desired place.

In some embodiments, the non-invasive system can include an interface, which is in communication with the patient, but where the housing is not attached to the patient. For example, the system can be an external device with which the patient interacts. For example, the housing might be an open or closed tube-like structure in which the patient can place a limb. As illustrated in FIG. 14D, another example includes an external device that resembles a pad 1430 or support structure, such as a wrist pad or support, over which a patient can place at least a portion of a limb.

In one embodiment, the housing 1450 may have the configuration of a wristwatch as shown in FIG. 14H-14L worn on the wrist or arm of the user. The housing 1450 may contain an interface 1452 separated, partially separated, or connected to the housing, and which may interact with the user. The interface 1452 may connect to the housing 1450 and be disposable after use for a period of time. The electrodes 1454 of the interface may be arranged in strips and may be arranged in anode/cathode pairs. Other electrode configurations as described herein may also be used. The period of time may be after a single use, or after multiple uses over the period of minutes, hours, days, weeks, or months. The interface itself may be the entire portion that is the wristband or may be a portion of the wristband or be attached to the wristband. The wristband itself can be part of the interface or be part of the housing, or both. In one example, the wristband with or without the interface may snap around the wrist, by including a feature of elastic material that is slightly curved so that when moved, the wristband wraps into a circular shape around the wrist. In another example, there is a temperature sensitive material, like nitinol, that has shape memory, so that when the device comes into contact with skin, the wristband with or without the interface may change shape to wrap around the patient's wrist. In another example, the wristband with or without the interface has one or more metal wires inside or outside the wristband that retains a new shape when moved to allow the user to place the device on the wrist and add force to shape the wristband onto the user's unique anatomy. In another example, the wristband with or without the interface wraps partially or completely around the wrist. This wrap may be in the same axis, or may be a spiral wrap.

The disposable or non-disposable interface may be connected to the housing in a number of different ways, including but not limited to snapping features, velcro, pressfit, magnets, temperature, adhesive, that may or may not include self-aligning features. The connection may be in one or more multiple dimensions or axes. As an example, FIGS. 14J-14L show one potential embodiment where there is a self-aligning piece, that can be a magnet, that connects the interface to the body in 3 dimensions. The circular shape of the aligning piece may allow the first dimensional alignment in one plane. The bar shape portion of the aligning piece, which can be offset from the circular feature of the aligning piece, may align the interface in the proper axis. The overall shape of the aligning piece can align the interface in the final dimension, which in this particular example of embodiment is the depth. The housing can have a matching feature of this shape for which the connection can connect to. It is possible that the connection feature can be reversed and the aligning piece be placed on the housing, and the matching feature of shape be placed on the interface. These connections of the aligning piece can possibly have or not have magnets on one, both or none of the housing or interface components.

In some embodiments, the external device may be an object not worn on the body. For example, it may have the form factor of a cellphone and the patient would carry the device around in their pocket, bag, hand or other ways that cellphones are transported and supported, such as on a tabletop. It may be designed to sit on a furniture surface in the location where the patient wants their tremor controlled, such as at the dining room table, in the kitchen, or in their dressing room.

As shown in FIG. 14M, another preferred embodiment may comprise a stimulation device with one or more electrodes 1460 applied along the spine. The stimulation device may function to stimulate the release of neurotransmitters and reduce tremor through neuromodulation of the nerves located along the spine. Stimulation may affect the release and uptake of neurotransmitters, thereby affecting the nerves innervating the tremulous regions. The electrodes are preferably placed on the dermal surface at the cervical spine roots, preferably from C1 to C8 but most preferably between C5 and C8. The electrodes are preferably patch electrodes. The operating unit is preferably affixable to the user and the leads connecting the electrodes to the operating unit are preferably magnetized for easy connection. The operating unit may be connected to and controlled by the processor. Since the electrodes are preferably placed along the spine (back side of the user), a detached and portable controls module may be more convenient for a user to operate.

In some embodiments, neurotransmitters (such as dopamine, serotonin, GABA, etc.) are increased or decreased via the neuromodulation devices described herein (e.g., electrical, vibration, ultrasonic (e.g., focused ultrasound), radiofrequency, etc.) to treat tremor, overactive bladder, cardiac dysfunction, depression, anxiety, migraine, and other disorders. Although the spine may be one location, other locations include the wrist, hand (including fingers), upper arm, head (including scalp, ear, face, temple), leg, foot (including toes), and other locations. Two, three or more locations may be used to produce a synergistic therapeutic result.

In one embodiment the electrodes may be placed on either side of the spine around C2 to C8 region of the neck and shoulders. The electrodes may be placed approximately 100 cm to 1 cm away from the spine, and may be placed 200 cm to 5 cm apart from each other. The stimulation parameters may include a phase duration of between 500 and 30 μseconds, which may preferably be 300-60 μseconds (micro-seconds). The pulse rate may range from 10 Hz to 5000 Hz or higher (e.g., 20 kHz), and the preferable range may be 50 Hz to 200 Hz, or 150 Hz. The cycle time may be continuous, or may range from 5 seconds to 1 hour. The preferable cycle time may be approximately 5 seconds to 20 seconds, or 10 seconds. The duration of electrical stimulation may range from 5 minutes to 24 hours per day. The preferable range may include 30 minutes to 60 minutes repeated approximately 10 times per day, or the preferable range may be approximately 40 minutes to 1 hours per day and repeated once per week to once every day. The amplitude (which may be used interchangeably with intensity) may range from 0.1 mA to 200 mA, and a preferable range may include 1 mA to 10 mA. The length of time the user may use the device before having an effect on the user's tremor may be one day to one month, or may preferably range from 2 days to 4 days.

Form Factors: For Electrical Stimulation

Conventional TENS devices are often difficult to position, bulky and uncomfortable. The innovations below are solutions to make it easy to quickly apply, adjust a simulator to control ET and to enable patients to use it discretely and comfortably.

With a conventional TENS device, it is difficult to properly size and position the sticker electrodes to optimally target the desired nerve. Smaller electrodes increase the current density at the target nerve, but with smaller pads it is more likely they will miss the nerve, and higher current density from smaller electrodes can cause discomfort. Larger pads are easier to position, but need more power and are more likely to unintentionally stimulate adjacent tissues. The following innovations resolve these challenges and achieve consistent, effective, comfortable, and safe stimulation.

Figure 15A:
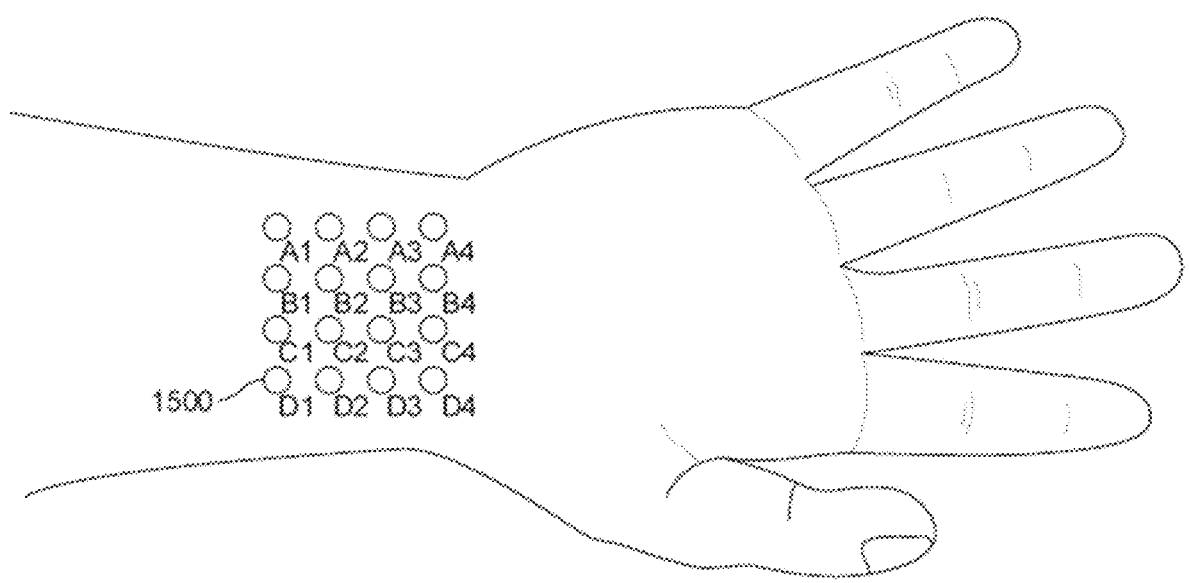
FIGS. 15A-15C illustrate various embodiments of an array of electrodes.
Figure 15B:
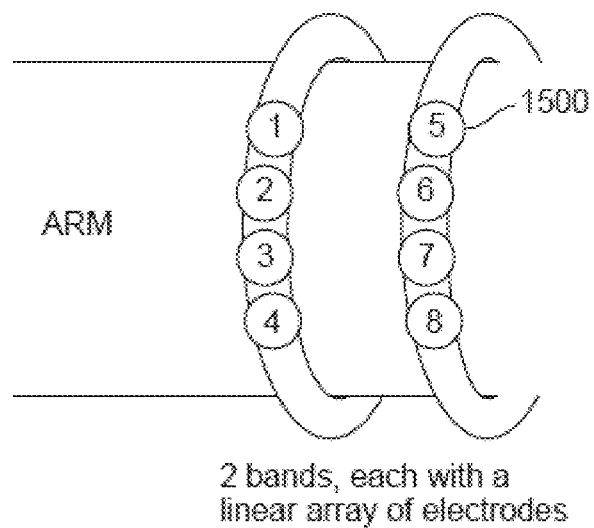
Figure 15C:
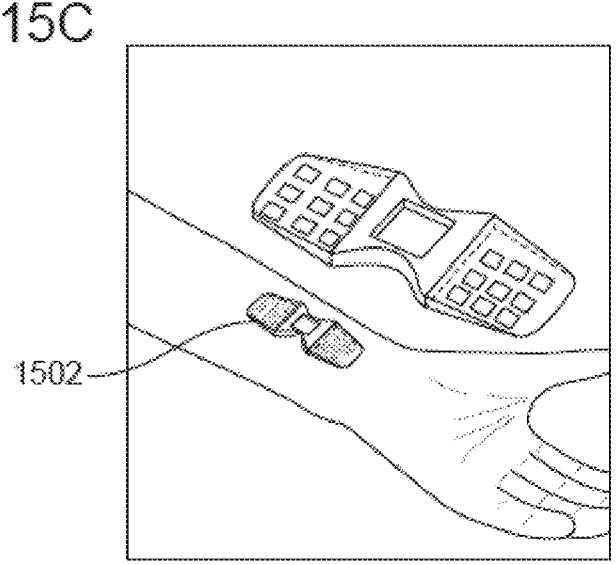

Instead of using only a single electrode as the cathode and a single electrode as the anode, the device may contain an array of electrodes 1500, as illustrated in FIG. 15A-15C. Although the electrodes are shown individually on the patient's skin for the sake of clarity, in practice the array of electrodes can be integrated into a sleeve, flexible pad or substrate, or other form factor as described herein. An appropriate combination of electrodes would be selected each time the device is repositioned or based off the detected stimulation needs. The stimulation may use single electrodes as the anode and cathode, or may use a combination of electrodes to shape the simulation field. The electrode selection may be automatic based on feedback from sensors in the device (see below). In some embodiments, electrode selection may be done manually by the user. For example, the user may cycle through the electrode combinations until they find the combination that provides optimal tremor reduction or achieves a surrogate for the correct placement such as tingling in the 1st (index) and 2nd finger as occurs with median nerve sensory stimulation. FIG. 15A illustrates a two dimensional array of discrete electrodes 1500. In several embodiments, some of the electrodes can be combined into linear rows, such that the two dimensional array is formed from a plurality of rows of electrodes. FIG. 15B illustrates a linear array of electrodes 1500 which can be worn as bands, as shown, or patches, pads, sleeves, and the like. FIG. 15C illustrates a housing 1502 that can be used to hold the array of electrodes 1500.

In some embodiments, electrical stimulation from a poorly positioned electrode may be redirected to the target nerve by modifying the conduction pathway between the electrode and the target nerve. For example, a conduction pathway enhancer 1600, which can be made from a conductive material, can be placed on the patient's skin, embedded into the skin, implanted, or a combination of the above, in order to enhance the conduction of the electrical stimulus from the electrode 1602 to the target nerve 1604, as illustrated in FIGS. 16A-16D. The conduction pathway enhancer may be placed over the nerve and/or across the nerve. For example, in one embodiments, a tattoo of conductive ink may direct off-target stimulation towards the median nerve. A tattoo more conductive than adjacent structures (e.g., blood vessels, nerves) will provide the path of least resistance and redirect the current. To place or position the conductive tattoo, the target nerve is first positively identified. Then the conductive tattoo is placed over the target nerve. As illustrated in FIGS. 16A-16D, the conductive tattoo may include a plurality of conductive stripes that cross the nerve. In some embodiments, the stripes can be parallel to each other and cross the nerve transversely. In other embodiments, the stripes can be formed into a star or cross hatch pattern with a center located over the nerve. In other embodiments, a stripe can also be placed over and parallel to the nerve (not shown).

For user adoption, a wearable device should be discrete and comfortable. In the preferred embodiment shown in FIGS. 14B and 14F, for example, the effector is electrical and the skin patch has a single electrode or plurality of electrodes electronics printed onto a flexible substrate in a predetermined pattern to make a "second-skin", similar to a bandaid. For optimal comfort and surface adhesion, the mechanical characteristics such as the elasticity and stiffness should be matched to the skin. The circuitry and wiring for surface electrical stimulation may be printed or etched into a flexible material such that the device conforms to the body or to tissue within the body. For example, it may be copper printed on a flexible substrate such as plastic.

In another embodiment as illustrated in FIG. 14G, the device may be positioned on the surface of the body but containing a transcutaneous penetrating elements 1470 to improve influence on the nerves. These elements may be microneedles, used for improvement of stimulation and/or drug delivery. In some embodiments, the transcutaneous penetrating elements can form a microelectrode array that is placed on the skin surface and penetrates through the skin. The microelectrode array can function like microneedles, and can both improve signal transmission from the electrode to the nerve and to improve the permeability of the skin to improve topical drug delivery.

Sensors: Types of Sensors

Figure 17A:
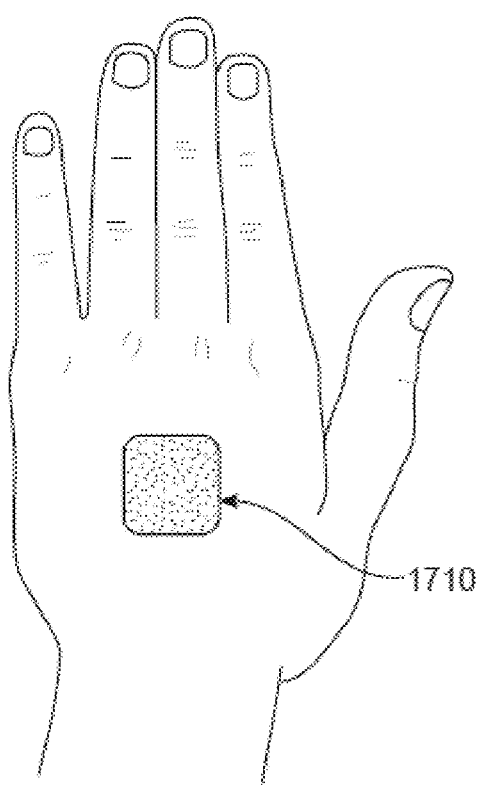
FIGS. 17A-17B is a diagram showing an embodiment of the positioning of an accelerometer on the hand or wrist for measuring the patient's activity and tremor.
Figure 17B:
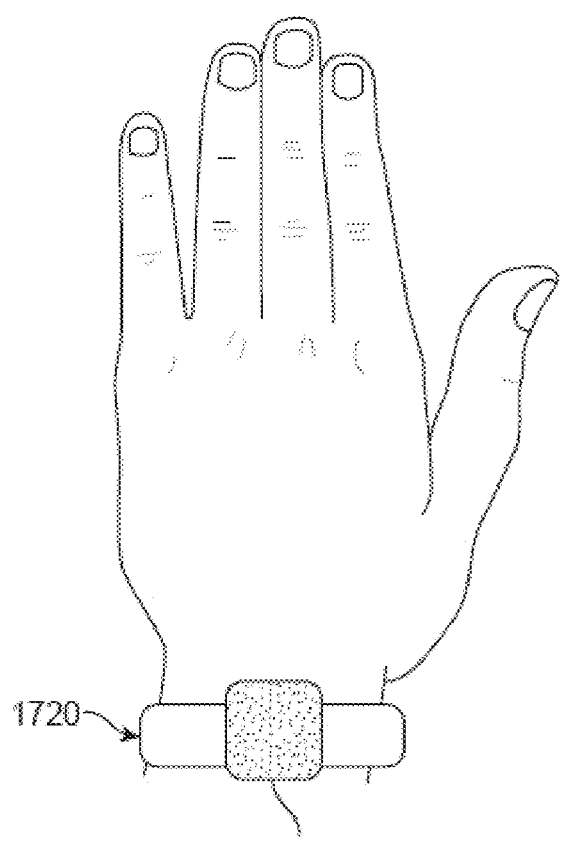

The device or system may include sensors. Sensors for monitoring the tremor may include a combination of single or multi-axis accelerometers, gyroscopes, inclinometers (to measure and correct for changes in the gravity field resulting from slow changes in the device's orientation), magnetometers; fiber optic electrogoniometers, optical tracking or electromagnetic tracking; electromyography (EMG) to detect firing of tremoring muscle; electroneurogram (ENG) signals; cortical recordings by techniques such as electroencephalography (EEG) or direct nerve recordings on an implant in close proximity to the nerve. FIGS. 17A-17B show representative positions of motion sensors on the 1710 hand or 1720 wrist. Other tracking locations may include the fingers or other body parts.

The data from these tremor sensors is used measure the patient's current and historical tremor characteristics such as the amplitude, frequency and phase. These sensors may also be used to determine activities, such as to distinguish involuntary movements (e.g., tremor) from voluntary movements (e.g., drinking, writing) or the presence and absence of the tremor relative to the time of day or other detected activities such as sleep/wake cycles.

The device may also include sensors to provide performance and usage data, including when the device was worn (e.g., from temperature sensors), the device's location (e.g., from GPS), battery level, or video recording. In another embodiment, the sensor is a temperature sensor to measure the temperature of a cooled limb. In another embodiment, the sensor includes video recording. In another embodiment, sensors from existing hardware such as a smartphone are used. For example, the tremor may be measured using the accelerometers on a smartphone or engaging the patient in a tremor-inducing writing task by analyzing a line traced on a smartphone screen.

Sensors: Algorithms to Extract Tremors

Algorithms will be used to extract information about tremors from the stream of data provided by the sensors in several embodiments. The tremor may be identified based off its time-domain signal, frequency-domain signal, amplitude, or firing pattern (e.g., bursts, spikes). For example, in FIG. 18A-18B, the frequency analysis of the spectral power of gyroscopic motion data indicates that the tremor is centered at approximately 6.5 Hz (see the maximum power in the lower plot).

Motion data can be taken as each raw sensor channel or by fusing the raw signals of multiple sensors. As one example, multi-axis accelerometer data can be combined into a single numerical value for analysis. The algorithm will extract motion data in the 4 to 12 Hz range to remove motions that are not attributable to the tremor. This may be done using any combination of notch filters, low pass filters, weighted-frequency Fourier linear combiners, or wavelet filters. As each patient has a dominant tremor frequency, this range may be narrowed based on specific knowledge of the patient's tremor or tremor history. For example, for a patient with a 6 Hz tremor an analysis algorithm may extract only motion data in the 5 to 7 Hz range. If a patient is known to have a tremor that flexes and extends the wrist by a maximum of 5-degrees then an analysis algorithm would determine that a measured motion of 45-degree wrist flexion is likely due to intentional gross movement rather than tremor. In some embodiments, the algorithm will sample the motion data by identifying time periods likely to correspond to postural holds or kinetic fine motor tasks.

Once the appropriate motion data has been extracted, the algorithm will analyze key characteristics of the tremor including the amplitude, center frequency, frequency spread, amplitude, phase, and spectral power.

Sensor fusion techniques can also be used to analyze different aspects of the tremor. For example, a multi-axis accelerometer and gyroscope attached to the backside of the hand could be combined to reduce noise and drift and determine an accurate orientation of the hand in space. If a second pair of multi-axis accelerometer and gyroscope were also used on the wrist, the joint angle and position of the wrist could be determined during the tremor. This could isolate what excitations of which nerves are causing damping of the different muscle groups controlling the tremor.

ET patients have two components of their tremor. Kinetic tremors are present during intentional movement and have a major impact on quality of life because they impact a person's ability to accomplish daily tasks like drinking, eating writing and dressing. Postural tremors are present during static positions held against gravity. They can be embarrassing, though are less impactful on quality of life. Postural tremors typically present earlier in the disease course and are thought to drive kinetic tremors. Both components are typically in the range of 4 to 12 Hz, with older patients experiencing lower frequency tremors.

Detecting postural and kinetic tremors is more challenging than detecting resting tremors. Resting tremors are present in other movement disorders including Parkinson's disease and can be easily identified by analyzing tremors present only while the limb is at rest. Extracting kinetic tremors from motion data is challenging because it is necessary to separate the motion due to tremor from the motion due to the task.

Identifying postural tremors may be easier than kinetic tremors since accelerometer/gyroscopic data during kinetic tasks are corrupted by the motion involved in the task. It is thought that postural tremors may drive the kinetic tremors because people often have postural tremors earlier in life than kinetic tremors and they are about the same frequency. The correlation of postural and kinetic tremors we discovered in our clinical study, as illustrated in FIG. 19, supports this theory of using postural tremor data to analyze or treat kinetic tremors.

Customized treatment based on feedback and/or algorithms are provided in several embodiments.

Sensors: Data Storage & Usage

Figure 20:
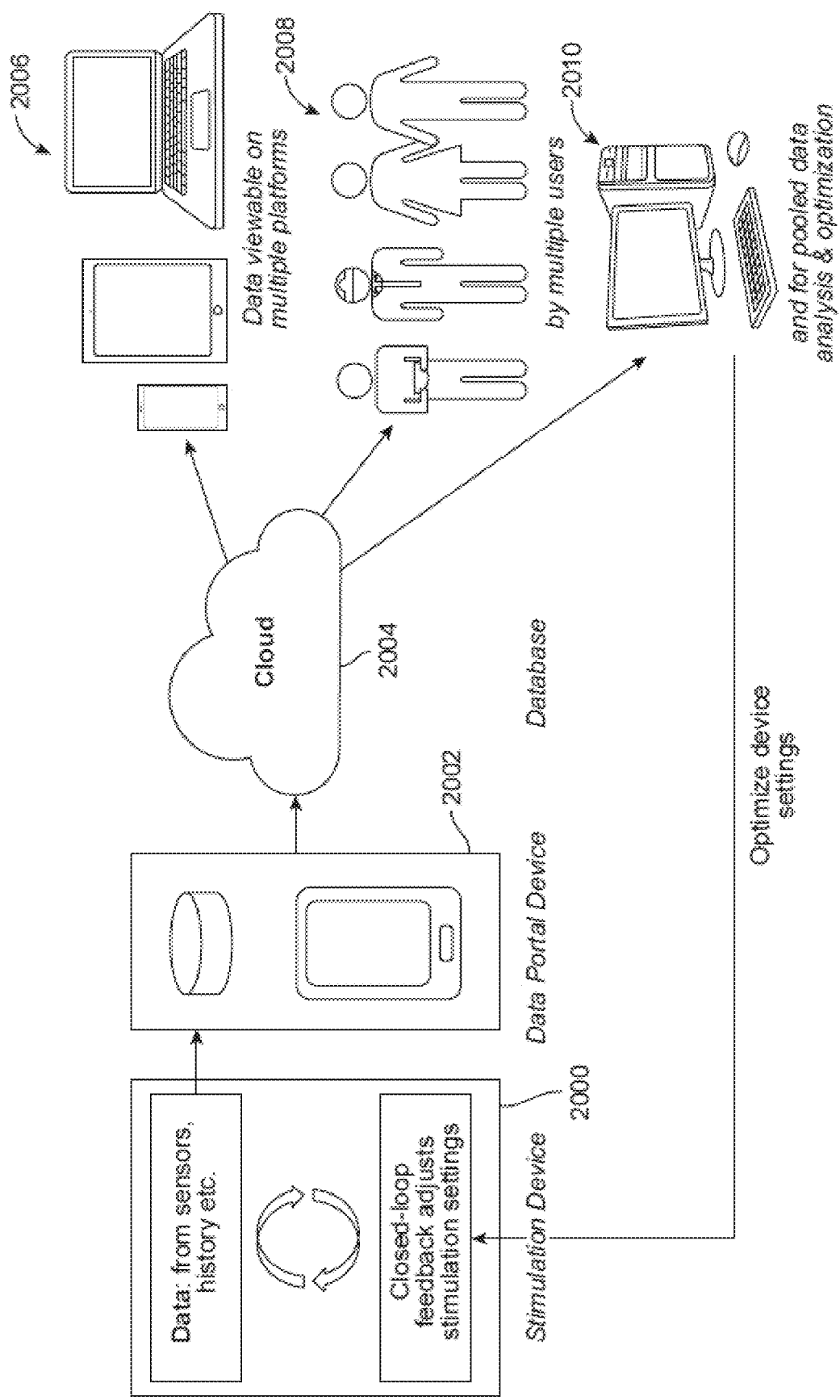
FIG. 20 illustrates an embodiment of a stimulation device that can record and transmit data, such as the tremor characteristics and stimulation history, to a data portal device, such as a smartphone, that transmits the data to a cloud-based server.

As shown in FIG. 20, the stimulation device 2000 can contain hardware, software and firmware to record and transmit data such as the tremor characteristics, stimulation history, performance, usage and/or control of the device to a data portal device 2002, such as a smartphone, cell phone, tablet computer, laptop computer, desktop computer or other electronic device using a wireless communication protocol, such as Bluetooth.

Data recorded using the device used the ET patients can be stored on a smartphone that transmits it to a cloud-based database/server 2004, or the device used by the ET patients may directly transmit data to a cloud-based database/server 2004, enabling many activities including tracking tremors, optimizing stimulation, sharing with caregivers and physicians, and building community. The data may provide information to the controller, real-time feedback to the patient, caregivers and/or clinicians, or may store the data to provide historical data to the patient, caregivers and clinicians. The data stored on the cloud 2004 can be viewed on multiple platforms 2006 by multiple users 2008. In addition, the data on the cloud 2004 can be pooled and analyzed by a computing device 2010.

Patients are generally monitored for tremor every few months, or perhaps annually, when they visit their physician. This monitoring is typically highly subjective. Further, tremor severity can be dramatically affected by many factors, including sleep patterns, emotional status, previous physical activity, caffeine intake, food, medications etc.

Such infrequent and inaccurate monitoring limits the ability of patients, their caregivers and physicians to understand the severity and progression of a patient's ET and the effects of various treatments and behaviors. These factors can interact with the effects of the stimulation provided by the device, and it can be difficult to detect these interactions. These interactions could be identified to optimize the therapy and help patients better understand how their behavior affects their tremor.

Figure 21A:
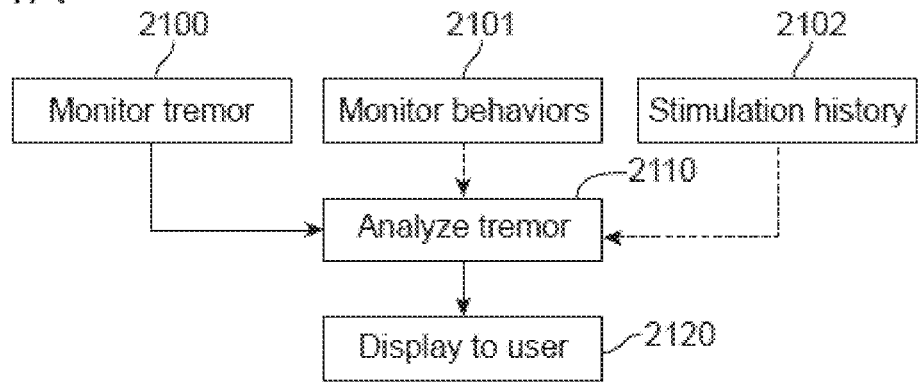
FIGS. 21A-21D are flowcharts showing the monitoring, integration, analysis and display of data used to inform the users or improve the stimulation.

In one embodiment shown in FIG. 21A, the tremor is 2100 monitored using sensors that may be IMUS, electrodes, or any of the other sensors previously discussed. The monitoring may be continuous or during discrete time periods. The data from these sensors is 2110 analyzed to identify changes in the tremor characteristics (amplitude, frequency, etc.) over time. The results are recorded and 2120 displayed to the user. The 2110 analysis and/or 2120 display may be done on the stimulation device itself or by communicating either the raw or analyzed data to a secondary device such as a smartphone or computer.

In another embodiment, 2101 behavioral data may also be collected such that the analysis may examine the relationship between the tremor history and the user's behaviors. Behavioral data may include consumption of caffeine, alcohol, medications and anxiety levels. The system can then alert the patient of the interactions between the behaviors and the tremor.

In another embodiment in which the device is therapeutic (e.g., if it has an effector), the 2102 stimulation history may be collected such that the analysis may examine the relationship between the stimulation history and the tremor characteristics.

Figure 21B:
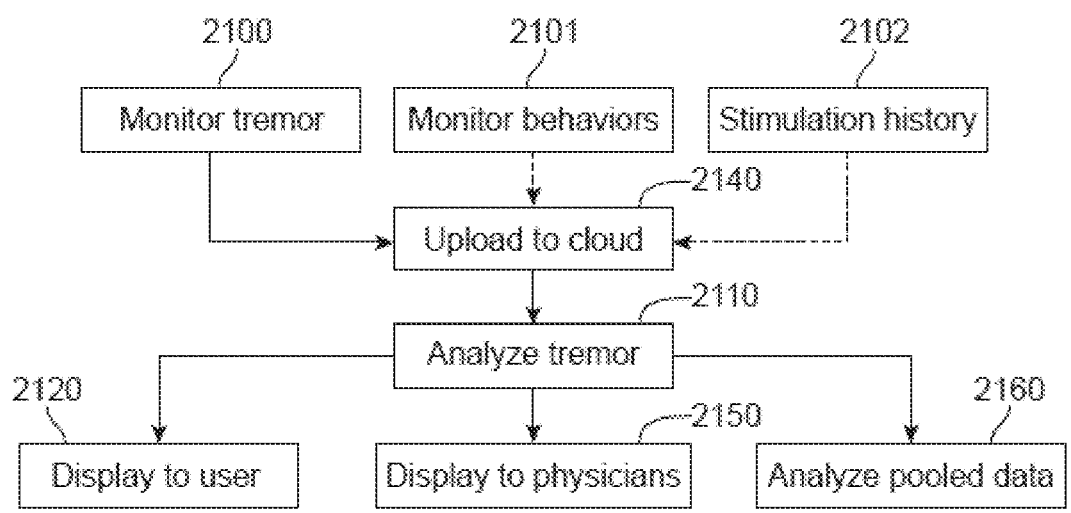

The embodiment shown in FIG. 21B adds a 2140 upload to the cloud. The order of 2140 upload and 2110 analysis may be swapped such that the analysis is done on-board prior to upload (not shown). Use of the cloud enables the results to be 2120 displayed to the user on a variety of networked devices including smartphone, tablets, laptops and desktop computers; to other users such as 2150 physicians or caregivers; or for 2160 pooled analysis across multiple patients.

Figure 21C:
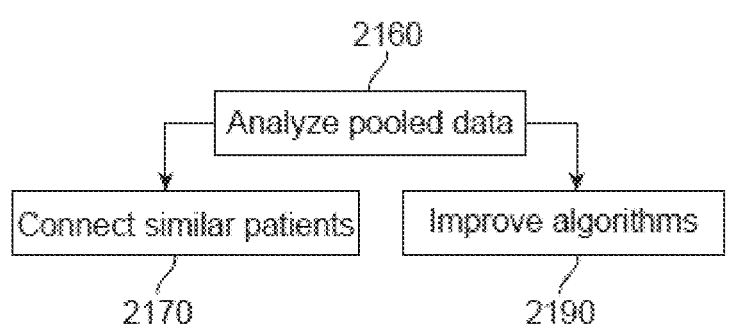

FIG. 21C shows some of the potential uses of the pooled data, including 2170 connecting patients to similar patients based on features such as their tremor characteristics, geography, age and gender or 2180 improving the stimulation algorithms.

Figure 21D:
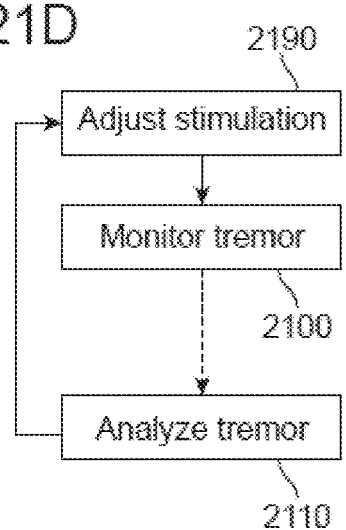

FIG. 21D shows how the data monitoring and analysis shown in FIGS. 21A-C may be used in a closed loop to adjust the stimulation parameters. In this way, the algorithms detect interactions between the variables to optimize the therapy.

Figure 26A:
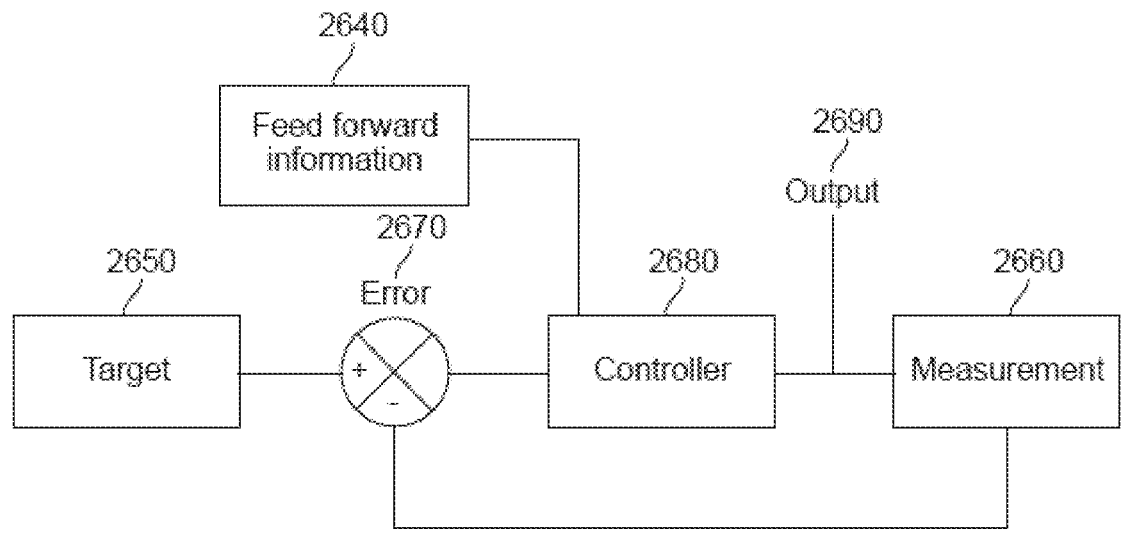
FIGS. 26A-26B illustrate two preferred embodiments of the controls module that is used to interact with the device. A control system for the tremor device utilizes feedback to modify the stimulation. It is a closed loop in which the stimulation is adjusted based on measurement of the activity and tremor.

The device may contain closed-loop control of the stimulation to adaptively respond to detected tremor or activity levels. The device enables sensation of tremor through an activity sensor, data logging and systematic adjustment of the stimulation parameters to achieve an optimal tremor reduction. FIG. 26A is a control diagram showing the basic components of this detection and response system. The 2650 target defines the intended profile. For example, in ET patient this profile may be absence of tremor and in a PD patient this profile may be absence of tremor or rigidity. The 2670 error between the 2650 target and 2660 detection is fed into the 2680 controller, which modifies the 2690 output. The 2680 controller may include a processor and memory. In addition to the error and measurements, the 2680 controller algorithms may also input the history of measurements, stimulation and activity into its algorithms. The output 2690 modifies the stimulation. If the effector is electrical, this may include modifying the waveform, frequency, phase, location, pulse width, pulse spacing, phase, waveform shape, waveform symmetry, duration, duty cycle, on/off time, bursting, and/or amplitude of the stimulation. In the preferred embodiment (FIG. 15), the device contains an array of small electrodes and the output modifies the selection of which electrodes to use as the anode and cathode. The effect of the modifications are then 2660 detected by the measurement device and the process repeats. The 2660 detection and/or 2690 output modification may occur continuously in real-time, with periodic delays between pre-defined times (e.g., hourly or daily), or in response to a user-generated signal such as a pre-defined sequence of movements or a button press. In some embodiments, the controller may alert the patient to manually modify the stimulation parameters. This closed loop may be used for automatic self-calibration.

Figure 26B:
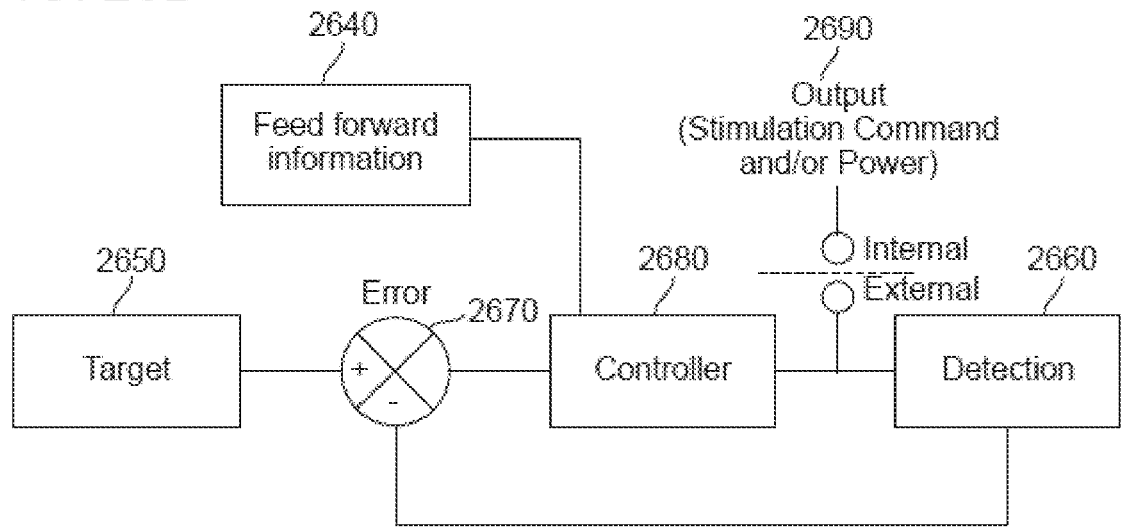

FIG. 26B illustrates a control diagram showing the basic components of this detection and response system, which is similar to the description shown in FIG. 26A, but now with internally and externally located components.

The control could also take into account other patterns in behavior, more like a feed-forward controller 2640. For example, typical patterns in eating times could cause the effector to fire more actively at particular times to reduce tremor for those activities. Also, the person could indicate in a schedule, based upon their activities for the day if they would like increased treatment at certain periods of time, for example if they had a speech or other anxiety causing events. This type of information could also be obtained and learned over time by the control unit. Other data such as sleep, food intake, particularly alcohol and caffeine consumption, exercise history, emotional status, particularly levels of anxiety, and medication usage collected through other mobile technologies and applications, such as Azumio, Jawbone, Fitbit, etc., which may be integrated into the cloud-based patient database, as illustrated in FIGS. 20 and 21. The user can be prompted to enter such data, such as taking a photo of a meal to determine food uptake using an imaging processing application. The database will combine discrete events (e.g., time and amount of caffeine intake) with time series data (e.g., tremor measurements). Algorithms will examine the relationship between patient behaviors, stimulation, and tremor. These will optimize stimulation and alert the patient of the behaviors that influence tremor. This will allow for individually optimized treatment for tremor and feed forward into the system.

In some embodiments, the user may be prompted at predetermined times by the device or cell phone to perform a specific task, which may be tailored to the type of tremor afflicting the patient, such as holding the arm out in a specific posture for ET, or placing the arm in a rest position for Parkinson's. During this time, the sensors can record the tremors. In some embodiments, the patient may additionally or alternatively be instructed to consume caffeine or to record the time period that has elapsed since they last consumed caffeine. This data may be used to determine how caffeine affects tremor, the efficacy of the treatment protocol and stimulation parameters, the duration of the effectiveness, and the like. In some embodiments, the patient can be prompted at a predetermined amount of time after stimulation, such as 10, 20, 30, and/or 60 minutes after stimulation. The time can be adjusted depending on measured duration of the tremor reduction following stimulation.

The device will have on-board data logging and may transmit this information to an external data portal device, such as a smartphone or internet-enabled charge & sync station. This transmission may be wireless or direct. The external device will have greater storage capacity and allow transmission to a database in the cloud. The external device may analyze this data on-board and present information on a screen or using indicators such as LED lights, or the data may be shown on the stimulation device itself.

The data in the cloud will be viewable on multiple platforms including smartphones, tablets and computers. The data will be viewable by multiple people including the user, his or her physicians, caregivers or family members. This will provide a much more comprehensive picture of a patient's tremor and enable optimization of treatment. In some embodiments, users viewing the data can also add comments and notes to the data, which can be tagged with the identity of the user making the comment or note, and the time the comment or note was made. In some embodiments, the ability to make annotations can be restricted to the health care providers, such as the patient's physician, and the patient.

In some embodiments, access to the data is restricted to the health care providers and the patient. Access can be limited by requiring users to set up a secure username and password to access the data. In some embodiments, the patient can also provide others, such as family and friends, with access to the data.

Algorithms for Optimization

Figure 22:
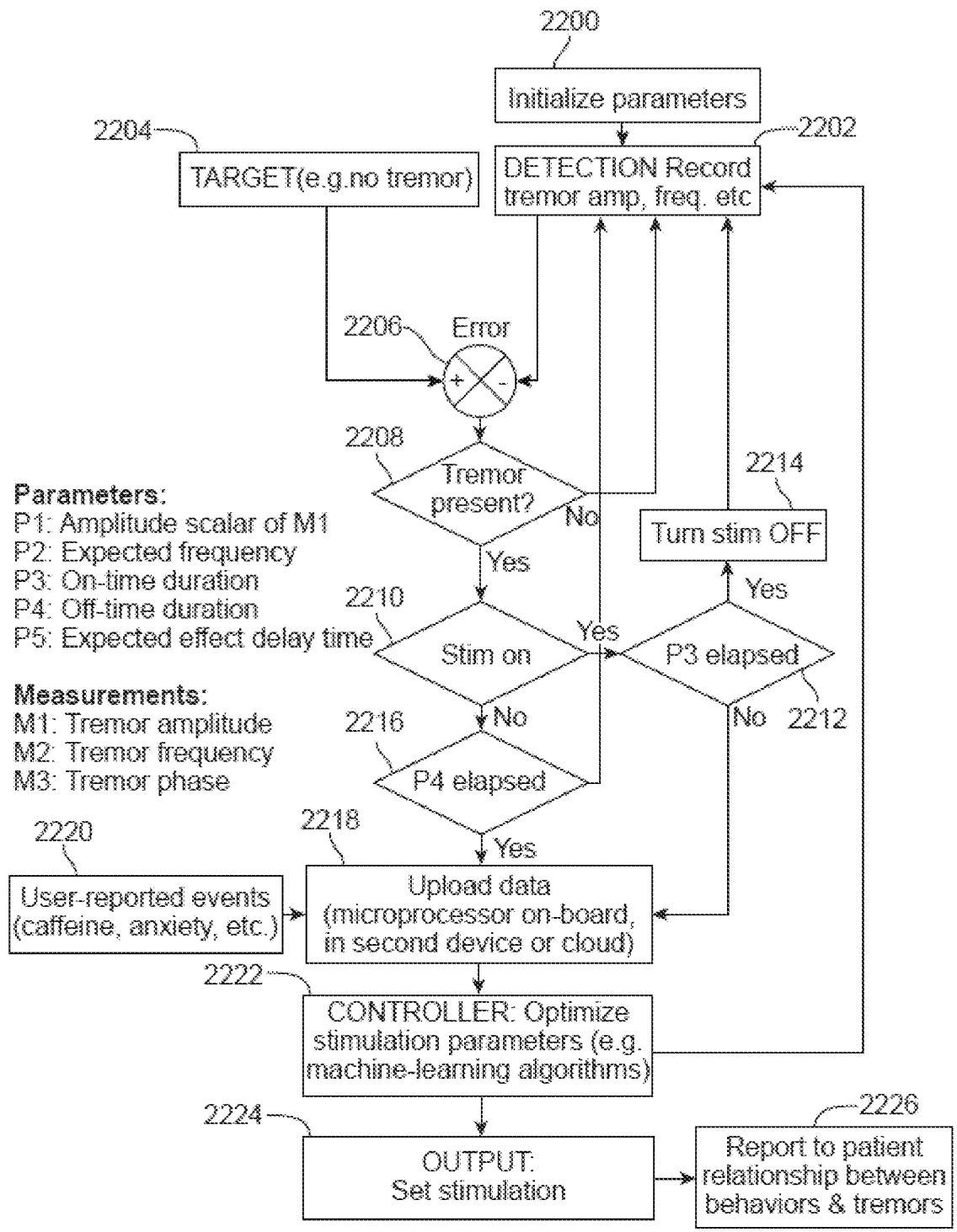
FIG. 22 is a flowchart showing the feedback logic.

Our data indicate that stimulation using a TENS device is highly effective in some patients, somewhat effective in other patients, and ineffective in others. However, optimization of the simulation parameters (simulation intensity (e.g., amplitude), frequency, phase, waveform (e.g., shape, symmetry), duty cycle, phasing, pulse width, pulse spacing, duration, on/off time, bursting, etc.) enables the device to achieve the greatest tremor reduction with the most comfort in each patient and allows the device to adjust over time in response to changes in the circuit dynamics, device positioning, patient state, etc. FIG. 22 shows a decision algorithm/controller for device.

In one embodiment, the optimization algorithm starts by initializing one or more parameters 2200, which may include stimulus amplitude, expected frequency, on-time duration, off-time duration, and expected stimulation effect delay time. Next, a sensor detects 2202 and records tremor characteristics, including tremor amplitude, frequency, phase, and other characteristics described herein. The detected tremor characteristics 2202 are compared with desired target tremor characteristics 2204, which may be no tremor or a reduced tremor. The comparison step 2206 can determine the error or difference between the detected tremor characteristics and the target tremor characteristics, and determine whether tremor or reduced tremor is present 2208, or in other words, whether the detected tremor meets or exceeds the target conditions. If no tremor is detected, or more generally, if a predetermined target tremor condition is not exceeded, then the algorithm loops back to the detection step 2202. If a tremor is detected, or more generally, if a predetermined target tremor condition is exceeded, then stimulation can be turned on 2210. Once the stimulation has exceeded the set on-time duration 2212, then the stimulation is turned off 2214, and the algorithm proceeds back to the detection step 2202. While stimulation is on, the device can upload the recorded data 2218 to the cloud or another device for further processing. Once the stimulation has been turned off 2214, the algorithm can monitor the off-time duration 2216, and can continue to upload data 2218 once the off-time duration has elapsed. In some embodiments, data can be uploaded even before the off-time has elapsed. User-reported events 2220, which can include caffeine or alcohol intake, feelings of anxiety, and other events that may affect tremor, can also be entered into the system and sent to the cloud. The data can be processed by a controller 2222 which can optimize the stimulation parameters using various algorithms, including machine learning algorithms. Once the parameters are optimized, the new stimulation parameters are set 2224. A report 2226 can also be sent to the patient that can highlight or correlate various behaviors identified in the user-reported events with measured tremors.

In one embodiment, the stimulation algorithm is designed to optimize the therapeutic "on"-time. The optimization algorithm may find the best solution for outputs including but not limited to controlling tremor during specific tasks, at specific times of day, in specific location or simply to optimize the overall daily minimization of tremor. The algorithm may be self-calibrating to adjust stimulation parameters including but not limited to the frequency, amplitude, pulse width, electrode selection for cathode and anode and/or timing of turning the stimulation on and off. The algorithm may respond user input or may be entirely pre-programmed. The algorithm may be a learning algorithm to tailor the stimulation over time to adjust in real-time to a patient's tremor or patient-defined needs. The stimulation may be triggered on or off in response to inputs including but not limited to user input (e.g., turning the device on or and off), timing since previous use, time of day, detection of tremor (e.g., by accelerometers), electrical recordings, or algorithms based on the previously described or other inputs. As an example, the user can use voice activation to turn the device off to utilize the therapeutic window (e.g., the time of tremor reduction after stimulation is turned off) to provide a time interval of steadiness needed for intentional movements. In another example, the user bites down or uses the tongue muscle detected by an external device placed inside or outside the oral cavity, which will signal to turn off the stimulation and allow the user steadiness of the arm to enable execution of intention actions with steadiness. In some embodiments, the system and algorithm can detect the type of tremor, such as differentiating between a postural tremor and kinetic tremor, based on an analysis of the tremor parameters and the measured activity of the patient. In some embodiments, the stimulation parameters may be determined in part based on the type of tremor detected.

In some embodiments, the system can be controlled by an event trigger. Event triggers can include defined movements, temperature, voice activation, GPS location, or based on data received by a sensor or any combination thereof. For example, the device can be turned on or off during an intentional movement, such as, before a tremor has started or ended respectively. In another example, the device is turned on or off when a specified temperature is reached. The system may act to achieve a desired tremor suppression profile. For example, the control may activate the device during a period of desired tremor suppression; prior to a period of desired tremor suppression, with effects lasting beyond the use of the device; and/or in response to detection of the tremor.

According to several embodiments, a system may use sensors to determine whether a modality, combination of modalities, or modality settings are effective and adjust one or more modality parameters to improve response. For example, if a wearable device comprises an electric effector and a vibrational effector, but the setting are not effective (e.g., due to tolerance build-up), a parameter (e.g., one or more of frequency, amplitude, pulse width, duty cycle, phase, waveform shape, waveform symmetry, pulse spacing, duration, on/off time, bursting, etc.) of the electric stimulation may be modified and/or a parameter (e.g., one or more of frequency, amplitude, pulse width, duty cycle, waveform shape, phase, waveform symmetry, pulse spacing, duration, on/off time, bursting, etc.) of the vibrational stimulation may be modified. In some embodiments, a modality may stop being used. In some embodiments, a new modality may be added (e.g., in place of a stopped modality or additive to an existing modality or existing modalities).

Optimization Based on Community Data

At present, the time course of tremors is poorly understood. While creating a database for a single patient will improve our ability to reduce tremor in that patient, combining individual patient data into a database that includes recordings from many patients enables more powerful statistical methods to be applied to identify optimal stimulation parameters. In some embodiments, data from patients suffering from the same type of tremor can be combined. In some embodiments, the tremor data from each patient can include searchable and sortable metadata that allow the collection of data in the database to be sorted, searched and/or reorganized on demand. The metadata can include type of tremor (tremor amplitude, tremor frequency, temporal presence of tremor etc.), name, age, race, sex, location, time, food and drink consumption (particularly for caffeine and alcohol), activity history (exercise, sleep etc.), medications, past treatments, and current treatments.

The systems described above with respect to FIGS. 20 and 21 can be adapted to data from many patients going into a database, and the algorithms can operate on the massive set of data.

Community Building

Individuals with ET feel isolated by the disability associated with their tremor. As a result, they are highly motivated to meet other people with ET. There is an active and growing set of support groups that organize meetings and enable patients with ET talk about their issues and discuss possible solutions. Attending these meetings can be challenging because some patients with ET have difficulty driving. Also, the individuals within a particular physical location who attend a support group may have symptoms that are different from each other, and they lack the ability to identify other patients that are most like each other.

Algorithms can help individuals find members of the ET community that have similar profiles. For example, algorithms can characterize patients based their age, tremor severity, tremor features, success with treatment, treatment type, medication type, location (based on address or GPS), and other characteristics. This will help them communicate with each other and to share information from the central community website that is customized to a particular individual with ET or a caregiver. For example, system can identify patients within a geographical location or identify other patients within a predetermined distance from a particular patient. Patients may have the option of joining an online ET community and making their location searchable on the system. The system may identify to a patient existing ET community support groups within a predetermined distance.

Other Processor, Library, Data Storage

The processor 797, as illustrated in FIGS. 7A-7D for example, may function to operate on data, perform computations, and control other components of the tremor reduction device. It may preferably be a microprocessor with peripherals or a microcontroller. For example, the processor could receive input from the user via the controls module 740 and could control the execution of stimulation as selected by the user. In another embodiment, the processor 797 could execute predefined stimulation protocols selected by the user. These stimulation protocols could be found in the digital library of stimulation protocols 798, which may be loaded in the processor 797 or stored in external memory, like an EEPROM, SD card, etc. The processor 797 can also receive information from the sensors 780 and process that information on board and adjust the stimulation accordingly. The selection of the processor is determined by the degree of signal processing it needs to do and the number and type of peripherals it needs to control. Communication with peripherals can be executed by any of the well-known standards such as USB, UART, SPI, I2C/TWI, for example. The processor may also communicate wirelessly with other device components using Bluetooth, Wifi, etc. The processor may be on board the device, or the tremor data be transmitted via a wireless link between the processing unit and the stimulation unit.

In an embodiment with an electrical stimulator 730, the preloaded protocols 798 may be electrical stimulation or a sequence of electrical stimulations. Electrical stimulation or electrical signal refers to an electrical pulse or pattern of electrical pulses. The electrical stimulation may include parameters such as pulse frequency, amplitude, phase, pulse width, or time duration, duty cycle, waveform shape, waveform symmetry, pulse spacing, on/off time, or bursting of electrical stimulation. These parameters may be predefined or controlled by the user.

The data storage unit 770 may function to store operational statistics about the device and usage statistics about the device, preferably in NAND flash memory. NAND flash memory is a data storage device that is non-volatile, which does not require power to retain the stored information, and can be electrically erased and rewritten to. In some cases, it may be beneficial to have this memory be removable in the form of a micro-SD card.

Power

The effector may be electrically coupled to one or more power sources, as illustrated in FIGS. 7A-7D for example. The power source 750 functions to power the device. The power source 750 may be connected to the processor 797 and provide energy for the processor to run. The power source may preferably be rechargeable and detachable as this allows the device to be reused. The power source may preferably be a battery. Several different combinations of chemicals are commonly used, including lead-acid, nickel cadmium (NiCd), nickel metal hydride (NiMH), lithium ion (Li-ion), and lithium ion polymer (Li-ion polymer). Methods of recharging the battery are preferably attaching to a wall socket or other powered device, solar power, radio frequency, and electrochemical. In some embodiments, the source of power is ultracapacitors. Ultracapacitors may be divided into three different families—double-layer capacitors, pseudocapacitors, and hybrid capacitors. Ultracapacitors may preferably be made with nanoporous material including activated charcoal, graphene, carbon nanotubes, carbide-derived carbons, carbon aerogel, solid activated carbon, tunable nanoporous carbon, and mineral-based carbon. Ultracapacitors provide an advantage of faster charging than batteries as well as tolerance of more charge and discharge cycles. Batteries and ultracapacitors could be used in conjunction as the tolerance of ultracapacitors to a large number of charge-discharge cycles makes them well suited for parallel connections with batteries and may improve battery performance in terms of power density. In some embodiments, the power source may harness energy from the body. In some embodiments the power can be harnessed by kinetic motion, by thermal energy, and/or by sound. The power source may in some embodiments include a plug to an external source, such as a general appliance. Two, three or more power sources may be provided for a single device.

Low-profile and lightweight devices are used in several embodiments to increase patient compliance. Water-resistant or waterproof devices are provided in some embodiments.

In one embodiment, a special charging station or dongle could be used to recharge the device. The benefit of the special charging station is that it could also facilitate the upload of data from the device to the web via Wifi or another communication protocol.

Implants

In some embodiments, at least a portion of the system is implantable. An implanted stimulator may offer greater control and comfort than surface stimulation because it is located closer to the nerve and avoids exciting cutaneous afferents.

The method of stimulating peripheral nerves to control hand tremors introduces specific requirements for an appropriate implanted stimulator. First, the implant should be small to minimize the invasiveness of the procedure used to position the implant and make it appropriate for implantation. Second, because the stimulation may be responsive to the detected tremor or user input, the implant should be capable of receiving communication from an external device. Third, the device should tolerate variability in the positioning of the external device.

Any number of the system components disclosed herein can be implanted. In some embodiments, the housing, interface, effector and power source are implanted and the controller is external to the patient. In such embodiments, the controller, may be, for example, in wireless communication with the effector. In other embodiments, the power source is external to the patient.

The device may be implanted subcutaneously, partially implanted, or may be transcutaneous (passing through the skin), may be on the surface of the skin or may not be in contact with the body. It may be an assembly of these devices, such as a surface component that communicates with or powers an implanted component. If it is implanted, the device may be implanted in or around nerves, muscle, bone, ligaments or other tissues.

In one embodiment, the implant is positioned in or near the carpal tunnel to influence the nerves passing through the carpal tunnel. In another embodiment, the implant is positioned on or near the median nerve in the upper arm between the biceps. In another embodiment, the implant is positioned on or near the median, radial or ulnar nerve in the forearm or wrist. In another embodiment, the implant is positioned on or near the brachial plexus to influence the proprioceptive nerves passing from the arm toward the central nervous system.

The implanted portions may be placed or delivered intravascularly to affect nerves in the area within range of the implant's effect. In one example, a device is placed in or through the subclavian artery or vein to affect the nerves of the brachial plexus.

Figure 23:
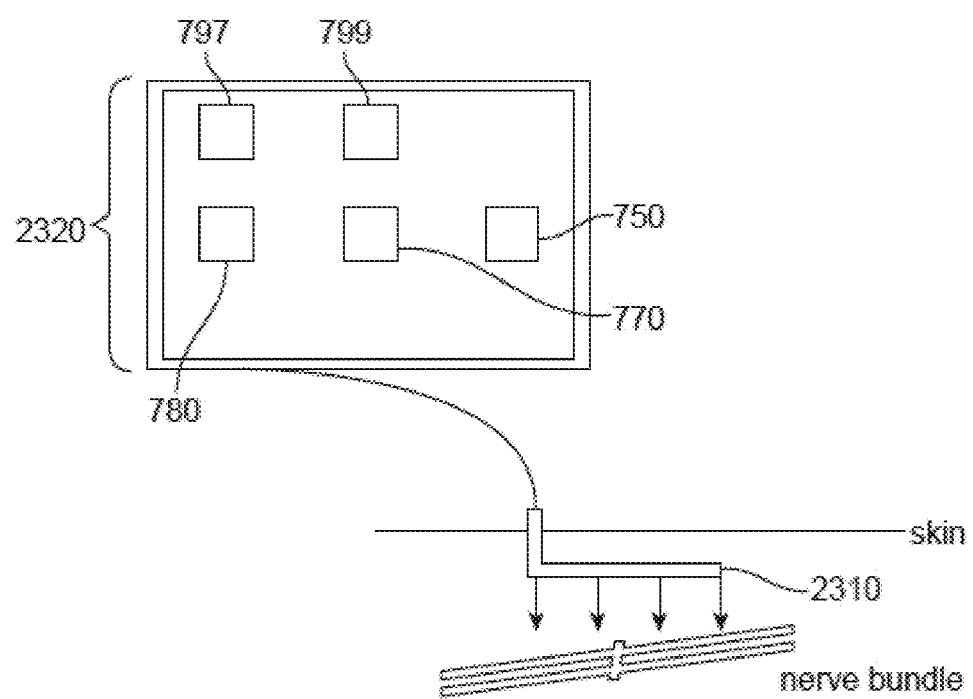
FIG. 23 is a drawing showing an embodiment where the stimulator is an electrode implanted at least partially subdermally.
Figure 24A:
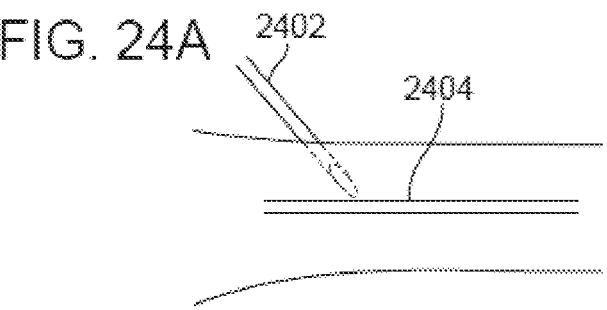
FIGS. 24A-24D illustrate various embodiments of implantable devices and skin surface devices allowing wireless power and control.
Figure 24B:
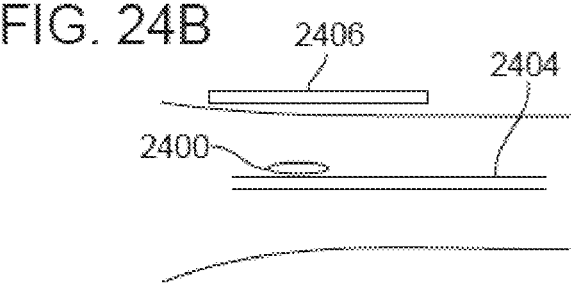
Figure 24D:
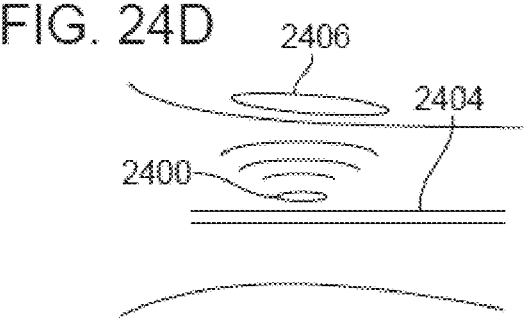
Figure 24C:
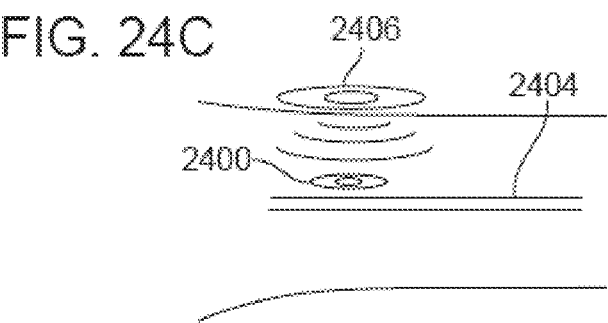

As shown in FIG. 23, a preferred embodiment of a controllable device for a user to reduce essential tremor comprises electrodes 2310 made from biocompatible materials implanted at least partially sub-dermally to stimulate targeted nerves; an external operating unit 2320, which contains a user controls interface, connected by leads to the implanted electrode 2310. The device may contain further elements which may include a processor 797 that performs computations and controls other components; a processor controlled function generator; a digital library 799 stored on the processor or memory which contains preloaded modulation protocols; a sensor 780 connected to or in communication with the processor 797 which detects predefined parameters and transmits that parameter information to the processor; a data storage unit 770 connected to the sensor and processor; and a power supply 750.

In this embodiment, the implanted electrodes 2310 may function to provide direct electrical stimulation to the targeted nerves. Since the electrodes are implanted at least partially into the body and will remain an extended period of time (preferably several years), the electrodes may be made of material that has suitable electrical properties and is biocompatible. The electrode 2310 material is preferably selected from a group including silicones, PTFE, parylene, polyimide, polyesterimide, platinum, ceramic, and gold, or of natural materials such as collagen or hyaluronic acid. The electrodes 2310 can be of varying shape and size but importantly contact the nerves of interest. Electrode shapes include planar shanks, simple uniform microwires, and probes that taper to a thin tip from a wider base. The electrode may have a proximal end and a distal end. The distal end, may contact the nerves, and be adapted to deliver neural stimulation pulses to the selected nerves. The proximal end of the lead may be adapted to connect to the external operating unit run by a processor 797.

In a variation of the embodiment, there may be multiple leads connected to different nerve bundles. In another variation, there may be wireless communication with the implant as shown in FIGS. 24A-24D. The implant 2400, which can be a microelectrode or microstimulator, can be inserted proximate the nerve using needle insertion. The needle 2402 can be inserted into the patient next to or near the target nerve 2404, and then the implant can be ejected from the needle. The implant 2400 can be in communication with, transfer and receive data with, and be powered by an externally located device 2406, such as a decision unit described herein.

In one embodiment, the Interface may be an implanted nerve cuff. The cuff may either fully or partially encircle the nerve. The cuff may be attached to the nerve by means of closing butterfly arm electrodes. In another embodiment, the Interface may be a nerve abutment. The abutment may be in close proximity to the nerve or may lie along the nerve. The function of the cuff may be to provide good contact or close proximity between the device and the nerve. In another embodiment, the Interface may be anchored on the nerve or sheath around the nerve. For example, the device may be wrapped around, tied to, clamped to, tethered with small barbs to or chemically fused to the nerve or nerve sheath. The function of the cuff, coil, abutment or anchor is to provide good contact or close proximity between the device and the nerve. Some of these embodiments are depicted in FIGS. 25A-25F. Cuffs or bands may be used on the wrist, fingers, ankle, leg, arm, ear, and other locations.

Figure 25A:
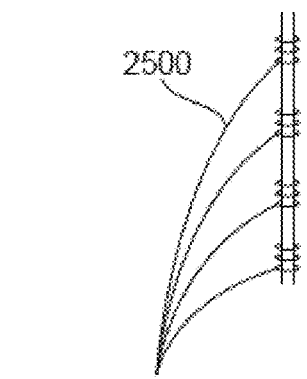
FIGS. 25A-25F illustrate various geometries of electrodes for implanted electrical stimulation.
Figure 25B:
Figure 25C:
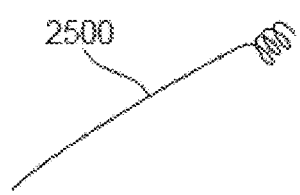
Figure 25D:
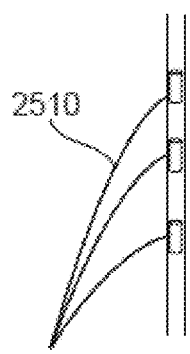
Figure 25E:
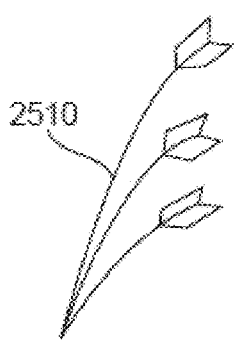
Figure 25F:
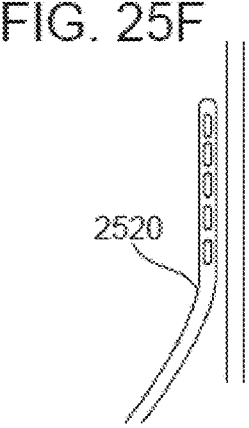

For example, FIGS. 25A-25C illustrate an embodiment of a coil electrode interface, which can be a multi-coil electrode, as shown, or a single coil electrode. In some embodiments, the coil electrode 2500 can be made of a shape memory material, such as nitinol, and can have a relaxed, straight configuration before insertion and implantation, and a coiled configuration after exposure to body temperature. FIGS. 25D and 25E illustrate embodiments of butterfly cuff type electrodes 2510, which may at least partially encircle the nerve. As in other embodiments, the interface can include single or multiple electrodes, and can be fabricated from a shape memory material to have an open configuration during delivery and a closed configuration wrapped around the nerve after implantation. FIG. 25F illustrates an embodiment of an interface having a linear array of electrodes 2520 that can abut against and lie along the nerve.

The method of inserting the implant may involve local or general anesthesia. The implant may be delivered through one or more punctures in the skin, such as a needle or suture, or it may be an open incision made in the skin to access the target area, or it could include both methods. In one embodiment, the device may be implanted by threading all or part of the device around the nerve and or surrounding tissue, such as blood vessels or tendons.

In one embodiment, the implant may include two electrodes positioned along a vascular pathway. The pathway may be along the palmar arch and the electrodes may be positioned in the brachial and axillary arteries. The fluid column between the electrodes may carry electricity and stimulate adjacent nerves. The electrodes may be either internal to the vascular pathway, like a stent, or external to the vascular pathway similar to a vascular wrap. In one embodiment, the device may be an implant capable of two-way communication with an external device. The embodiment may contain memory. The external "listener" device may also be a power source. The implant could communicate information such as its power reserves or usage history to the "listener". In another embodiment, the device is an implant capable of sensing activity on the nerve or adjacent nerves and reporting this information to the listener.

In another embodiment, the device or devices used to place the device may use ultrasound for guidance. Ultrasound may be used to measure proximity to blood vessels, nerves or other tissues, or to characterize the type and location of adjacent tissues.

In another embodiment, the electrodes for stimulation may be injected as a liquid. In another embodiment, the electrodes may be flexible and delivered in a viscous medium like hyaluronic acid. In another embodiment, the electrodes may be made of nitinol that takes its shape at 37 degrees Celsius. This would permit injecting or inserting the electrodes in one configuration, such as an elongated configuration to fit in a needle, and then would take their form when warmed to body temperature. Some of these examples are depicted in FIG. 25.

The implant may contain the necessary components for uni-directional or bi-directional communication between the implant, an external power transmission, a communication system, and/or electronics to store programmable stimulation parameters. The device may contain a wireless micro-module that receives command and power signals by radiofrequency inductive coupling from an external antenna. If the effector is electrical, the incoming communication channel may include information including the stimulation frequency, delay, pulse width and on/off intervals.

Transcutaneous charging or powering reduces the implant size by eliminating the need for a large power source (e.g., battery) and eliminates the need to replace the power source with repeat surgeries. An external component may be used to wirelessly power the internal component, such as by radiofrequency (RF) power transfer. For example, the external device may emit RF power that the internal component receives with a resonant coil. The power may be transmitted at a variety of wavelengths, including but not limited the radiofrequency and microwave spectrums, which range from 3 kHz to 300 GHz. In some embodiments, the internal device may contain a battery. The external device may be worn or carried on the body, or it may be in the nearby surroundings such as on a nearby table or wall. It may be portable or fixed. The device may contain a capacitive energy storage module electrode that stimulates when it discharges. The electronics may be significantly simplified if the powering itself drives the stimulation profile. The capacitor blocks direct current while allowing alternating current to pass. When the capacitor reaches its dielectric breakdown, it discharges and releases a stimulation pulse.

The implant may also sense the tremor directly, such as by using electroneurography (ENG) or electromyography (EMG) signals or an accelerometer or a combination of the above. In this case, the implant may include multiple electrodes since microelectrodes and macroelectrodes are preferable for sensing and stimulating, respectively. The device may also include an outgoing communication channel to communicate the detected events.

Additional Embodiments for Multi-Modal Treatment of Urinary and/or Gastrointestinal Dysfunction In some embodiments, multi-modal approaches can involve restoring balance to autonomic (sympathetic and parasympathetic) nervous system activity, including but not limited to reducing sympathetic and/or parasympathetic nervous system activation relating to neural bladder circuits. Some embodiments can utilize any of the multi-modal approaches disclosed herein, and can be used or modified for use with systems and methods disclosed for treatment of bladder disorders in PCT Pub. WO 2017/132067 to Wong et al., which is hereby incorporated by reference in its entirety.

In some embodiments, disclosed herein are multi-modal peripheral nerve stimulators to improve conditions including but not limited to urinary and/or gastrointestinal dysfunction. The stimulation can target one, two, three, or more nerves associated with bladder function. The nerves can include, for example, the tibial nerve or posterior tibial nerve, which can branch into the medial and lateral plantar nerve branches, and the calcaneal nerves. The saphenous nerve is the cutaneous branch of the femoral nerve. Other nerves include, for example, the pudendal nerve, pelvic nerve, dorsal genital nerve, external anal sphincter nerve, and the dorsal genital nerve, for example. In some embodiments, the tibial (e.g., posterior tibial) nerve can be stimulated transcutaneously in a manner similar to percutaneous tibial nerve stimulation but noninvasively and in a more prolonged manner. In some embodiments, systems and methods include only transcutaneous elements without any implanted and/or percutaneous components. In some embodiments, the nerve(s) to be stimulated are lower extremity peripheral afferent nerves only, and are not spinal nerves.

Not to be limited by theory, voluntary control of the bladder can be mediated in large part by the autonomic nervous system (ANS). The ANS maintains a balance which can be important to the normal functioning of the body's organs. For instance, the hypogastric nerve (sympathetic) and pelvic nerve (parasympathetic) both carry information about bladder fullness to the brain, and also work together to enable the relaxation-contraction mechanism that controls micturition.

Activation of the pontine micturition center (PMC) results in parasympathetic activation of the bladder. This in turn contracts muscles in the bladder and relaxes muscles in the urethra. Micturition commands cease when CNS structures including the periaqueductal gray (PAG) receive signals that the bladder is no longer full.

Inappropriate activation and inhibition of the parasympathetic and sympathetic systems can result in a sense of bladder fullness, urgency, sensory discomfort, and/or involuntary voiding. Peripheral stimulation that affects the activity of autonomic nerves can be used to modulate or interrupt micturition reflex circuits to correct abnormal bladder functioning. This modulation can be achieved by, for example, multi-modal stimulation of the saphenous nerve, tibial nerve, or a combination of the two. In some embodiments, systems and methods use multi-modal stimulation schemes designed to dephase, override or obscure the abnormal networks. In some embodiments, systems and methods use multi-modal stimulation schemes designed to restore balance of sympathetic and parasympathetic activity of the micturition reflex loop. Advantageously, certain embodiments utilize multi-modal transcutaneous afferent stimulation of one, two, or more peripheral nerves to modulate a brain or spinal pathway associated with bladder function, and/or an organ or target remote from the site(s) of stimulation.

In some embodiments, systems and methods involve multi-modal stimulation parameters including frequency and spatial selectivity on the surface of the distal limb to selectively or preferentially modulate and balance the sympathetic and parasympathetic system.

Not to be limited by theory, stimulation of a first target nerve, such as the saphenous nerve can provide sympathetic modulation of the bladder circuit. Specifically, stimulation tuned to excite large myelinated fibers in a target nerve, e.g., the saphenous nerve can provide somatic afferent input to the lumbar plexus, mediating the sympathetic input to the bladder circuitry via the hypogastric nerve. Sympathetic nerves relax the detrusor muscle of the bladder by releasing norepinephrine, activating the β adrenergic receptors, and contract the intrinsic urethral sphincter, by activating the α-adrenergic receptors. Relaxing the bladder and contracting the intrinsic sphincters can give comfort during the filling and storage phases of the bladder cycle. Stimulation of a second target nerve, e.g., the tibial nerve can provide parasympathetic modulation of the bladder circuit. Specifically, stimulation tuned to excite large myelinated fibers in the tibial nerve provides somatic afferent input to sacral plexus, the sacral micturition center, mediating parasympathetic input to the bladder circuitry via the pelvic nerves via release of cholinergic transmitters. There may also be input from the somatic efferents of the pelvic floor to the external urethral sphincter and modulates the afferent sensation of bladder fullness. Due to widely connected and circuit-based mechanisms of these circuits, all mechanisms described above can in some embodiments modulate the central cortical and pontine micturition centers which coordinate and time signals.

The system may run on a selection of pre-specified programs that vary stimulation parameters and target one or more nerves individually or in combination to improve symptoms of overactive bladder in a specific patient, e.g. whether their challenge is primarily daytime urinary urgency, nighttime waking (nocturia), or incontinence and/or gastrointestinal dysfunction. Alternatively, the system may be closed loop on a number of parameters including: the subject's symptomatic history, including night waking events, or manually entered urination indicated on board the device or a secondary device; direct detection of sympathetic and parasympathetic tone in the bladder or general circuitry, including HRV and galvanic skin response; and/or closed-loop based on previous usage of a device.

In some embodiments, multi-modal nerve stimulation can be synergistically combined with one, two, or more pharmacologic therapies for overactive bladder, including but not limited to an anti-cholinergic (e.g., oxybutynin, tolterodine, trospium, darifenacin, solifenancin, and/or fesoterodine), a beta-3 adrenergic (e.g., mirabegron), an anti-spasmodic (e.g., flavoxate), and/or an anti-depressant (e.g., a tricyclic antidepressant such as desipramine or imipramine), a hormone (such as an estrogen and/or progesterone), or botulinum toxin.

In some embodiments, the effector can be excitatory to the nerve. In other embodiments, the effector can be inhibitory to the nerve. In some embodiments, the system can be used to excite the nerve during some portions of the treatment and inhibit the nerve during other portions of the treatment.

In some embodiments, waveforms including those described herein can be modified over time in order to minimize certain effects, such as habituation. One way of decreasing habituation is to modify the frequency, pulse width, amplitude, duty cycle, phase, waveform shape, waveform symmetry, pulse spacing, duration, on/off time, or bursting pattern of the stimulation. For instance, randomizing or pseudo-randomizing parameters such as, for example, the frequency or pulse width can reduce habituation. Using a Gaussian distribution for randomization can be effective in some cases, and used in such waveforms as stochastic waveforms. Another way of reducing habituation is to the lower the frequency below a certain threshold, such as, for example, no more than about 60 Hz, 55 Hz, 50 Hz, 45 Hz, or 40 Hz, in which humans tend not to habituate.

Varying other parameters such as amplitude can be a way to improve waveform comfort. For example, the amplitude of the stimulation can be adjusted based on the threshold necessary to produce strong sensory perception and paresthesia without eliciting motor contraction. Excitation of muscles can lead to unpleasant cramping sensations in some embodiments. This amplitude could also be modulated throughout a session to be the appropriate, comfortable value depending a person's position or motion.

The stimulation waveforms described herein can be applied continuously to target nerves such as the tibial and/or saphenous nerves, for example, or can be provided in a manner that is adaptive in applying stimulation of various durations or by adjusting properties of the stimulation waveform, including but not limited to amplitude, frequency, pulse width, duty cycle, phase, waveform shape, waveform symmetry, pulse spacing, duration, on/off time, and bursting, in response to different inputs in the system. In some embodiments, the system could include closed loop control, using one or more signals measured by the device or feedback input into the device by the patient or physician to modulate the stimulation to improve efficacy. The signals or input could include, for example, any number of the following: sensors on-board the device or connected in the digital ecosystem; evaluation of autonomic function, reflex loop integrity, or excitability using heart rate variability, measuring muscle sympathetic nerve activity (MSNA), and/or measuring h-reflex by sending a stimulation signal and measure response with EMG. In some embodiments, the signals or input can also include sleep sensor sets, including but not limited to accelerometers, gyroscopes, infrared based motion sensors, and/or pressure sensors under a mattress, to measure night time motion as a measure of nocturia events. For example, patients may wear a stimulator while sleeping and therapy can be triggered by night time restlessness, which is an indicator of an upcoming nocturia event. A motion sensor set (e.g., accelerometer, IR based motion sensor, etc.) can measure rapid back and forth movement of legs typically seen when someone has a sense of urgency. An EEG headband could be used to measure different sleep states. Patient and/or physician input can provide feedback on the effectiveness of and/or satisfaction with the therapy into the device or into another connected device. Also, usage of the stimulation device can be tracked; and specific stimulation modes (e.g., a specified set of stimulation parameters) can be changed based on symptoms presented by the patient or outcomes of the therapy. Multiple modes can be triggered serially and/or simultaneously, or overlapping.

In some embodiments, a stimulator can be part of a system with sensors to assess the state of sleep and modulate stimulation based on the wearer's sleep state. Sensors could include motion sensors (e.g., body worn accelerometers and gyroscopes, or wireless motion tracking via video or infrared), temperature sensors to measure body temperature, pressure sensor under the mattress to measure movement, heart rate sensors to measure HRV, other sensors to measure sympathetic and parasympathetic activity, and/or EEG sensors to measure brain activity to assess the wearer's sleep state. For example, if nocturia events occur during slow wave sleep when parasympathetic activity can be elevated, stimulation parameters are modulated to affect parasympathetic activity, and vice-versa for sympathetic activity.

In some embodiments, multi-modal stimulation can be a first stimulation frequency can be provided for short term benefit, and a second stimulation frequency different (e.g., higher or lower) from the first stimulation frequency can be provided for long-term benefit. For example, 10 Hz stimulation can provide a short term benefit and 20 Hz stimulation can provide a long term benefit in some cases. As one example, 10 Hz stimulation can be provided in an initial period with the therapy (e.g., 3 weeks) for acute therapy, then 20 Hz stimulation can be provided for long term maintenance or condition therapy, or vice versa depending on the desired clinical result. In some embodiments, particular sympathetic and/or parasympathetic nervous system targets and circuits can be specifically targeted to modulate upward or downward sympathetic and/or parasympathetic nervous system activity depending on the patient's underlying autonomic nervous system activity. Utilization of data and/or sensors directly or indirectly measuring sympathetic and/or parasympathetic nervous system activity as disclosed, for example, elsewhere herein can be utilized as closed loop feedback inputs into a hardware and/or software controller to modify stimulation parameters, including on a real-time basis.

In some embodiments, the therapy (e.g., stimulation) can be applied for about, at least about, or no more than about 5 minutes, 10 minutes, 15 minutes, 30 minutes, 45 minutes, 1 hour, 2 hours, 3 hours, 4 hours, 5 hours, 6 hours, or more a day. In some embodiments, the patient is treated nocturnally, such as during sleep, and/or during waking hours. The treatment can be repeated 1, 2, 3, 4, 5, or more times daily or weekly, every other day, every third day, weekly, or other interval depending on the desired clinical result.

In some embodiments, the responsiveness could be dependent on different times of day. For instance, the patient or physician (or algorithm) could pre-schedule different episodic treatment sessions throughout the day and the device could provide treatment stimulation at those different times of day. In one example, treatments are applied at regular or irregular intervals during the day at a frequency related to the typical amount of voiding. In the treatment of nocturia, stimulation could be timed to periodic intervals during a person's sleep. In some embodiments, stimulation schemes are applied to restore autonomic dysregulation based on natural diurnal patterns of sympathetic or parasympathetic activity. Treatment could also occur at irregular intervals that are human-entered or predicted by machine learning from previous days' voiding incidents. In some embodiments, a first frequency (e.g., 10 Hz or 20 Hz) therapy can be applied in the morning for acute day time relief, and a second different higher or lower frequency (e.g., 20 Hz or 10 Hz) therapy can be provided before bed for longer night time relief.

In some embodiments, the responsiveness could be dependent on activity. For instance in nocturia, a motion sensor such as an accelerometer or gyroscope could sense if a person is stirring, which could indicate a desired potential voiding. During that time, the device could turn on to provide appropriate stimulation. In some embodiments, the device could turn off once voiding is complete.

In some embodiments, the responsiveness of stimulation could be dependent on one, two, or more sensors housed in the device to collect, store, and analyze biological measures about the wearer including, but not limited to, motion (e.g., accelerometers, gyroscopes, magnetometer, bend sensors), ground reaction force or foot pressure (e.g., force sensors or pressure insoles), muscle activity (e.g., EMG), cardiovascular measures (e.g., heart rate, HRV), skin conductance (e.g., skin conductance response, galvanic skin response), respiratory rate, skin temperature, and sleep state (e.g., awake, light sleep, deep sleep, REM). Using standard statistical analysis techniques, such as a logistical regression or a Naive Bayesian classifier, these biological measures can be analyzed to assess the wearer's activity state, such as sedentary versus active, level of stress and/or bladder fluid volume, and the like, which in turn, can serve as a predictor for increases in urinary and/or gastrointestinal urgency.

Sympathetic and parasympathetic activity can be measured through several methods, including microneurography (MSNA), catecholamine tests, heart rate, HRV, or galvanic skin response. HRV can provide a quick and effective approximation of autonomic activity in the body. HRV can be determined by analyzing the time intervals between heartbeats, also known as RR intervals. Heart rate can be accurately captured, for example, through recording devices such as chest straps or finger sensors. The differences between successive RR intervals can provide a picture of one's heart health and autonomic activity. Generally speaking, healthier hearts have more variability between successive RR-intervals. This interbeat data can also be used to denote an individual's sympathetic and parasympathetic activity levels. Through frequency-domain analysis, heartbeat frequencies can be separated into distinct bands. High-frequency signals (~0.15-0.4 Hz) can almost exclusively reflect parasympathetic activity, and low-frequency signals (~0.04-0.15 Hz) can represent a mixture of sympathetic and parasympathetic activity. Therefore, taking the ratio of high frequency (HF) to low frequency (LF) signals can yield an approximation of one's sympathetic tone. In some embodiments, HRV can be analyzed, for example, under time-domain, geometric domain methods in addition to frequency domain methods. In some embodiments, increased heart rate variability can signify increased parasympathetic response and/or decreased sympathetic response. Decreased heart rate variability can signify decreased parasympathetic response and/or increased sympathetic response. In some embodiments, a system can sense an increase or decrease in HRV of about or more than about 5%, 10%, 15%, 20%, 25%, 30%, 35%, 40%, 45%, 50%, 75%, 100%, or more over a baseline value (or target desired HRV value) and institute a change in one, two, or more stimulation modality parameters accordingly. In some embodiments, the one, two, or more stimulation modalities can be configured to modulate, such as increase or decrease stimulation to one or more nerves (e.g., peripheral nerves) associated with the sympathetic and/or parasympathetic nervous system, and a response to therapy can be confirmed by sensing an increase or decrease in parasympathetic or sympathetic tone, including but not limited to increase or decrease in HRV, changes in high frequency content of HRV, and changes in the ratio of high frequency and low frequency content of HRV. In some embodiments, balance of parasympathetic and sympathetic activity of the bladder reflex loop can be assessed with frequency analysis of heart rate variability measured with pulsed plethysmography with an LED light source and optical sensor disposed in the device that measures fluctuations in light level due to blood flow that target one of the major blood vessels around the knee, which could include one or more of the following, femoral, popliteal, tibial, posterior tibial, anterior tibial, and/or descending genicular arteries or veins.

In some embodiments, a system or method for non-invasively measuring eye muscle movement and/or the blink reflex can be utilized as a biomarker (e.g., a biological marker that can be used to inform diagnosis of a disease state) of diagnosis of overactive bladder or other conditions, monitoring of the progression or efficacy of therapy of overactive bladder or other conditions, and/or be utilized as feedback parameters regarding closed-loop adjustment of therapy. Not to be limited by theory, the centers involved in the control of micturition, such as the medial and lateral regions of the pontine micturition center are in the reticular formation of pontine tegmentum and in close anatomical proximity to regions that control eye muscle movement and/or for coordinating the blink reflex. Thus, such biomarkers can be used to gauge functions that are either integrated in, or mediated by the pontine structures. For example, an increased blink latency time (such as about or at least about 1%, 2%, 3%, 4%, 5%, 6%, 7%, 8%, 9%, 10%, 15%, 20%, 25%, or more) compared to reference values can be in some cases associated with overactive bladder symptoms. In some embodiments, a patient's baseline eye muscle movement parameter such as blink time can be compared with parameters/times of the patient while on or after therapy for comparison. Some embodiments could involve, for example: video eye tracking or blinking (such as via a camera, including a web camera, tablet or smartphone camera, or a wearable device that includes a camera, e.g., headwear such as a cap, glasses such as a modified Google Glass, and the like); electro-oculography eye muscle recording based on the dipole of the eye; EMG of muscles on the head that control blinking, such as the orbicularis oculi and levator palpebrae superioris muscle; a system to induce a blink, such as a bright light or puff of air into the eye, and then measuring time to blink using a camera or EMG; and/or measurement of the blink reflex with an active stimulation signal, such as applied transcutaneously to the supraorbital nerve and recording of nerve activity of the orbicularis oculi.

In some embodiments, any form of stimulation as disclosed herein can be utilized to apply stimulation to one, two, or more acupuncture points. In some embodiments, the acupuncture points to be stimulated could include any one, two, three, four, five, six, seven, eight, nine, ten, or any other number of the following: BL18 (Ganshu), BL23 (Shenshu), BL27 (Xiaochangshu); BL28 (Pangguangshu); BL32 (Ciliao); BL33 (Zhongliao); BL53 (Baohuang); CV2 (Qugu); CV3 (Zhongji); CV4 (Guanyuan); CV5 (Shinen); CV6 (Qihai); GB34 (Yanglingquan); KI7 (Fuliu); KI10 (Yingu); LR1 (Dadun); LR2 (Xingjian); LR8 (Quan); N-BW-38 (Xiajiaoshu); SP6 (Sanyinjiao); SP9 (Yinlingquan); and/or ST28 (Shuidao). In some embodiments, the points to be stimulated include BL18, BL23, BL28, and CV2. In some embodiments, the points to be stimulated include ST28, SP6, BL23, BL28, BL32, BL33, BL53, CV3, and N-BW-38. In some embodiments, the points to be stimulated include SP6, BL23, BL27, BL28, BL33, and CV4. In some embodiments, the points to be stimulated include SP9, LR1, LR2, CV4, and CV6. In some embodiments, the points to be stimulated include SP6, SP9, BL23, CV3, and CV6. In some embodiments, the points to be stimulated include SP9 and GB34. In some embodiments, the points to be stimulated include SP9, KI7, KI10, and LR8. In some embodiments, the point to be stimulated is either CV5 alone or BL39 alone, or a combination thereof. Other permutations of stimulation points are also possible, depending on the desired clinical result.

A large source of error in optical measurements of heart rate is motion artifacts due to relative motion between the optical sensor and the blood vessel being measures. In some embodiments, the optical heart rate sensor has an adhesive on the side of housing that contacts the wearer's skin to reduce relative motion between the sensor and the target blood vessel.

In some embodiments, one, two, or more additional sensors are disposed in the device, including electrical sensors in contact with the wearer's skin to measure cardiac activity or pressure sensors to measure changes in blood vessels, to be used in combination with an optical sensor to improve the fidelity of heart rate measurement.

In some embodiments, the system and device have memory and a processor to extract RR intervals from sensor data, calculate variability of RR intervals, transform data into frequency domain, and calculate high frequency signals, low frequency signals, and the ratio of the high frequency and low frequency signals.

In some embodiments, the heart rate sensor can store collected data for specified time period to gather adequate data for heart rate variability calculation. Specified time period can range in some cases from 1-60 seconds, and may extend to 10 minutes or more.

In some embodiments, electrodermal activity, also known as galvanic skin response or skin conductance response, for example, can be measured using sensors, such as electrodes. Galvanic skin response is the change of the electrical resistance of the skin caused by emotional stress, and measurable with, e.g., a sensitive galvanometer. Not to be limited by theory, skin resistance varies with the state of sweat glands in the skin. Sweating is controlled by the sympathetic nervous system, and skin conductance can be an indication of psychological or physiological arousal. If the sympathetic nervous system is highly aroused, then sweat gland activity also increases, which in turn increases skin conductance. In this way, skin conductance can be a measure of emotional and sympathetic responses, which can be measured, and the feedback data can be sent to the controller, which will in turn modulate stimulation to, for example, decrease sympathetic nervous system activity. Other non-limiting parameters associated with sympathetic and/or parasympathetic nervous system activity that can be sensed include, for example, sweating during particular times of the day and/or night, sleep states as detected, for example, by an EEG headband (to determine when sympathetic and/or parasympathetic activity is particularly high or low, and potentially correlating a sleep state such as stage 1, 2, 3, 4, or REM with nocturia), and/or motion. In some embodiments, a diagnostic and/or combination diagnostic/stimulation device can be configured to measure a person's heart rate and galvanic skin response for improved estimation of the person's autonomic activity. In some embodiments, a wearable device, such as a wrist-worn device can include both electrodermal activity (EDA) sensors and optical heart rate sensors. This combination of data can in some embodiments advantageously and synergistically provide improved estimation of sympathetic and parasympathetic activity than a single measure alone. In some embodiments, the system can include multiple sensors to measure electrodermal activity in conjunction with heart rate and HRV. Data from the multiple sensors can be analyzed by a hardware or software processor and combined to provide a more accurate estimation of sympathetic and/or parasympathetic activity. In some embodiments, the EDA and HR sensors can be disposed in a wrist-worn device that communicates via a wired or wireless connection to the stimulator or to send data to a centralized remote server (e.g., the cloud). Stimulation parameters, nerve target locations (e.g., tibial and/or saphenous nerves for example) or dosing regimen (e.g., duration or frequency of stimulation sessions) could be adjusted based on estimations of sympathetic and/or parasympathetic activity. Adjustments could be made in real-time, or in subsequent stimulation sessions. In some embodiments, stimulation frequency can be adjusted to either increase or decrease autonomic activity modulated by a single specific nerve, or multiple nerves. For example, in some embodiments, relatively low frequency stimulation of a target nerve (e.g., below a threshold value, e.g., about 5 Hz) can potentially inhibit the nerve and thus decreases sympathetic activity, while higher frequency stimulation (e.g., above a threshold value, e.g., about 5 Hz) can potentially excite the nerve and thus increases sympathetic activity. The same effect can occur with the same or other target nerves to regulate parasympathetic activity. In other words, in some embodiments, relatively low frequency stimulation of the target nerve (e.g., below a threshold value, e.g., about 5 Hz) can potentially inhibit the nerve and thus decreases parasympathetic activity, while higher frequency stimulation (e.g., above a threshold value, e.g., about 5 Hz) can potentially excite the nerve and thus increases parasympathetic activity. Not to be limited by theory, depending on the stimulation parameters for example, in some cases stimulating the target nerve can increase or decrease either sympathetic activity, parasympathetic activity, or both. In some embodiments, stimulation of the saphenous nerve can affect sympathetic activity, and stimulation of the tibial nerve can affect parasympathetic activity.

The multi-modal device could also be responsive to number of episodes of symptoms, including overactive bladder. If more episodes occur in one day, treatment can be increased by increasing the amplitude of the stimulation, duration of the stimulation, or number of treatment sessions, for example.

The number of episodes of symptoms such as overactive bladder could be detected in various ways to control the stimulation applied by system and devices. In some embodiments, the patient can enter events related to symptoms of overactive bladder, including but not limited to bladder voiding events, urgency event, or incontinence events on a mobile device. In some embodiments, location services on the device, such as GPS, can detect when the person has entered a building or bathroom.

In some embodiments, disclosed herein are multi-modal wearable systems and methods that can utilize transcutaneous sensory stimulation in the form of a burst pattern, e.g., a theta burst pattern to improve the symptoms of overactive bladder and a variety of other conditions, including but not limited to those disclosed herein (e.g., tremor and other movement disorders, hypertension, cardiac dysrhythmias, and inflammatory bowel diseases (e.g., Crohn's)). Noninvasive peripheral nerve theta burst stimulation may be effective in driving cortical or spinal plasticity to reduce symptoms and improve an individual's quality of life.

In some embodiments, the multi-modal stimulation involves patterns of electromagnetic stimulation of peripheral nerves. The patterned stimulation could be a bursting stimulation, such as an on/off pattern that repeats at regular intervals (e.g., on for 10 ms, off for 20 ms, etc.), or non-burst patterned stimulation that can be more complex in some embodiments, such as a stochastic pattern or a sinusoidal envelope for example. The electromagnetic stimulation could include, for example, electrical energy, mechanical energy (e.g., vibration), magnetic energy, ultrasonic energy (e.g., focused ultrasound), radiofrequency energy, thermal energy, light energy (such as infrared or ultraviolet energy for example), and/or microwave energy, or combinations thereof. In some embodiments, the stimulation is limited to only electrical energy or electrical and mechanical energy (e.g., no magnetic or other types of energy are applied). The peripheral stimulation could include transcutaneous, percutaneous, and/or implanted stimulation.

In some embodiments, the multi-modal stimulation involves non-invasive transcutaneous patterned or burst stimulation of peripheral nerves, including afferent and/or efferent nerves. Not to be limited by theory, but burst stimulation of peripheral nerves can unexpectedly result in one or more of the following compared with conventional or continuous stimulation: greater efficacy; greater plasticity; increased tolerance or tolerability; reduced effects of habituation; increased comfort; and/or reduced treatment time required to achieve the same beneficial effects. Burst stimulation of peripheral nerves, including afferent nerves, can in some cases deliver a more efficacious therapy by remotely accelerating plasticity of one or more central nervous system (e.g., brain and/or spinal cord) circuits, in other words creating plasticity in neural circuits for a period of time that is far longer than the duration of the stimulation session, such as, for example, about or at least about 6 hours, 12 hours, 24 hours, 2 days, 3 days, 4 days, 5 days, 6 days, 7 days, 2 weeks, 3 weeks, 1 month, 2 months, 3 months, 4 months, 5 months, 6 months, 9 months, 12 months, 18 months, 24 months, 36 months, or even longer. Peripheral stimulation in some cases can be more convenient and comfortable for the user than central stimulation (e.g., transcranial stimulation and/or spinal stimulation) and can be more suitable for home and ambulatory use.

In some embodiments, the burst stimulation includes theta burst stimulation. Theta burst stimulation (TBS) is a patterned form of repetitive stimulation that uses high frequency pulses separated by varying inter-burst intervals. Originally used for the induction of long term potentiation in hippocampal learning and memory research, theta burst stimulation in the form of repetitive magnetic stimulation (rTMS) has been demonstrated to noninvasively induce plasticity in humans in the motor, sensory and visual cortex. Depending on various parameters including the duration and continuity of stimulation, a long term potentiation or depression (LTP/LTD) like effect can be observed which are surrogate measures of synaptic efficacy. The number of sessions and the spacing interval between individual sessions of stimulation can also have an effect on the duration of the induced response. The level of muscle relaxation before or during stimulation can also affect the resulting direction or amplitude of plasticity induction suggesting that homeostatic mechanisms are in place that adjust the threshold for plasticity depending on prior synaptic activity. The effective modulation of nervous system plasticity demonstrated with theta burst stimulation can have great potential for the treatment of various neurologic disorders, and can have an effect on other central neural circuits.

In some embodiments, theta burst stimulation can take the form of intermittent theta burst stimulation (iTBS), continuous theta burst stimulation (cTBS), and intermediate theta burst stimulation (imTBS). The burst pattern (or a combination of two or more burst patterns) can be selected depending on the desired clinical result. In some cases, cTBS can be inhibitory, iTBS can be excitatory, and imTBS can be neither excitatory nor inhibitory, but this may be varied depending on the parameters. In some embodiments, inhibitory stimulation of a first nerve (e.g., the saphenous or tibial nerves) can be used alone or in combination with excitatory stimulation of a second nerve (e.g., the saphenous or tibial nerves), such as to restore or improve sympathetic and parasympathetic balance. In some embodiments, inhibitory or excitatory stimulation of a nerve can be controlled by adjusting frequency or pulse width of the stimulation waveform.

In some embodiments, each burst can include a plurality of stimuli, such as about or at least about 2, 3, 4, 5, 6, 7, 8, 9, 10, 11, 12, 13, 14, 15, 16, 17, 18, 19, 20, 30, 40, 50, 60, 70, 80, 90, 100, or more stimuli. Each burst can have the same, or a variable number of stimuli.

In some embodiments, the intraburst frequency could be about or at least about 10 Hz, 20 Hz, 30 Hz, 40 Hz, 50 Hz, 100 Hz, 250 Hz, 500 Hz, 1 kHz, or more. In some embodiments, intraburst frequency could vary between about 10 Hz and about 20 kHz. Intraburst frequency can also be varied in a random or pseudorandom fashion during the burst to reduce habituation and/or increase comfort. In other embodiments, the intraburst frequency can be between about 10 Hz and about 250 Hz, between about 50 Hz and about 150 Hz, between about 10 Hz and about 100 Hz, between about 100 Hz and about 150 Hz, between about 50 Hz and about 250 Hz, or between about 50 Hz to about 1000 Hz, in order to maximize tremor reduction, improve comfort, reduce habituation, and/or reduce power consumption of the stimulator device.

In some embodiments, the interburst frequency can be between about 1 Hz to about 20 Hz, such as between about 4 Hz (250 ms between the start of each burst) and about 12 Hz (83 ms), such as between about 4 Hz (250 ms) and about 8 Hz (142 ms) which is generally accepted as the theta band frequency, including about 5 Hz (200 ms), or in some embodiments between about 3.5 Hz and about 7.5 Hz, or between about 6 Hz and about 10 Hz.

In some embodiments, the inter-session frequency can be between about 1 minute and about 12 hours, such as between about 5 minutes and about 120 minutes, between about 5 minutes and about 60 minutes, between about 10 minutes and about 30 minutes, about 5, 10, 15, 20, 25, 30, 35, 40, 45, 50, 55, 60, 75, 90, 120, 180, 240, 300, 360, 420, 480, 540, 600, 660, or 720 minutes, or ranges incorporating any two of the aforementioned values.

In some embodiments, a repetitive patterned stimulation known as quadripulse stimulation could be used, which includes four pulses at a short interval frequency (inter-stimulus interval of 1.5 ms) repeated at about 0.2 Hz for a period of time, such as about 30 minutes. Quadripulse stimulation has been shown to induce prolonged plasticity. Variation of the intraburst frequency using this paradigm can influence the direction of induced plasticity. These repetitive small pulses could be anywhere between 2-10 pulses or more.

Other burst patterns other than theta burst stimulation can also be used, instead or in addition. Some non-limiting examples include delta (0-4 Hz), alpha (8-12 Hz), beta (12-30 Hz), and gamma (30-100 Hz) inter-burst frequencies. In some embodiments, peripheral burst stimulation can include a sinusoidal, square, rectangular, triangular, sawtooth, or other waveform.

In some embodiments, disclosed herein is a multi-modal method of treating urinary and/or gastrointestinal symptoms in a patient with dual stimulation of a saphenous nerve and a posterior tibial nerve. The method can include, in some embodiments, any number of the following: positioning a first peripheral nerve effector on the patient's skin to stimulate the saphenous nerve of the patient; positioning a second peripheral nerve effector on the patient's skin to stimulate the posterior tibial nerve of the patient; delivering a first nerve stimulation signal transcutaneously to the saphenous nerve through the first peripheral nerve effector; delivering a second nerve stimulation signal transcutaneously to the tibial nerve through the second peripheral nerve effector; receiving an input relating to autonomic nervous system activity of the patient; and modifying at least one brain or spinal cord autonomic feedback loop relating to bladder function based on the input to balance parasympathetic and sympathetic nervous system activity of the patient. In some embodiments, the method does not utilize any implantable components, and only involves transcutaneous stimulation. The first peripheral nerve effector and the second peripheral nerve effector can be both positioned proximate the knee of the patient. The first stimulation signal can be different from the second stimulation signal, including but not limited to a different type of energy, stimulation parameter, burst pattern, waveform shape, etc. The first stimulation signal can have a first frequency different from a second frequency of the second stimulation signal. The first stimulation signal can have an amplitude different from the second stimulation signal. The first or second frequency can be, for example, from about 10 Hz to about 20 Hz. The first or second frequency can be, for example, from about 5 Hz to about 30 Hz. Receiving an input relating to autonomic nervous system activity of the patient can include any number of the following: receiving data from a sensor that measures autonomic nervous system activity of the patient; receiving data from a sensor that measures heart rate variability of the patient; receiving heart rate variability data from an optical sensor measuring blood flow characteristics and disposed proximate a vessel proximate a knee of the patient; receiving data from a sensor that measures galvanic skin response of the patient; receiving data relating to urinary and/or gastrointestinal symptoms of the patient; and/or receiving data relating to nocturia episodes of the patient.

Also disclosed herein is a multi-modal wearable device for dual stimulation of the saphenous nerve and posterior tibial nerve and for treating urinary and/or gastrointestinal symptoms in a patient. The device can include, in some embodiments, any number of the following features: a controller; a first peripheral nerve effector configured to be positioned to transcutaneously modulate the saphenous nerve; a second peripheral nerve effector configured to be positioned to transcutaneously modulate the posterior tibial nerve; and at least one biomedical sensor or data input source configured to provide feedback information. The controller can include a processor and a memory for receiving the feedback information from the sensor that, when executed by the processor, cause the device to adjust one or more parameters of a first stimulus and a second stimulus based at least in part on the feedback information; and/or deliver the first stimulus to the saphenous nerve through the first peripheral nerve effector and deliver the second stimulus to the posterior tibial nerve through the second peripheral nerve effector to reduce urinary and/or gastrointestinal symptoms by modifying a brain or spinal cord autonomic feedback loop relating to bladder function and balancing sympathetic nerve and parasympathetic nerve activity. In some embodiments, the device is not configured for implantation within the patient. The feedback information can include real-time feedback information. The first stimulus can have a frequency of, for example, between about 10 Hz and about 20 Hz. The second stimulus can have a frequency of, for example, between about 5 Hz and about 30 Hz. The feedback information can include autonomic nervous system activity of the patient. The feedback information can include heart rate variability. The feedback information can also include information relating to nocturia events of the patient. The feedback information can also include information relating to patient sleep state.

Additional Embodiments for Multi-Modal Treatment of Cardiac Dysfunction

In some embodiments, multi-modal approaches can involve restoring balance to autonomic (sympathetic and parasympathetic) nervous system activity, including but not limited to reducing sympathetic and/or parasympathetic nervous system activation relating to neural circuits affecting blood pressure as well as cardiac dysrhythmias. Some embodiments can utilize any of the multi-modal approaches disclosed herein, and can be used or modified for use with systems and methods disclosed for treatment of cardiac disorders in PCT Pub. WO 2018/039458 to Hamner et al., which is hereby incorporated by reference in its entirety.

Some cardiac diseases, such as hypertension and cardiac dysrhythmia, can be driven by an imbalance of autonomic activity; that is an imbalance of sympathetic and parasympathetic activity within the autonomic nervous system. This imbalance can arise from overactivity or underactivity of the sympathetic and/or parasympathetic limbs of the autonomic nervous system. Multi-modal stimulation that affects the autonomic nervous system including systems and methods as disclosed herein can provide therapeutic benefit by restoring balance to the autonomic nervous system, thus reducing the burden of symptoms associated with these cardiac diseases.

Autonomic nerve activity has been shown as an important trigger for cardiac dysrhythmia. Human skin is well innervated with autonomic nerves and stimulation of nerve or meridian points as disclosed herein can potentially help in treatment of cardiac dysrhythmia. For example, afferent nerves in the periphery or distal limbs, including but not limited to median nerve, are connected by neural circuits to the arcuate nucleus of the hypothalamus. Not to be limited by theory, modulation of the arcuate nucleus reduces elevated sympathetic outflow via either or both of the following pathways: descending input into the neuroendocrine or hormonal system from the pituitary gland and descending input via the ventrolateral peri-acqueductal grey in the midbrain and the nucleus raphe pallidus in the medulla to the rostral ventrolateral medulla (RVLM). This pathway may be via the cholinergic mu-receptors.

Alternatively or in addition, stimulation of peripheral cutaneous fibers in the arm, leg, neck, or tragus may modulate activity of the stellate ganglion at the level of C8-T1 of the spinal cord to reduce elevated sympathetic outflow and/or increase vagal tone via the carotid sinus nerve. Peripheral nerves that can be modulated include the musculocutaneous nerve (innervated at C5-C7), the radial nerve (innervated at C5-T1), the median nerve (innervated at C5-T1), the ulnar nerve (innervated at C8-T1), and the medial cutaneous nerves (innervated at C8-T1). The medulla oblongata is operably connected to the vagus nerve, which has parasympathetic effects in, for example, the SA and AV nodes of the heart. The cervical ganglia are paravertebral ganglia of the sympathetic nervous system. Preganglionic nerves from the thoracic spinal cord can enter into the cervical ganglions and synapse with its postganglionic fibers or nerves. The cervical ganglion has three paravertebral ganglia: superior cervical ganglion adjacent to C2 & C3; postganglionic axon projects to target: (heart, head, neck) via a pathway adjacent the carotid arteries; middle cervical ganglion (smallest)—adjacent to C6; targeting the heart and the neck; and the inferior cervical ganglion. The inferior ganglion may be fused with the first thoracic ganglion to form a single structure, the stellate ganglion—adjacent to C7; targeting the heart, lower neck, arm, posterior cranial arteries. Nerves emerging from cervical sympathetic ganglia contribute to the cardiac plexus, for example. The stellate ganglion (or cervicothoracic ganglion) is a sympathetic ganglion formed by the fusion of the inferior cervical ganglion and the first thoracic ganglion. Emerging from the thoracic ganglia are thoracic splanchnic nerves (the cardio-pulmonary, the greater, lesser, and least splanchnic nerves) that help provide sympathetic innervation to abdominal structures.

Alternatively or in addition, and not to be limited by theory, multi-modal stimulation can invoke a neurohormonal response by myofascial or cutaneous stimulation of acupressure points in the upper and lower extremities, such as Ht7, Pc6, Gb34, Sp6, Ki6, etc. Neurohormonal responses can include changes (increase or decrease) in production of norepinephrine, epinephrine, acetylcholine, and/or inflammatory cytokines. Inflammatory cytokines can include interleukin, high-mobility group-box 1 protein, and/or tumor necrosis factor alpha. Neurohormonal response can also be invoked by afferent and/or efferent nerve stimulation of median, radial, ulnar, or vagus nerve, cutaneous nerves or sympathetic nerves. In one embodiment, one or more of norepinephrine, epinephrine, acetylcholine, and/or inflammatory cytokines are reduced post treatment with the devices disclosed herein by at least about 5%, 10-20%, 20-40%, 40-60% or more (including overlapping ranges therein) compared to pre-treatment.

Alternatively or in addition, and not to be limited by theory, antidromic stimulation of autonomic or visceral efferent nerve fibers in the arm, leg, neck, or tragus may modulate sympathetic outflow and/or modulate vagal tone. Specifically, sympathetic efferents can be specifically stimulated by targeting c-fibers in the periphery of the body.

Alternatively or in addition, and not to be limited by theory, multi-modal stimulation of peripheral nerves, either somatic, autonomic, afferent, and/or efferent, can reduce sporadic electrical activity of the pulmonary veins, which trigger and maintain cardiac dysrhythmias.

Some embodiments are related to a multi-modal device and system that provides peripheral nerve stimulation, targeting individual nerves. Some embodiments involve a device and system that allows customization and optimization of treatment to an individual. In particular, the device can be configured for multi-modal stimulation of the median, radial, ulnar, peroneal, saphenous, tibial and/or other nerves or meridians accessible on the limbs for treating cardiac dysrhythmia, including but not limited to atrial fibrillation (such as chronic or paroxysmal atrial fibrillation) and other arrhythmias, and/or reducing cardiac dyssynchrony and/or hypertension. Other non-limiting examples of arrhythmias that can be treated using systems and methods as disclosed herein can include, for example, long QT syndrome, torsades de pointes, premature atrial contractions, wandering atrial pacemaker, multifocal atrial tachycardia, atrial flutter, supraventricular tachycardia (including PSVT), AV nodal reentrant tachycardia, junctional rhythm, junctional tachycardia, premature junctional complex, premature ventricular contractions, accelerated idioventricular rhythm, monomorphic ventricular tachycardia, polymorphic ventricular tachycardia, and ventricular fibrillation. Targeting those specific nerves and utilizing appropriately customized stimulation results in more effective therapy (e.g., reduced arrhythmia episodes such as fibrillations or fibrillation episodes and/or shorter duration of fibrillation episodes; reduced palpitations/sensation of arrhythmias; improved rate control of arrhythmias such as a decrease in heart rate of about or at least about 10%, 20%, 30%, 40%, or more compared to pre-treatment (with or without cessation of the arrhythmia); prevention or reduction in the rate of embolic events such as stroke associated with atrial fibrillation; and/or modulation, e.g., decreasing systolic, diastolic, and/or mean blood pressure). In some embodiments, therapy can prevent or reduce the recurrence rate of fibrillation in people with persistent atrial fibrillation (AF) after pharmaco- or electro-cardioversion; or the number and duration of fibrillation episodes in paroxysmal AF patients, including but not limited to reducing the number of arrhythmia recurrent episodes after an ablation procedure. In some embodiments, therapy can reduce or eliminate the number, dose, and/or frequency of medications that a patient may need to take for their underlying arrhythmia, advantageously reducing side effects/potential toxicities. In some embodiments, therapy can have an unexpectedly synergistic effect when combined with one, two, or more pharmacologic agents such as a rate-control agent (e.g., a beta-blocker such as for example atenolol, metoprolol, propranolol, carvedilol; a calcium-channel blocker such as for example nifedipine, amlodipine, diltiazem, or verapamil; or a cardiac glycoside such as digoxin) and/or an anti-arrhythmic agent (e.g., quinidine, procainamide, disopyramide, lidocaine, mexiletine, flecainide, propafenone, sotalol, ibutilide, dofetilide, amiodarone or dronedarone). In some embodiments, a cardiac glycoside such as digoxin can be administered orally, intravenously, or another route along with peripheral nerve stimulation protocols such as described herein for an unexpected synergistically beneficial effect in treating cardiac arrhythmias, cardiac dyssynchrony, and/or hypertension. Not to be limited by theory, *digitalis* glycosides and cardiac glycosides, sometimes referred to as digoxin or deacetyllanatoside C, can modulate arterial baroreflex mechanisms in humans. A diminishing of the baroreceptor reflex can lead to continuous and excessive sympathetic activity, which in turn can lead to an increase in heart rate, blood pressure, and the initiation and maintenance of cardiac dysrhythmias. Abnormal baroreceptor function can be related to elevated activation of the sodium-potassium ATPase pump; *digitalis* glycosides and cardiac glycosides act to decrease this elevated activation, which leads to increased sensitivity of the baroreceptors, including sensitivity to stimulation. Thus, multi-modal stimulation of peripheral nerves that modulates the baroreceptors, e.g., median, radial, ulnar or cutaneous fibers of the arm, can have an unexpectedly synergistic effect with *digitalis* glycosides and cardiac glycosides to inhibit elevated sympathetic activity; the glycosides increase sensitivity of the baroreceptor reflex, and stimulation activates the baroreceptor reflex. This synergistic effect can be advantageous by reducing the required dosage of the glycosides to treat cardiac dysfunction, such as hypertension or cardiac dysrhythmias, as the therapeutic index of digoxin is very narrow and severe toxic effects may occur at plasma concentrations only twice the therapeutic plasma concentration range. In some embodiments, the dose of cardiac glycoside, such as digoxin, administered to the patient can be much less than conventionally prescribed, such as about or less than about 3, 2.8, 2.6, 2.4, 2.2, 2.0, 1.8, 1.6, 1.4, 1.2, 1.0, 0.8, 0.6, 0.4 or 0.2 mcg/kg per day. In some embodiments, the dose of cardiac glycoside can be titrated to a blood level that is less than therapeutic, for example, about or less than about 1.5, 1.4, 1.3, 1.2, 1.1, 1.0, 0.9, 0.8, 0.7, 0.6, 0.5, 0.4, 0.3, 0.2, or 0.1 ng/ml. In some embodiments, the digoxin is provided in single-dose forms of administration (e.g., a tablet) of about or less than about 250 mcg, 125 mcg, 62.5 mcg, 31.25 mcg, 16 mcg, 8 mcg, 4 mcg, 2 mcg, 1 mcg, or less.

In some embodiments, disclosed herein are multi-modal device systems and methods for stimulating a plurality of nerves for the treatment of cardiac dysfunction. Stimulation of 2, 3, or more nerves or dermatomes, such as the median, median cutaneous, radial, and/or ulnar nerve could be used for the treatment of conditions such as cardiac dysrhythmia. Dual nerve stimulation can in some cases synergistically increase the effectiveness of therapy by an effect at the brachial plexus, the proximal location where individual nerves converge near the spinal cord. For example, in one embodiment, the devices disclosed herein are used to stimulate two nerves (including but not limited to the median, radial, ulnar, or median cutaneous nerve) located at a distance from the brachial plexus at two different times, wherein, ultimately, the brachial plexus is stimulated by both signals from two or more nerves substantially simultaneously (e.g., less than about 2 ms, 1 ms, 0.5 ms, 0.4 ms, 0.3 ms, 0.2 ms, 0.1 ms, 0.09 ms, 0.08 ms, 0.07 ms, 0.06 ms, 0.05 ms, 0.04 ms, 0.03 ms, 0.02 ms, 0.01 ms, or less), but could be higher in some cases. In one embodiment, the two nerves are offset (in terms of timing of stimulation) by 0.1-3.0 ms. In one embodiment, two, three, four or more nerves located at a distance from a target (including but not limited to the brachial plexus) are stimulated at different times in order to hit the target at substantially the same time. In some embodiments, the system can be configured to independently control stimulation of a first target nerve (including stimulation parameters such as frequency and others listed herein) and a second target nerve respectively. In other words, the first target nerve and the second target nerve can be stimulated with either the same or different parameters, and can be stimulated simultaneously or in alternating or other fashion. In some embodiments, the stimulation systems can include a plurality of independent stimulation circuits, or a common circuit with a controller configured to switch stimulation parameters for one, two, or more nerves.

Embodiments of the invention can include a device and system and method to measure and collect biological data (e.g., heart rate, heart rate variability, ECG, galvanic skin response, temperature, and blood pressure), analyze the data as to interpret how these measures may influence cardiac rhythm and/or blood pressure, and provide peripheral nerve stimulation that targets one or more individual nerves, such as the median, ulnar, and/or radial nerve, to treat or prevent cardiac dysrhythmias, reduce cardiac dyssynchrony, and/or reduce blood pressure, where the stimulation applied may or may not be modified based on the measured data.

In some embodiments, multi-modal systems and methods can include a monitor unit which can be a wearable monitor having a housing with a user interface. The housing can use a plurality of sensors to collect, store, and analyze biological measures about the wearer including, but not limited to, blood pressure, motion (e.g., accelerometers, gyroscopes, magnetometer, bend sensors), muscle activity (e.g., EMG using electrodes), cardiovascular rhythm measures (e.g., heart rate, heart rate variability, or ventricular and/or atrial dyssynchrony using electrodes to measure ECG, heart rhythm abnormalities), skin conductance (e.g., skin conductance response, galvanic skin response, using electrodes), respiratory rate, skin temperature, pupil diameter, and sleep state (e.g., awake, light sleep, deep sleep, REM). Heart rhythm measures can be recorded with optical, electrical, and/or accelerometery-based sensors. In particular, studies have shown that increased stress levels can increase blood pressure. Activities such as exercise, can also affect cardiac rate and/or rhythm, and/or affect blood pressure—measuring accelerometry (motion), heart rate, etc. could help identify these activities and normalize the measurements by similar activities. Additionally, hypertension has been correlated with heart failure—measuring ventricle dyssynchrony with ECG sensors could help identify the effectiveness of the stimulation to chronically reduce hypertension. Thus, using standard statistical analysis, machine learning, deep learning, or big data techniques—such as a logistical regression or Naïve Bayes classifier, these biological measures can be analyzed to assess a person's state, such as level of stress, which in turn, can serve as a predictor for increases in cardiac dysrhythmia, cardiac dyssynchrony, and/or blood pressure. In some embodiments, the device can provide stimulation based on measurements of one or more biological measures, a determination of a person's state, and/or a prediction of cardiac dysrhythmia, cardiac dyssynchrony, and/or a change in blood pressure.

In some embodiments, the responsiveness could be dependent on activity. For instance in arrhythmias that may be exacerbated with activity, a motion sensor such as an accelerometer or gyroscope could sense if a person is exercising, for example. During that time, the device could turn on to provide appropriate stimulation. In some embodiments, the device could turn off once the activity is complete. In some embodiments, the sensors could activate stimulation during periods of no activity (e.g., when the subject is sleeping).

In some embodiments, the responsiveness of stimulation could be dependent on one, two, or more sensors housed in the device to collect, store, and analyze biological measures about the wearer including, but not limited to, motion (e.g., accelerometers, gyroscopes, magnetometer, bend sensors), ground reaction force or foot pressure (e.g., force sensors or pressure insoles), muscle activity (e.g., EMG), cardiovascular measures (e.g., heart rate, heart rate variability (HRV), photoplethysmography (PPG), or ventricular and/or atrial dyssynchrony using electrodes to measure ECG and/or heart rhythm abnormalities), skin conductance (e.g., skin conductance response, galvanic skin response), respiratory rate, skin temperature, pupil diameter, and sleep state (e.g., awake, light sleep, deep sleep, REM). Using standard statistical analysis, machine learning, deep learning, or big data techniques, such as a logistical regression or a Naïve Bayesian classifier, these biological measures can be analyzed to assess the wearer's activity state, such as sedentary versus active, level of stress and the like, which in turn, can serve as a predictor for changes in blood pressure, cardiac arrhythmias, or cardiac dyssynchrony.

Sympathetic and parasympathetic activity can be measured through several methods, including microneurography (MSNA), catecholamine tests, heart rate, HRV, or galvanic skin response as described elsewhere herein.

HRV measurements in subjects with cardiovascular disease can be significantly different compared to controls. Through frequency-domain analysis, heartbeat frequencies can be separated into distinct bands. High-frequency signals (between about 0.15 Hz and about 0.4 Hz) can almost exclusively reflect parasympathetic activity, and low-frequency signals (between about 0.04 Hz and about 0.15 Hz) can represent a mixture of sympathetic and parasympathetic activity. In some embodiments, taking the ratio of high frequency (HF) to low frequency (LF) signals yields an approximation of one's sympathetic tone. Very low frequency (VLF) signals (between about 0.004 Hz and about 0.040 Hz) can also be evaluated to assess parasympathetic activity. The total power of HRV in the frequency domain can also be evaluated to assess autonomic activity.

Sympathetic and parasympathetic functions can also be evaluated, for example, by analyzing mean normal-to-normal intervals, e.g., all intervals between adjacent QRS complexes of measured cardiac rhythm, including the number of interval differences of successive NN intervals greater than 50 milliseconds; square root of the mean squared differences of successive NN intervals, and standard deviation of the NN intervals.

In some embodiments, sympathetic activity can also be assessed using more traditional techniques, such as measuring blood pressure changes before release and before starting a hand grip exercise, or measuring blood pressure changes before and after immersing the hand in a bath of cold water (e.g., cold pressor test). Parasympathetic activity can be assessed by measuring heart rate response during deep breathing, or heart rate response to standing from lying or seated position (orthostatics), or by changing the orientation of a person's body using, for example, a tilt table. Both sympathetic and parasympathetic activity can be assessed during the Valsalva maneuver (e.g., blowing into a mercury manometer and maintaining a pressure of about or at least about 40 mmHg), or orthostatic heart rate response (e.g., to standing from lying or seated position).

In some embodiments, one, two, or more additional sensors are disposed in the device, including electrical and/or accelerometer sensors in contact with the wearer's skin to measure cardiac activity or pressure sensors to measure changes in blood vessels, to be used in combination with an optical sensor to improve the fidelity of heart rate measurement.

In some embodiments, the system and device have memory and a processor to extract RR intervals from sensor data, calculate variability of RR intervals, transform data into frequency domain, and calculate high frequency signals, low frequency signals, and the ratio of the high frequency and low frequency signals. In some embodiments, the system could store cardiac events, such as arrhythmias, tachycardias, bradycardia, etc.

In some embodiments, the heart rate sensor can store collected data for specified time period to gather adequate date for heart rate variability calculation. Specified time period can range in some cases from 1-60 seconds, and may extend to 10 minutes or more.

In some embodiments, electrodermal activity, also known as galvanic skin response or skin conductance response, for example, can be measured as disclosed elsewhere herein. In some embodiments, significant changes in sympathetic and/or parasympathetic activity can be used to predict the onset of a ventricular and/or atrial dyssynchrony or heart rhythm abnormalities, and the device can start stimulation to prevent or reduce the duration of the dyssynchrony event. Adjustments could be made in real-time, or in subsequent stimulation sessions. In some embodiments, stimulation frequency can be adjusted to either increase or decrease autonomic activity modulated by a single specific nerve, or multiple nerves. For example, in some embodiments, relatively low frequency stimulation of a target nerve (e.g., below a threshold value, e.g., about 5 Hz) can potentially inhibit the nerve and thus decreases sympathetic activity, while higher frequency stimulation (e.g., above a threshold value, e.g., about 5 Hz) can potentially excite the nerve and thus increases sympathetic activity. Additionally, pulse width of the stimulation waveform can be adjusted to recruit more or less of a specific fiber type, including cutaneous fibers, which can inhibit sympathetic activity. The same effect can occur with the same or other target nerves to regulate parasympathetic activity. In other words, in some embodiments, relatively low frequency stimulation of the target nerve (e.g., below a threshold value, e.g., about 5 Hz) can potentially inhibit the nerve and thus decreases parasympathetic activity, while higher frequency stimulation (e.g., above a threshold value, e.g., about 5 Hz) can potentially excite the nerve and thus increases parasympathetic activity. Not to be limited by theory, depending on the stimulation parameters for example, in some cases stimulating the target nerve can increase or decrease either sympathetic activity, parasympathetic activity, or both. In some embodiments, stimulation of the saphenous nerve can affect sympathetic activity, and stimulation of the tibial nerve can affect parasympathetic activity.

Not to be limited by theory, some arrhythmias including atrial fibrillation can be triggered by simultaneous discharge of vagal and sympathetic activity, which leads to an imbalance of both arms of the autonomic nervous system. In some embodiments, systems and methods can include assessment of sympathovagal balance using measurements of heart rate variability, galvanic skin response, and arrhythmias, e.g., atrial fibrillation events to determine likelihood of response to peripheral stimulation. For example, a device could be worn on the wrist that combines sensors to measure heart rate, such as optical based sensors, and/or galvanic skin response to assess the sympathovagal balance and detect arrhythmia, e.g., atrial fibrillation events, and a stimulation device. The device could measure HRV and/or GSR and detects atrial fibrillation events over a specified period of time, such as 1-3 days, or 1 week, to adjust stimulation parameters (e.g., stimulation frequency, alternating frequency, duration of stimulation, stimulation time of day, pulse width, amplitude, duty cycle, phase, waveform shape, waveform symmetry, pulse spacing, on/off time, bursting) based on an assessment of sympathovagal balance and detection of arrhythmic events. In some embodiments, stimulation of one, two, or more nerves in the upper and/or lower extremity can be combined with stimulation of the auricular branch of the vagus nerve, such as by way of the tragus, to modulate vagal activity and restore balance of the autonomic nervous system.

In some embodiments, a multi-modal system can include a plurality of stimulators that communicate with each other wirelessly and provided a synchronized, patterned stimulation. In some embodiments, multiple stimulators may be in connection with multiple effectors to stimulate multiple nerves simultaneously. In one embodiment, a system can include a stimulator on the wrist to target median nerve and a stimulator in the ear to target the auricular branch of the vagus nerve. Each stimulator in the system can communicate with each other via a wired or wireless connection.

Multiple stimulators can provide synchronized stimulation to the multiple nerves. Stimulation may be, for example, burst, offset, or alternating between the multiple nerves.

The device could also be responsive to number of episodes of symptoms, including chest pain, dyspnea, lightheadedness, and/or palpitations signifying the presence of arrhythmias, cardiac dyssynchrony, and/or abnormal blood pressure in some cases. If more episodes occur in one day, treatment can be increased by increasing the amplitude of the stimulation, duration of the stimulation, or number of treatment sessions, for example.

The number of episodes of symptoms could be detected in various ways to control the stimulation applied by system and devices. In some embodiments, the patient can enter events related to cardiac symptoms, including but not limited to chest pain, dyspnea, lightheadedness, and/or palpitations events on a mobile device.

One embodiment of the system could centrally store biological measures from multiple wearers on a server system (e.g., the cloud), along with other relevant demographic data about each user, including age, weight, height, gender, ethnicity, etc. Data collected from multiple wearers can be analyzed using standard statistical analysis, machine learning, deep learning, or big data techniques, such as a logistic regression or Naive Bayes classifier (or other classifiers), to improve prediction of cardiac dysrhythmia, cardiac dyssynchrony, blood pressure or blood pressure changes by determining correlations between biological measures and other recorded events and cardiac dysrhythmia, cardiac dyssynchrony, and/or increased blood pressure. These correlations can be used to set parameters of the stimulation waveform applied by the therapy unit, determine best time to apply stimulation therapy, and/or adapt the stimulation waveform applied by the therapy unit in real time.

In some embodiments, the wearable monitor can have a visual, auditory, tactile (e.g., squeezing band), or vibrotactile cues to notify the wearer of key events based on analysis of biological measures, including, but not limited to, prediction of cardiac dysrhythmia, cardiac dyssynchrony, blood pressure or increased blood pressure, and/or increase in stress level, heart rate, heart rate variability, or other parameters. The cuing system could also notify the wearer of other predetermined events or reminders set by the wearer. Cuing system is used to communicate information to the wearer, such as the presence of an arrhythmia such as atrial fibrillation, high blood pressure or other predetermined events, in a more discreet, personalized way, without drawing attention from others in social situations.

In some embodiments, the form of the wearable monitor and/or therapy unit could be a wrist band or watch, a ring, a glove, an arm sleeve or arm band or cuff, knee band, sock, leg sleeve or cuff, an ear piece/headphone, head band, a necklace or neck band, or a compliant patch that conforms to multiple locations on the body.

In some embodiments, specific fiber types within a nerve or nerves can be selectively or preferentially activated (e.g., create action potentials in such specific fiber types) to restore autonomic balance by specifically modulating sympathetic and parasympathetic limbs of the autonomic nervous system (e.g., selectively or preferentially only one, or more than one of A-alpha, A-beta, A-delta, B, and/or C fibers). In some embodiments, systems and methods do not stimulate or substantially stimulate A-alpha, A-beta, A-delta, B fibers, or C fibers.

Not to be limited by theory, stimulation of superficial and/or cutaneous afferent and/or efferent nerves can prevent arrhythmias by inhibiting the nucleus of the solitary tract and vagal nuclei, inhibiting the aortic depressor nerve, and thereby the parasympathetic cardiac input; stimulation of deep afferent and/or efferent nerves can prevent arrhythmias by exciting the arcuate nucleus-ventral periaqueductal gray-nuclei raphe pathway, inhibiting the rostral ventrolateral medulla (rVLM) and thereby the sympathetic cardiac input. Superficial fibers are finer (e.g., smaller diameter) afferents that relay sensory information to the superficial dorsal horn, which is a distinct region of the dorsal horn and spinal gray matter; deep fibers are thicker (e.g., larger diameter) afferents that relay sensory information to the deep dorsal horn.

Some embodiments can include preferential stimulation of cutaneous fibers (e.g., A-alpha, A-beta, A-delta, and/or C) fibers to inhibit sympathetic activity of via the stellate ganglion. Stimulation of select cutaneous fibers at the wrist can carry sensory information by way of the medial cutaneous nerve and the medial cord of the brachial plexus, which innervates the spinal cord at the level of C8-T1; stimulation in turn modulates cardiac sympathetic activity by way of the stellate or cervicothoracic ganglion, which are a collection of sympathetic nerves at the level of C7-T1. In some embodiments, peripheral nerve effectors can be positioned, e.g., on the patient's skin such as on the medial side of the forearm as to stimulate the median cutaneous nerve but not stimulate or not substantially stimulate the median, radial, or ulnar nerves, or at least stimulate the medial cutaneous nerve preferentially. In some embodiments, the lateral cutaneous nerve and/or musculocutaneous nerve, or specific fibers thereof can be preferentially or specifically stimulated. In some embodiments, only a single type of nerve fiber is activated, while other types are not activated. For example, in one embodiment, only A-alpha fibers are activated but B fibers are not activated. In one embodiment, 1-5 types of fibers are activated, while leaving one or more fiber types inactivated (or functionally unstimulated). In some embodiments, inactivated fibers do not fire or carry an action potential. In some embodiments, one or more of A-alpha, A-beta, A-delta, B fibers, or C fibers are activated, or not activated. In some embodiments, one or more fibers is preferentially activated, such that a greater number or fraction of one or more fiber types of a particular peripheral nerve is stimulated with respect to other fibers of that peripheral nerve and/or other peripheral nerves proximate the target peripheral nerve. In some embodiments, more than about 50%, 60%, 70%, 80%, 90%, 95%, or substantially all fibers of one or more fiber types of a nerve is activated, while less than about 50%, 40%, 30%, 20%, 10%, 5%, or less of another fiber type is activated, such that there is preferential activation of one or more fiber types with respect to one or more different fiber types of the same nerve and/or other peripheral nerves proximate the target peripheral nerve.

Selective or preferential activation of various nerve fiber types can be accomplished in various ways. In some embodiments, stimulation parameters such as pulse width of a biphasic square wave can be controlled to selectively or preferentially activate specific fiber types (e.g., without activating other fiber types). For example, pulse widths of about 50-100 µs can selectively or preferentially stimulate larger A-alpha fibers; pulse widths of about 150-200 µs can selectively or preferentially stimulate smaller A-delta fibers; and pulse widths of about 300-400 µs can selectively or preferentially stimulate even smaller C fibers.

In some embodiments, frequency of a sine wave pattern can be controlled to selectively or preferentially activate specific fiber types. For example, frequencies of about 2000

Hz, about 250 Hz, and about 5 Hz can selectively or preferentially activate A-beta, A-delta and C afferent fibers, respectively.

In some embodiments, a device can include peripheral nerve effectors configured to selectively or preferentially stimulate superficial nerve fibers (e.g., fibers closer to the surface of the skin) by aligning the effectors along the length of the nerve axon.

Some embodiments can involve one or more multi-modal stimulation patterns (e.g., bursting, pulse patterns, random, pseudo-random, or noise) selected to improve the efficiency and efficacy of stimulation. In some embodiments, stimulation can be provided in a bursting pattern where the bursting can either be rhythmic (e.g., at regular intervals) or pseudorandom. In some embodiments, a stimulation waveform can be provided that combines infraslow stimulation frequency (0.01-0.1 Hz) with a higher frequency stimulation (1-200 Hz), or lower frequency (1-200 Hz) with very high frequencies (1000-10 kHz).

In some embodiments, disclosed herein are wearable systems and methods that can utilize transcutaneous sensory stimulation in the form of a burst pattern, e.g., a theta burst pattern to improve cardiac dysrhythmias, cardiac dyssynchrony, hypertension, and/or a variety of other conditions, including but not limited to those disclosed herein. Noninvasive peripheral nerve theta burst stimulation may be effective in some cases in driving cortical or spinal plasticity more efficiently than continuous stimulation to reduce symptoms and improve an individual's quality of life. Additional details regarding non-limiting bursting parameters are disclosed elsewhere herein.

In some embodiments, the multi-modal stimulation involves non-invasive transcutaneous patterned or burst stimulation of peripheral nerves, including afferent and/or efferent nerves, as noted elsewhere herein.

Not to be limited by theory, alternating bursting stimulation on the medial, radial, and/or ulnar nerves can prevent arrhythmias by having a synergistic effect that increases input to stellate ganglion via the brachial plexus to inhibit sympathetic activity or modulate vagal tone via the carotid sinus nerve.

In some embodiments, median, radial, and/or ulnar stimulation can be combined for a synergistic effect at the brachial plexus. The median, radial, and ulnar nerves innervate different levels of the spinal cord at the brachial plexus, with pathways that proceed to different target locations and organs. Some embodiments can provide timed stimulation, either simultaneously or with a delay, to the median, radial, and/or ulnar nerves to control targeting within the brachial plexus to provide a synergistic effect of neural activation at the brachial plexus, which leads to the stellate ganglia and the sympathetic chain. This synergistic effect can provide an advantage of greater therapeutic benefit with less discomfort and less current (e.g., less power for longer battery life). Timing of the stimulation may be simultaneous, or with a delay to account for differences in conduction velocities for the different nerves such that the signals reach the brachial plexus at the same time. Not to be limited by theory, but simultaneous or near simultaneous activation of the brachial plexus can enhance stimulation through the pathway to the stellate ganglia, and increase the effect (e.g., inhibition) of the sympathetic nervous system. For example, the average conduction velocities of sensory nerves of radial, median, and ulnar nerves are about 51 m/s, 60 m/s, and 63 m/s respectively. Based on variation in nerve length from the wrist to the brachial plexus from 1st percentile female to 99th percentile male, this would require a delay in stimulation between the median and radial nerves of about 1.3 to about 1.7 milliseconds, between median and ulnar of about 0.3 and about 0.4 ms, and between radial and ulnar of about 1.6 ms and about 2.1 ms. In some embodiments the delay in stimulation between a first nerve and a second nerve can be between about 0.3 ms and about 1.7 ms, or between about 0.2 ms and about 2.0 ms, between about 1.2 ms and about 2.1 ms, or between about 1 ms and about 2 ms. Lower threshold stimulation on the median, radial, and/or ulnar nerves in combination can advantageously require lower threshold stimulation on the individual nerves with a resultant synergistic effect at the brachial plexus. In some embodiments, a system could include a nerve conduction velocity measurement by applying a stimulation source on a distal portion of the nerve(s) and a measurement electrode on a proximal portion of the nerve(s) to measure an individual's nerve conduction velocities and modify the timed delay based on the individualized measurements.

In some embodiments, a system could include a peripheral nerve effector configuration to stimulate nerves (e.g., radial, median, and/or ulnar) in an alternating pattern that could be rhythmic or pseudorandom. For rhythmic alternating patterns, the alternating frequency can be in a range from 1-100 Hz, which can improve efficiency of therapy by promoting plasticity of corticospinal circuits. In some embodiments, a device embodiment could include an effector configuration to alternate stimulation of nerves (e.g., radial, median, and/or ulnar) and adjust stimulation parameters (e.g., stimulation frequency, alternating frequency, duration of stimulation, stimulation time of day, pulse width, amplitude, duty cycle, phase, waveform shape, waveform symmetry, pulse spacing, on/off time, or bursting) based on an assessment of autonomic balance, for example, by measuring heart rate variability (HRV) and analyzing sympathovagal balance as a the ratio of absolute low frequency (LF) to absolute high frequency (HF) power, or LF/HF of measured HRV as noted elsewhere herein.

In some embodiments, disclosed herein are multi-modal methods for treating cardiac arrhythmias or hypertension. The methods can include any number of the following: positioning a first peripheral nerve effector on a patient's skin on an upper extremity of the patient to stimulate a first peripheral nerve selected from the group consisting of one of a median nerve, radial nerve, and ulnar nerve of the patient; positioning a second peripheral nerve effector on a tragus of an ear or auricular vagus (e.g., via the cymba concha) of the patient to stimulate a second peripheral nerve associated with a parasympathetic nervous pathway of the patient; delivering a first nerve stimulation signal to the first peripheral nerve effector to stimulate the first peripheral nerve sufficient to modify at least one brain or spinal cord autonomic feedback loop relating to the cardiac arrhythmia or hypertension; and delivering a second nerve stimulation signal to the second peripheral nerve effector to stimulate the second peripheral nerve sufficient to modify at least one brain or spinal cord autonomic feedback loop relating to the cardiac arrhythmia or hypertension. The second nerve stimulation signal may have the same or different stimulation parameters as the first nerve stimulation signal. The first nerve stimulation signal and the second nerve stimulation signal can be configured to balance parasympathetic and sympathetic nervous system activity of the patient. The method can also include monitoring sympathetic and parasympathetic activity in the patient. The method can also include adjusting the first nerve stimulation signal upon identifying abnormal sympathetic activity in the patient. The method can also include adjusting the second nerve stimulation signal upon identifying abnormal parasympathetic activity in the patient.

Also disclosed herein in some embodiments is a multi-modal wearable system for treating cardiac arrhythmias or hypertension. The system can include any number of the following features, or others disclosed elsewhere in the specification. The system can include a first peripheral nerve effector configured to be positioned on a patient's skin on an extremity of the patient; a second peripheral nerve effector configured to be positioned on a tragus of an ear or auricular vagus (e.g., via the cymba concha) of the patient; and/or at least one biomedical sensor or data input source configured to provide feedback information. The controller can be configured to generate a first nerve stimulation signal to the first peripheral nerve effector to stimulate a first peripheral nerve sufficient to modify at least one brain or spinal cord autonomic feedback loop relating to the cardiac arrhythmia or hypertension. The controller can also be configured to generate a second nerve stimulation signal to the second peripheral nerve effector to stimulate a second peripheral nerve associated with a parasympathetic nervous pathway of the patient to modify at least one brain or spinal cord autonomic feedback loop relating to the cardiac arrhythmia or hypertension. The controller can also be configured to adjust the first nerve stimulation signal and the second nerve stimulation signal to balance parasympathetic and sympathetic nervous system activity of the patient. The controller can be configured to adjust the first nerve stimulation signal upon identifying abnormal sympathetic and/or parasympathetic activity in the patient.

Also disclosed herein is a multi-modal method for treating cardiac arrhythmias or hypertension. The method can include any number of assessing at least one of sympathetic and parasympathetic activity of a subject and determining the presence of abnormal sympathetic or parasympathetic activity in the subject; stimulating a first nerve associated operably connected to the brachial plexus sufficient to have a therapeutic effect on cardiac arrhythmias or hypertension if abnormal sympathetic activity is present; and stimulating the tragus of the ear or auricular vagus (e.g., via the cymba concha) sufficient to have a therapeutic effect on cardiac arrhythmias or hypertension if abnormal parasympathetic activity is present. Stimulation can be in some cases only transcutaneous stimulation, can include exciting or inhibiting nerve activity of the first nerve. Stimulating can involve both the first nerve and the tragus of the ear or auricular vagus (e.g., via the cymba concha) if both abnormal sympathetic activity and abnormal parasympathetic activity are present. Assessing at least one of sympathetic and parasympathetic activity of a subject comprises measuring HRV in the subject, such as with a wrist-worn device, and also include measuring heart rate and/or electrodermal activity. The first nerve can be, for example, the median, radial, ulnar, median cutaneous, lateral cutaneous, or other nerves as discussed herein. Adjustments can include types of energy, stimulation parameters (e.g., frequency, amplitude, pulse width, pulse spacing, phase, waveform shape, waveform symmetry, duration, duty cycle, on/off time, bursting, etc.), time of day stimulation is applied, etc.

Also disclosed herein are multi-modal methods of treating cardiac arrhythmias or hypertension, that can involve stimulating a first peripheral nerve; assessing at least one of sympathetic and parasympathetic activity of a subject and determining abnormal sympathetic or parasympathetic activity in the subject; and adjusting the stimulation based upon assessing the at least one of sympathetic and parasympathetic activity. Adjusting the stimulation can include identifying abnormal sympathetic or parasympathetic activity in the patient, and adjusting the frequency of stimulation of the first nerve, and/or discontinuing stimulation of the first nerve; and initiating stimulation of a second nerve.

In several embodiments, the embodiments described herein that include multiple peripheral nerve stimulation to promote sympathovagal balance with at least one peripheral nerve modulating the sympathetic nervous system and at least one peripheral nerve modulating the parasympathetic nervous system can advantageously have the ability to selectively or preferentially modulate either sympathetic and/or parasympathetic arms of the autonomic nervous system in response to detected sympathetic and/or parasympathetic overactivity.

For essential tremor and other movement disorders, cardiac dysfunction, overactive bladder, gastrointestinal diseases, inflammatory bowel diseases, psychiatric disorders and other indications, A first stimulator may comprise an electrical stimulator and a second stimulator may comprise a magnetic stimulator. A first stimulator may comprise an electrical stimulator and a second stimulator may comprise a chemical stimulator. A first stimulator may comprise an electrical stimulator and a second stimulator may comprise a thermal stimulator. A first stimulator may comprise an electrical stimulator and a second stimulator may comprise a mechanical stimulator. A first stimulator may comprise an electrical stimulator and a second stimulator may comprise an ultrasonic stimulator (e.g., focused ultrasound). A first stimulator may comprise an electrical stimulator and a second stimulator may comprise a radiofrequency stimulator. A first stimulator may comprise an electrical stimulator and a second stimulator may comprise a microwave stimulator. A first stimulator may comprise a magnetic stimulator and a second stimulator may comprise a chemical stimulator. A first stimulator may comprise a magnetic stimulator and a second stimulator may comprise a thermal stimulator. A first stimulator may comprise a magnetic stimulator and a second stimulator may comprise a mechanical stimulator. A first stimulator may comprise a magnetic stimulator and a second stimulator may comprise an ultrasonic stimulator, e.g., focused ultrasonic stimulator (e.g., focused ultrasound). A first stimulator may comprise a magnetic stimulator and a second stimulator may comprise a radiofrequency stimulator. A first stimulator may comprise a magnetic stimulator and a second stimulator may comprise a microwave stimulator. A first stimulator may comprise a chemical stimulator and a second stimulator may comprise a thermal stimulator. A first stimulator may comprise a chemical stimulator and a second stimulator may comprise a mechanical stimulator. A first stimulator may comprise a chemical stimulator and a second stimulator may comprise a focused ultrasonic stimulator (e.g., focused ultrasound). A first stimulator may comprise a chemical stimulator and a second stimulator may comprise a radiofrequency stimulator. A first stimulator may comprise a chemical stimulator and a second stimulator may comprise a microwave stimulator. A first stimulator may comprise a thermal stimulator and a second stimulator may comprise a mechanical stimulator. A first stimulator may comprise a thermal stimulator and a second stimulator may comprise a focused ultrasonic stimulator (e.g., focused ultrasound). A first stimulator may comprise a thermal stimulator and a second stimulator may comprise a radiofrequency stimulator. A first stimulator may comprise a thermal stimulator and a second stimulator may comprise a microwave stimulator. A first stimulator may comprise a mechanical stimulator and a second stimulator may comprise a focused ultrasonic stimulator (e.g., focused ultrasound). A first stimulator may comprise a mechanical stimulator and a second stimulator may comprise a radiofrequency stimulator. A first stimulator may comprise a mechanical stimulator and a second stimulator may comprise a microwave stimulator. A first stimulator may comprise a focused ultrasonic stimulator (e.g., focused ultrasound) and a second stimulator may comprise a radiofrequency stimulator. A first stimulator may comprise an ultrasonic (e.g., focused ultrasound) stimulator and a second stimulator may comprise a microwave stimulator. A first stimulator may comprise a radiofrequency stimulator and a second stimulator may comprise a microwave stimulator.

Figure 27A:
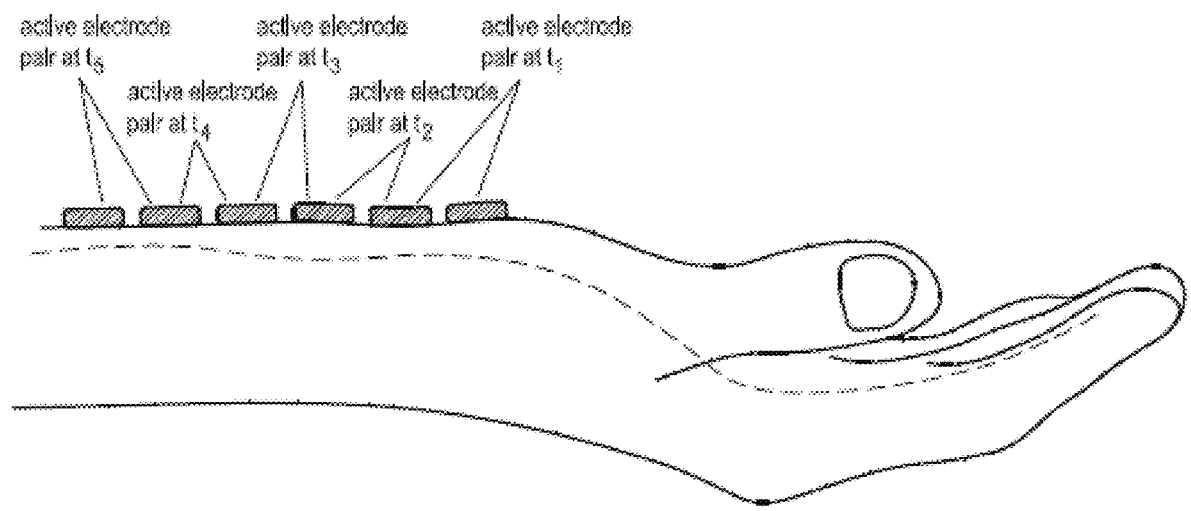
FIG. 27A illustrates an embodiment of a system that can be configured to stimulate multiple dermatomes in a timed manner.

FIG. 27A illustrates a system that can be configured to stimulates multiple dermatomes in a timed manner with an array of electrodes embedded in a sleeve across the arm by stimulating adjacent pairs of electrodes at regular intervals such that specific points along the nerve are stimulated. Electrodes may be arranged in a linear array, for example to provide spatially patterned stimulation. Multi-modal stimulation may include application of different patterns to an array of electrodes (e.g., a linear array of pairs of electrodes). Dermatomes in the arm that carry sensory information that can be stimulated, include, for example, C5 (lateral aspect of the upper extremity at and above the elbow); C6 (the forearm and radial side of the hand); C7 (the middle finger); C8 (the skin over the little finger and the medial aspect of each hand); T1 (the medial side of the forearm); and T2 (the medial and upper aspect of the arm and the axillary region).

Some embodiments can involve stimulation patterns (e.g., bursting, pulse patterns, random, pseudo-random, or noise) selected to improve the efficiency and/or efficacy of stimulation. In some embodiments, for example as illustrated schematically in FIG. 27A, an array of electrodes can be aligned along the axon of the nerve and adjacent pairs of electrodes can be stimulated at regular intervals such that specific points along the nerve are stimulated at a velocity of, for example, between about 1 cm/s and about 10 cm/s (e.g., about 1 cm/s, about 2 cm/s, about 3 cm/s, about 4 cm/s, about 5 cm/s, about 6 cm/s, about 7 cm/s, about 8 cm/s, about 9 cm/s, about 10 cm/s, and ranges between such values). In some embodiments, stimulation can be provided in a bursting pattern where the bursting can either be rhythmic (e.g., at regular intervals) or pseudorandom. In some embodiments, a stimulation waveform can be provided that combines infraslow stimulation frequency (0.01-0.1 Hz) with a higher frequency stimulation (1-200 Hz), or lower frequency (1-200 Hz) with very high frequencies (1000-10 kHz).

Transverse electrode configuration could provide interferential stimulation at a location below the surface of the skin. Multiple modes could be used to create different interferential patterns. Interference could be constructive or destructive. Each electrode pair could have the same stimulation parameters, or different parameters. For example, different stimulation frequencies could create deconstructive interference that stimulates at new beat frequency (e.g., the difference between the two different frequencies).

Figure 27B:
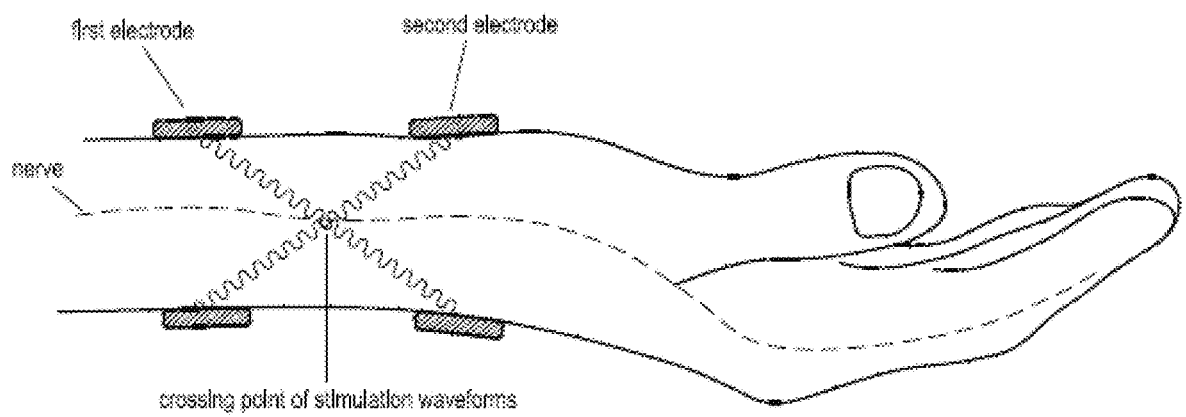
FIG. 27B illustrates an embodiment of electrode alignments for selective or preferential activation of nerve fibers.

In some embodiments, the electrode pairs can be spaced on the limb, as shown in FIG. 27B, such that the stimulation waveforms combine at a specific crossing point to target deep fibers in the limb by creating an interferential pattern of stimulation with a frequency that is the difference between the frequencies of the two waveforms, e.g., between about 2 Hz and about 20 kHz (e.g., about 2 Hz, about 4 Hz, about 6 Hz, about 8 Hz, about 10 Hz, about 12 Hz, about 15 Hz, about 20 Hz, about 30 Hz, about 40 Hz, about 50 Hz, about 60 Hz, about 100 Hz, about 250 Hz, about 500 Hz, about 1000 Hz, about 2500 Hz, about 5 kHz, about 10 kHz, about 15 kHz, about 20 kHz, and ranges between such values). Higher an lower frequencies are also possible.

EXAMPLES

The following examples are illustrative only and not intended to be limiting.

Figure 1:
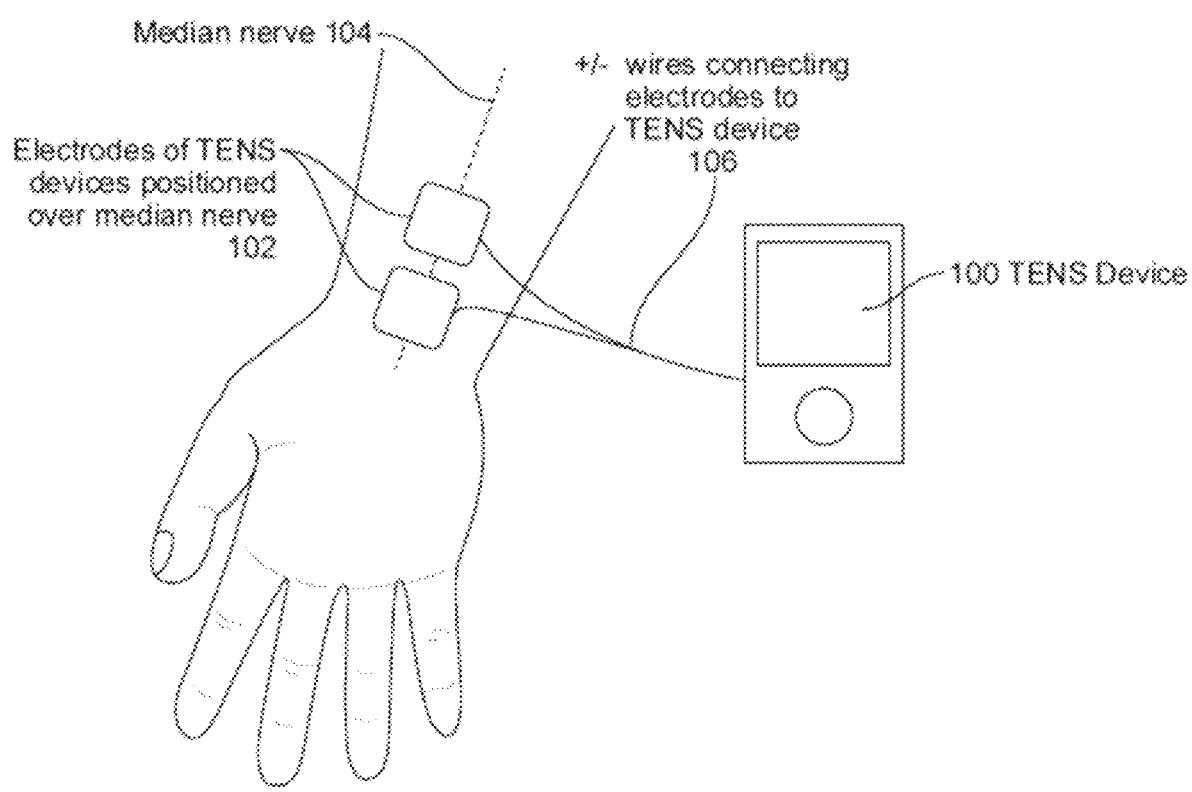
FIG. 1 illustrates one embodiment of delivering stimulation to the median nerve found to reduce tremor.

We evaluated the method of using peripheral nerve stimulation to alter the circuit dynamics associated with ET in a clinical study. A device 100 that delivers transcutaneous electrical nerve simulation (TENS) using surface electrodes 102 positioned on the palmar side of the wrist was used to stimulate the median nerve 104 with square waves at a frequency of 150 Hz with a pulse width of 300 microseconds for 40 minutes, as illustrated in FIG. 1. Wires 106 were used in this embodiment to connect the device 100 to the electrodes 102. It was surprising to discover that the tremor was reduced because previous work reported that peripheral nerve stimulation using TENS did not improve tremor.

This electrical stimulation effectively reduced the tremor in subjects with tremors ranging in severity from mild to severe. Kinetic tremors were evaluated using a widely used measure of kinetic tremor: the Archimedes Spiral drawing task of the Fahn Tolosa Marin test. Postural tremors were evaluated by measuring the angular velocity of gyroscopes worn on the back on the hand.

Figure 2A:
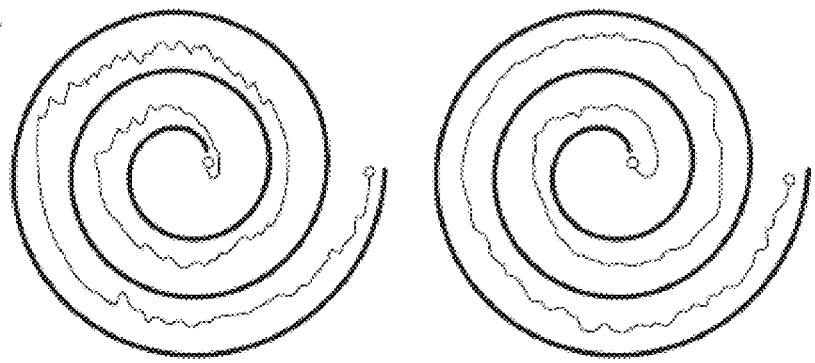
FIGS. 2A-2C illustrate treatment effect of an embodiment of peripheral nerve stimulation in a mild (FIG. 2A), moderate (FIG. 2B), and severe (FIG. 2C) ET patient. It presents results of a clinical study in which a patient with essential tremor reduced tremor amplitude by the configuration of stimulation at 150 Hz frequency, 300 μs, and for 40 minutes of stimulation on-time. The tremor reduction, shown by comparing the ET patient's ability to draw a spiral, was observed immediately after the stimulation was turned off.
Figure 2B:
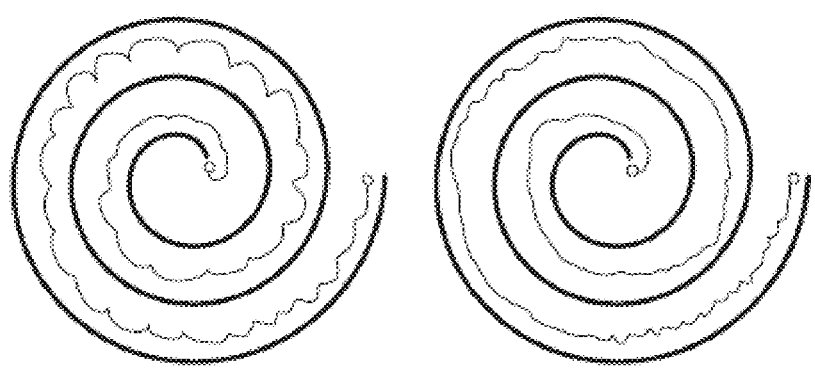
Figure 2C:
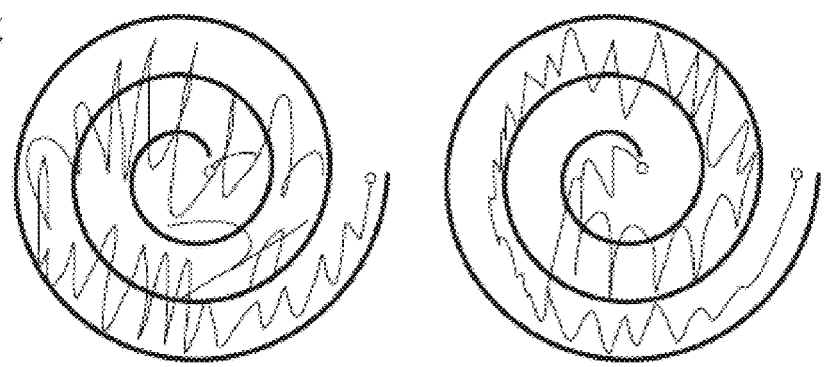

Three patients, represented as subject A, B, and C in FIG. 2, show spirals drawn by subjects with mild, moderate and severe ET before and after stimulation. The postural tremor reductions were 70%, 78% and 92%, respectively, in the subjects with mild, moderate and severe tremor. Postural tremor could also be reduced with electrical stimulation, and this effect was maintained up to 45 minutes after the end of treatment. FIGS. 3A-3C shows the effect on wrist flexion-extension as determined from gyroscopic data in subject B from FIG. 2 as a representative example. Fifteen minutes of treatment reduced the tremor amplitude from 0.9 degrees (FIG. 3A) to 0.2 degrees (FIG. 3B). This reduction in tremor amplitude was maintained through 40 minutes of treatment. A measurement taken 20 minutes after treatment showed the tremor amplitude continued to be reduced and was maintained at 0.2 degrees (FIG. 3C). The tremor reduction was variable between subjects. Some subjects did not respond to therapy, as shown in FIG. 4.

Great therapeutic results were achieved by reducing the tremor in subjects with ET through the application of electrical stimulation. The stimulation was able to reduce tremor during the treatment, immediately after the treatment, and up to twenty minutes after treatment. To enable chronic use and allow patients with ET to integrate the treatment into their lives, the system is made convenient to use and effective over a long duration in many embodiments. The innovations and devices described herein are used achieve this goal in several embodiments.

In another example, a multi-modal approach will be used, which, in some embodiments, will use algorithmic learning and/or feedback. At least two stimuli will be selected from the following group: vibrotactile, chemical, mechanical, thermal, electrical, ultrasound (e.g., ultrasonic, focused ultrasound), RF and microwave and applied to the same or different location on or within the body. For example, a first stimulus will be applied to the wrist and a second, different stimulus will be applied at a different location (ankle, finger, ear, leg, arm, etc.). Alternatively, a first stimulus will be applied to a first location (e.g., the wrist) and a second, different stimulus will be applied to same first location. In another example, using different points in the same region may also offer synergy (e.g., different points on the wrist). The same or different nerves can be stimulated on the first location. For example, different nerves (or multiple location points) in one region will be stimulated in some embodiments.

Various embodiments of various disease altering devices and methods, including but not limited to tremor altering devices and methods for using it have been disclosed above. These various embodiments may be used alone or in combination, and various changes to individual features of the embodiments may be altered, without departing from the scope of the invention. For example, the order of various method steps may in some instances be changed, and/or one or more optional features may be added to or eliminated from a described device. Therefore, the description of the embodiments provided above should not be interpreted as unduly limiting the scope of the invention as it is set forth in the claims.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

The foregoing description and examples has been set forth to illustrate the disclosure according to various embodiments and are not intended as being unduly limiting. The headings provided herein are for organizational purposes only and should not be used to limit embodiments. Each of the disclosed aspects and examples of the present disclosure may be considered individually or in combination with other aspects, examples, and variations of the disclosure. In addition, unless otherwise specified, none of the steps of the methods of the present disclosure are confined to any particular order of performance. References cited herein are incorporated by reference in their entirety. The description of an embodiment as "preferred" does not limit the use or scope of alternative embodiments.

While the methods and devices described herein may be susceptible to various modifications and alternative forms, specific examples thereof have been shown in the drawings and are herein described in detail. It should be understood, however, that the embodiments disclosed should cover modifications, equivalents, and alternatives falling within the spirit and scope of the various embodiments described herein and the appended claims.

Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some examples, acts or events can be performed concurrently, e.g., through multi-threaded processing, interrupt processing, or multiple processors or processor cores or on other parallel architectures, rather than sequentially.

The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed.

The various illustrative logical blocks, modules, processes, methods, and algorithms described in connection with the embodiments disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, an optical disc (e.g., CD-ROM or DVD), or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that some examples include, while other examples do not include, certain features, elements, and/or states. Thus, such conditional language is not generally intended to imply that features, elements, blocks, and/or states are in any way required for one or more examples or that one or more examples necessarily include logic for deciding, with or without author input or prompting, whether these features, elements and/or states are included or are to be performed in any particular embodiment.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 hour" includes "1 hour." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure. The phrase "at least one of" is intended to require at least one item from the subsequent listing, not one type of each item from each item in the subsequent listing. For example, "at least one of A, B, and C" can include A, B, C, A and B, A and C, B and C, or A, B, and C.

What is claimed is:

1. A method of treating tremor in a subject, the method comprising:
    applying a first stimulation from a first actuator to a first location on a body of the subject,
        wherein the first location is a first skin surface of a wrist of the body,
        wherein the first stimulation is therapeutically effective and comprises a current applied by electrical stimulation; and
    applying a second stimulation from a second actuator to a second location on the body,
        wherein the second location is a second skin surface of the wrist of the body,
        wherein the second stimulation is therapeutically effective and comprises a plurality of vibratory stimulations,
        wherein the second actuator comprises a phased array of piezoelectric elements;
        wherein a first piezoelectric element of the phased array of piezoelectric elements is configured to vibrate at a first piezoelectric frequency of between about 20 kHz and about 2 MHz;
        wherein a second piezoelectric element of the phased array of piezoelectric elements is configured to vibrate at a second piezoelectric frequency of between about 20 kHz and about 2 MHz;
        wherein the first piezoelectric frequency is different than the second piezoelectric frequency;
        wherein the first piezoelectric element is configured to vibrate at the first piezoelectric frequency for a first duration and the second piezoelectric element is configured to vibrate at the second piezoelectric frequency for a second duration,
    wherein at least one of applying the first stimulation or applying the second stimulation is responsive to a controller in a smart device and based on a sensed amplitude of the tremor,
    wherein, after applying the first stimulation and applying the second stimulation, the amplitude of the tremor is reduced,
    wherein the first stimulation and the second stimulation both modulate one or more afferent nerves specifically associated with a peripheral pathway, and
    wherein both the first actuator and the second actuator are coupled to the wrist of the body using a single flexible cuff.

2. The method of claim 1, further comprising applying a third stimulation from a third actuator to a third location on the body, wherein the third stimulation comprises vibratory stimulation, and wherein the third actuator comprises a third actuator piezoelectric element configured to vibrate at a third piezoelectric frequency.

3. The method of claim 2, wherein the third piezoelectric frequency is different from the second piezoelectric frequency.

4. The method of claim 2, wherein the third piezoelectric frequency is between 10 Hz and 500 Hz.

5. The method of claim 4, wherein the third piezoelectric frequency is between 10 Hz and 30 Hz.

6. The method of claim 2, wherein the third location comprises a third skin surface of the wrist of the body.

7. The method of claim 1, wherein the second piezoelectric frequency is between about 20 kHz and about 1.5 MHz.

8. The method of claim 1, wherein the second piezoelectric frequency is between about 20 kHz and about 1 MHz.

9. The method of claim 1, wherein the first piezoelectric frequency is between about 20 kHz and about 1.5 MHz.

10. The method of claim 1, wherein the first piezoelectric frequency is between about 20 kHz and about 1 MHz.

11. A method of treating tremor in a subject, the method comprising:
    applying an electrical stimulation current from a first actuator to a first location on a first peripheral body part of the subject,
        wherein the first location is below a first skin surface of a wrist of the first peripheral body part;
    measuring a first effectiveness of the electrical stimulation current with one or more sensors;
    adjusting, based at least in part on the first effectiveness measured by the one or more sensors, one or more modality parameters of a vibratory stimulation; and
    applying the vibratory stimulation from a second actuator to a second location on the first peripheral body part of the subject,
        wherein the second location is below a second skin surface of the wrist of the first peripheral body part,
        wherein the second actuator comprises a first piezoelectric element configured to apply focused ultrasound at a first piezoelectric frequency of between about 20 kHz and about 2 MHZ,
    wherein at least one of applying the electrical stimulation current or applying the vibratory stimulation is responsive to a controller in a smart device and based on a sensed amplitude of the tremor,
    wherein, after applying the electrical stimulation current and applying the vibratory stimulation, the amplitude of the tremor is reduced,
    wherein the electrical stimulation current and the vibratory stimulation both specifically modulate one or more afferent nerves associated with a peripheral pathway,
    wherein both the first actuator and the second actuator are coupled to a wrist of the first peripheral body part of the subject using a single flexible cuff,
    wherein the one or more modality parameters adjusted of the vibratory stimulation enhances efficacy of the vibratory stimulation, wherein the second actuator further comprises a second piezoelectric element configured to apply focused ultrasound at a second piezoelectric frequency between about 20 kHz and about 2 MHZ, wherein the first piezoelectric frequency is different than the second piezoelectric frequency; and wherein the first piezoelectric element is configured to transcutaneously apply focused ultrasound at the first piezoelectric frequency for a first duration and the second piezoelectric element is configured to transcutaneously apply focused ultrasound at the second piezoelectric frequency for a second duration.

12. The method of claim 11, further comprising applying a third stimulation from a third actuator to a third location on the first peripheral body part, wherein the third stimulation comprises vibratory stimulation, and wherein the third actuator comprises a piezoelectric element configured to vibrate at a third actuator frequency.

13. The method of claim 12, wherein the third actuator frequency is different from the second actuator piezoelectric frequency.

14. The method of claim 12, wherein the frequency of the third actuator is between 10 Hz and 500 Hz.

15. The method of claim 14, wherein the frequency of the third actuator is between 10 Hz and 30 Hz.

16. The method of claim 11, wherein the first piezoelectric frequency is between about 20 kHz and about 1.5 MHz.

17. The method of claim 11, wherein the first piezoelectric frequency is between about 20 kHz and about 1 MHz.

18. The method of claim 11, wherein the first duration at least partially overlaps with the second duration.

* * * * *

UNITED STATES PATENT AND TRADEMARK OFFICE
CERTIFICATE OF CORRECTION

PATENT NO. : 12,453,853 B2  
APPLICATION NO. : 16/020876  
DATED : October 28, 2025  
INVENTOR(S) : Kathryn H. Rosenbluth et al.

Page 1 of 1

It is certified that error appears in the above-identified patent and that said Letters Patent is hereby corrected as shown below:

On the Title Page

On Page 10, Column 1, Line 10, item (56) under Other Publications, delete "and tracking;|Seventh Framework" and insert --and tracking; Seventh Framework--.

On Page 10, Column 2, Line 31, item (56) under Other Publications, delete "Ad HocScientific Committee.," and insert --Ad Hoc Scientific Committee.,--.

On Page 10, Column 2, Line 70, item (56) under Other Publications, delete "stimulation ofinnervated muscle;" and insert --stimulation of innervated muscle;--.

On Page 11, Column 2, Line 13, item (56) under Other Publications, delete "inflammation inlinflammatory bowel" and insert --inflammation in inflammatory bowel--.

In the Specification

In Column 40, Line 5, delete "be IMUS, electrodes," and insert --be IMUs, electrodes,--.

In Column 75, Line 32, delete "a sub combination or" and insert --a subcombination or--.

In the Claims

In Column 78, Claim 11, Line 51, delete "2 MHZ," and insert --2 MHz,--.

In Column 79, Claim 11, Line 4, delete "2 MHZ," and insert --2 MHz,--.

In Column 79, Claim 13, Line 20, delete "second actuator piezoelectric" and insert --second piezoelectric--.

Signed and Sealed this  
Twentieth Day of January, 2026

John A. Squires  
*Director of the United States Patent and Trademark Office*